US012586454B2

(12) United States Patent
De Jong et al.

(10) Patent No.: US 12,586,454 B2
(45) Date of Patent: Mar. 24, 2026

(54) USER INTERFACES FOR LOCATION TRACKING

(71) Applicant: Apple Inc., Cupertino, CA (US)

(72) Inventors: Frank De Jong, San Francisco, CA (US); Christine A. Franco, Menlo Park, CA (US); Benjamin A. Detwiler, Encinitas, CA (US); Brent M. Ledvina, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 87 days.

(21) Appl. No.: 17/659,830

(22) Filed: Apr. 19, 2022

(65) Prior Publication Data

US 2022/0335807 A1 Oct. 20, 2022

Related U.S. Application Data

(60) Provisional application No. 63/363,023, filed on Apr. 14, 2022, provisional application No. 63/176,680, filed on Apr. 19, 2021.

(51) Int. Cl.
*G08B 21/24* (2006.01)
*G06F 3/0482* (2013.01)
*G06F 3/04847* (2022.01)

(52) U.S. Cl.
CPC ........... *G08B 21/24* (2013.01); *G06F 3/0482* (2013.01); *G06F 3/04847* (2013.01)

(58) Field of Classification Search
CPC ... G08B 21/24; G06F 3/0482; G06F 3/04847; G06F 2221/2111; G06F 2221/2141;
(Continued)

(56) References Cited

U.S. PATENT DOCUMENTS 5,672,820 A 9/1997 Rossi et al.
5,956,038 A 9/1999 Rekimoto
(Continued)

FOREIGN PATENT DOCUMENTS

CN 103269510 A 8/2013
CN 205769155 U 12/2016
(Continued)

OTHER PUBLICATIONS

Final Office Action received for U.S. Appl. No. 17/452,971, mailed on Jun. 1, 2022, 22 Pages.
(Continued)

*Primary Examiner* — Quan Zhen Wang
*Assistant Examiner* — Mancil Littlejohn, Jr.
(74) *Attorney, Agent, or Firm* — Kubota & Basol LLP

(57) ABSTRACT

In some embodiments, an electronic device displays visual indications to a user when an electronic device is associated with a particular user account. In some embodiments, an electronic device displays notifications of a separation with a remote locator object (and/or device). In some embodiments, an electronic device utilizes a first or second locator process for locating a device or a remote locator object based on the device or remote locator object being located. In some embodiments, an electronic device facilitates finding associated components that are at one or more physical locations. In some embodiments, an electronic device facilitates display of location information of associated components that are at one or more physical locations.

52 Claims, 133 Drawing Sheets

(58) Field of Classification Search
CPC ............ G06F 2221/2149; G06F 21/88; H04W
4/029; H04W 12/126; H04W 12/63
See application file for complete search history.

(56) References Cited

U.S. PATENT DOCUMENTS

| 6,144,318 | A | 11/2000 | Hayashi et al. |
| 6,144,956 | A | 11/2000 | Yajima et al. |
| 6,323,846 | B1 | 11/2001 | Westerman et al. |
| 6,421,608 | B1 | 7/2002 | Motoyama et al. |
| 6,553,236 | B1 | 4/2003 | Dunko et al. |
| 6,570,557 | B1 | 5/2003 | Westerman et al. |
| 6,636,249 | B1 | 10/2003 | Rekimoto |
| 6,677,932 | B1 | 1/2004 | Westerman |
| 7,274,292 | B2 | 9/2007 | Velhal et al. |
| 7,372,276 | B2 | 5/2008 | Mulcahey |
| 7,523,871 | B1 | 4/2009 | Wilson et al. |
| 7,575,065 | B1 | 8/2009 | Podhrasky |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,788,032 | B2 | 8/2010 | Moloney |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,094,011 | B2 | 1/2012 | Faris et al. |
| 8,239,784 | B2 | 8/2012 | Hotelling et al. |
| 8,279,180 | B2 | 10/2012 | Hotelling et al. |
| 8,380,430 | B2 | 2/2013 | Malone et al. |
| 8,381,135 | B2 | 2/2013 | Hotelling et al. |
| 8,433,722 | B2 | 4/2013 | Shin et al. |
| 8,462,591 | B1 | 6/2013 | Marhaben |
| 8,479,122 | B2 | 7/2013 | Hotelling et al. |
| 8,526,677 | B1 | 9/2013 | Crichton et al. |
| 8,576,669 | B2 | 11/2013 | Onda |
| 8,847,754 | B2 | 9/2014 | Buchheim et al. |
| 8,878,671 | B2 | 11/2014 | Buchheim et al. |
| 9,002,372 | B2 | 4/2015 | Shakespeare et al. |
| 9,348,458 | B2 | 5/2016 | Hotelling et al. |
| 9,357,348 | B2 | 5/2016 | Evans et al. |
| 9,443,414 | B2 | 9/2016 | Scavezze et al. |
| 9,514,630 | B1 | 12/2016 | Steven |
| 9,547,939 | B2 | 1/2017 | Hittel et al. |
| 9,549,282 | B1 | 1/2017 | Mcdonough et al. |
| 9,609,515 | B2 | 3/2017 | Tredoux et al. |
| 9,654,598 | B1 | 5/2017 | Crawford et al. |
| 9,706,357 | B2 | 7/2017 | Heo et al. |
| 9,836,187 | B2 | 12/2017 | Lee et al. |
| 9,892,535 | B1 | 2/2018 | Guy |
| 9,900,733 | B2 | 2/2018 | Beattie, Jr. |
| 9,911,310 | B2 | 3/2018 | Neumeyer et al. |
| 9,933,937 | B2 | 4/2018 | Lemay et al. |
| 9,997,043 | B2 | 6/2018 | H. Kazerouni |
| 10,102,749 | B1 | 10/2018 | Wagner |
| 10,147,303 | B1 | 12/2018 | Carter |
| 10,154,379 | B2 | 12/2018 | Mei et al. |
| 10,212,541 | B1 | 2/2019 | Brody et al. |
| 10,292,006 | B2 | 5/2019 | Yu et al. |
| 10,318,811 | B1 | 6/2019 | Gold et al. |
| 10,373,463 | B1 | 8/2019 | Herring |
| 10,386,960 | B1 | 8/2019 | Smith |
| 10,424,189 | B2 | 9/2019 | Daoura et al. |
| 10,438,409 | B2 | 10/2019 | Todeschini et al. |
| 10,448,211 | B1 | 10/2019 | Shen et al. |
| 10,462,611 | B1 | 10/2019 | Klinkner et al. |
| 10,568,035 | B1 | 2/2020 | Tong |
| 10,757,057 | B2 | 8/2020 | Friend et al. |
| 10,757,540 | B1 | 8/2020 | Klinkner et al. |
| 10,757,676 | B1 | 8/2020 | De La Broise et al. |
| 10,777,053 | B2 | 9/2020 | Jenkins et al. |
| 10,852,918 | B1 | 12/2020 | Voss |
| 11,047,702 | B1 | 6/2021 | Meyer et al. |
| 11,138,251 | B2 | 10/2021 | Estruch Tena et al. |
| 11,145,183 | B2 | 10/2021 | Daoura et al. |
| 11,216,624 | B2 | 1/2022 | Zarshchikov et al. |
| 11,221,752 | B2 | 1/2022 | Howard et al. |
| 11,222,203 | B2 | 1/2022 | Dante et al. |
| 11,792,605 | B2 * | 10/2023 | Daoura .................. H04L 67/563 |
| | | | 340/539.13 |
| 11,823,558 | B2 | 11/2023 | Persson |
| 12,287,220 | B1 | 4/2025 | Cummings |
| 2002/0015024 | A1 | 2/2002 | Westerman et al. |
| 2002/0055362 | A1 | 5/2002 | Aoyama |
| 2002/0183077 | A1 | 12/2002 | Fomukong |
| 2004/0021567 | A1 | 2/2004 | Dunn |
| 2004/0212630 | A1 | 10/2004 | Hobgood et al. |
| 2004/0217859 | A1 | 11/2004 | Pucci et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2006/0197753 | A1 | 9/2006 | Hotelling |
| 2006/0255935 | A1 | 11/2006 | Scalisi et al. |
| 2006/0277469 | A1 | 12/2006 | Chaudhri et al. |
| 2007/0021108 | A1 | 1/2007 | Bocking et al. |
| 2007/0037582 | A1 | 2/2007 | Mohi et al. |
| 2007/0037587 | A1 | 2/2007 | Mohi et al. |
| 2007/0037588 | A1 | 2/2007 | Mohi et al. |
| 2007/0042790 | A1 | 2/2007 | Mohi et al. |
| 2007/0101291 | A1 | 5/2007 | Forstall et al. |
| 2007/0106457 | A1 | 5/2007 | Rosenberg |
| 2007/0157089 | A1 | 7/2007 | Van et al. |
| 2007/0197229 | A1 | 8/2007 | Kalliola et al. |
| 2007/0229350 | A1 | 10/2007 | Scalisi et al. |
| 2007/0252696 | A1 | 11/2007 | Belisle et al. |
| 2007/0291104 | A1 | 12/2007 | Petersen et al. |
| 2008/0102786 | A1 | 5/2008 | Griffin |
| 2008/0125040 | A1 | 5/2008 | Kalayjian |
| 2008/0129491 | A1 | 6/2008 | Ruperto |
| 2008/0143516 | A1 | 6/2008 | Mock et al. |
| 2008/0170118 | A1 | 7/2008 | Albertson et al. |
| 2008/0242278 | A1 | 10/2008 | Rekimoto |
| 2008/0254808 | A1 | 10/2008 | Rekimoto |
| 2008/0254811 | A1 | 10/2008 | Stewart |
| 2009/0040048 | A1 | 2/2009 | Locker et al. |
| 2009/0076723 | A1 | 3/2009 | Moloney |
| 2009/0260022 | A1 | 10/2009 | Louch et al. |
| 2009/0300511 | A1 | 12/2009 | Behar et al. |
| 2010/0002938 | A1 | 1/2010 | Mulcahey |
| 2010/0107179 | A1 | 4/2010 | Quintanilla et al. |
| 2010/0151840 | A1 | 6/2010 | Bauchot et al. |
| 2010/0198867 | A1 | 8/2010 | Rekimoto |
| 2010/0255882 | A1 | 10/2010 | Kozitsyn et al. |
| 2010/0325194 | A1 | 12/2010 | Williamson et al. |
| 2011/0052083 | A1 | 3/2011 | Rekimoto |
| 2011/0081920 | A1 | 4/2011 | Hung et al. |
| 2011/0148625 | A1 | 6/2011 | Velusamy |
| 2011/0181289 | A1 | 7/2011 | Rushing |
| 2011/0187527 | A1 | 8/2011 | Goodwill et al. |
| 2011/0210847 | A1 | 9/2011 | Howard et al. |
| 2011/0222729 | A1 | 9/2011 | Gabara |
| 2011/0234399 | A1 | 9/2011 | Yan |
| 2011/0285506 | A1 | 11/2011 | Hillis |
| 2011/0286310 | A1 | 11/2011 | Onda |
| 2012/0008526 | A1 | 1/2012 | Borghei |
| 2012/0052870 | A1 | 3/2012 | Habicher |
| 2012/0075099 | A1 | 3/2012 | Brown |
| 2012/0092373 | A1 | 4/2012 | Ryu et al. |
| 2012/0166077 | A1 | 6/2012 | Herzog et al. |
| 2012/0171998 | A1 | 7/2012 | Kang |
| 2012/0229400 | A1 | 9/2012 | Birnbaum et al. |
| 2012/0303270 | A1 | 11/2012 | Su et al. |
| 2013/0030931 | A1 | 1/2013 | Moshfeghi |
| 2013/0107057 | A1 | 5/2013 | Zhou et al. |
| 2013/0113715 | A1 | 5/2013 | Grant et al. |
| 2013/0172016 | A1 | 7/2013 | Ooka |
| 2013/0288719 | A1 | 10/2013 | Alonzo |
| 2013/0328665 | A1 | 12/2013 | Cranfill et al. |
| 2013/0332721 | A1 | 12/2013 | Chaudhri et al. |
| 2013/0345953 | A1 | 12/2013 | Udeshi et al. |
| 2014/0044305 | A1 | 2/2014 | Scavezze et al. |
| 2014/0047413 | A1 | 2/2014 | Sheive et al. |
| 2014/0089810 | A1 | 3/2014 | Chen et al. |

(56) References Cited

U.S. PATENT DOCUMENTS

| | | | |
|---|---|---|---|
| 2014/0101189 A1 | 4/2014 | Schenkel |
| 2014/0135042 A1 | 5/2014 | Buchheim et al. |
| 2014/0136633 A1 | 5/2014 | Murillo et al. |
| 2014/0162685 A1 | 6/2014 | Edge |
| 2014/0173439 A1 | 6/2014 | Gutierrez et al. |
| 2014/0213301 A1 | 7/2014 | Evans et al. |
| 2014/0222280 A1 | 8/2014 | Salomonsson et al. |
| 2014/0242972 A1 | 8/2014 | Slotznick |
| 2014/0266698 A1 | 9/2014 | Hall et al. |
| 2014/0267411 A1 | 9/2014 | Fein et al. |
| 2014/0300452 A1 | 10/2014 | Rofe et al. |
| 2014/0327518 A1 | 11/2014 | Loutit |
| 2014/0329460 A1 | 11/2014 | Loutit |
| 2014/0364099 A1 | 12/2014 | Pai et al. |
| 2014/0365923 A1 | 12/2014 | Lee et al. |
| 2014/0365945 A1 | 12/2014 | Karunamuni et al. |
| 2015/0012307 A1 | 1/2015 | Moss |
| 2015/0058744 A1 | 2/2015 | Dhingra et al. |
| 2015/0154851 A1 | 6/2015 | Vincent et al. |
| 2015/0170496 A1 | 6/2015 | King et al. |
| 2015/0172393 A1 | 6/2015 | Oplinger et al. |
| 2015/0195804 A1 | 7/2015 | Stewart et al. |
| 2015/0356393 A1 | 12/2015 | Daoura et al. |
| 2016/0026869 A1 | 1/2016 | Rekimoto |
| 2016/0027307 A1 | 1/2016 | Abhyanker et al. |
| 2016/0034855 A1 | 2/2016 | Guy et al. |
| 2016/0044451 A1 | 2/2016 | Marth |
| 2016/0055676 A1 | 2/2016 | Kasahara et al. |
| 2016/0092705 A1 | 3/2016 | Wadman et al. |
| 2016/0171777 A1 | 6/2016 | Todeschini et al. |
| 2016/0203641 A1 | 7/2016 | Bostick et al. |
| 2016/0335876 A1 | 11/2016 | Verma |
| 2016/0350639 A1 | 12/2016 | Tere |
| 2016/0357354 A1 | 12/2016 | Chen et al. |
| 2016/0381499 A1 | 12/2016 | Draghici et al. |
| 2017/0006577 A1 | 1/2017 | Koum et al. |
| 2017/0048686 A1 | 2/2017 | Chang et al. |
| 2017/0053560 A1 | 2/2017 | Aldossary et al. |
| 2017/0064504 A1 | 3/2017 | Jose |
| 2017/0064511 A1* | 3/2017 | McCormick ............ H04W 4/60 |
| 2017/0092085 A1 | 3/2017 | Agarwal |
| 2017/0092090 A1 | 3/2017 | Lemmer |
| 2017/0168159 A1 | 6/2017 | Gatland |
| 2017/0180934 A1 | 6/2017 | Brice et al. |
| 2017/0276498 A1 | 9/2017 | Tsai |
| 2017/0307388 A1 | 10/2017 | Mcconathy et al. |
| 2017/0353833 A1 | 12/2017 | De Barros Chapiewski et al. |
| 2017/0357320 A1 | 12/2017 | Chaudhri et al. |
| 2017/0357520 A1 | 12/2017 | De Vries et al. |
| 2017/0365100 A1 | 12/2017 | Walton |
| 2018/0035257 A1 | 2/2018 | Mccormick |
| 2018/0077097 A1 | 3/2018 | Alfaro et al. |
| 2018/0084517 A1 | 3/2018 | Do et al. |
| 2018/0091951 A1 | 3/2018 | Sandel et al. |
| 2018/0147472 A1 | 5/2018 | Deangelis et al. |
| 2018/0158197 A1 | 6/2018 | Dasgupta et al. |
| 2018/0165924 A9 | 6/2018 | Olsson et al. |
| 2018/0184286 A1* | 6/2018 | Patterson .............. H04W 12/02 |
| 2018/0189567 A1 | 7/2018 | Maheriya et al. |
| 2018/0198973 A1 | 7/2018 | Eronen et al. |
| 2018/0227393 A1 | 8/2018 | Daub |
| 2018/0240176 A1 | 8/2018 | Cronin et al. |
| 2018/0241488 A1* | 8/2018 | Daoura ................... H04W 4/70 |
| 2018/0276427 A1 | 9/2018 | Depew et al. |
| 2018/0278888 A1 | 9/2018 | Kasahara et al. |
| 2018/0343561 A1 | 11/2018 | Patterson |
| 2018/0349516 A1 | 12/2018 | Dutta et al. |
| 2018/0357876 A1 | 12/2018 | Smoak |
| 2019/0050901 A1 | 2/2019 | Vincent et al. |
| 2019/0073113 A1 | 3/2019 | Yang |
| 2019/0086666 A1 | 3/2019 | Wu |
| 2019/0102372 A1 | 4/2019 | Hailpern et al. |
| 2019/0103012 A1 | 4/2019 | Daoura et al. |
| 2019/0114887 A1 | 4/2019 | Brantley |
| 2019/0114921 A1 | 4/2019 | Cazzoli |
| 2019/0163748 A1 | 5/2019 | Cuthbert et al. |
| 2019/0174265 A1 | 6/2019 | Chen |
| 2019/0182626 A1 | 6/2019 | Miller et al. |
| 2019/0285413 A1 | 9/2019 | Hallett |
| 2019/0362556 A1 | 11/2019 | Ben-dor et al. |
| 2019/0370544 A1 | 12/2019 | Wright et al. |
| 2020/0015040 A1 | 1/2020 | Baird et al. |
| 2020/0107164 A1 | 4/2020 | Lopatin et al. |
| 2020/0107165 A1 | 4/2020 | Pai et al. |
| 2020/0110934 A1 | 4/2020 | Paul |
| 2020/0117339 A1 | 4/2020 | Amitay et al. |
| 2020/0139929 A1 | 5/2020 | Turley |
| 2020/0169848 A1 | 5/2020 | Daoura et al. |
| 2020/0193783 A1 | 6/2020 | Peoples |
| 2020/0220914 A1 | 7/2020 | Carrigan et al. |
| 2020/0242848 A1 | 7/2020 | Ambler et al. |
| 2020/0257865 A1 | 8/2020 | Zarshchikov et al. |
| 2020/0259908 A1 | 8/2020 | Klinkner et al. |
| 2020/0260142 A1 | 8/2020 | Kasahara et al. |
| 2020/0273235 A1 | 8/2020 | Emami et al. |
| 2020/0284585 A1 | 9/2020 | Lee |
| 2020/0379946 A1 | 12/2020 | Coffman et al. |
| 2020/0382908 A1 | 12/2020 | Behzadi et al. |
| 2020/0382912 A1 | 12/2020 | Dancie et al. |
| 2020/0409537 A1 | 12/2020 | Story et al. |
| 2021/0004759 A1 | 1/2021 | Arunachalam et al. |
| 2021/0126889 A1 | 4/2021 | Springstroh |
| 2021/0190503 A1 | 6/2021 | Landers |
| 2021/0264154 A1 | 8/2021 | Lamont |
| 2021/0314735 A1 | 10/2021 | Klinkner et al. |
| 2022/0023136 A1 | 1/2022 | Xia et al. |
| 2022/0035510 A1 | 2/2022 | Behzadi et al. |
| 2022/0050563 A1 | 2/2022 | Behzadi et al. |
| 2022/0051182 A1 | 2/2022 | Fox et al. |
| 2022/0075503 A1 | 3/2022 | Behzadi et al. |
| 2022/0100286 A1 | 3/2022 | De Jong et al. |
| 2022/0103974 A1 | 3/2022 | De Jong et al. |
| 2022/0107187 A1 | 4/2022 | Okabe et al. |
| 2022/0223013 A1 | 7/2022 | Persson et al. |
| 2022/0365633 A1 | 11/2022 | Rochette et al. |
| 2023/0164103 A1 | 5/2023 | Ham et al. |
| 2023/0262420 A1 | 8/2023 | Behzadi et al. |
| 2023/0342009 A1 | 10/2023 | De Jong et al. |
| 2023/0375359 A1 | 11/2023 | Fleizach et al. |
| 2024/0012531 A1 | 1/2024 | Behzadi et al. |
| 2024/0062634 A1 | 2/2024 | Persson |
| 2024/0272773 A1 | 8/2024 | De Jong et al. |
| 2024/0334161 A1 | 10/2024 | De Jong et al. |
| 2024/0406672 A1 | 12/2024 | Sart |
| 2024/0406677 A1 | 12/2024 | Allen |
| 2025/0088584 A1 | 3/2025 | De Jong et al. |
| 2025/0356743 A1 | 11/2025 | Persson et al. |

FOREIGN PATENT DOCUMENTS

| | | |
|---|---|---|
| CN | 109146954 A | 1/2019 |
| CN | 110297594 A | 10/2019 |
| EP | 2439920 A1 | 4/2012 |
| EP | 2482164 A1 | 8/2012 |
| IT | UA20163647 A1 | 11/2017 |
| JP | 2006-284458 A | 10/2006 |
| JP | 2007-088943 A | 4/2007 |
| JP | 2017-015593 A | 1/2017 |
| JP | 2017-530463 A | 10/2017 |
| JP | 2018101831 A | 6/2018 |
| JP | 2019-046502 A | 3/2019 |
| JP | 2020531938 A | 11/2020 |
| KR | 10-2016-0145159 A | 12/2016 |
| WO | 2001/037004 A1 | 5/2001 |
| WO | 2012/047920 A1 | 4/2012 |
| WO | 2013/169849 A2 | 11/2013 |
| WO | 2014/105276 A1 | 7/2014 |
| WO | 2018/034053 A1 | 2/2018 |

(56)                    References Cited

FOREIGN PATENT DOCUMENTS

WO          2020/214864 A1    10/2020
WO          2023105450 A1      6/2023

OTHER PUBLICATIONS

Final Office Action received for U.S. Appl. No. 17/503,246, mailed on May 20, 2022, 17 Pages.
International Search Report received for PCT Patent Application No. PCT/US2020/028595, mailed on Aug. 14, 2020, 5 pages.
International Search Report received for PCT Patent Application No. PCT/US2020/030149, mailed on Sep. 4, 2020, 6 pages.
International Search Report received for PCT Patent Application No. PCT/US2021/071555, mailed on Feb. 14, 2022, 6 pages.
Non-Final Office Action received for U.S. Appl. No. 17/452,971, mailed on Jan. 21, 2022, 12 pages.
Non-Final Office Action received for U.S. Appl. No. 17/455,821, mailed on Apr. 7, 2022, 18 Pages.
Non-Final Office Action received for U.S. Appl. No. 17/455,843, mailed on May 26, 2022, 20 Pages.
Non-Final Office Action received for U.S. Appl. No. 17/503,246, mailed on Feb. 3, 2022, 15 pages.
Mokatren et al., "Exploring the Potential of a Mobile Eye Tracker as an Intuitive Indoor Pointing Device: A Case Study in Cultural Heritage", In: Future Generation Computer Systems, Available online at: <https://is-web.hevra.haifa.ac.il/images/lecturers_files/ishimshoni_files/MokatrenFGCS.pdf>, [retrieved on Jul. 26, 2020], Jul. 1, 2017, 14 pages.
Extended European Search Report received for European Patent Application No. 20790659.5, mailed on Nov. 29, 2022, 11 pages.
Extended European Search Report received for European Patent Application No. 20798438.6, mailed on Jan. 3, 2023, 11 pages.
Final Office Action received for U.S. Appl. No. 17/455,821, mailed on Jul. 29, 2022, 20 pages.
Final Office Action received for U.S. Appl. No. 17/455,843, mailed on Oct. 3, 2022, 27 pages.
International Search Report received for PCT Patent Application No. PCT/US2022/071806, mailed on Oct. 21, 2022, 6 pages.
International Search Report received for PCT Patent Application No. PCT/US2022/072389, mailed on Nov. 30, 2022, 7 pages.
Non-Final Office Action received for U.S. Appl. No. 17/448,491, mailed on Jul. 27, 2022, 16 pages.
Non-Final Office Action received for U.S. Appl. No. 17/452,971, mailed on Feb. 15, 2023, 17 pages.
Non-Final Office Action received for U.S. Appl. No. 17/455,821, mailed on Dec. 8, 2022, 24 pages.
Non-Final Office Action received for U.S. Appl. No. 17/455,843, mailed on Feb. 15, 2023, 28 pages.
Notice of Allowance received for U.S. Appl. No. 17/448,491, mailed on Jan. 18, 2023, 8 pages.
Notice of Allowance received for U.S. Appl. No. 17/503,246, mailed on Dec. 7, 2022, 10 pages.
Notice of Allowance received for U.S. Appl. No. 17/503,246, mailed on Jan. 25, 2023, 9 pages.
Notice of Allowance received for U.S. Appl. No. 17/594,742, mailed on Mar. 29, 2023, 9 pages.
Google Maps' Location Sharing Feature Can Show Your Friends' Battery Status, Available online at: <https://www.firstpost.com/tech/news-analysis/google-maps-location-sharing-feature-can-show-your-friends-battery-status-4885521.html>, [Retrieved Jan. 27, 2023], Aug. 3, 2018, 2 pages.
Hill, Spencer, "Does Airplane Mode Stop GPS Tracking?", Retrieved from the Internet: <https://web.archive.org/web/20200921071851/https://www.imyfone.com/change-location/does-airplane-mode-stop-tracking/>, [retrieved on Aug. 18, 2022], Part 1. Does Airplane Mode Stop GPS Tracking?, Sep. 21, 2020, pp. 1-2.
Roberts et al., "The Use of Augmented Reality, GPS and INS for Subsurface Data Visualisation", FIG XXII International Congress, Washington, D.C. USA, Apr. 19-26, 2002, 12 pages.

Notice of Allowance received for U.S. Appl. No. 17/448,491, mailed on May 4, 2023, 7 pages.
Notice of Allowance received for U.S. Appl. No. 17/452,971, mailed on Aug. 17, 2023, 11 pages.
Notice of Allowance received for U.S. Appl. No. 17/455,821, mailed on Sep. 20, 2023, 8 pages.
Notice of Allowance received for U.S. Appl. No. 17/455,843, mailed on Jul. 19, 2023, 9 pages.
Notice of Allowance received for U.S. Appl. No. 17/503,246, mailed on May 18, 2023, 9 pages.
Notice of Allowance received for U.S. Appl. No. 17/594,742, mailed on Jul. 24, 2023, 8 pages.
Corrected Notice of Allowability received for U.S. Appl. No. 17/452,971, mailed on Mar. 11, 2024, 3 pages.
Corrected Notice of Allowability received for U.S. Appl. No. 17/455,843, mailed on Mar. 14 2024, 3 pages.
Final Office Action received for U.S. Appl. No. 17/663,816, mailed on Mar. 27, 2024, 38 pages.
HowTechs, Motorola Moto G—How to reorganize app and widget, https://www.youtube.com/watch?v=0szKlr7xnqs, Dec. 22, 2013, 15 pages.
International Search Report received for PCT Application No. PCT/US2023/019402, mailed on Sep. 19, 2023, 6 pages.
International Search Report received for PCT Patent Application No. PCT/US2023/022602, mailed on Sep. 4, 2023, 4 pages.
Non-Final Office Action received for U.S. Appl. No. 17/663,816, mailed on Oct. 19, 2023, 35 pages.
Non-Final Office Action received for U.S. Appl. No. 18/474,133, mailed on Jul. 3, 2024, 13 pages.
Non-Final Office Action received for U.S. Appl. No. 18/499,157, mailed on Jun. 5, 2024, 7 pages.
Notice of Allowance received for U.S. Appl. No. 17/452,971, mailed on Dec. 12, 2023, 7 pages.
Notice of Allowance received for U.S. Appl. No. 17/455,821, mailed on Dec. 12, 2023, 9 pages.
Notice of Allowance received for U.S. Appl. No. 17/455,843, mailed on Nov. 1, 2023, 7 pages.
Notice of Allowance received for U.S. Appl. No. 18/309,492, mailed on Mar. 8, 2024, 10 pages.
Notice of Allowance received for U.S. Appl. No. 18/309,492, mailed on Nov. 24, 2023, 10 pages.
Search Report received for Chinese Patent Application No. 202210059059.2, mailed on Dec. 22, 2023, 5 pages (2 pages of English Translation and 3 pages of Official Copy).
Stolyar, Brenda, "Google Maps' Location Sharing Now Lets You Track Battery Status", https://www.digitaltrends.com/mobile/google-maps-lets-you-share-your-location-and-battery-level/, Aug. 3, 2018, pp. 1-4.
European Search Report received for European Patent Application No. 21799155.3, mailed on Sep. 27, 2024, 4 pages.
Final Office Action received for U.S. Appl. No. 18/474,133, mailed on Aug. 26, 2024, 13 pages.
International Search Report received for PCT Patent Application No. PCT/US2024/015620, mailed on Jul. 17, 2024, 7 pages.
Non-Final Office Action received for U.S. Appl. No. 17/663,816, mailed on Sep. 28, 2024, 39 pages.
Non-Final Office Action received for U.S. Appl. No. 18/304,911, mailed on Sep. 12, 2024, 41 pages.
Wikipedia , "Virtual Network Computing", Wikipedia, Available online at <https://en.wikipedia.org/w/index.php?t%20itle=Virtual%20Network%20Computing&oldid=1120211990>, Nov. 5, 2024, 5 pages.
Non-Final Office Action received for U.S. Appl. No. 18/474,133, mailed on Mar. 24, 2025, 12 pages.
Final Office Action received for U.S. Appl. No. 17/663,816, mailed on Mar. 21, 2025, 36 pages.
International Search Report received for PCT Patent Application No. PCT/US2024/046045, mailed on Nov. 28, 2024, 4 pages.
Notice of Allowance received for U.S. Appl. No. 18/499,157, mailed on Apr. 11, 2025, 7 Pages.
International Search Report received for PCT Patent Application No. PCT/US2024/031500, mailed on Nov. 21, 2024, 6 pages.

(56) References Cited

OTHER PUBLICATIONS

International Search Report received for PCT Patent Application No. PCT/US2024/031781, mailed on Aug. 13, 2024, 5 pages.

Notice of Allowance received for U.S. Appl. No. 18/499,157, mailed on Dec. 12, 2024, 7 pages.

Non-Final Office Action received for U.S. Appl. No. 18/319,394, mailed on Jun. 17, 2025, 18 pages.

Non-Final Office Action received for U.S. Appl. No. 18/304,911, mailed on Apr. 28, 2025, 41 pages.

Non-Final Office Action received for U.S. Appl. No. 18/464,086, mailed on Apr. 22, 2025, 8 pages.

Non-Final Office Action received for U.S. Appl. No. 18/440,762, mailed on Sep. 30, 2025, 12 pages.

Final Office Action received for U.S. Appl. No. 18/474,133, mailed on Sep. 16, 2025, 13 pages.

Final Office Action received for U.S. Appl. No. 18/319,394, mailed on Nov. 17, 2025, 16 pages.

Notice of Allowance received for U.S. Appl. No. 17/663,816, mailed on Nov. 20, 2025, 20 pages.

Corrected Notice of Allowability received for U.S. Appl. No. 17/663,816, mailed on Dec. 5, 2025, 3 pages.

* cited by examiner

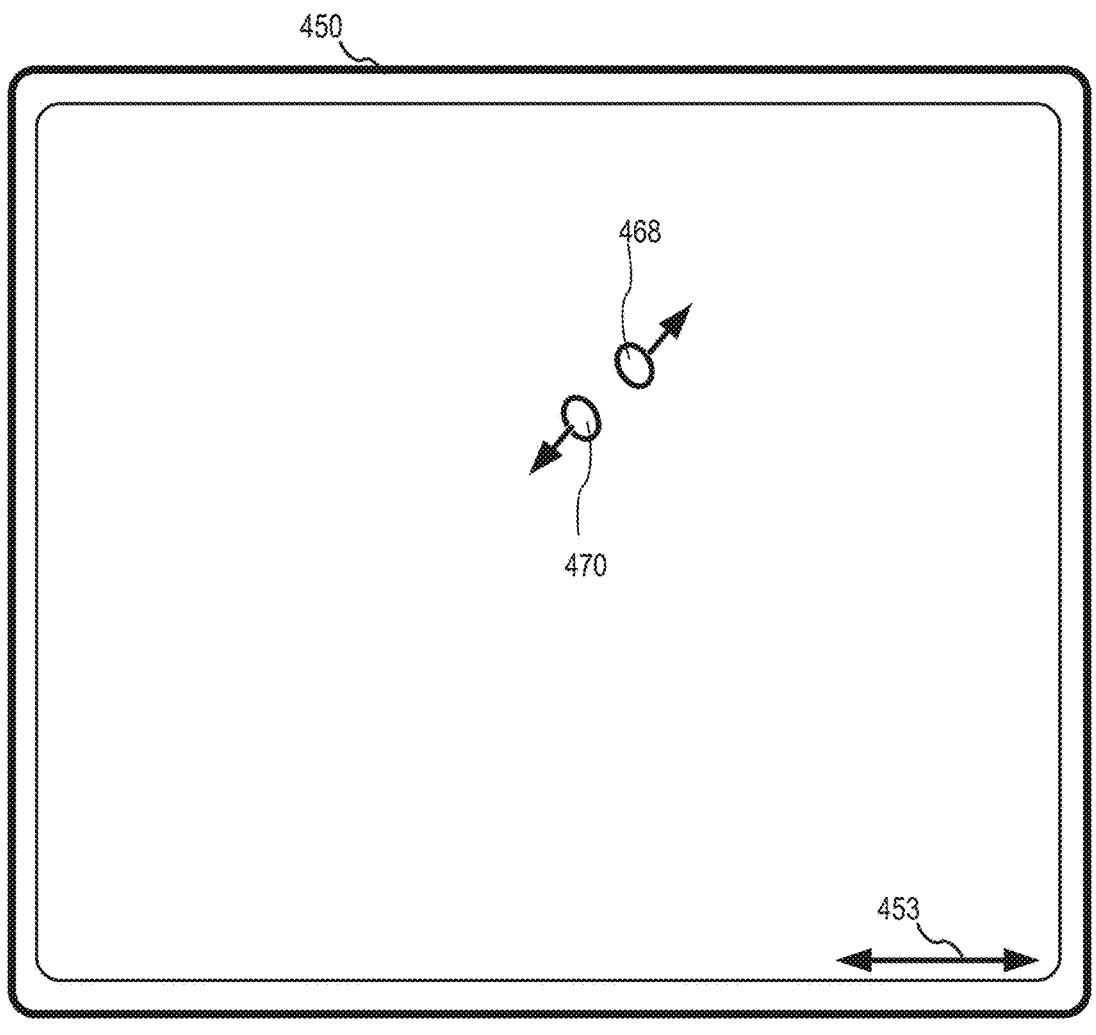
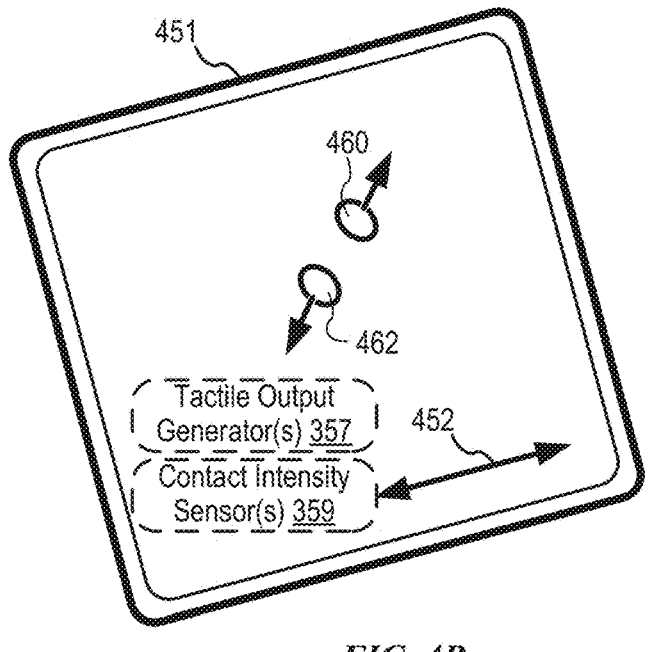
*FIG. 4B*

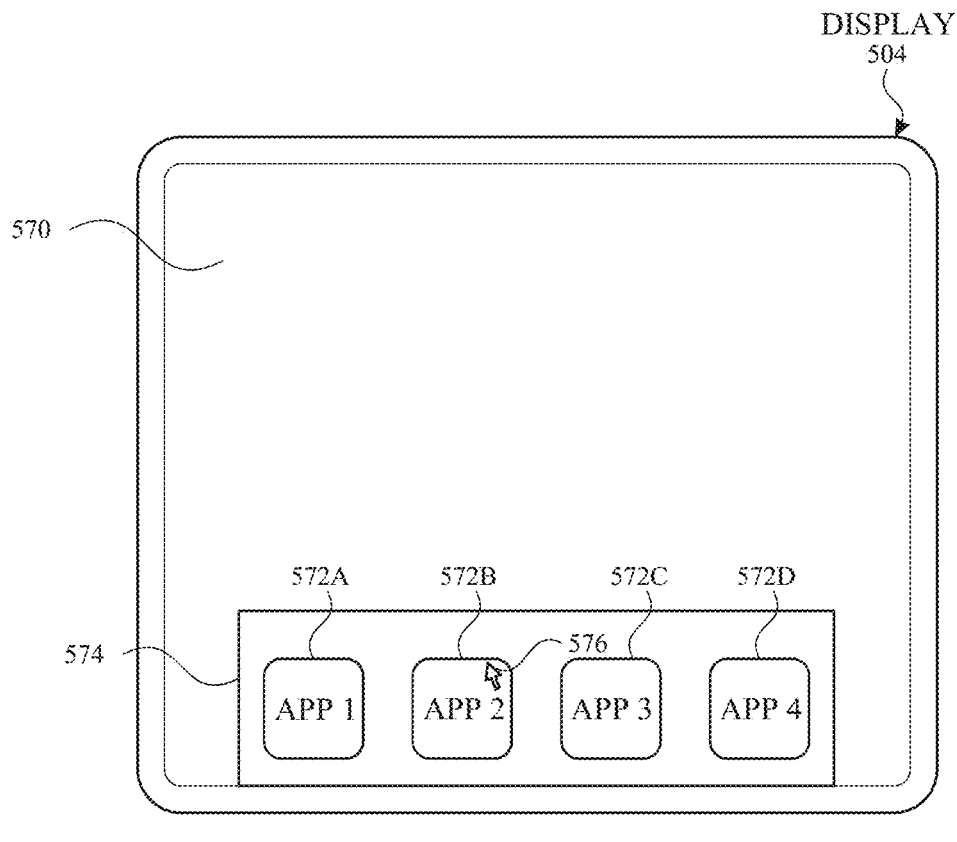
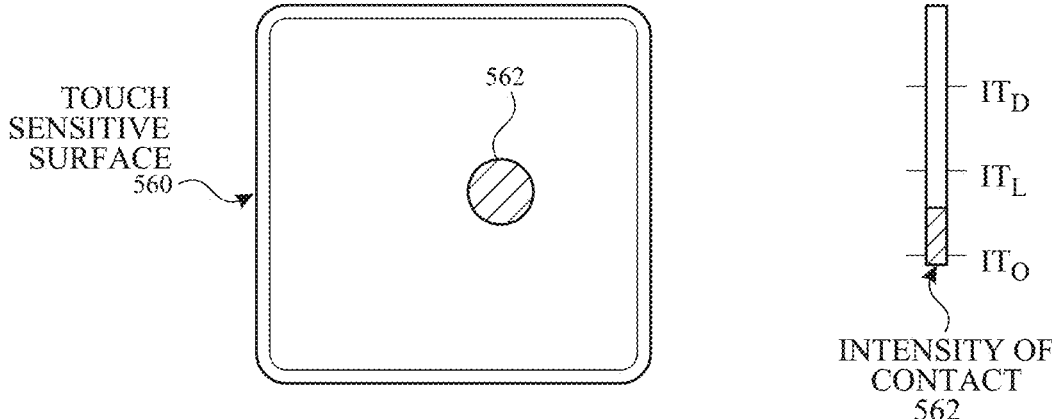
*FIG. 5E*

(Associated with John Doe's Account)

(Associated with John Doe's Account)

(Associated with John Doe's Account)

(Associated with John Doe's Account)

(Associated with John Doe's Account)

(Associated with John Doe's Account)

(Associated with John Doe's Account)

(Associated with John Doe's Account)

(Associated with John Doe's Account)

Resetting (Associated with John Doe's Account)

(Associated with John Doe's Account)

(Associated with John Doe's Account)

(Associated with John Doe's Account)

(Not associated with a User Account)

(Associated with Johnny Appleseed's Account)

(Associated with John Doe's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

(Associated with Johnny Appleseed's Account)

700

Detect, via one or more input devices, a first input, wherein the first input is detected while the electronic device is in a device setup state in which the device is prepared to be setup for use with a new user account and before starting a process for configuring the electronic device for use with the new user account 702a In response to detecting the first input, displaying, via a display generation component, a user interface of the electronic device, wherein:

702b

In accordance with a determination that the electronic device is currently associated with a user account that was used with the device prior to the device being reset to the device setup state the user interface includes an indication of functionality associated with the user account that was used with the device prior to the device being reset to the device setup state 702c In accordance with a determination that the electronic device is not currently associated with a user account, the user interface does not include the indication of functionality associated with the user account 702d

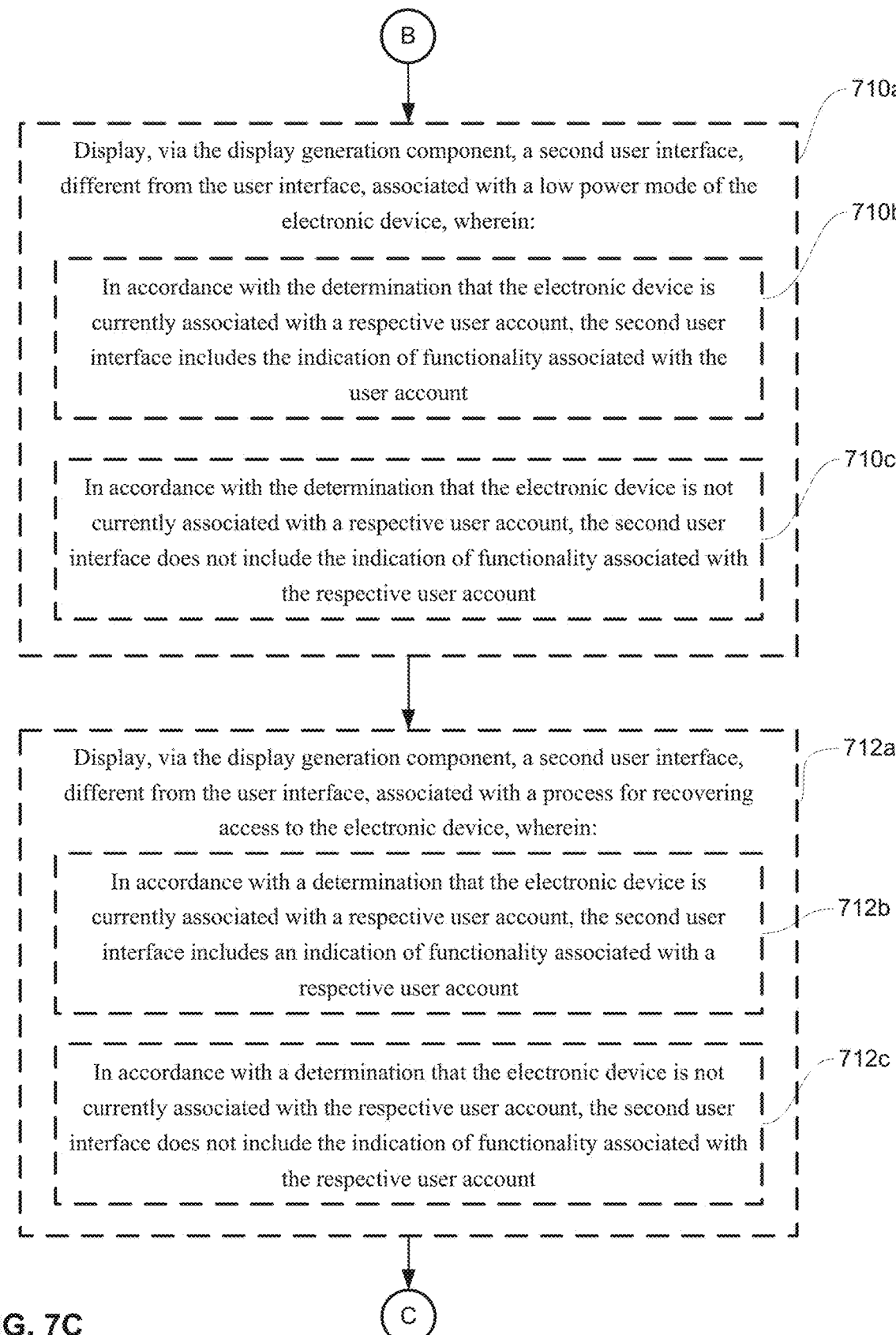

B

710a

Display, via the display generation component, a second user interface, different from the user interface, associated with a low power mode of the electronic device, wherein:

710b

In accordance with the determination that the electronic device is currently associated with a respective user account, the second user interface includes the indication of functionality associated with the user account 710c In accordance with the determination that the electronic device is not currently associated with a respective user account, the second user interface does not include the indication of functionality associated with the respective user account 712a Display, via the display generation component, a second user interface, different from the user interface, associated with a process for recovering access to the electronic device, wherein:

712b

In accordance with a determination that the electronic device is currently associated with a respective user account, the second user interface includes an indication of functionality associated with a respective user account 712c In accordance with a determination that the electronic device is not currently associated with the respective user account, the second user interface does not include the indication of functionality associated with the respective user account

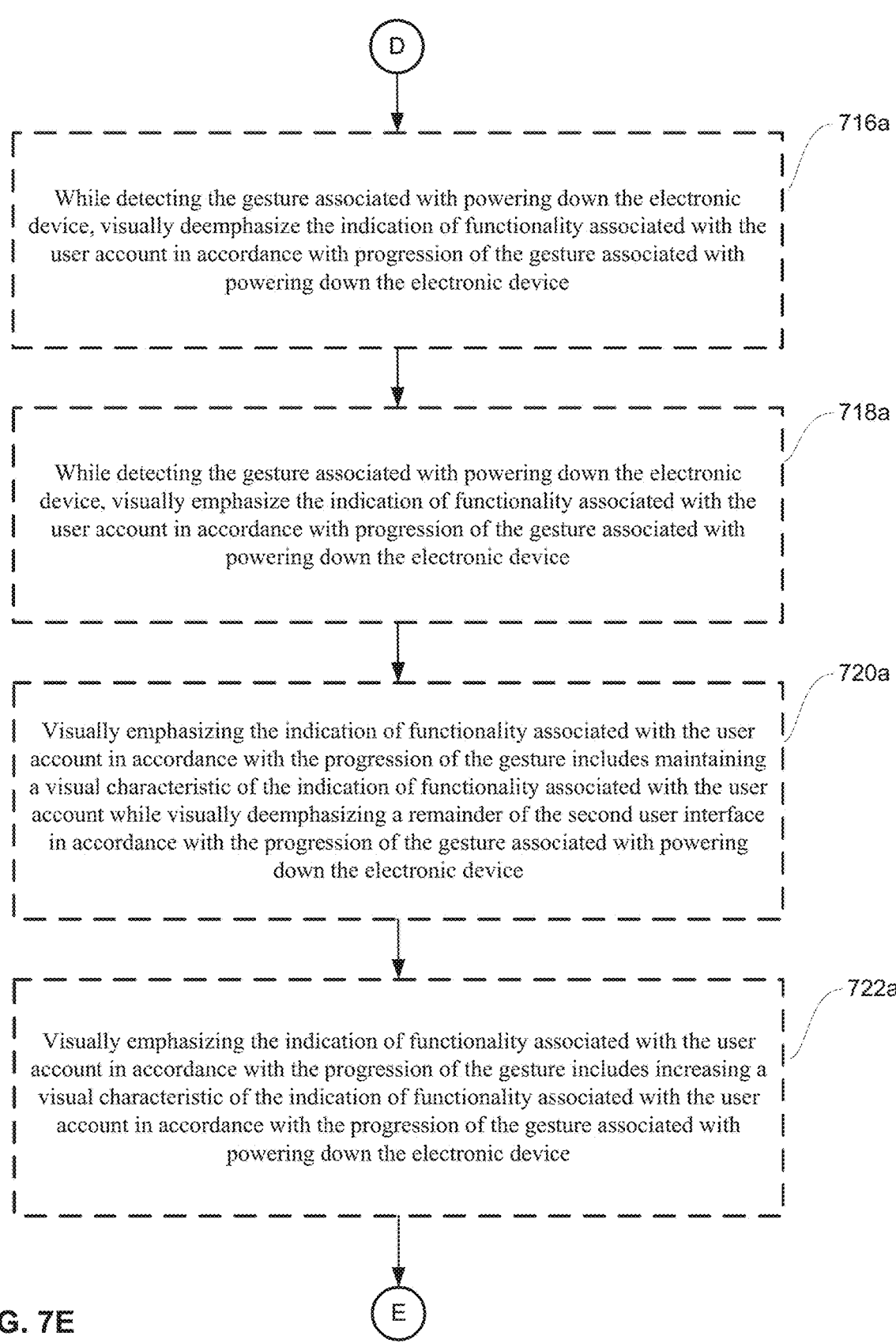

D

While detecting the gesture associated with powering down the electronic device, visually deemphasize the indication of functionality associated with the user account in accordance with progression of the gesture associated with powering down the electronic device 716a While detecting the gesture associated with powering down the electronic device, visually emphasize the indication of functionality associated with the user account in accordance with progression of the gesture associated with powering down the electronic device 718a Visually emphasizing the indication of functionality associated with the user account in accordance with the progression of the gesture includes maintaining a visual characteristic of the indication of functionality associated with the user account while visually deemphasizing a remainder of the second user interface in accordance with the progression of the gesture associated with powering down the electronic device 720a Visually emphasizing the indication of functionality associated with the user account in accordance with the progression of the gesture includes increasing a visual characteristic of the indication of functionality associated with the user account in accordance with the progression of the gesture associated with powering down the electronic device 722a

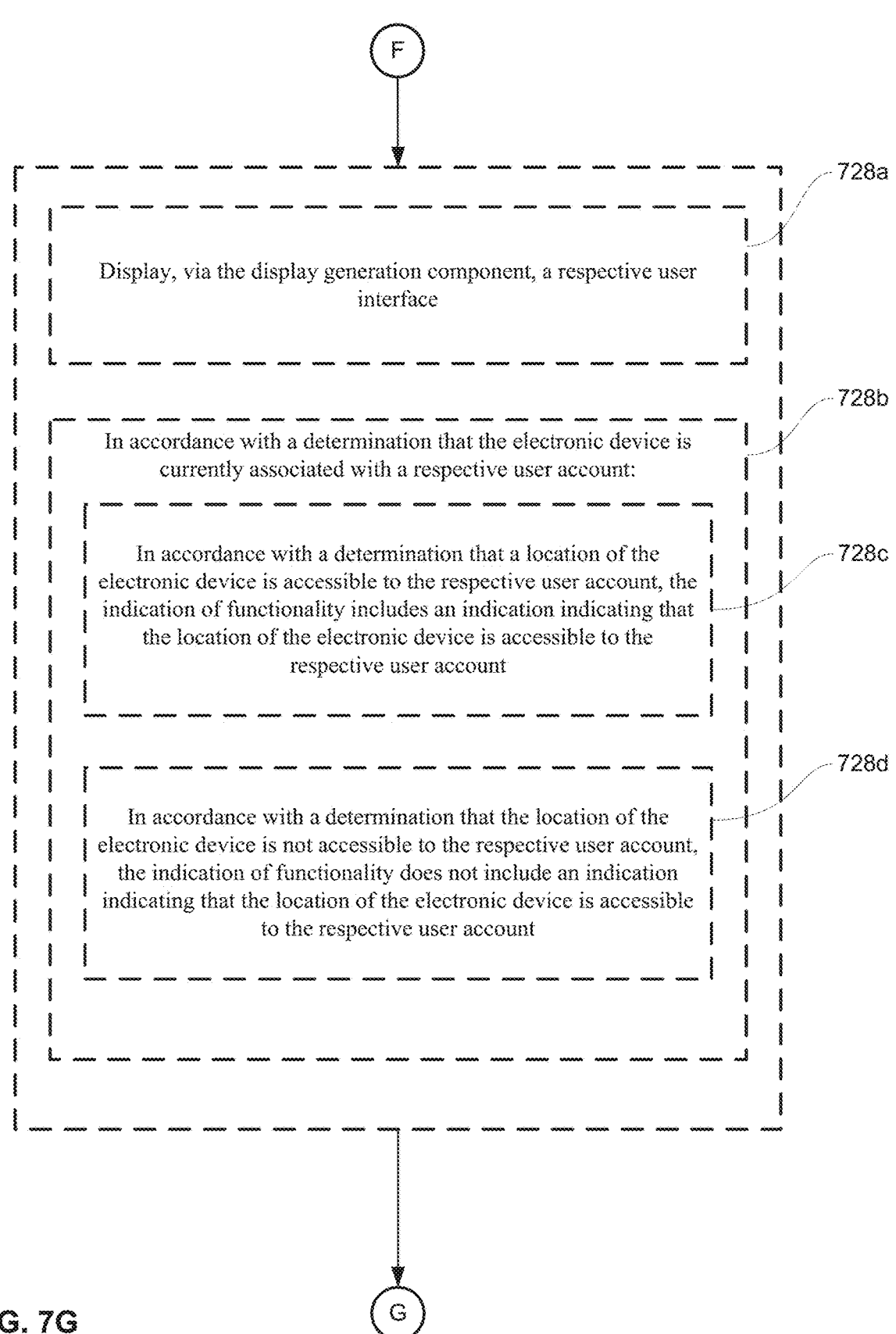

F

Display, via the display generation component, a respective user interface

728a

In accordance with a determination that the electronic device is currently associated with a respective user account:

728b

In accordance with a determination that a location of the electronic device is accessible to the respective user account, the indication of functionality includes an indication indicating that the location of the electronic device is accessible to the respective user account 728c In accordance with a determination that the location of the electronic device is not accessible to the respective user account, the indication of functionality does not include an indication indicating that the location of the electronic device is accessible to the respective user account 728d

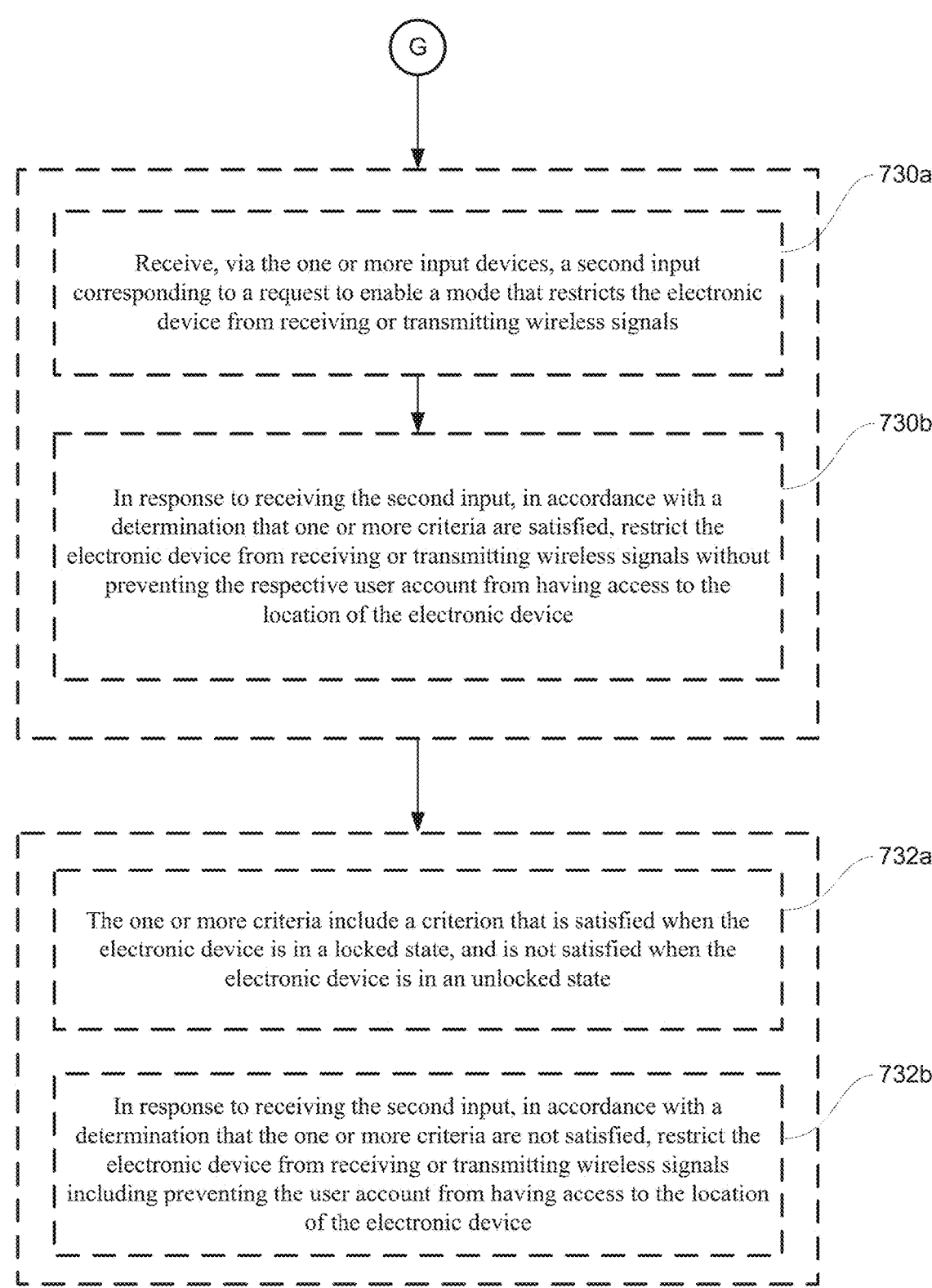

Receive, via the one or more input devices, a second input corresponding to a request to enable a mode that restricts the electronic device from receiving or transmitting wireless signals In response to receiving the second input, in accordance with a determination that one or more criteria are satisfied, restrict the electronic device from receiving or transmitting wireless signals without preventing the respective user account from having access to the location of the electronic device The one or more criteria include a criterion that is satisfied when the electronic device is in a locked state, and is not satisfied when the electronic device is in an unlocked state In response to receiving the second input, in accordance with a determination that the one or more criteria are not satisfied, restrict the electronic device from receiving or transmitting wireless signals including preventing the user account from having access to the location of the electronic device

FIG. 7H

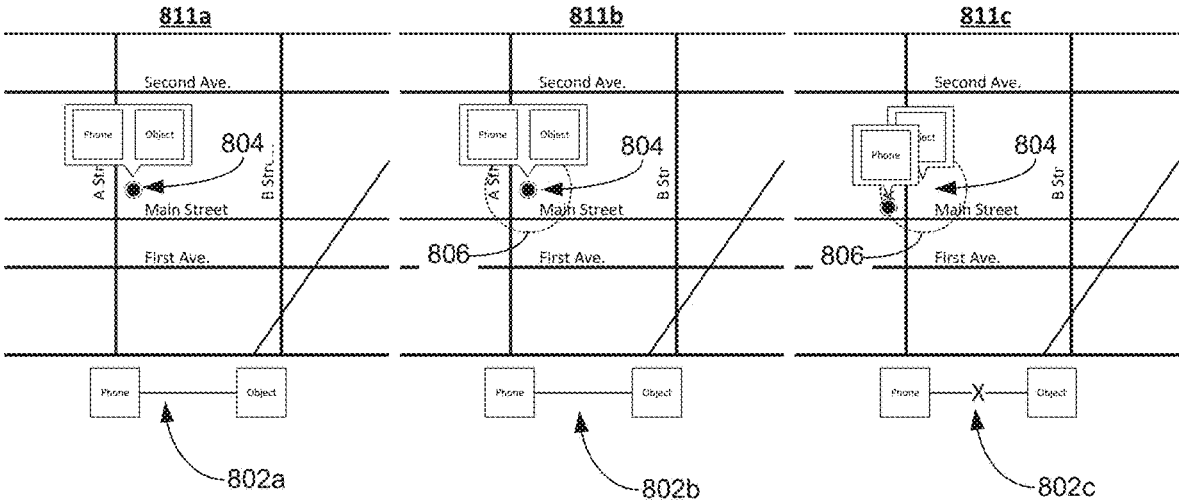
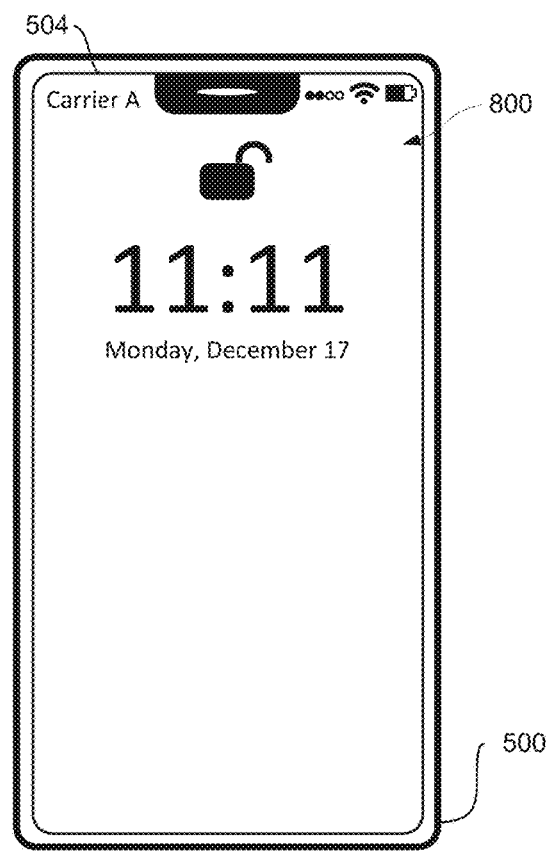
FIG. 8A

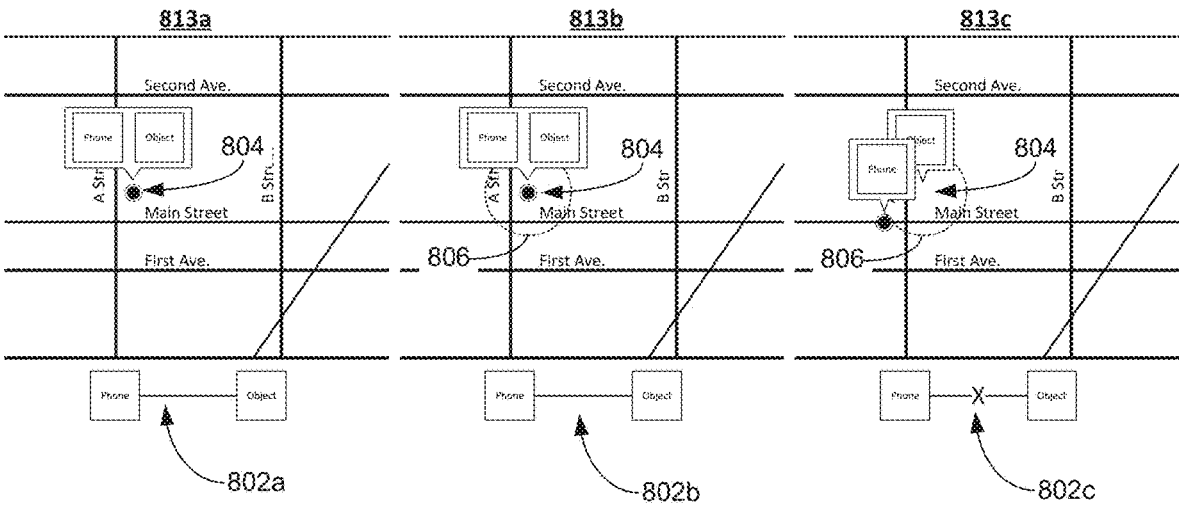
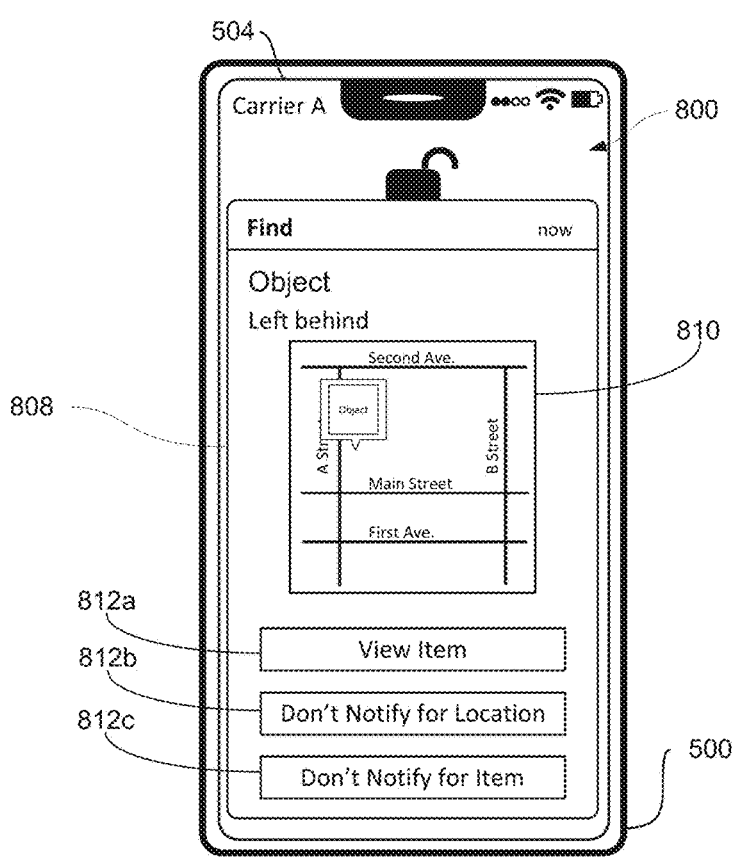
FIG. 8B

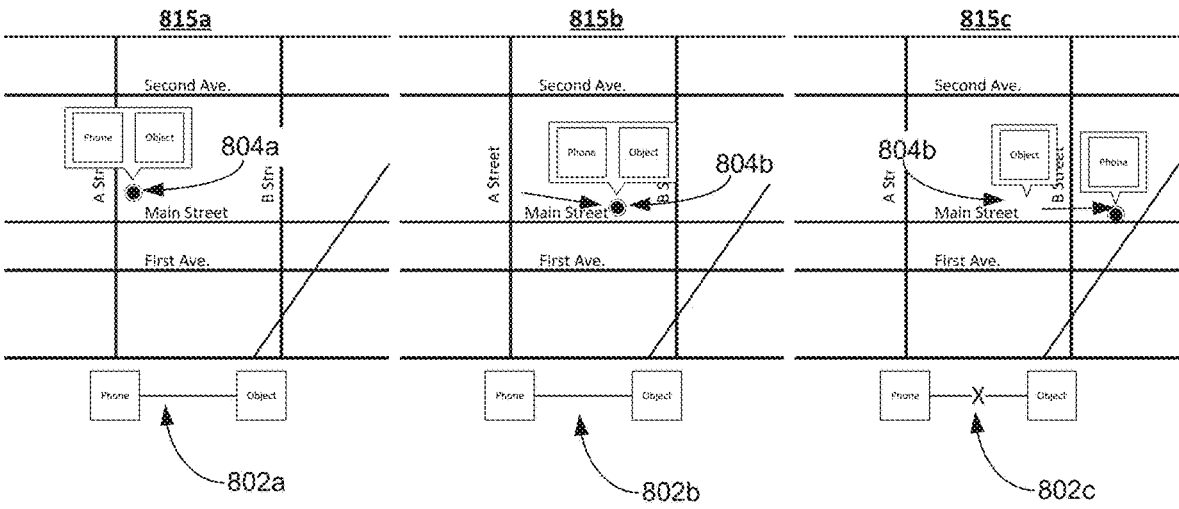
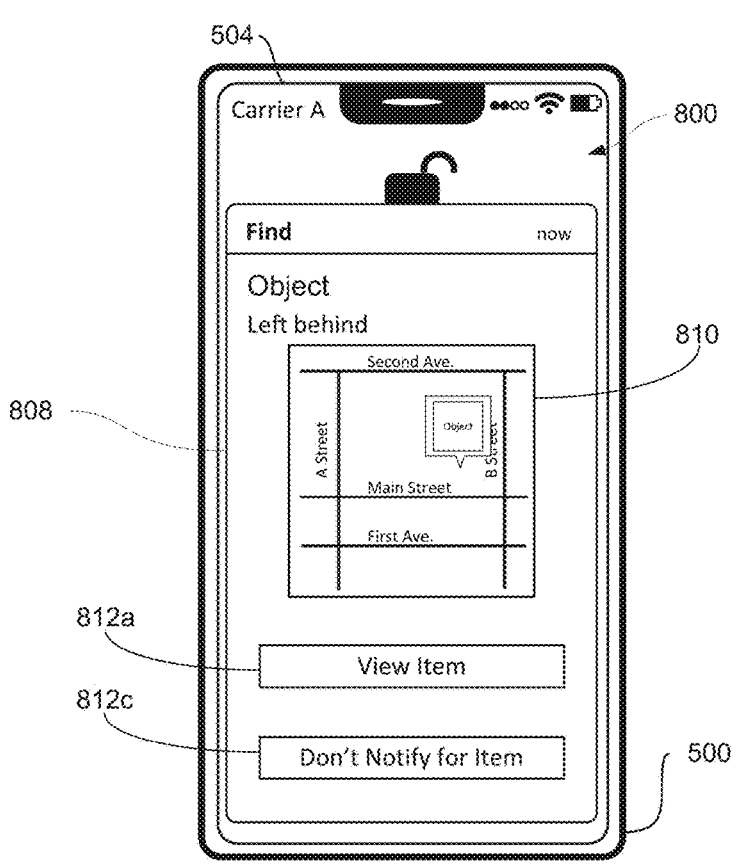
FIG. 8C

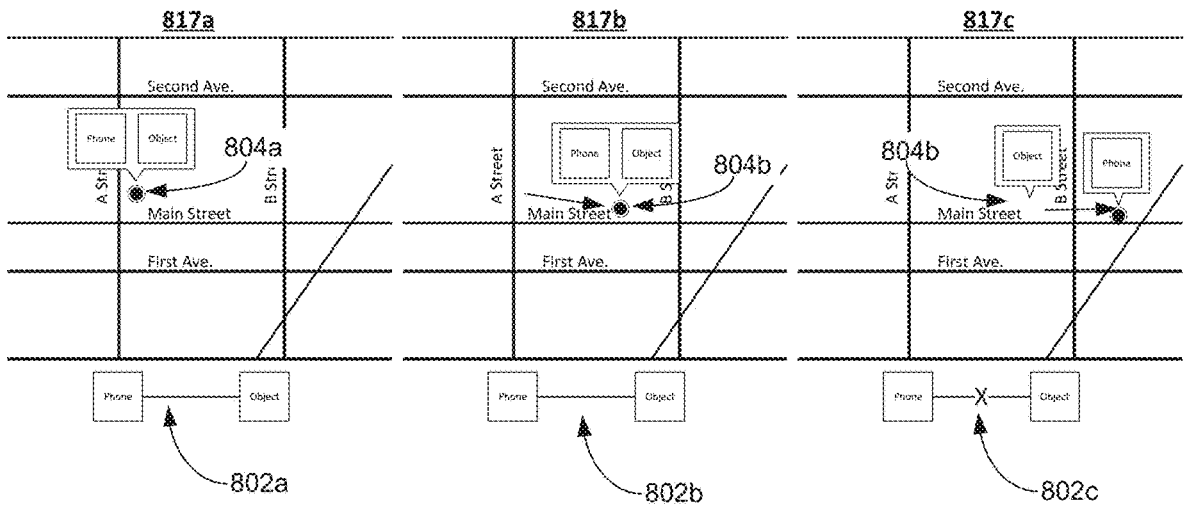
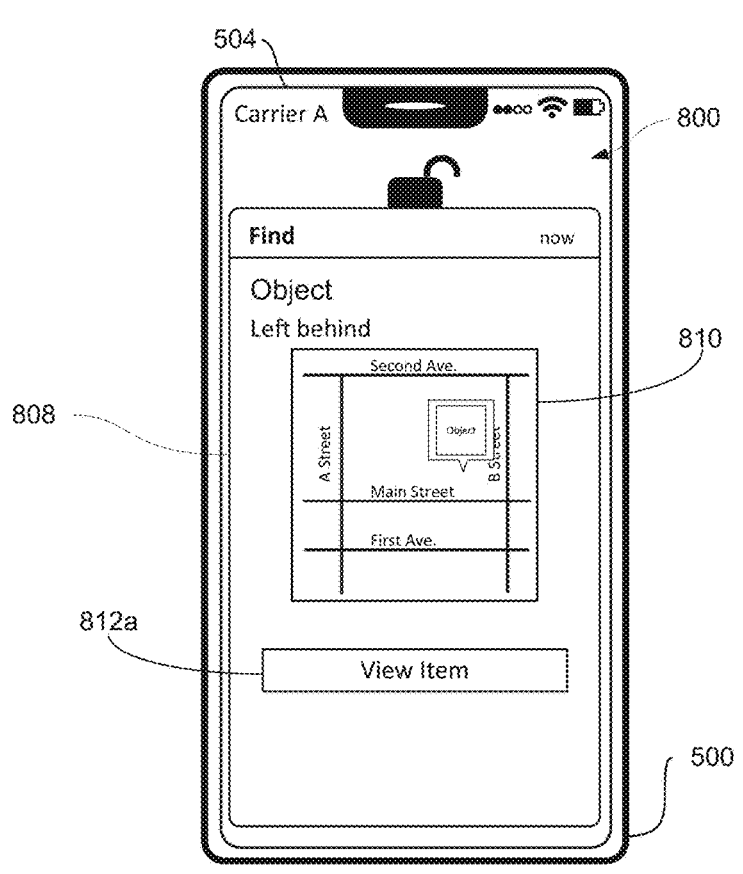
FIG. 8D

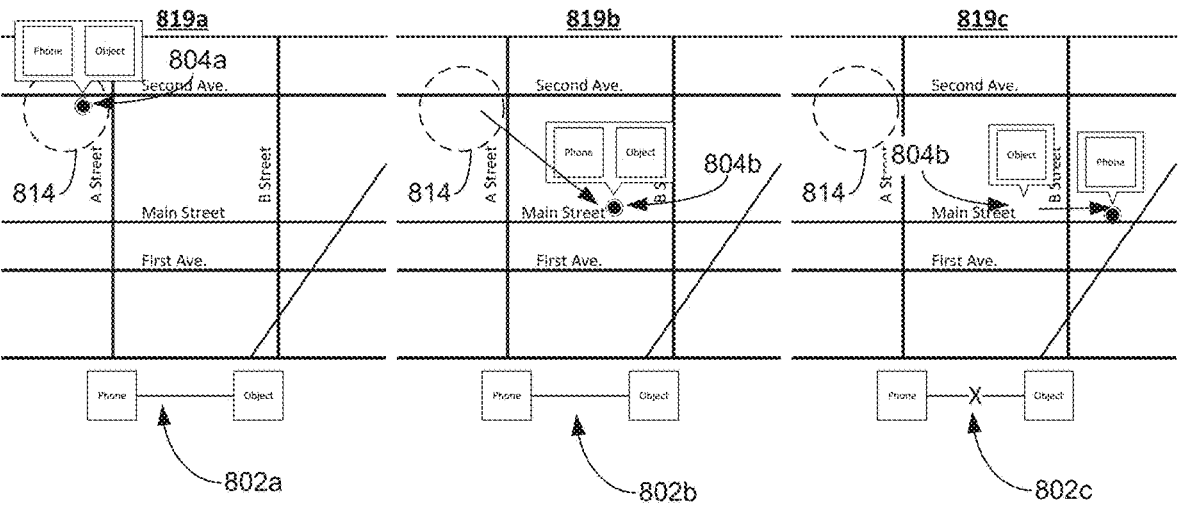
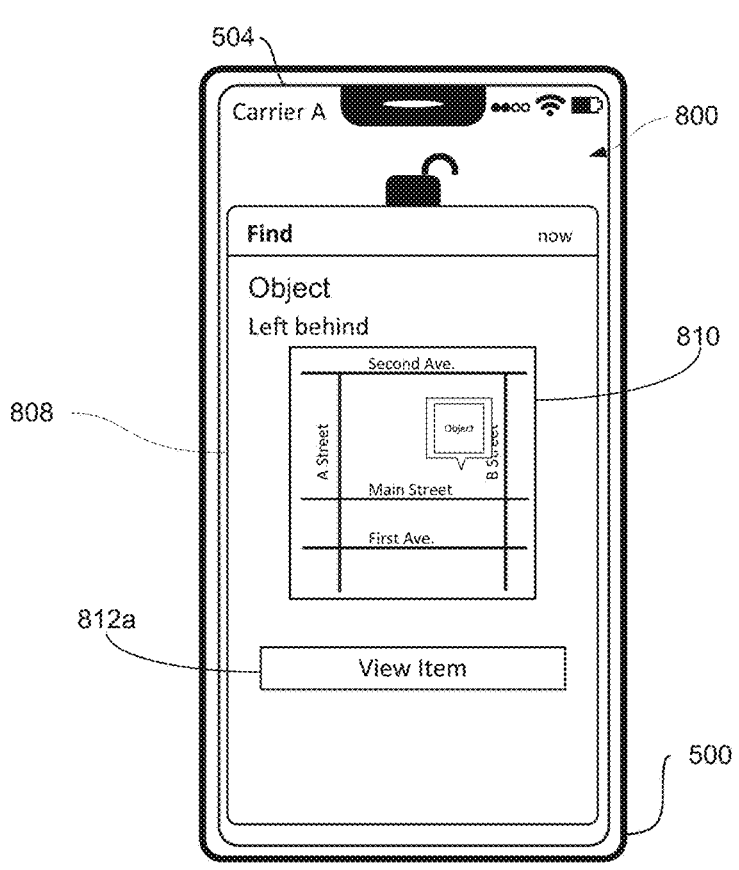
FIG. 8E

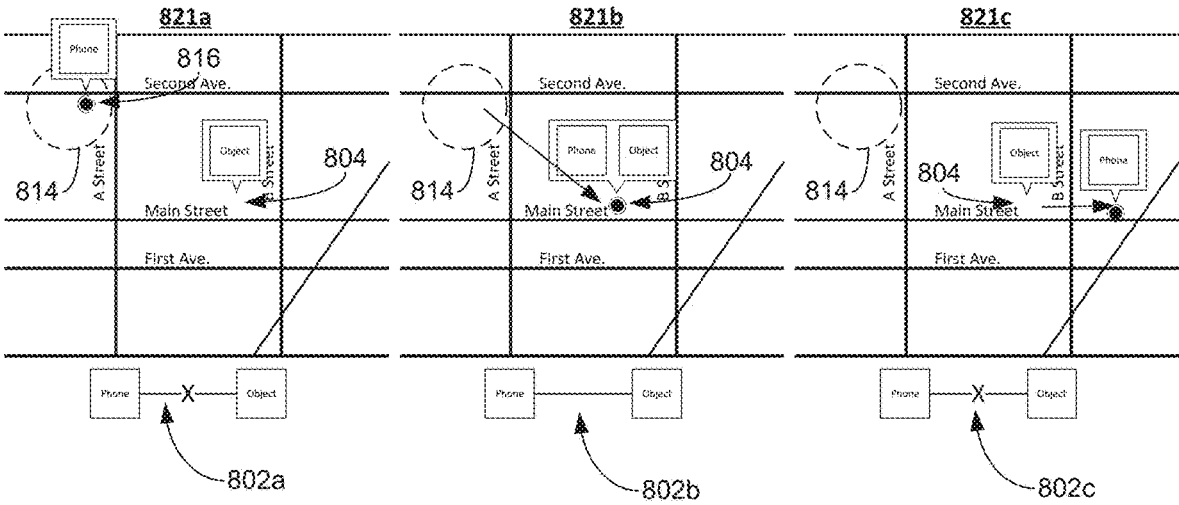
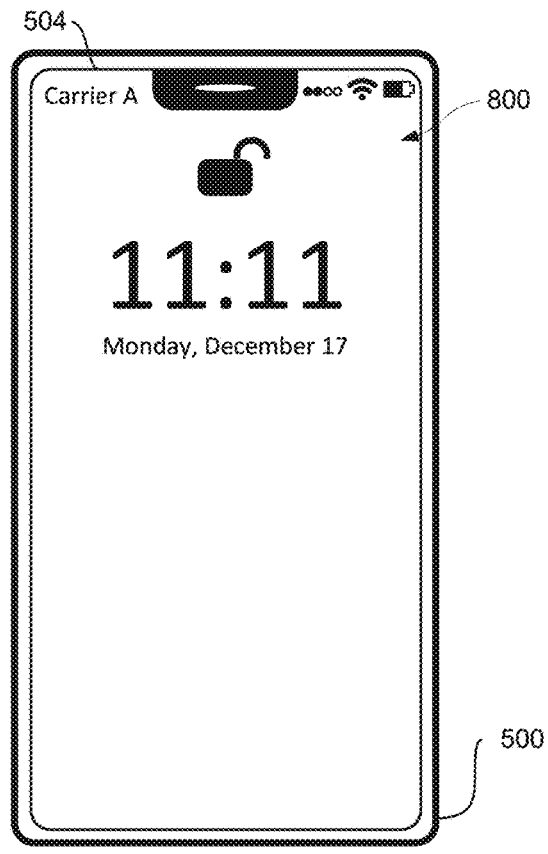
FIG. 8F

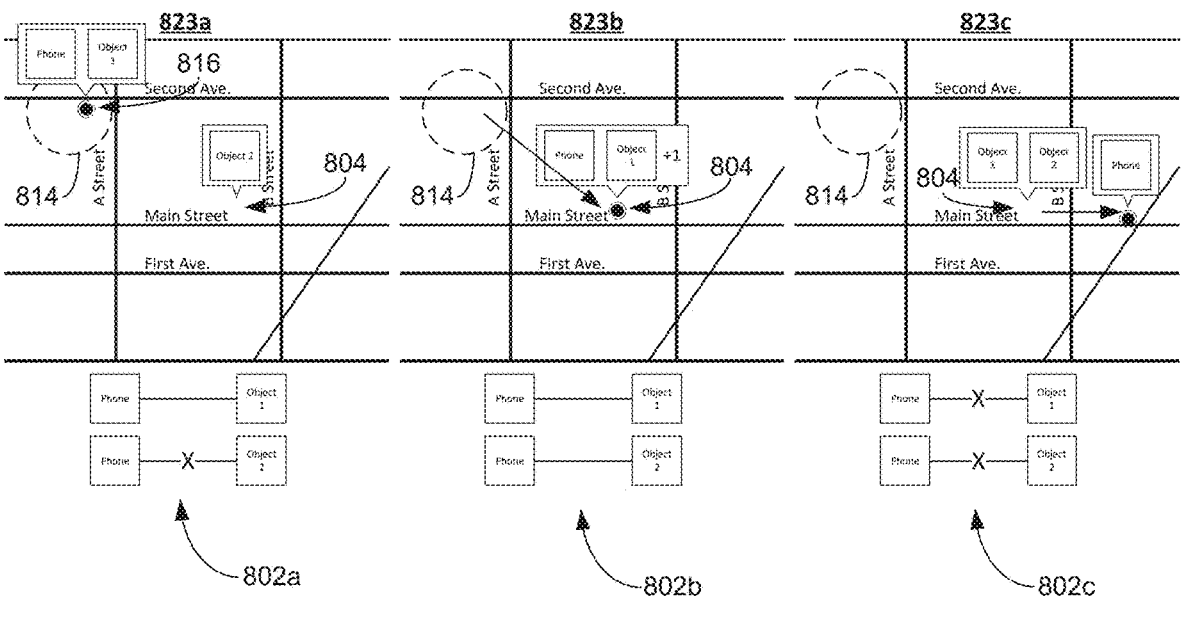
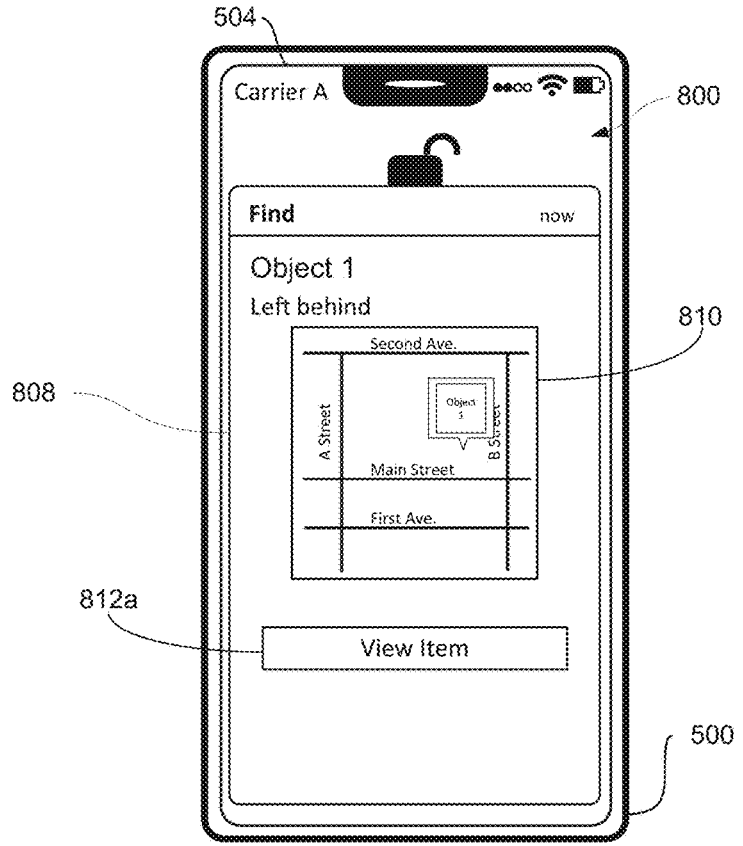
FIG. 8G

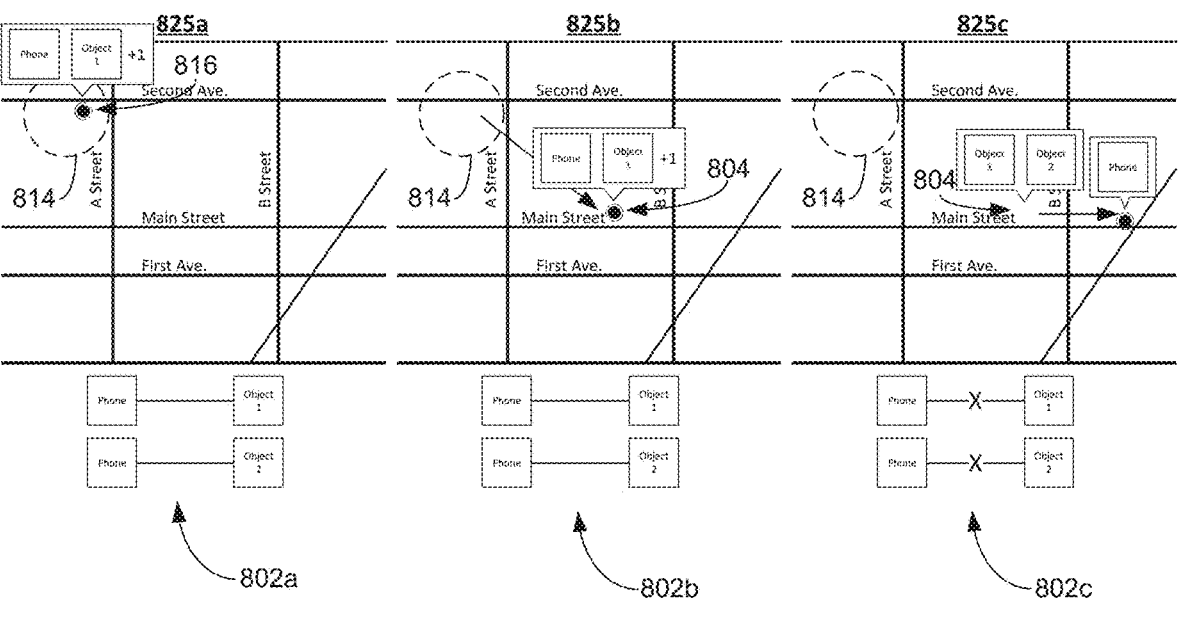
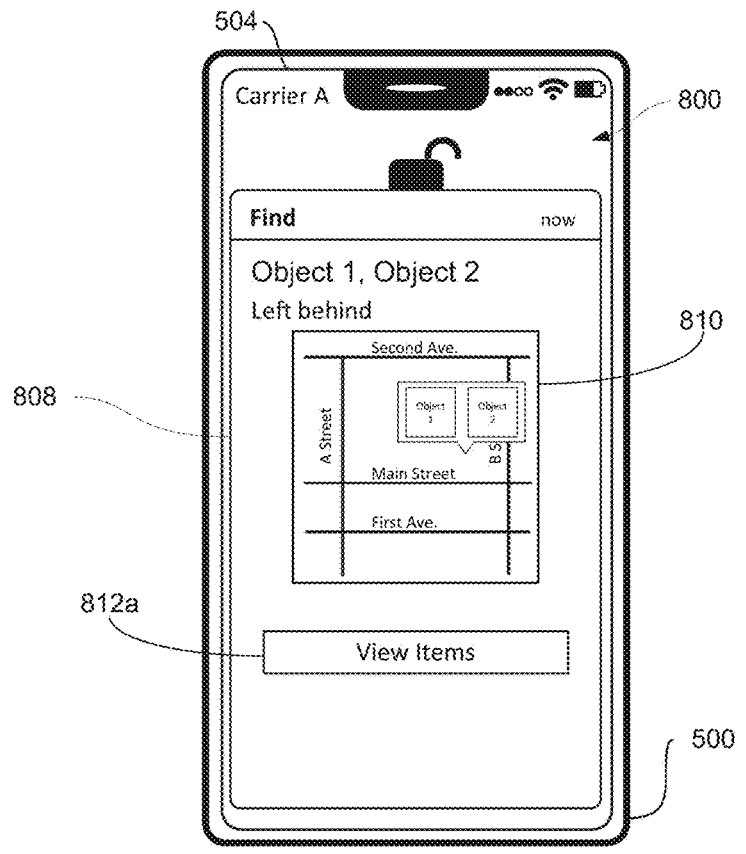
FIG. 8H

900

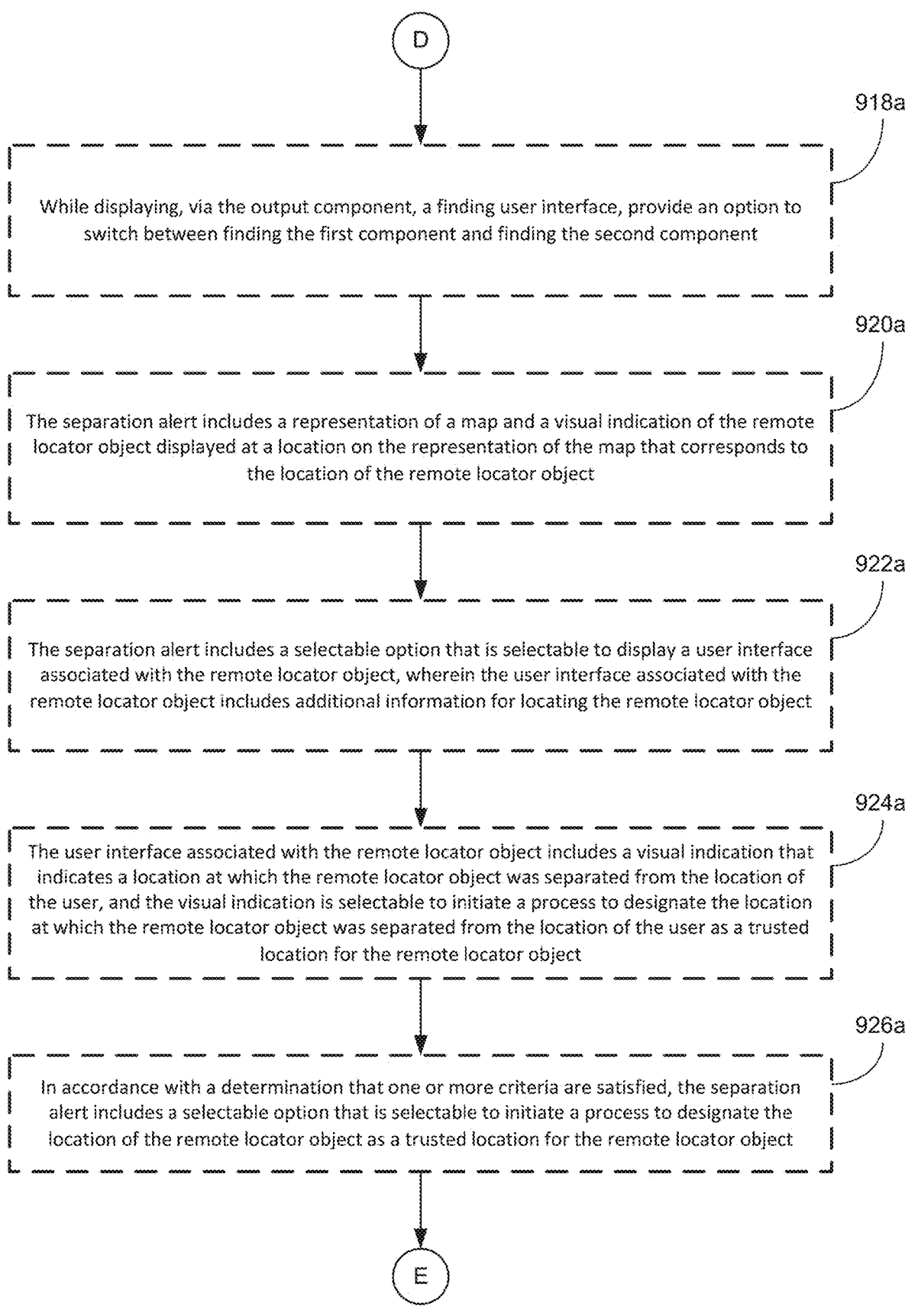

D

918a

While displaying, via the output component, a finding user interface, provide an option to switch between finding the first component and finding the second component 920a The separation alert includes a representation of a map and a visual indication of the remote locator object displayed at a location on the representation of the map that corresponds to the location of the remote locator object 922a The separation alert includes a selectable option that is selectable to display a user interface associated with the remote locator object, wherein the user interface associated with the remote locator object includes additional information for locating the remote locator object 924a The user interface associated with the remote locator object includes a visual indication that indicates a location at which the remote locator object was separated from the location of the user, and the visual indication is selectable to initiate a process to designate the location at which the remote locator object was separated from the location of the user as a trusted location for the remote locator object 926a In accordance with a determination that one or more criteria are satisfied, the separation alert includes a selectable option that is selectable to initiate a process to designate the location of the remote locator object as a trusted location for the remote locator object

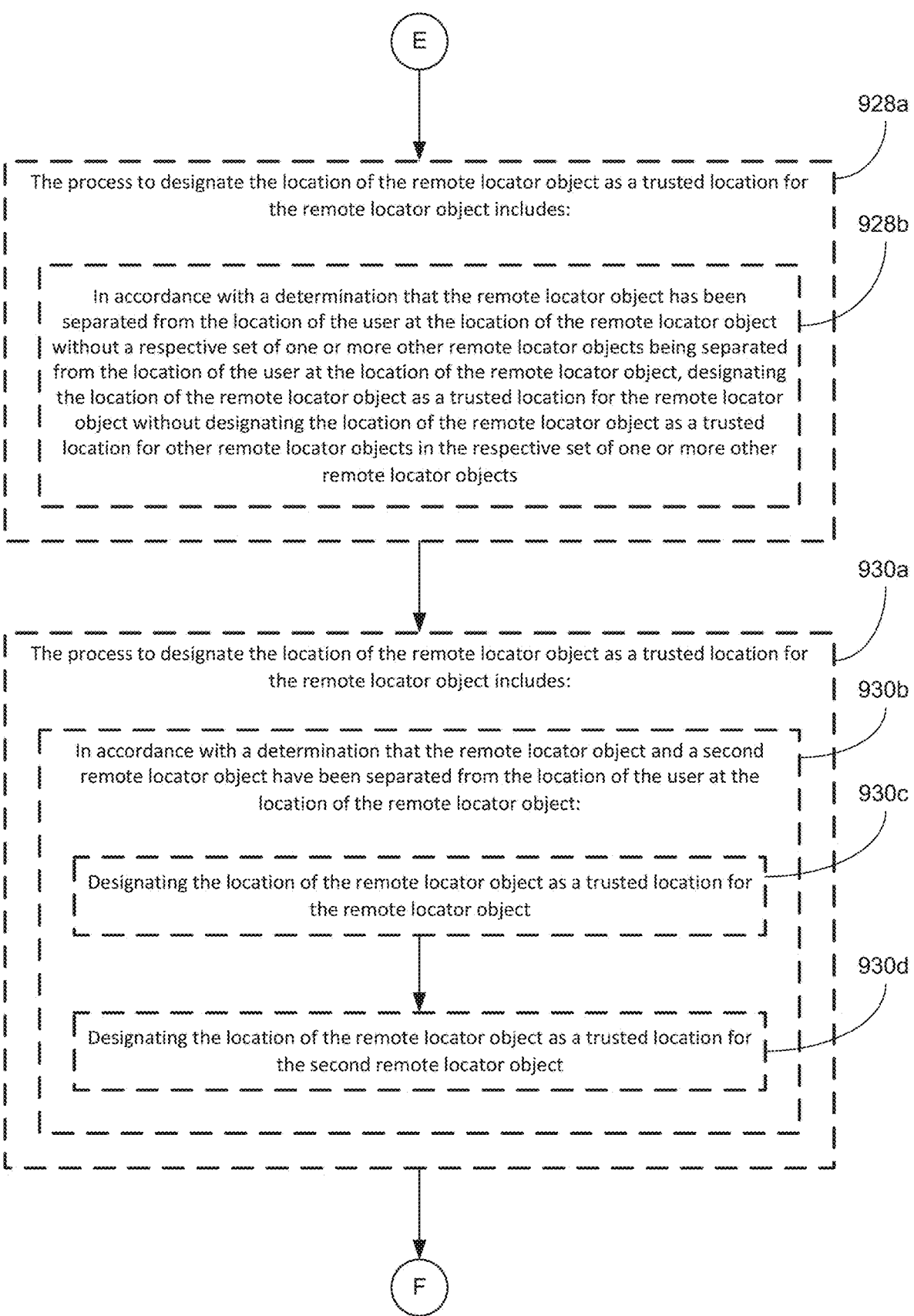

E

928a

The process to designate the location of the remote locator object as a trusted location for the remote locator object includes:

928b

In accordance with a determination that the remote locator object has been separated from the location of the user at the location of the remote locator object without a respective set of one or more other remote locator objects being separated from the location of the user at the location of the remote locator object, designating the location of the remote locator object as a trusted location for the remote locator object without designating the location of the remote locator object as a trusted location for other remote locator objects in the respective set of one or more other remote locator objects 930a The process to designate the location of the remote locator object as a trusted location for the remote locator object includes:

930b

In accordance with a determination that the remote locator object and a second remote locator object have been separated from the location of the user at the location of the remote locator object:

930c

Designating the location of the remote locator object as a trusted location for the remote locator object 930d Designating the location of the remote locator object as a trusted location for the second remote locator object

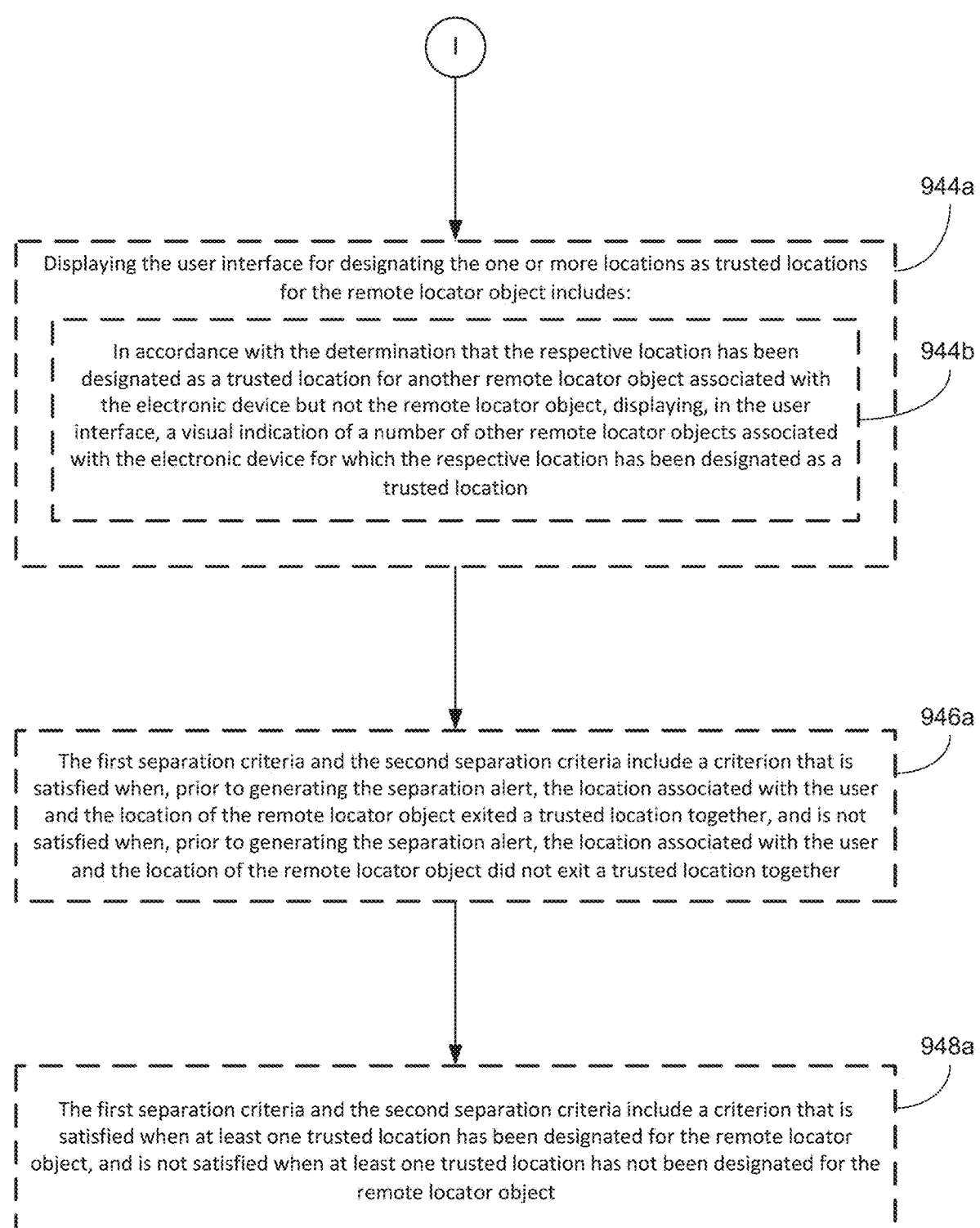

944a

Displaying the user interface for designating the one or more locations as trusted locations for the remote locator object includes:

944b

In accordance with the determination that the respective location has been designated as a trusted location for another remote locator object associated with the electronic device but not the remote locator object, displaying, in the user interface, a visual indication of a number of other remote locator objects associated with the electronic device for which the respective location has been designated as a trusted location 946a The first separation criteria and the second separation criteria include a criterion that is satisfied when, prior to generating the separation alert, the location associated with the user and the location of the remote locator object exited a trusted location together, and is not satisfied when, prior to generating the separation alert, the location associated with the user and the location of the remote locator object did not exit a trusted location together 948a The first separation criteria and the second separation criteria include a criterion that is satisfied when at least one trusted location has been designated for the remote locator object, and is not satisfied when at least one trusted location has not been designated for the remote locator object

FIG. 9J (Object 2 – 30 feet to the right)

504

Object 2 begin moving to help device locate your object 1012b
1016b
1018b
1014b
500
1022b
1020b (Object 1 – 30 feet to the right)

504

Object 1 begin moving to help device locate your object 1012a
1016a
1018a
1014a
500
1022a
1020a (Object 2 ~ 5 feet ahead)

Figures 10K, 10L:
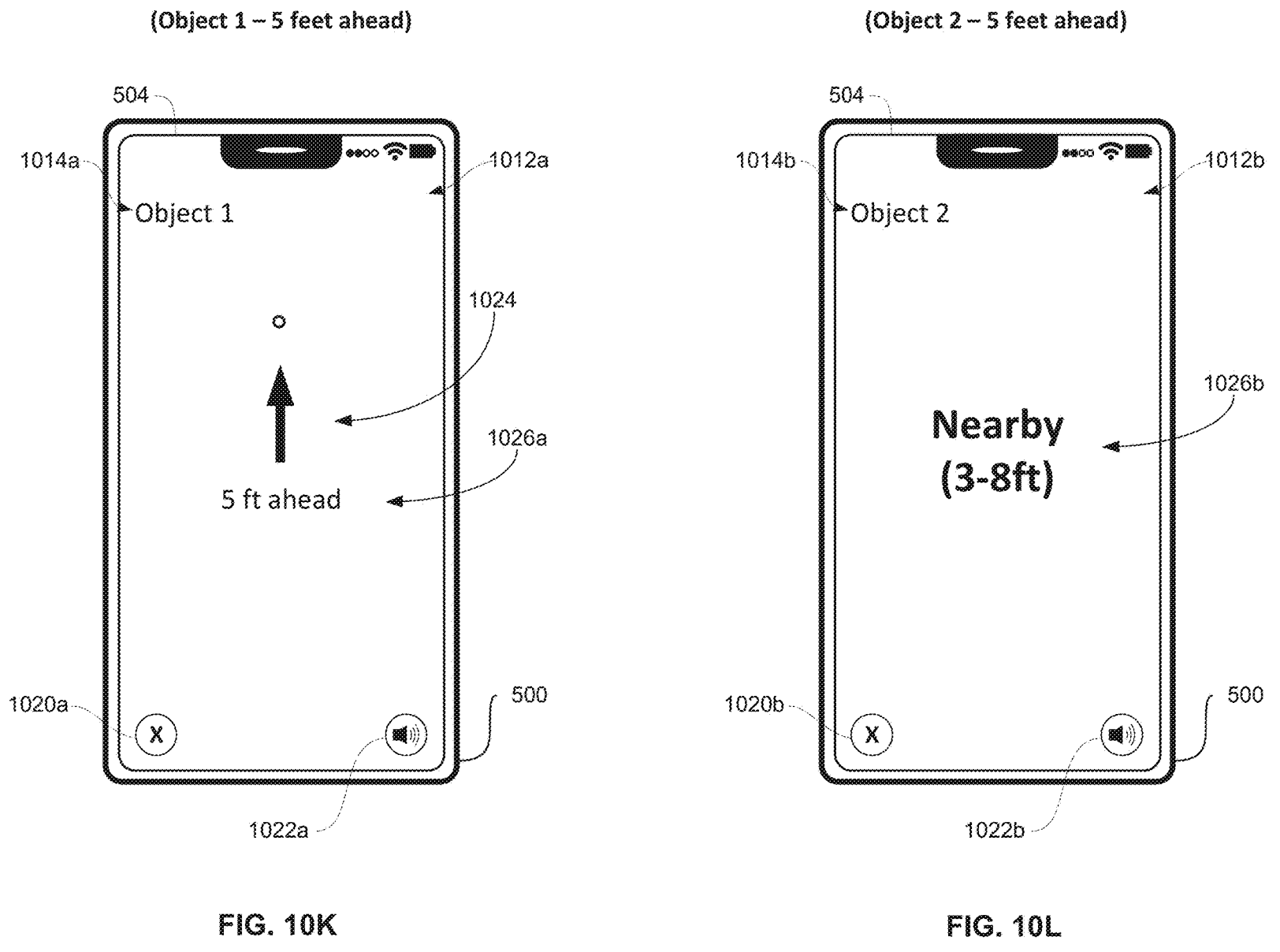

Object 2

Nearby
(3-8ft)

1012b

1026b

500

1022b

1020b

1014b

504

FIG. 10L (Object 1 ~ 5 feet ahead)

Object 1

5 ft ahead

1012a

1024

1026a

500

1022a

1020a

1014a

504

FIG. 10K (Object 2 – 3 feet ahead)

Object 2

Very Close
(0-3ft)

(Object 1 – 3 feet ahead)

Object 1

3 ft ahead (Object 2 – 2 feet ahead)

(Object 1 – 2 feet ahead)

Figures 10Q, 10R:
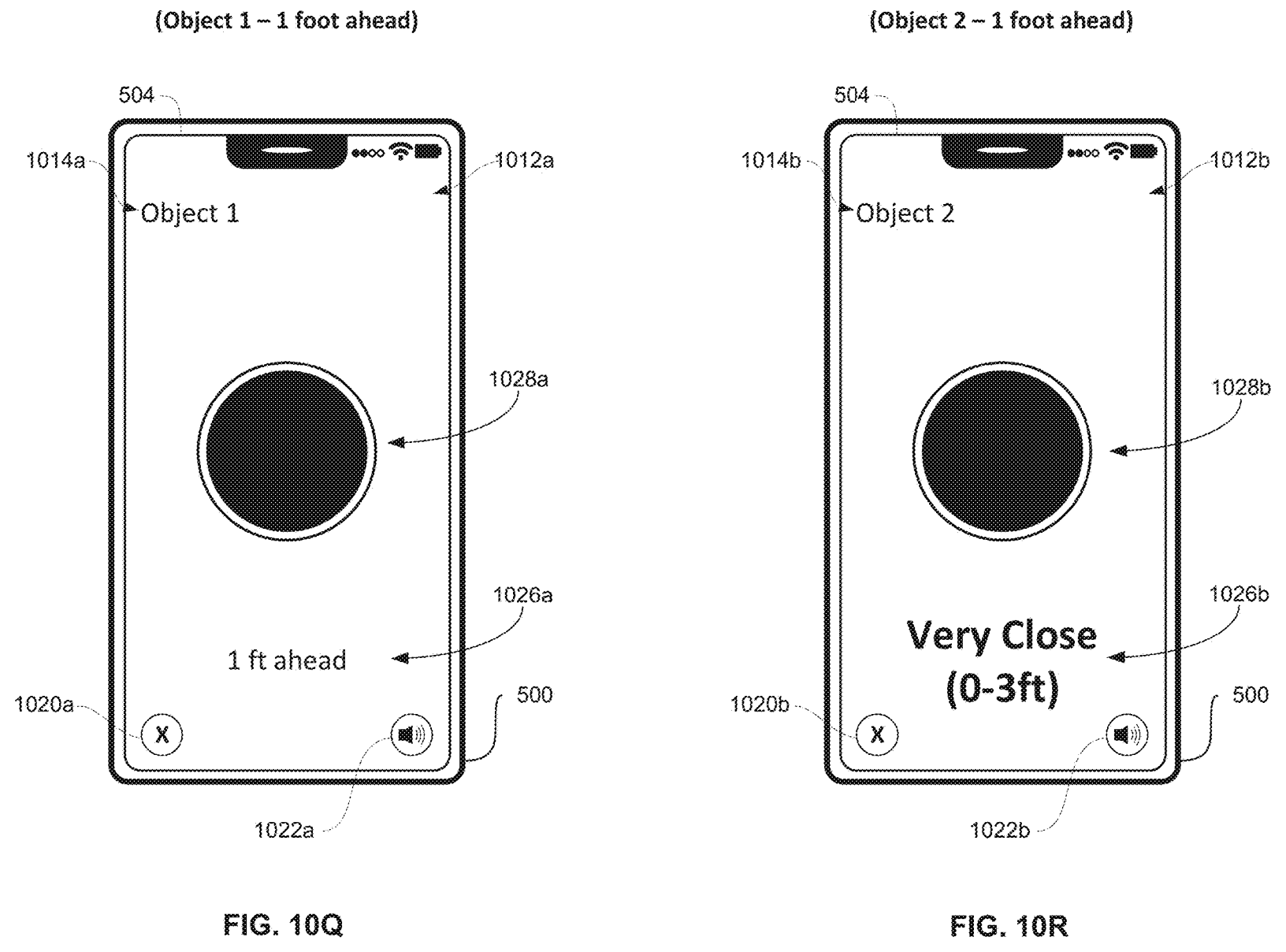

(Object 2 ~ 1 foot ahead)

1012b

1028b

1026b

500

504

Object 2

Very Close
(0-3ft)

(Object 1 ~ 1 foot ahead)

1012a

1028a

1026a

500

504

Object 1

1 ft ahead

(Object 2 – Found)

(Object 1 – Found)

1100

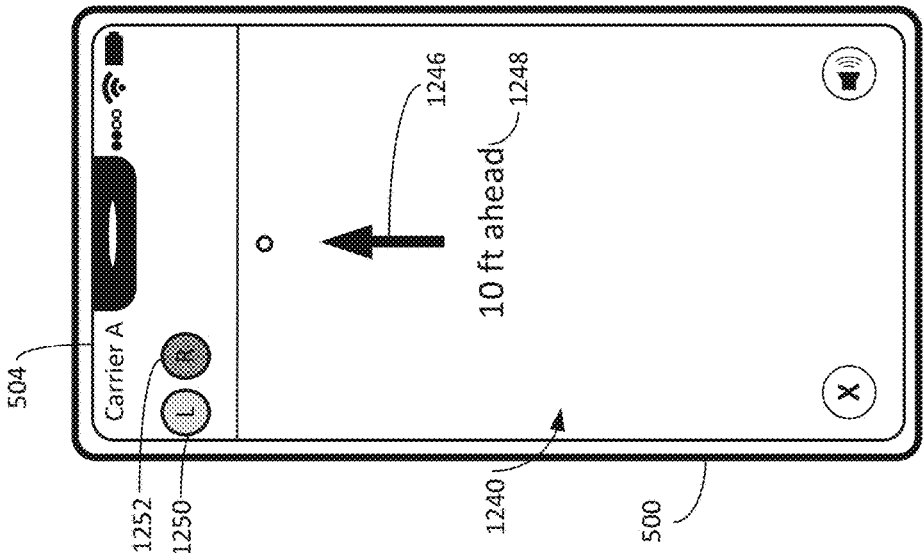
FIG. 12NN
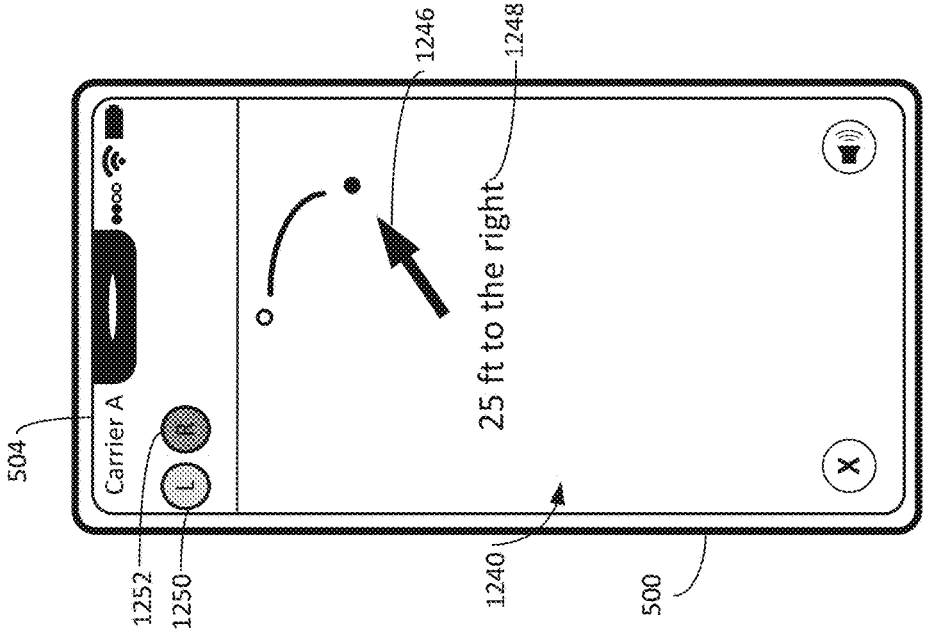
FIG. 12MM

1300

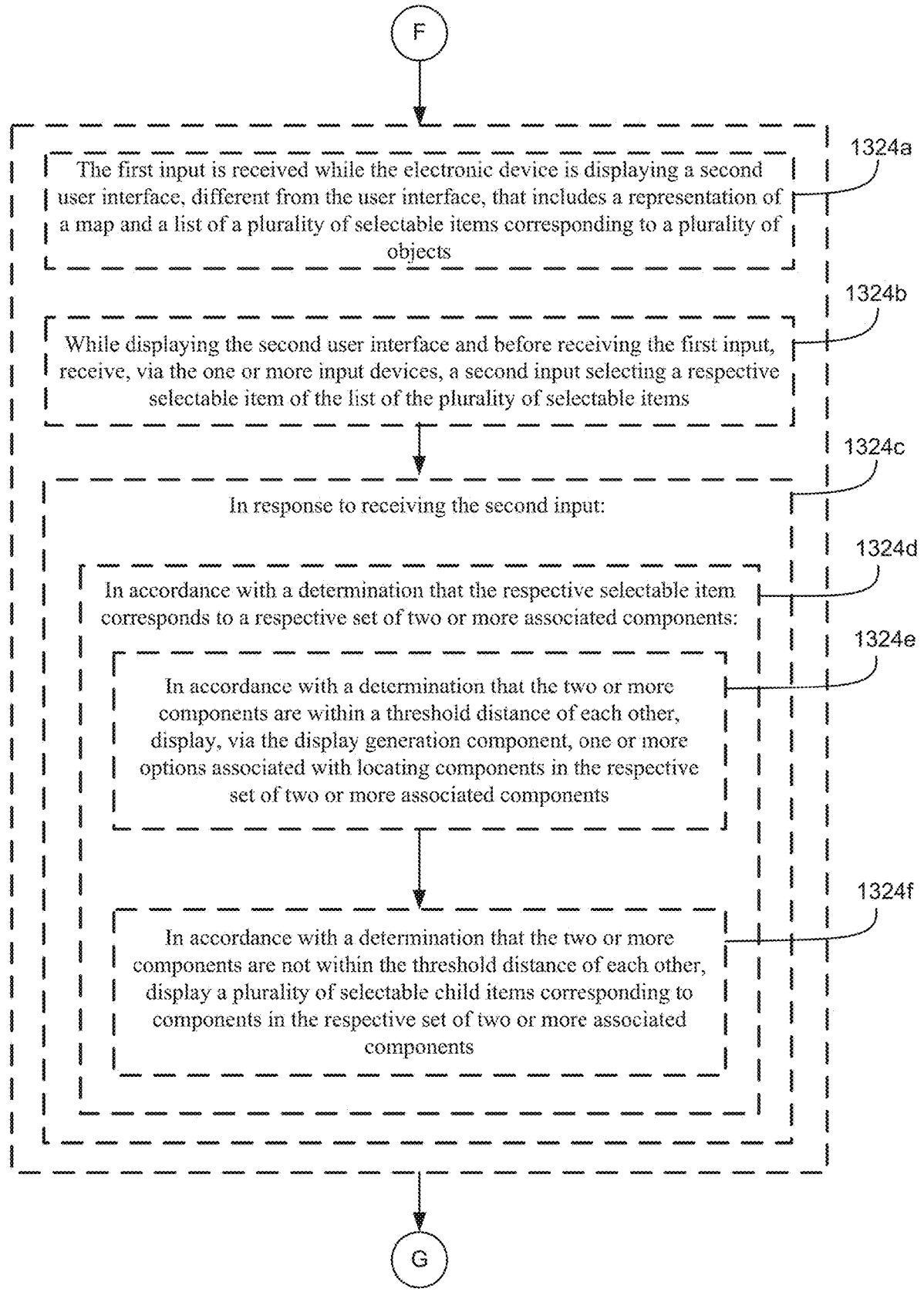

F

The first input is received while the electronic device is displaying a second user interface, different from the user interface, that includes a representation of a map and a list of a plurality of selectable items corresponding to a plurality of objects 1324a While displaying the second user interface and before receiving the first input, receive, via the one or more input devices, a second input selecting a respective selectable item of the list of the plurality of selectable items 1324b In response to receiving the second input:

1324c

In accordance with a determination that the respective selectable item corresponds to a respective set of two or more associated components:

1324d

In accordance with a determination that the two or more components are within a threshold distance of each other, display, via the display generation component, one or more options associated with locating components in the respective set of two or more associated components 1324e In accordance with a determination that the two or more components are not within the threshold distance of each other, display a plurality of selectable child items corresponding to components in the respective set of two or more associated components 1324f

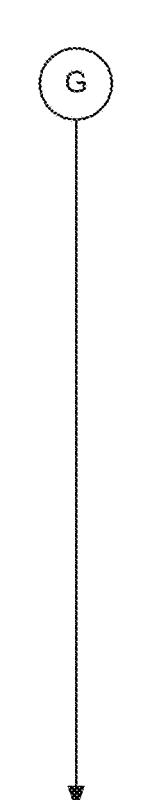

G

1326a

The plurality of selectable child items include a first item corresponding to a first component in the respective set and a second item corresponding to a second component in the respective set, different from the first component, the first item includes information about a location of the first component relative to the electronic device, and the second item includes second information about the location of the second component relative to the electronic device, different from the location of the first component relative to the electronic device

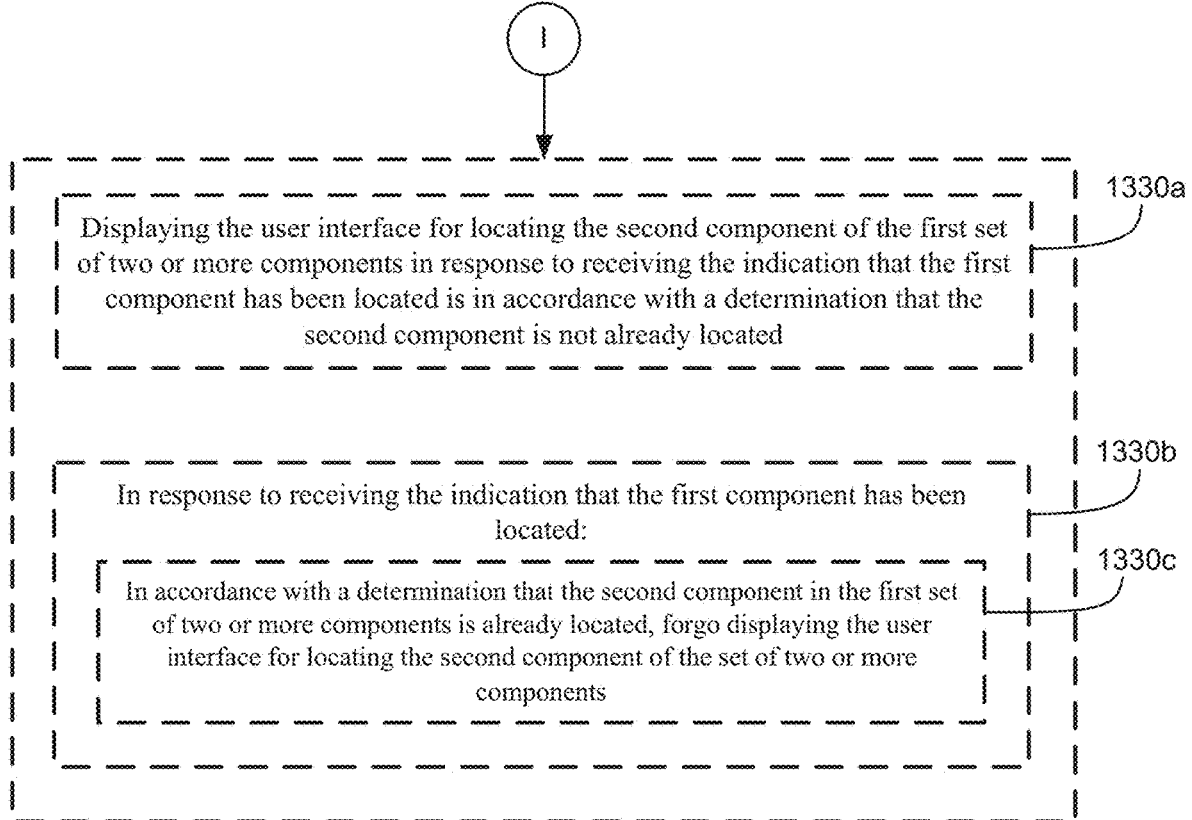

Displaying the user interface for locating the second component of the first set of two or more components in response to receiving the indication that the first component has been located is in accordance with a determination that the second component is not already located — 1330a In response to receiving the indication that the first component has been located: — 1330b In accordance with a determination that the second component in the first set of two or more components is already located, forgo displaying the user interface for locating the second component of the set of two or more components — 1330c

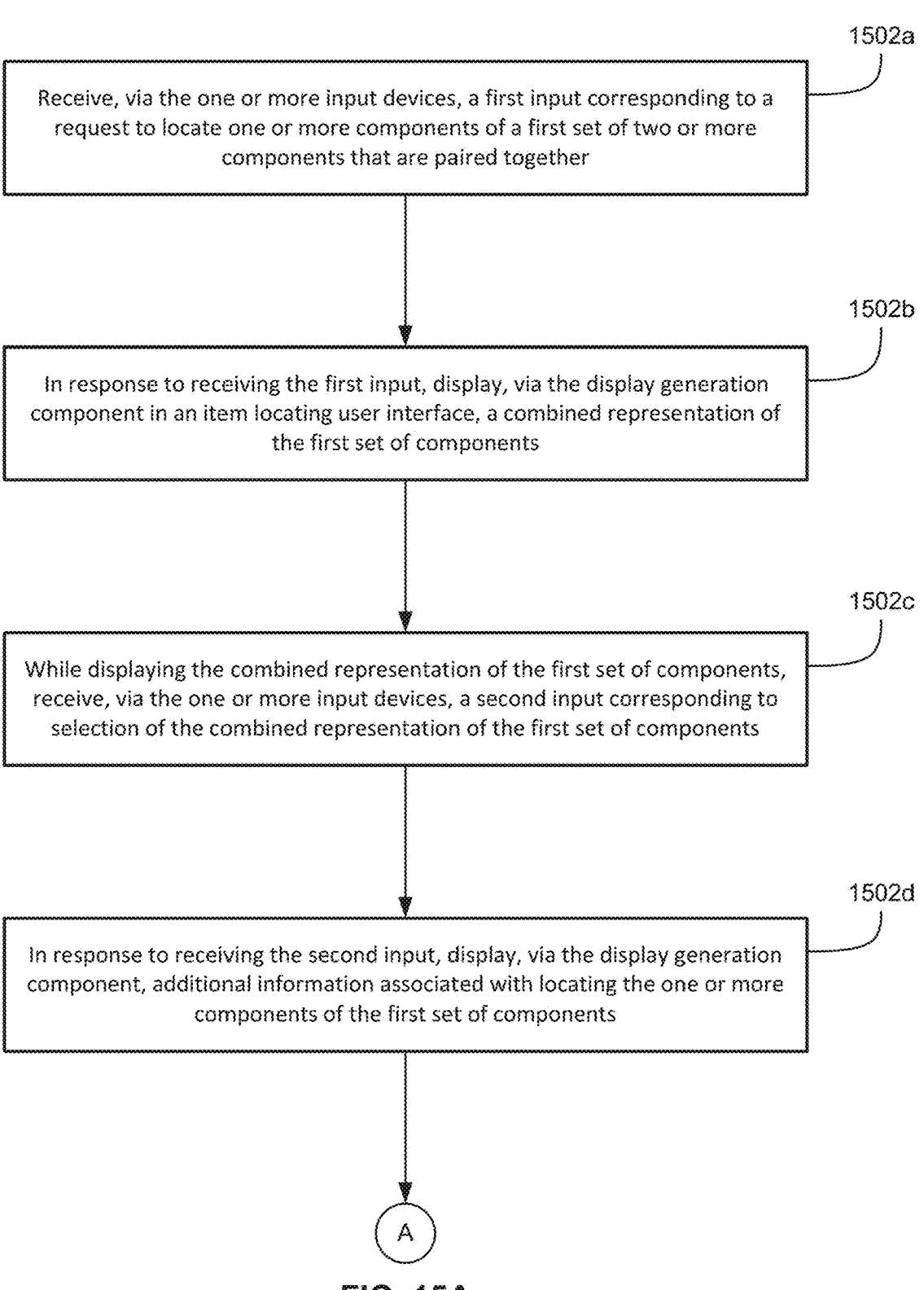

1502a

Receive, via the one or more input devices, a first input corresponding to a request to locate one or more components of a first set of two or more components that are paired together 1502b In response to receiving the first input, display, via the display generation component in an item locating user interface, a combined representation of the first set of components 1502c While displaying the combined representation of the first set of components, receive, via the one or more input devices, a second input corresponding to selection of the combined representation of the first set of components 1502d In response to receiving the second input, display, via the display generation component, additional information associated with locating the one or more components of the first set of components

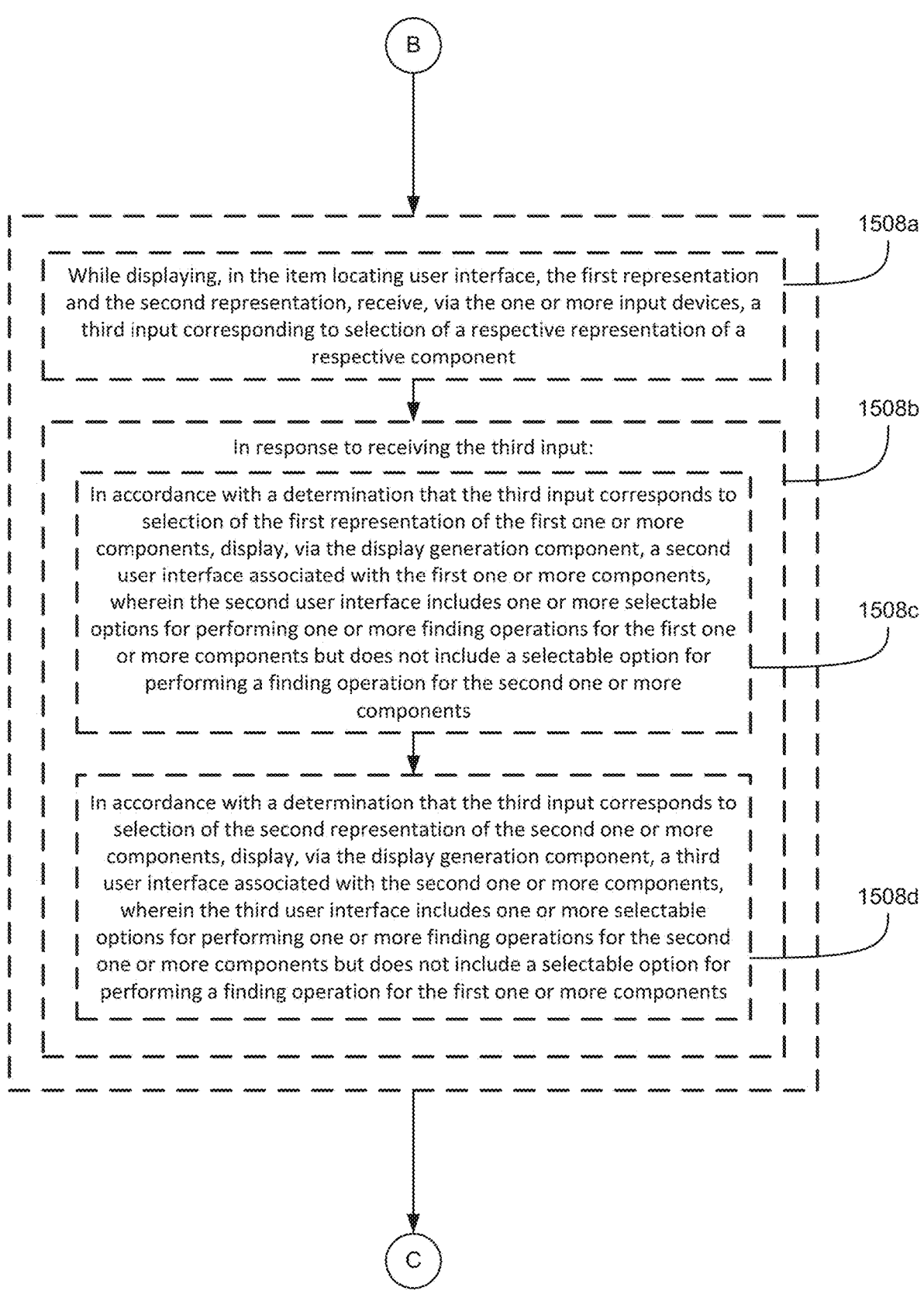

B

While displaying, in the item locating user interface, the first representation and the second representation, receive, via the one or more input devices, a third input corresponding to selection of a respective representation of a respective component 1508a In response to receiving the third input:

1508b

In accordance with a determination that the third input corresponds to selection of the first representation of the first one or more components, display, via the display generation component, a second user interface associated with the first one or more components, wherein the second user interface includes one or more selectable options for performing one or more finding operations for the first one or more components but does not include a selectable option for performing a finding operation for the second one or more components 1508c In accordance with a determination that the third input corresponds to selection of the second representation of the second one or more components, display, via the display generation component, a third user interface associated with the second one or more components, wherein the third user interface includes one or more selectable options for performing one or more finding operations for the second one or more components but does not include a selectable option for performing a finding operation for the first one or more components 1508d

Receive, via the one or more input devices, a third input corresponding to a request to designate a location as a trusted location, wherein the first set of components includes a first component and a second component 1522a In response to receiving the third input, designate the location as a trusted location for the first component and for the second component 1522b

USER INTERFACES FOR LOCATION TRACKING

CROSS-REFERENCE TO RELATED APPLICATIONS

This application claims the benefit of U.S. Provisional Application No. 63/176,680, filed Apr. 19, 2021, and U.S. Provisional Application No. 63/363,023, filed Apr. 14, 2022, the contents of which are incorporated herein by reference in their entireties for all purposes.

FIELD OF THE DISCLOSURE

This relates generally to user interfaces associated with tracking the location of an electronic device or objects associated with an electronic device

BACKGROUND OF THE DISCLOSURE

User interaction with electronic devices has increased significantly in recent years. These devices can be devices such as computers, tablet computers, televisions, multimedia devices, mobile devices, and the like.

In some circumstances, users may wish to use such devices to track items. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to one or more electronic devices that display visual indications to a user when an electronic device is associated with a particular user account. Some embodiments described in this disclosure are directed to one or more electronic devices that display notifications of a separation with a remote locator object (and/or device). Some embodiments described in this disclosure are directed to one or more electronic devices that utilize a first or second locator process for locating a device or a remote locator object based on the device or remote locator object being located. Some embodiments described in this disclosure are directed to one or more devices that facilitate finding associated components that are at one or more physical locations. Some embodiments described in this disclosure are directed to one or more devices that facilitate display of location information of associated components that are at one or more physical locations. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5E-5H illustrate exemplary components and user interfaces of a personal electronic device in accordance with some embodiments.

FIGS. 5I-5N provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.

FIGS. 7A-7H are flow diagrams illustrating a method 700 of displaying visual indications to a user when an electronic device is associated with a particular user account in accordance with some embodiments.

FIGS. 9A-9J are flow diagrams illustrating a method 900 of displaying notifications of a separation with a remote locator object (and/or device) in accordance with some embodiments.

FIGS. 13A-13J are flow diagrams illustrating a method 1300 of finding associated components that are at one or more physical locations in accordance with some embodiments.

FIGS. 15A-15E are flow diagrams illustrating a method 1500 of facilitating display of location information of associated components that are at one or more physical locations in accordance with some embodiments of the disclosure.

DETAILED DESCRIPTION

Figure 1A:
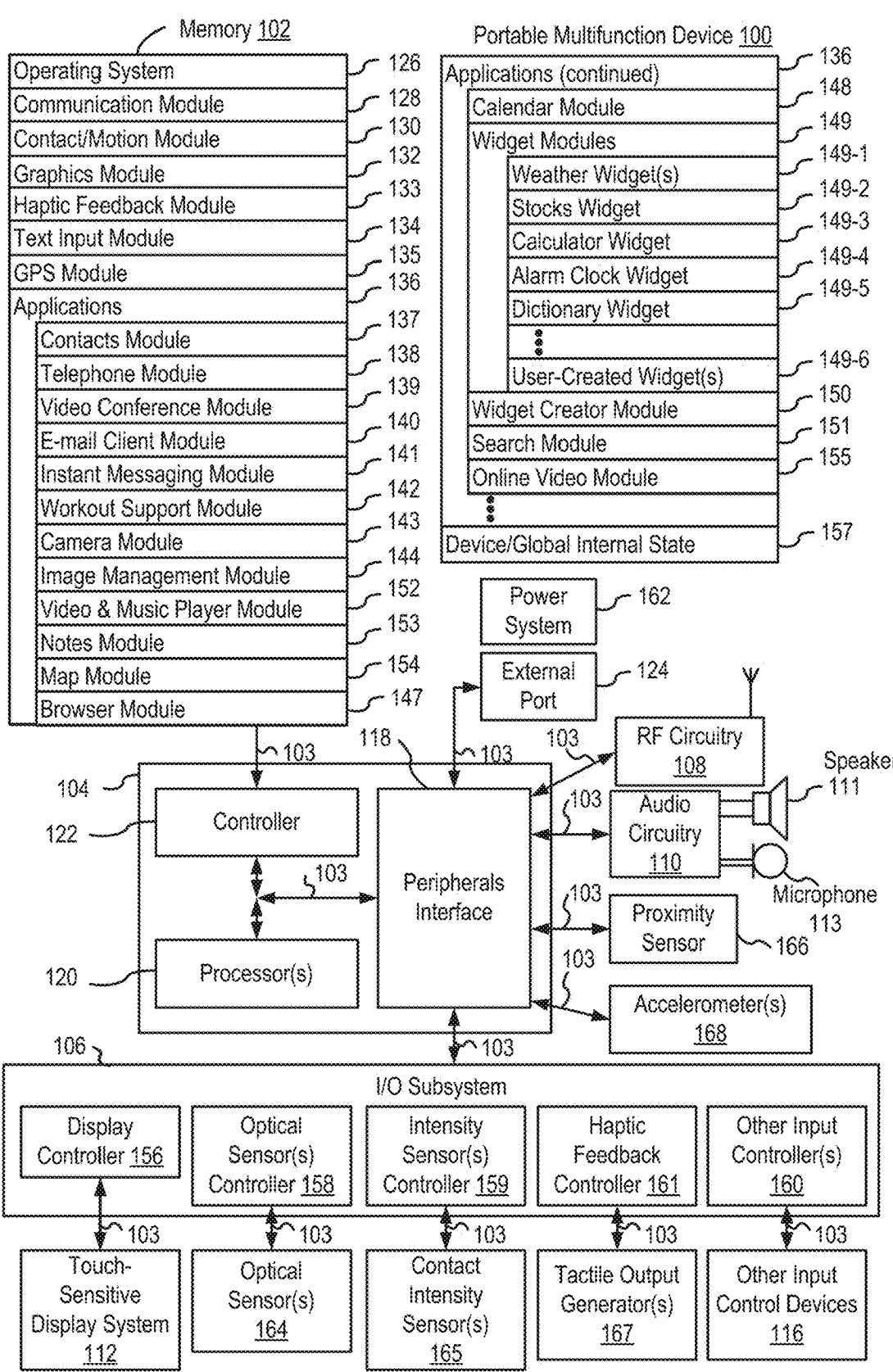
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices to track the location of objects or devices and generate notifications associated with objects or devices. There is also a need for electronic devices to indicate if they are associated with a particular user account and/or are trackable by a particular user account. Such techniques can reduce the cognitive burden on a user who uses such devices and/or wishes to control their use of such devices, and such technique can provide enhanced privacy or security. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
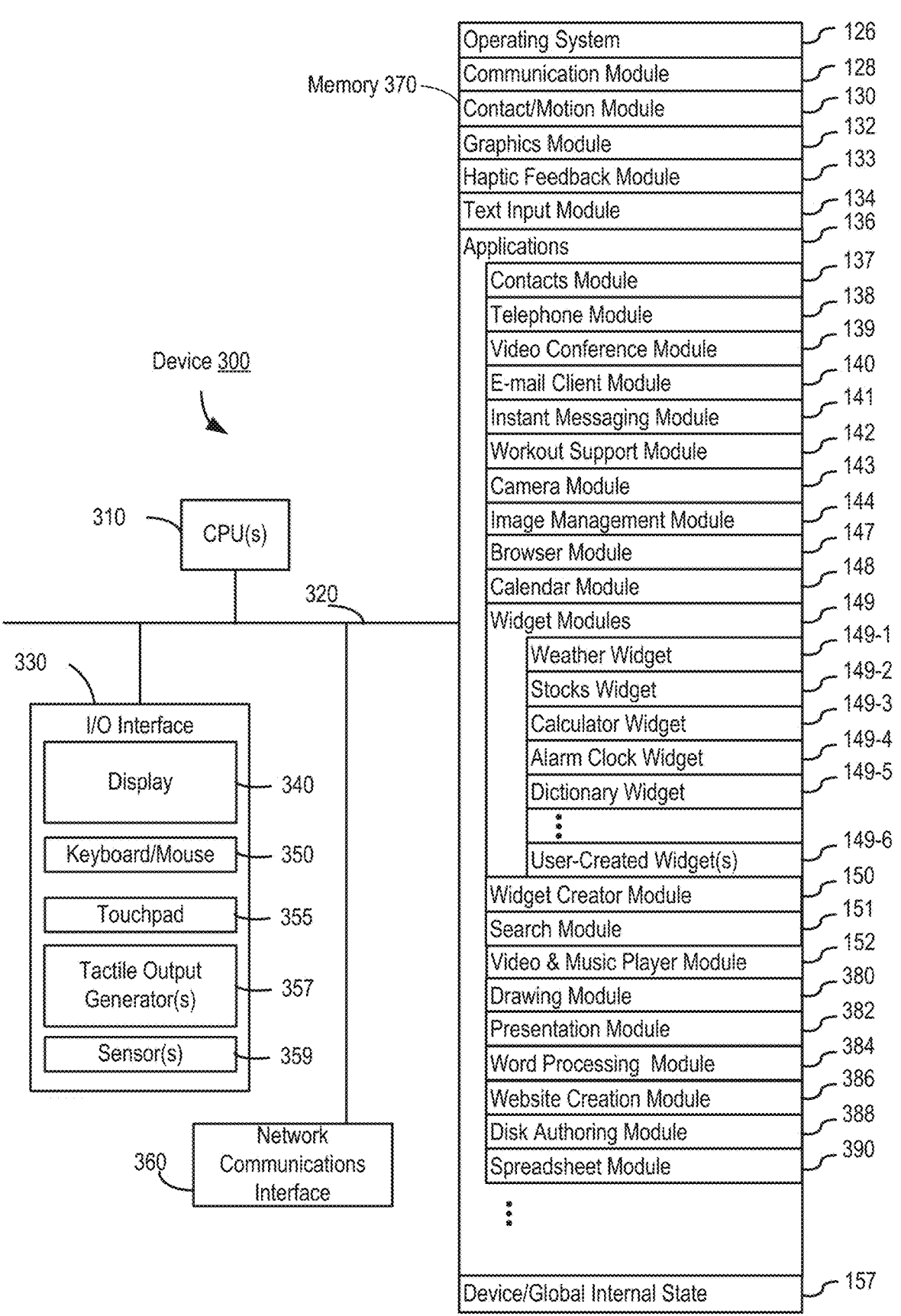
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;

Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
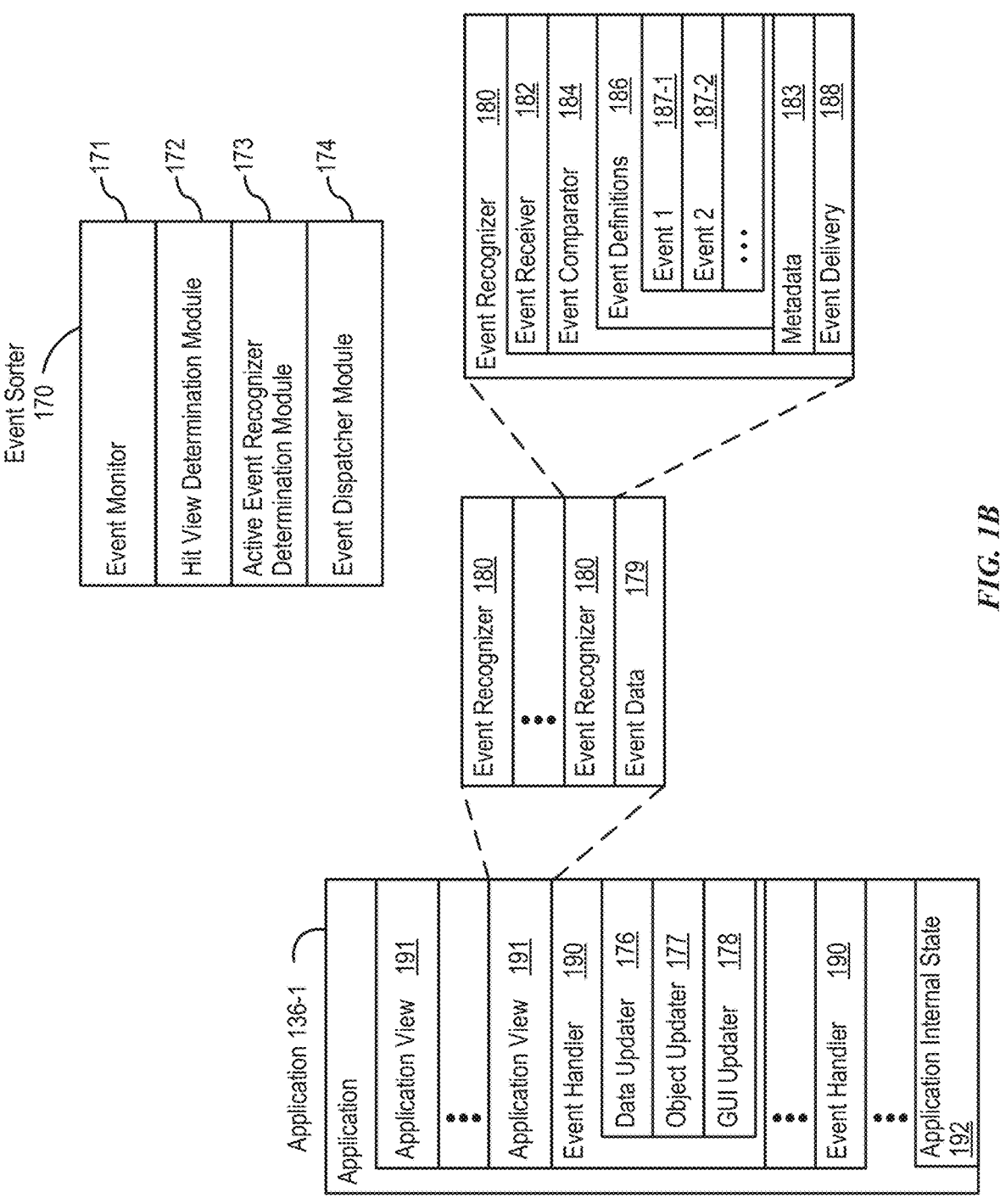
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
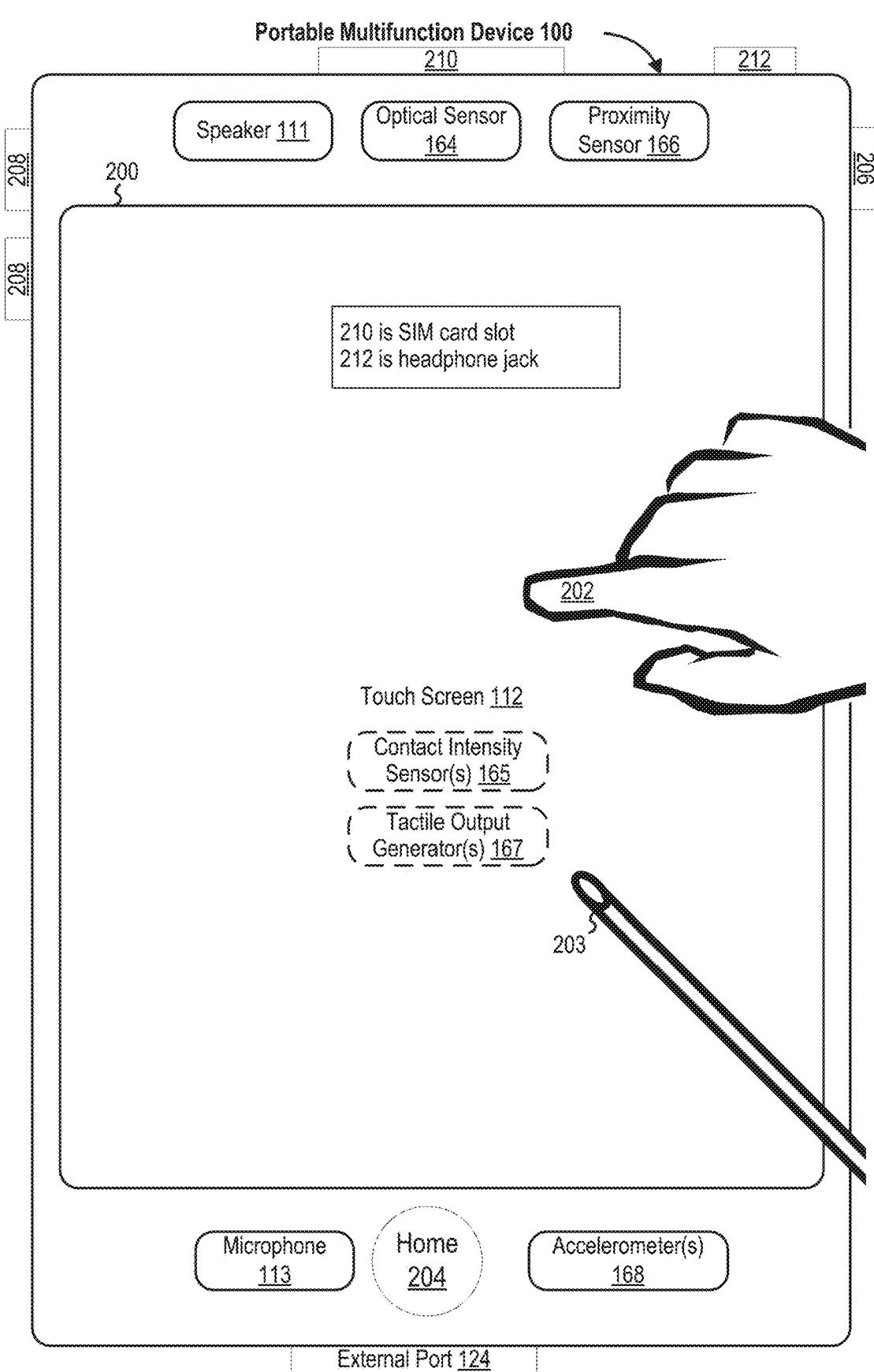
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port

124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multi-media player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
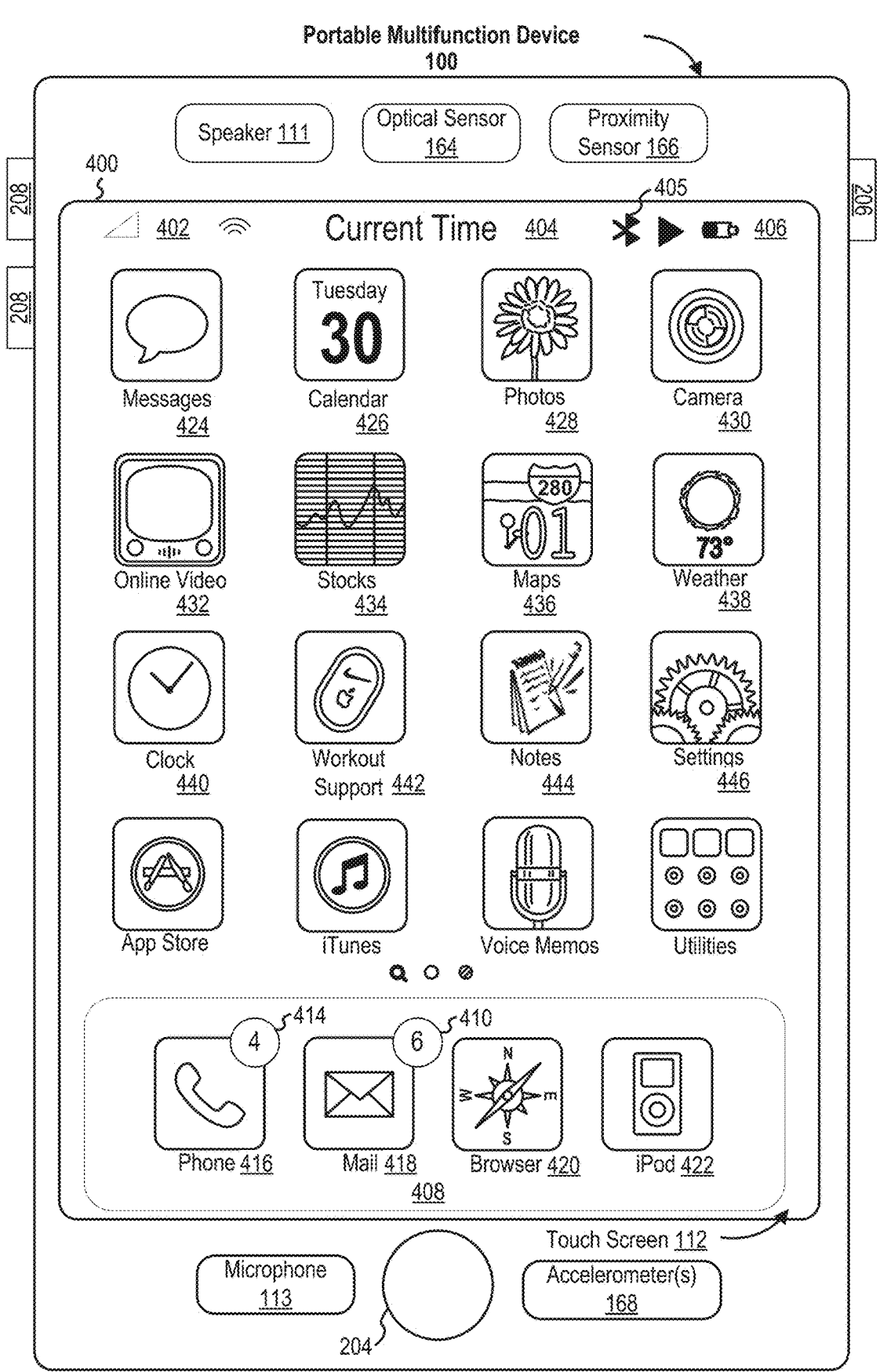
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
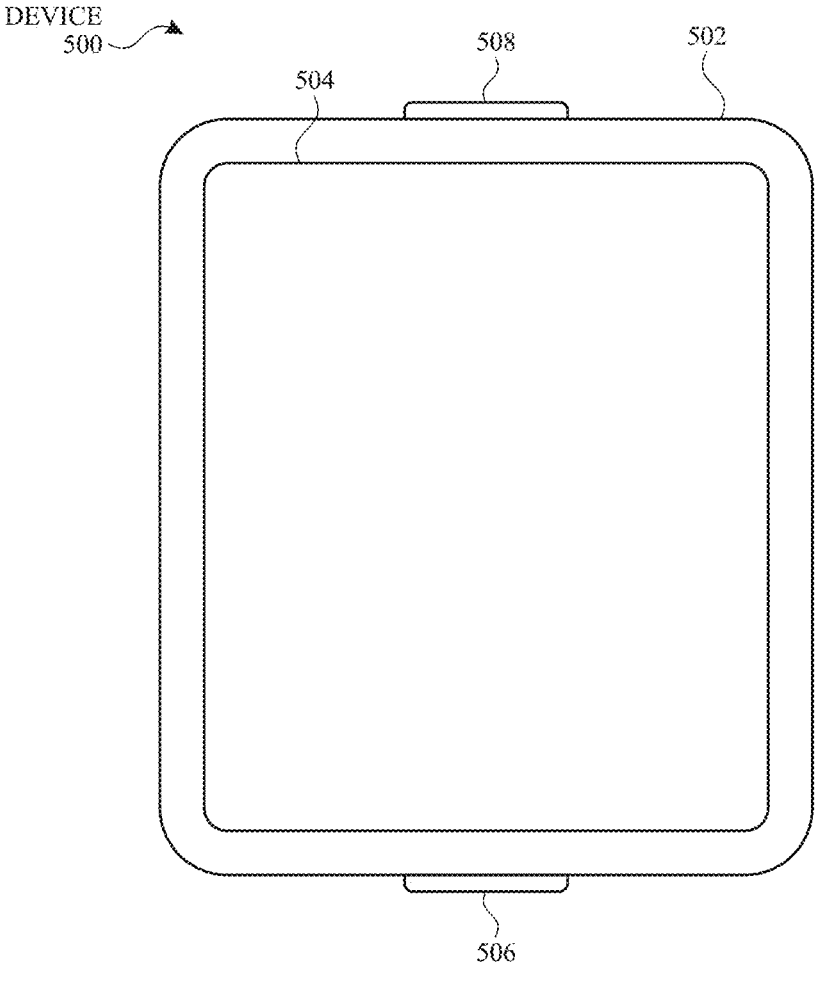
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
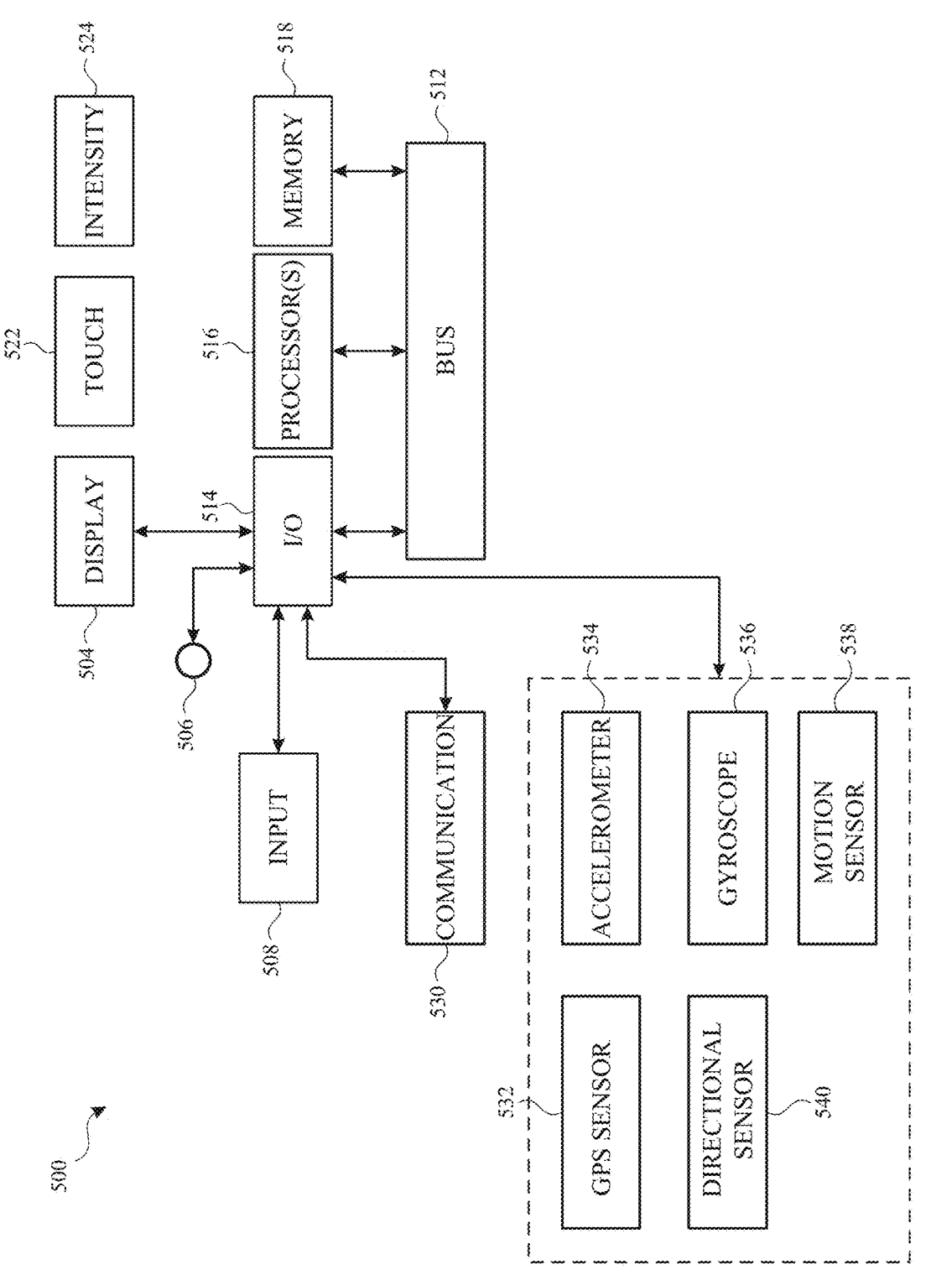
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300 and 1500 (FIGS. 7, 9, 11, 13 and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
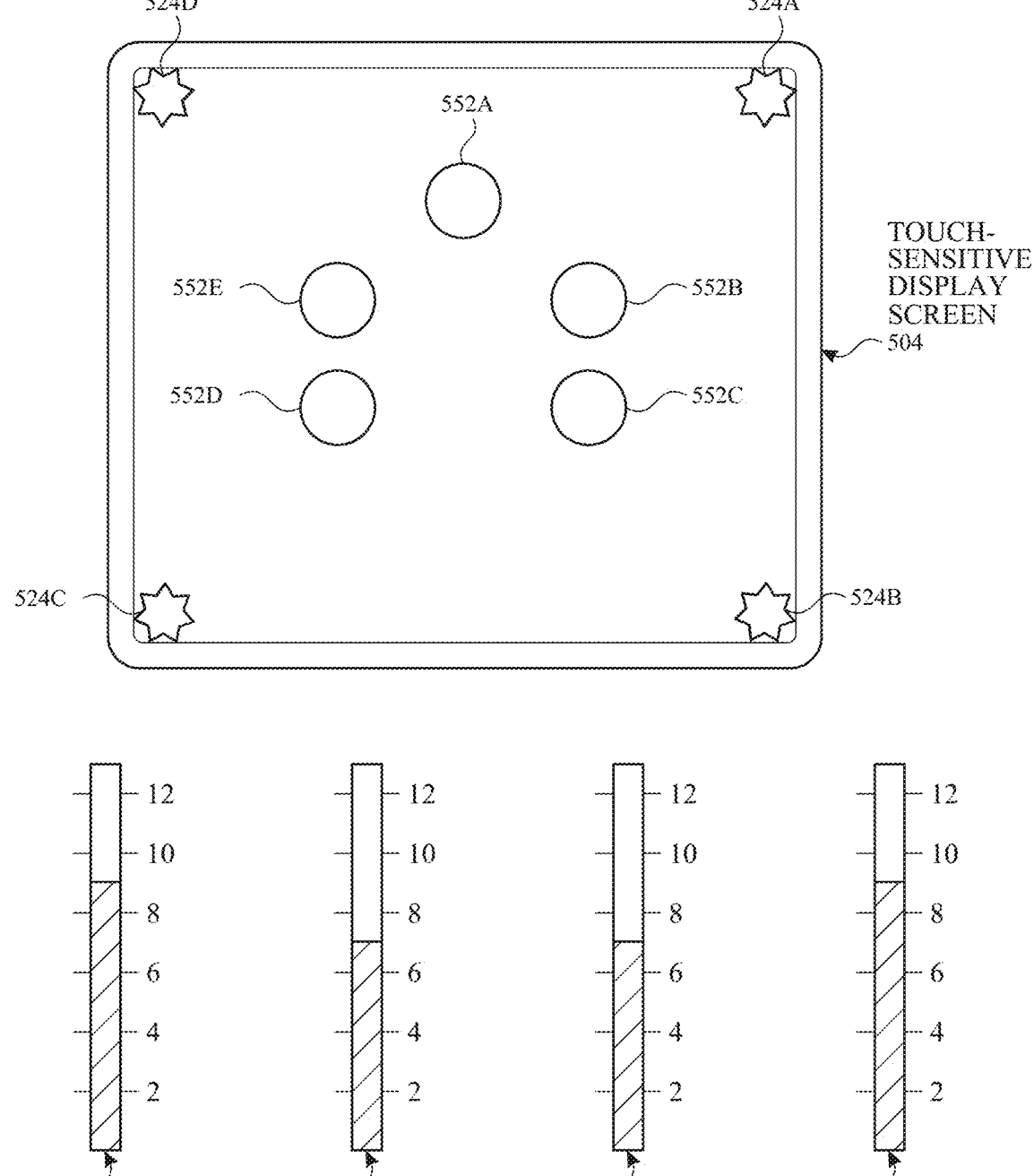
FIGS. 5C-5D illustrate exemplary components of a personal electronic device having a touch-sensitive display and intensity sensors in accordance with some embodiments.
Figure 5D:
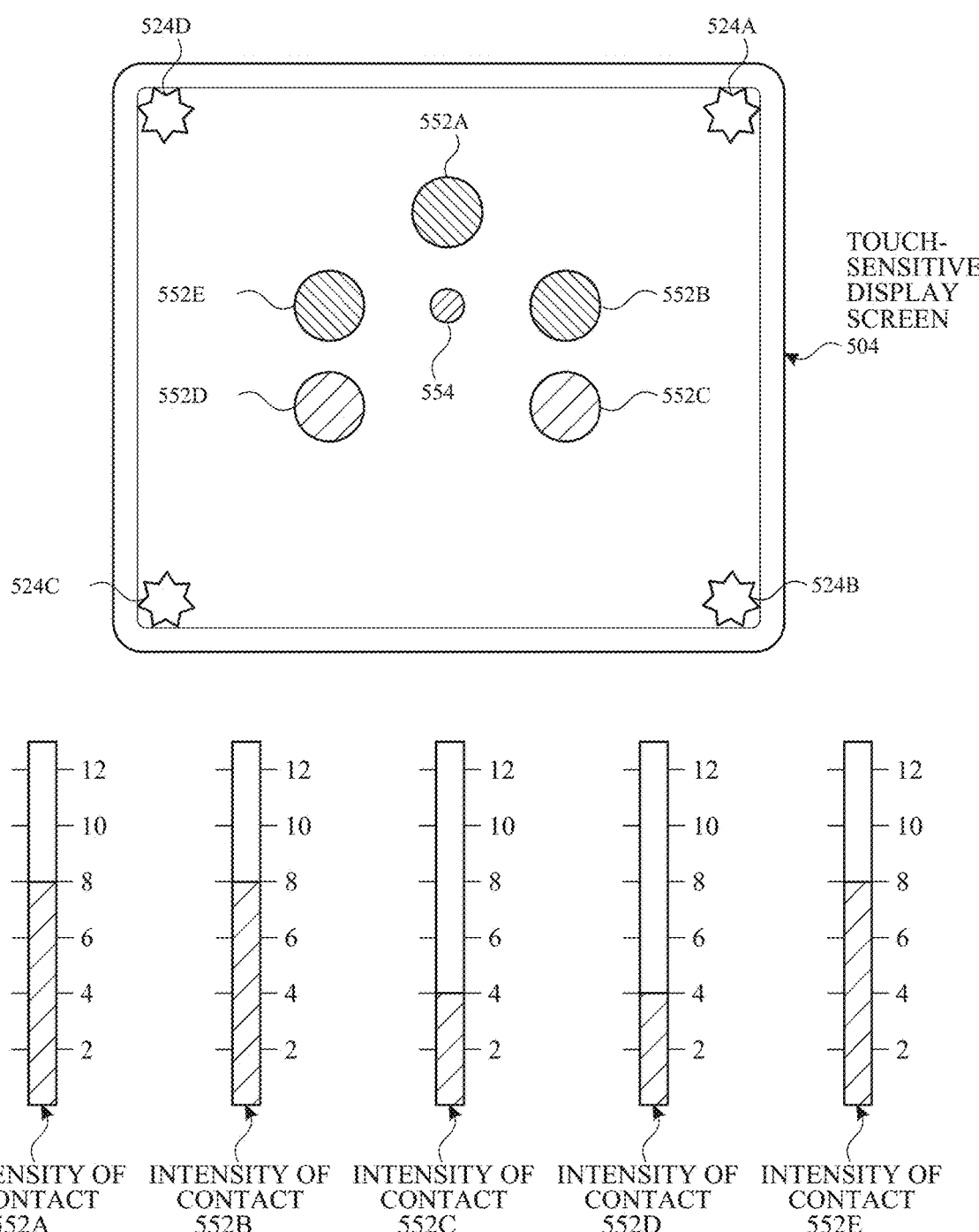

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input.

An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
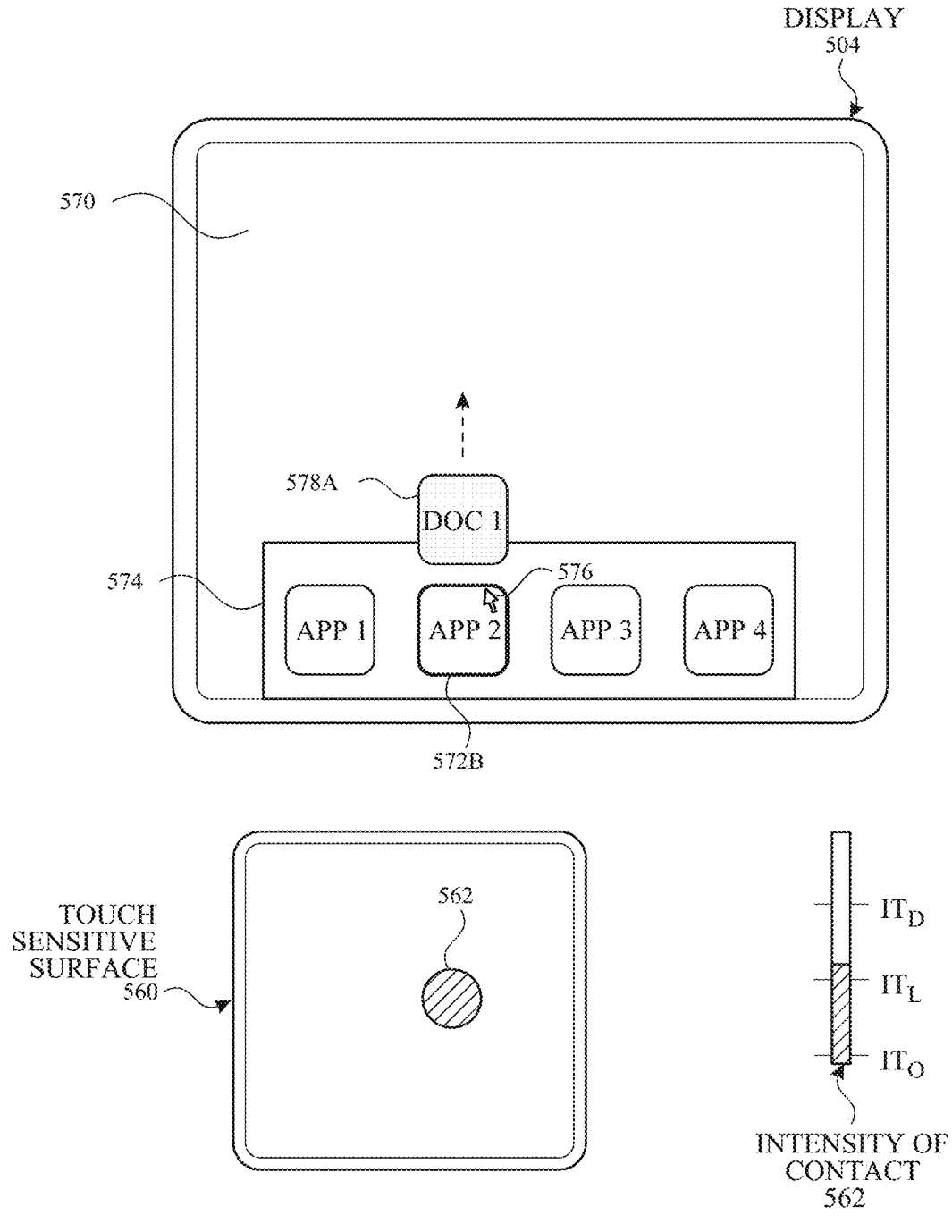
Figure 5G:
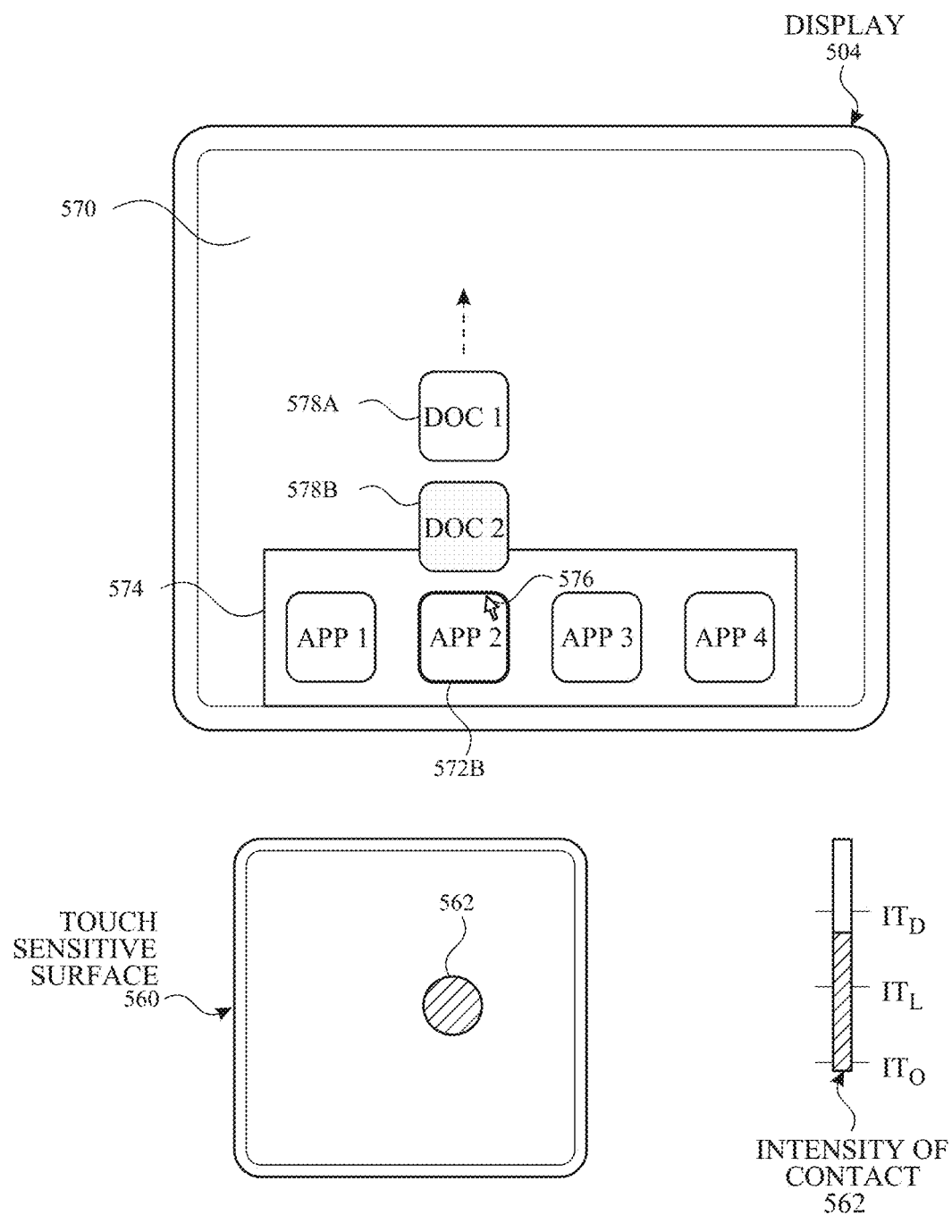
Figure 5H:
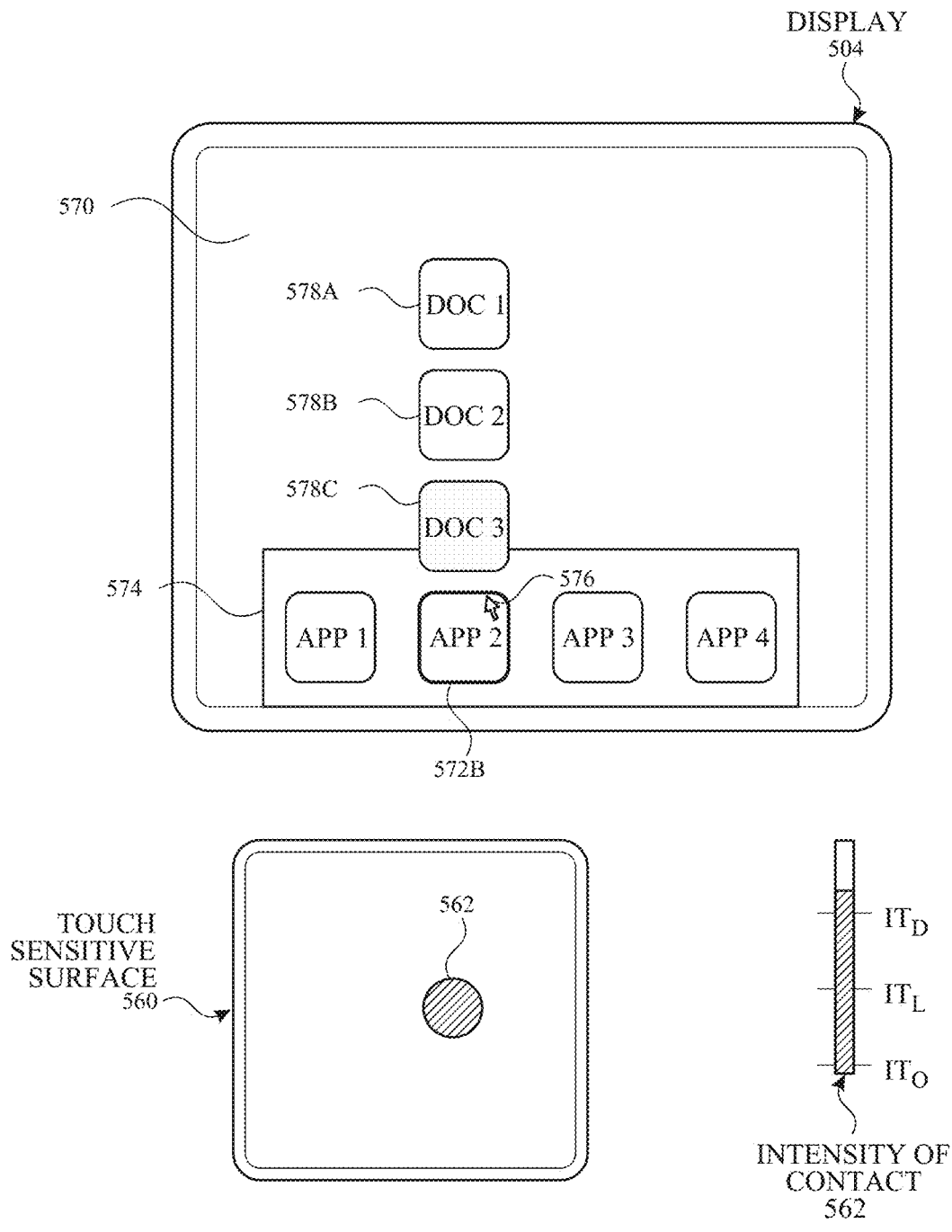
Figure 51:
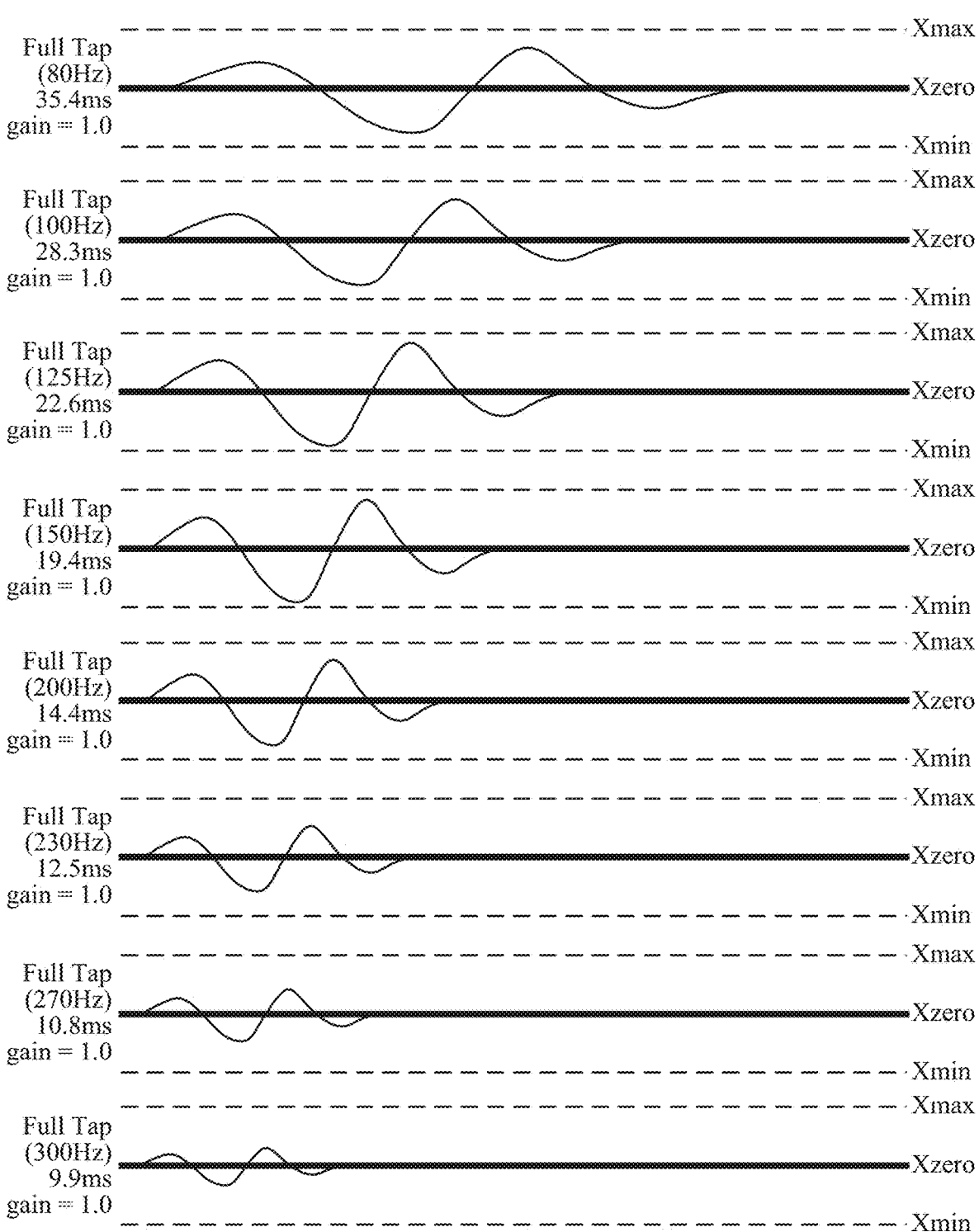

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT_D"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Figure 5J:
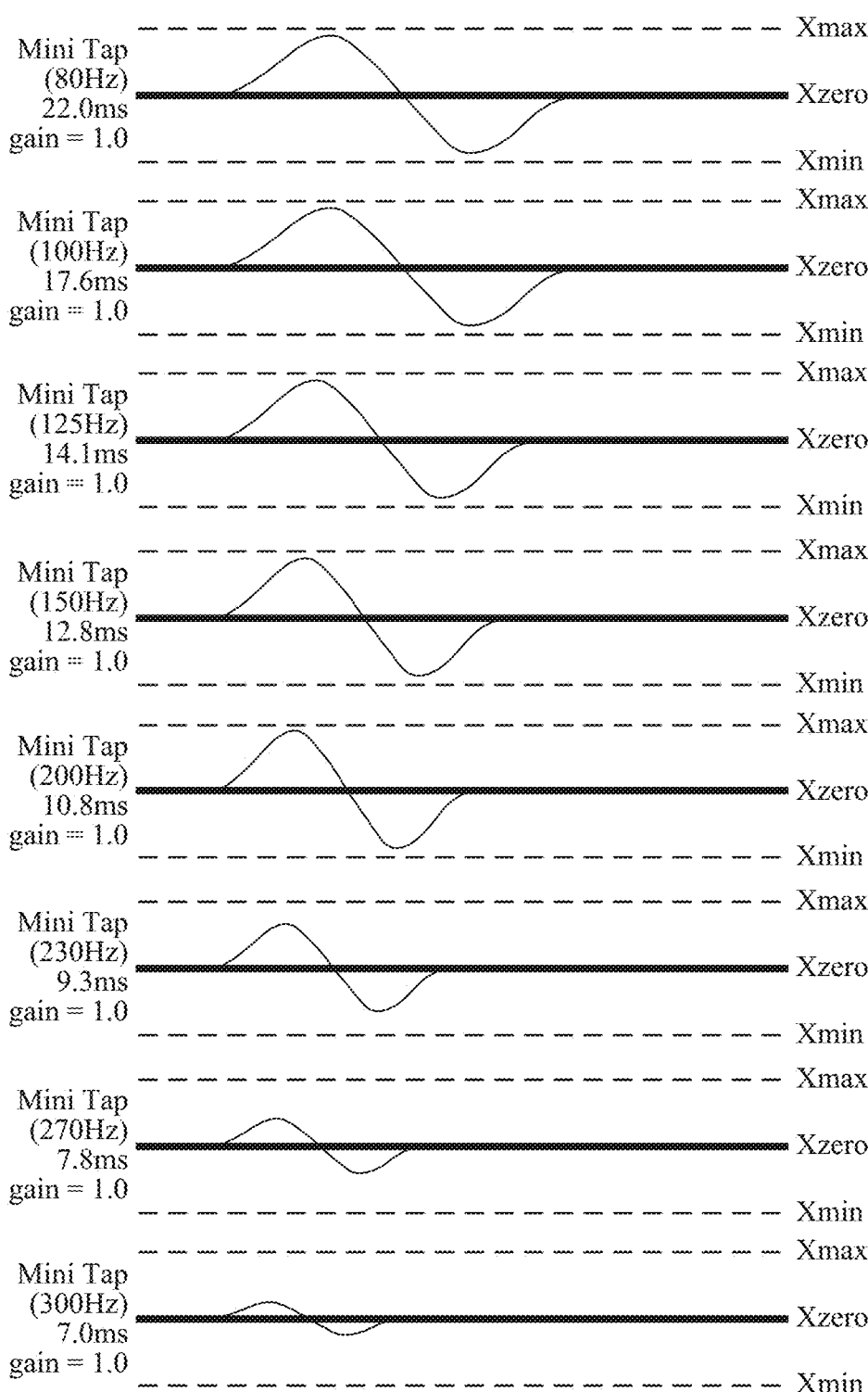
Figure 5K:
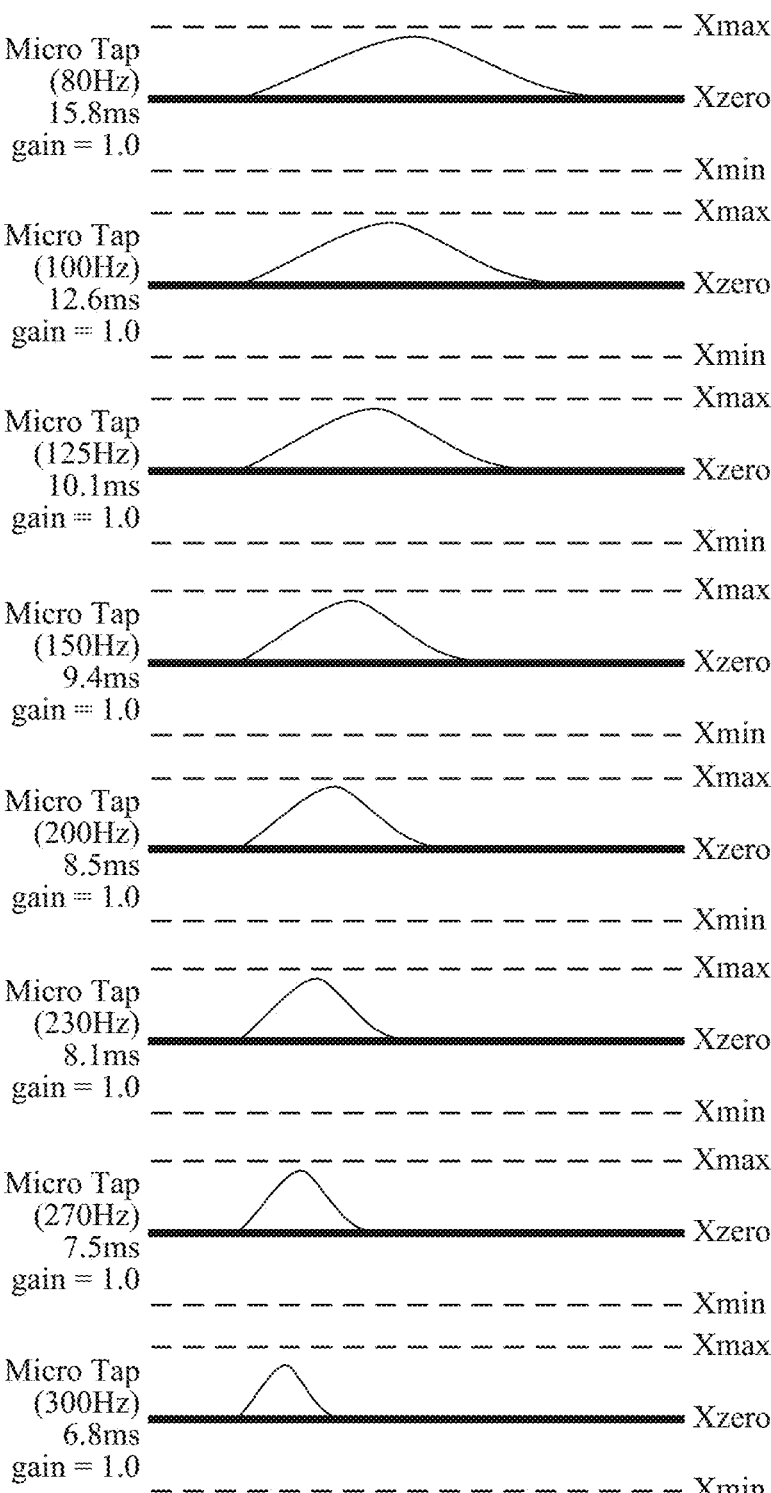
Figure 5L:
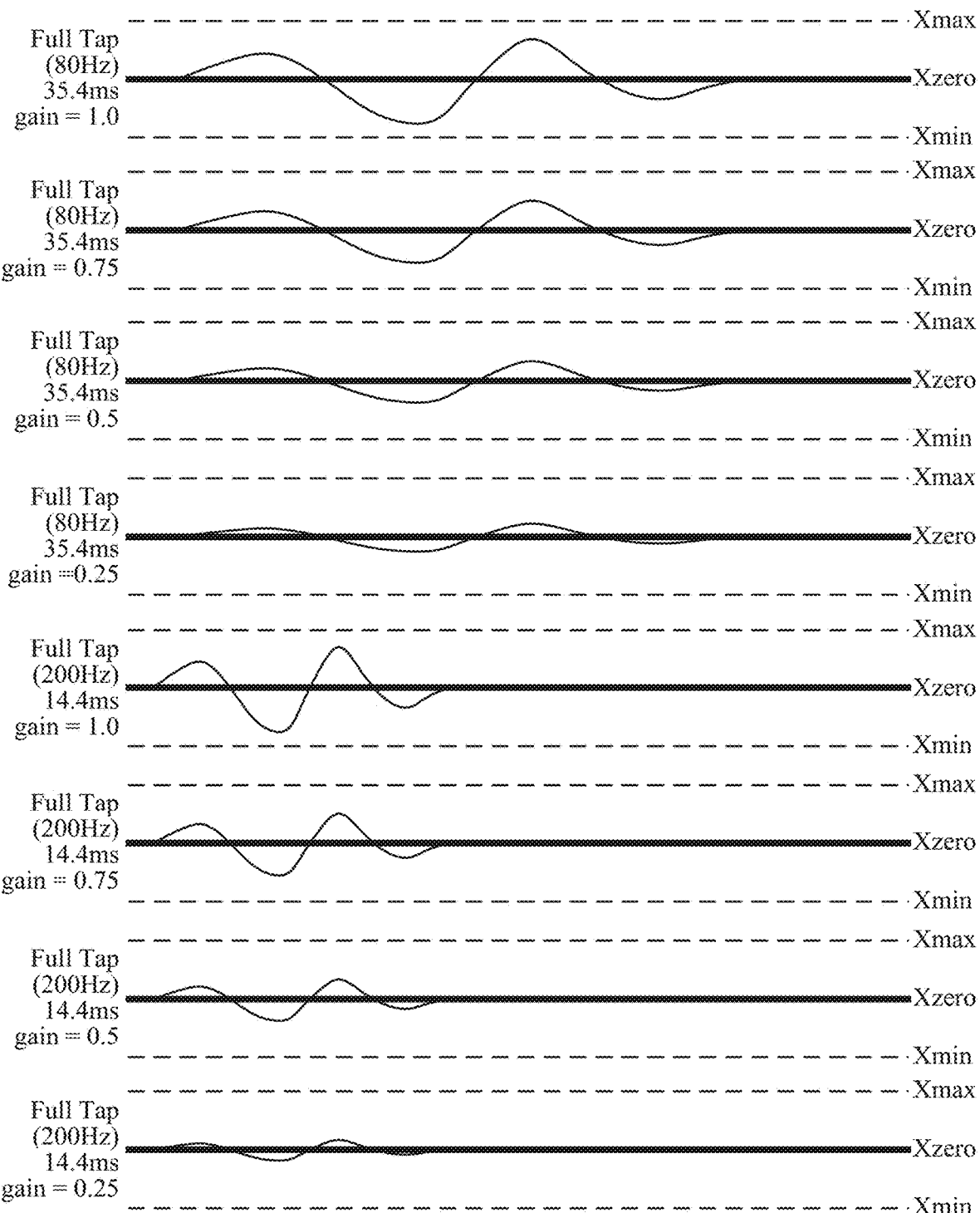
Figure 5M:
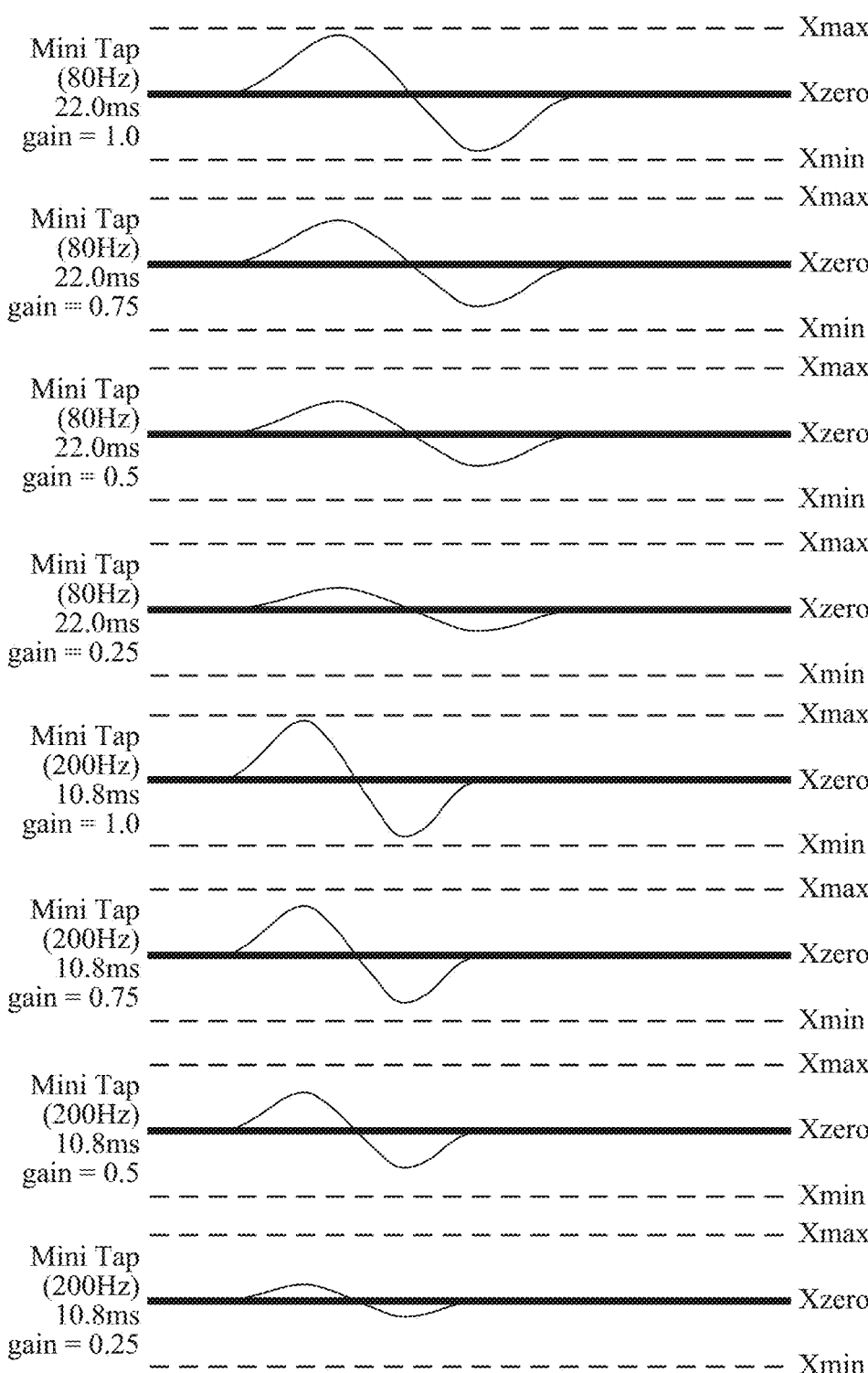
Figure 5N:
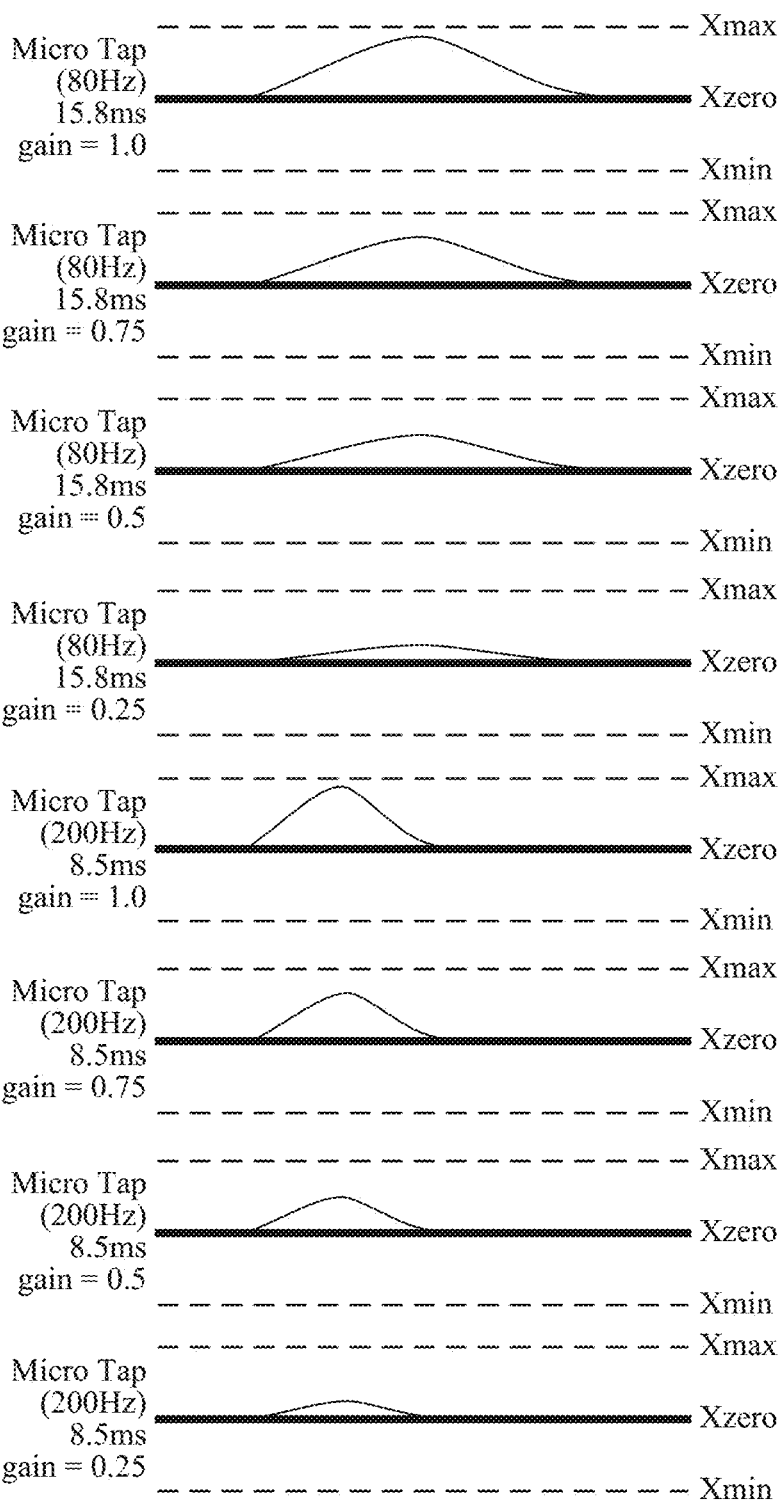

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Nz, and 200 Hz).

FIGS. 5I-5N show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5I (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5J (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5K (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5I-5N include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5I-5N describe movement of a mass in one dimension, however similar principles would also apply to movement of a moveable mass in two or three dimensions.

As shown in FIGS. 5I-5K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5I-5N, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5I). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5I-5K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interfacebased metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 5I-5K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 below provides representative examples of tactile output/haptic feedback behaviors and configurations, and examples of their use with respect to the user interfaces for managing content-based tactile outputs that are illustrated and described herein.

TABLE 1

| Type of Tactile Output Sequence | Waveform | Textural (continuous) or Discrete |
|---|---|---|
| "Major" | MiniTap at 180 Hz | Discrete |
| "Minor" | MicroTap at 80 Hz | Textural |
| "Major-reduced" | MiniTap at 200 Hz | Discrete |
| "Minor-Reduced" | MicroTap at 200 Hz | Discrete |

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes
Indicating Device Status with Respect to a User Account Users interact with electronic devices in many different manners. In some embodiments, an electronic device is associated with a user account and/or is trackable by the user account. The embodiments described below provide ways in which an electronic device displays visual indications to a user when an electronic device is associated with a particular user account, thus enhancing the user's interactions with the electronic device. Enhancing interactions with a device reduces the amount of time needed by a user to perform operations, and thus reduces the power usage of the device and increases battery life for battery-powered devices. The ability for a user account to track the location of an electronic device is intended to be used by users to help locate lost or stolen devices, and the visual indications provided by the embodiments herein clearly inform users when such location tracking is possible. It is understood that people use devices. When a person uses a device, that person is optionally referred to as a user of the device.

FIGS. 6A-6LL illustrate exemplary ways of displaying visual indications to a user when an electronic device is associated with a particular user account in accordance with some embodiments of the disclosure. The embodiments in these figures are used to illustrate the processes described below, including the processes described with reference to FIGS. 7A-7H.

Figure 6B:
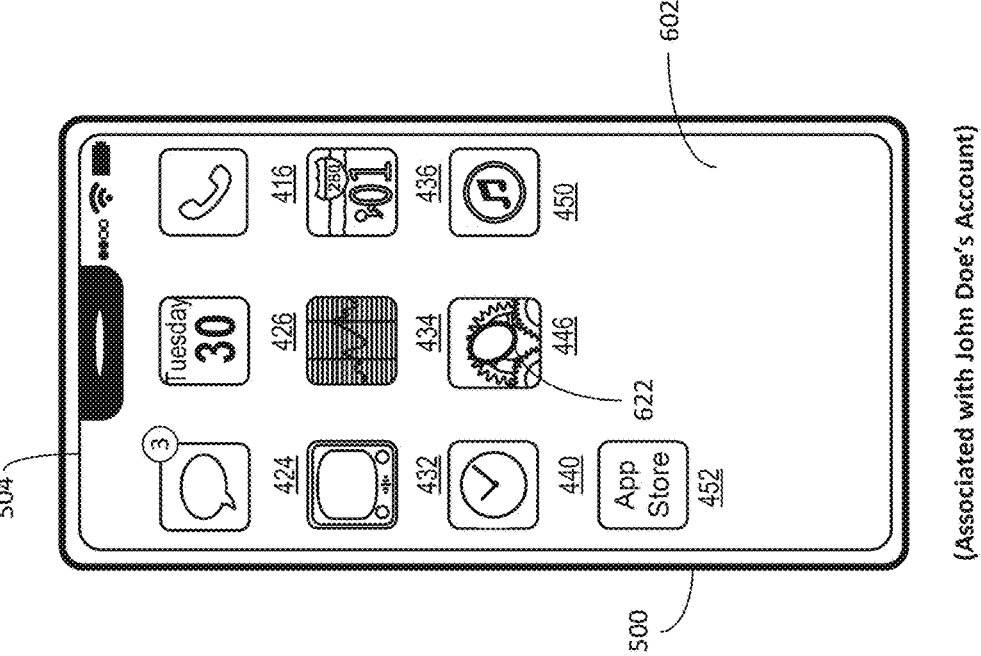
FIGS. 6A-6LL illustrate exemplary ways of displaying visual indications to a user when an electronic device is associated with a particular user account in accordance with some embodiments of the disclosure.
Figure 6A:
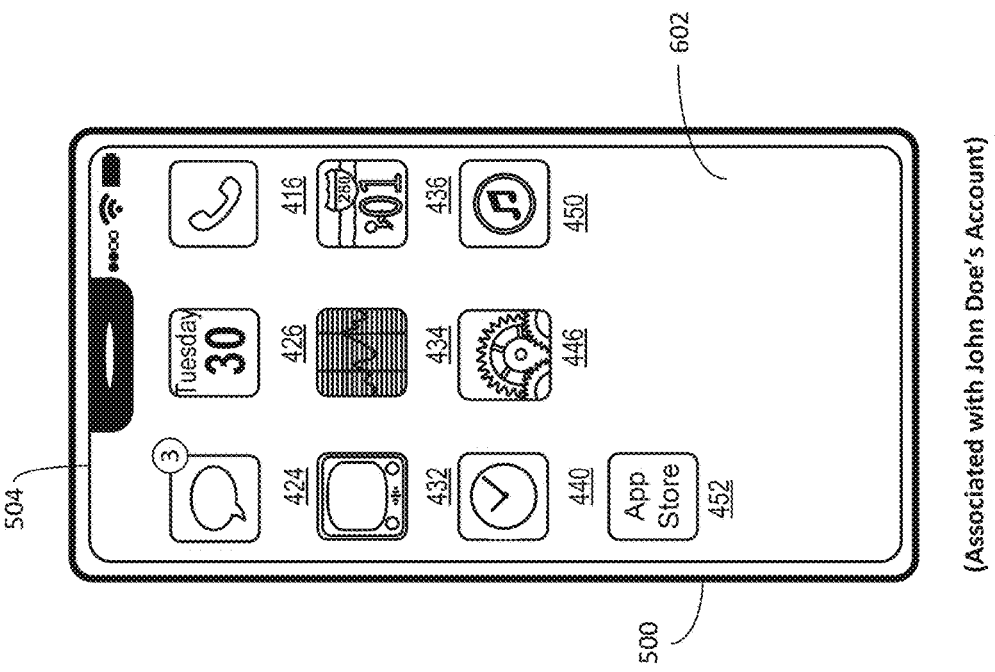

FIG. 6A illustrates an exemplary device 500 that includes touch screen 504. In FIG. 6A, while the electronic device 500 is associated with John Doe's Account (indicated by "(Associated with John Doe's Account)" in FIG. 6A), the electronic device 500 is presenting a home screen user interface 602 that includes a plurality of selectable options 424-452 (e.g., such as the home screen user interface described with reference to FIG. 4A). In some embodiments, the plurality of selectable options are representations of applications, which when selected, cause the electronic device 500 to present user interfaces of an application associated with the selected representation. In some embodiments, home screen user interface 602 is presented to a user while the phone is unlocked (e.g., the electronic device 500 is not restricting user access to the electronic device).

In some embodiments, the electronic device 500 presents a home screen user interface after having been configured for use with a particular user account. For example, in FIG. 6A, the electronic device is presenting home screen user interface 602 after having been configured with John Doe's Account. In some embodiments, the electronic device is configured with a particular user account when a user provides credentials for that particular user account during a configuration process of the electronic device. In some embodiments, when electronic device 500 is configured with the particular user account, settings of the particular user account optionally control/command the electronic device in a particular manner, as will be described in more detail later. In some embodiments, while electronic device 500 is unlocked, a user of the electronic device is optionally able to initiate a process to reset the electronic device 500.

For example, in FIG. 6B, while electronic device 500 is displaying home screen user interface 602 and while the electronic device is associated with John Doe's Account, the electronic device 500 detects touch contact 622 selecting selectable option 446, which corresponds to a representation of a Settings application of the operating system of device 500. In FIG. 6C, in response to receiving the selection of selectable option 446, the electronic device 500 presents a user interface 606 of the Settings application. In some embodiments, when the electronic device 500 is associated with a user account, a user interface of the Settings application includes selectable options associated with the user account. For example, because device 500 is associated with John Doe's Account, user interface 606 includes a selectable option 608 which is selectable to access information about John Doe's Account. In some embodiments, when the electronic device 500 is associated with a user account, selectable option 608 includes information about an email address/username associated with the user account (as shown in FIG. 6C). In some embodiments, when selectable option 608 is selected, settings of the user account are able to be viewed and adjusted, such as controlling if the electronic device 500 is able to be associated with a new user account, controlling if a user of the user account has access to the location of the electronic device, etc. Additionally, user interface 606 includes selectable options 612-620 corresponding to various other settings of the electronic device 500. In some embodiments, when selectable options 612-620 are selected, settings and/or user interfaces associated with the selected item are able to be viewed and adjusted.

Figure 6D:
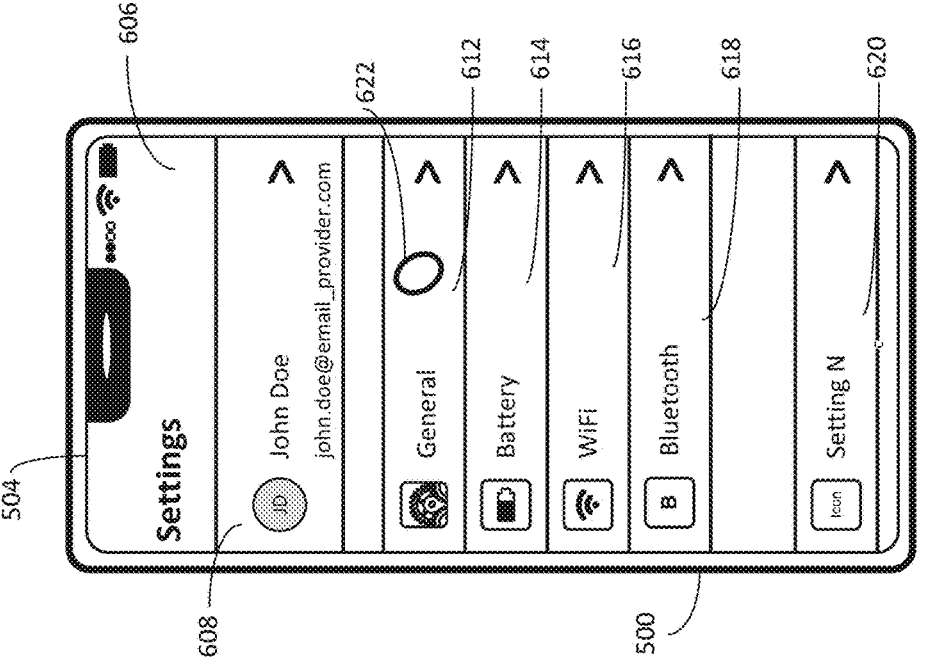
Figure 6C:
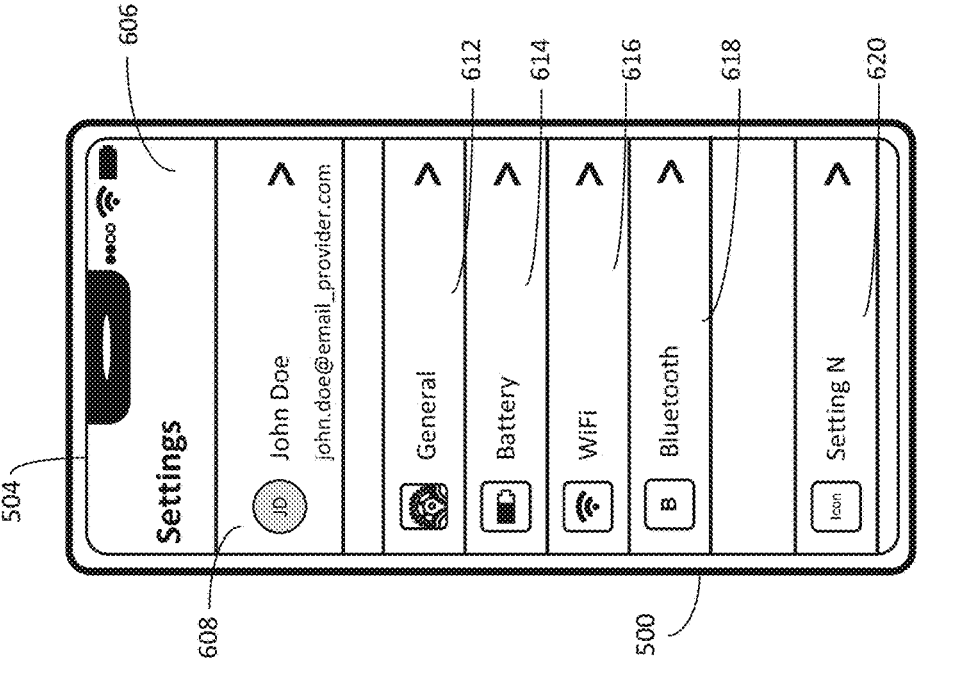
Figure 6F:
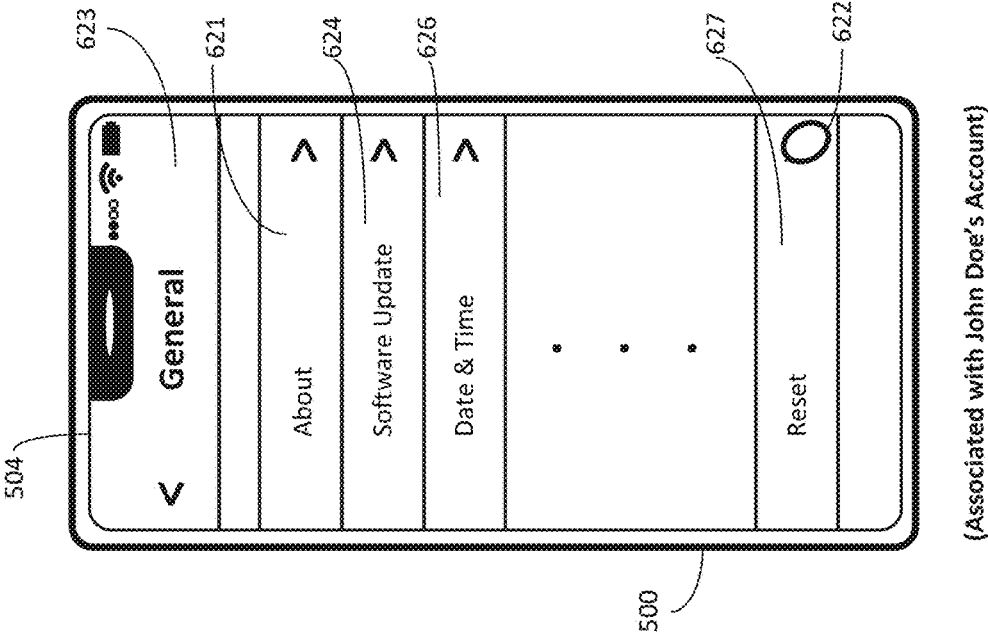
Figure 6E:
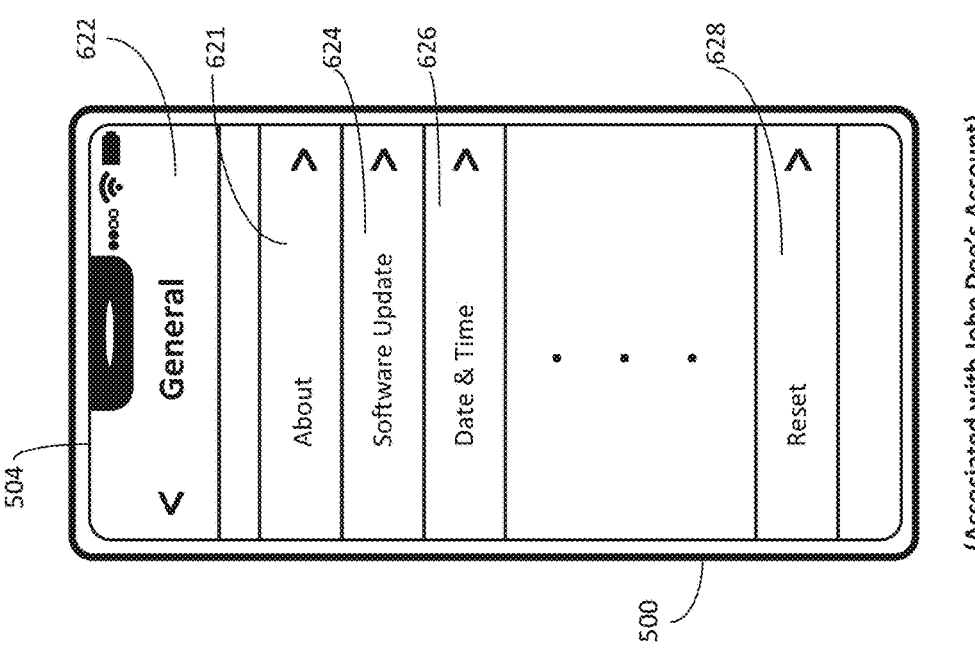

In FIG. 6D, while displaying the settings user interface 606, the electronic device 500 detects touch contact 622 selecting selectable option 612 which corresponds to General Settings of the electronic device 500. In FIG. 6E, in response to the electronic device 500 detecting touch contact 622 selecting selectable option 612, the electronic device 500 presents a user interface 622 corresponding to general device settings. User Interface 622 includes selectable option 621 for viewing information about the electronic device 500, selectable option 624 for updating the electronic device 500, selectable option 626 for adjusting time settings of the electronic device, and a selectable option 628 for resetting the electronic device. In FIG. 6F, while the electronic device is displaying user interface 622, the electronic device 500 detects touch contact 622 selecting selectable option 628.

Figure 6H:
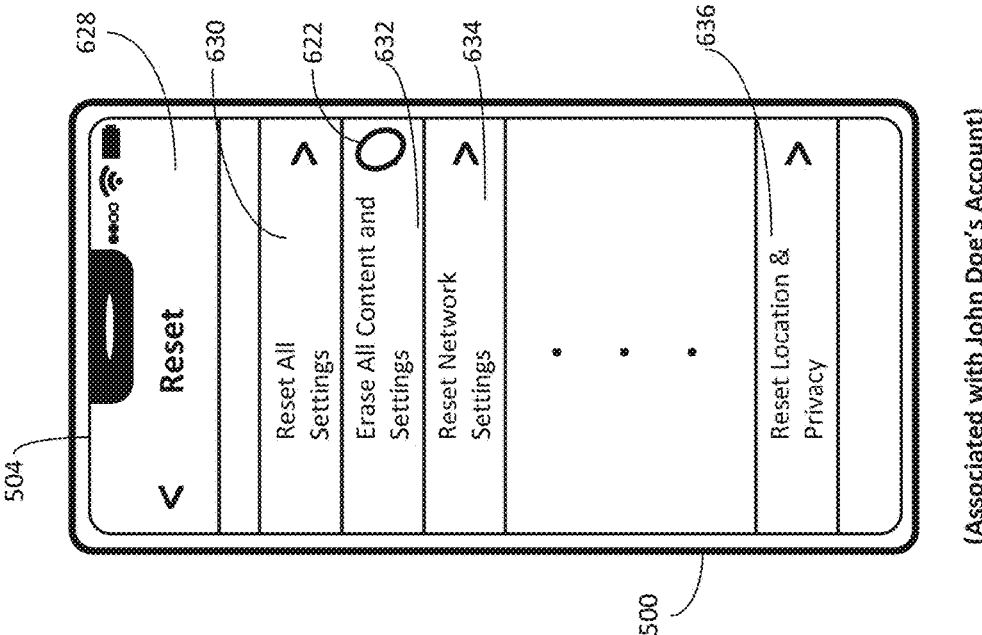
Figure 6G:
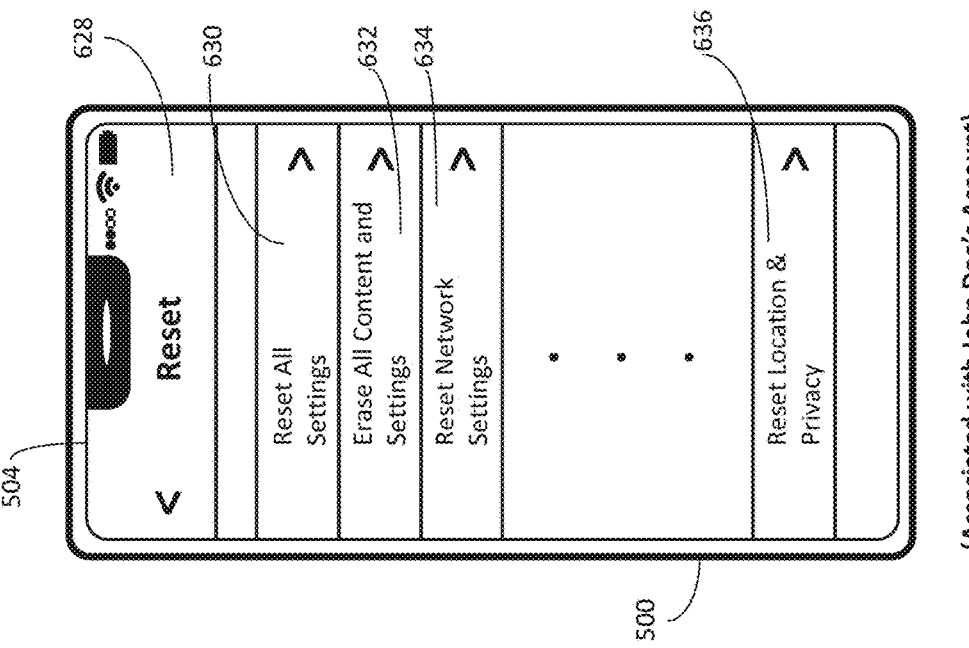

In FIG. 6G, in response to detecting selection of selectable option 627, the electronic device 500 presents a user interface 628 for resetting the electronic device 500. User Interface 628 includes selectable option 630 for resetting all settings of electronic device 500, selectable option 632 for erasing all content and settings of electronic device 500, selectable option 634 for resetting the network settings of the electronic device 500, and a selectable option 636 for resetting the location and privacy settings of the electronic device 500.

Figure 6J:
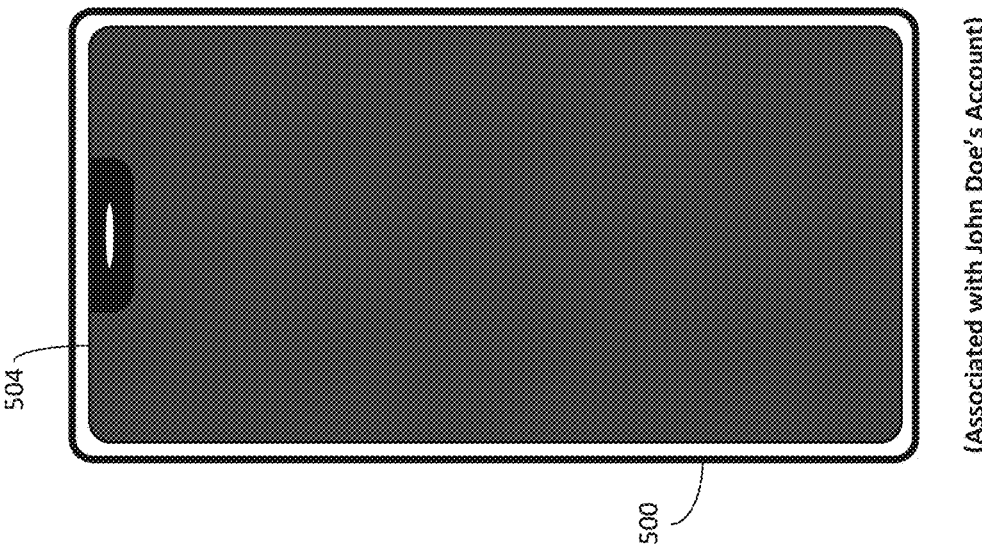
Figure 6I:
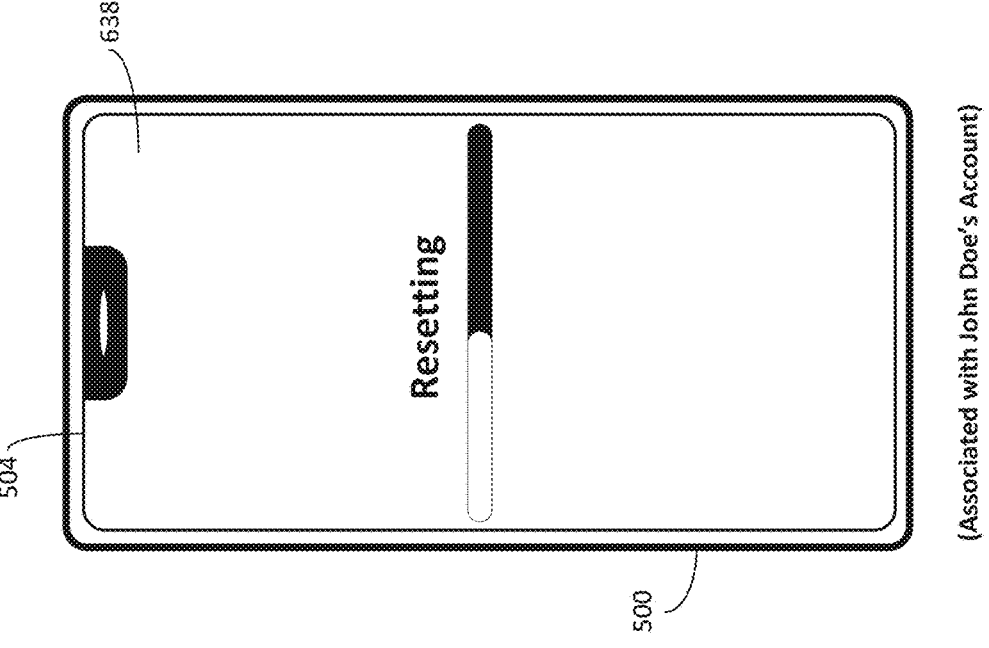

In FIG. 6H, the electronic device 500 detects touch contact 622 selecting selectable option 632 which corresponds to resetting the electronic device 500 by erasing all content and settings of the electronic device 500. In FIG. 6I, in response to receiving the touch contact 622 selecting selectable option 632, the electronic device 500 begins resetting the electronic device and erasing all content and settings of the electronic device 500. In some embodiments, while electronic device 500 is performing the process of resetting the electronic device, the electronic device 500 displays a user interface corresponding to the reset process. For example, in FIG. 6I, while the electronic device is being reset, the electronic device displays user interface 638 for indicating the current progress of the reset process.

Figure 6L:
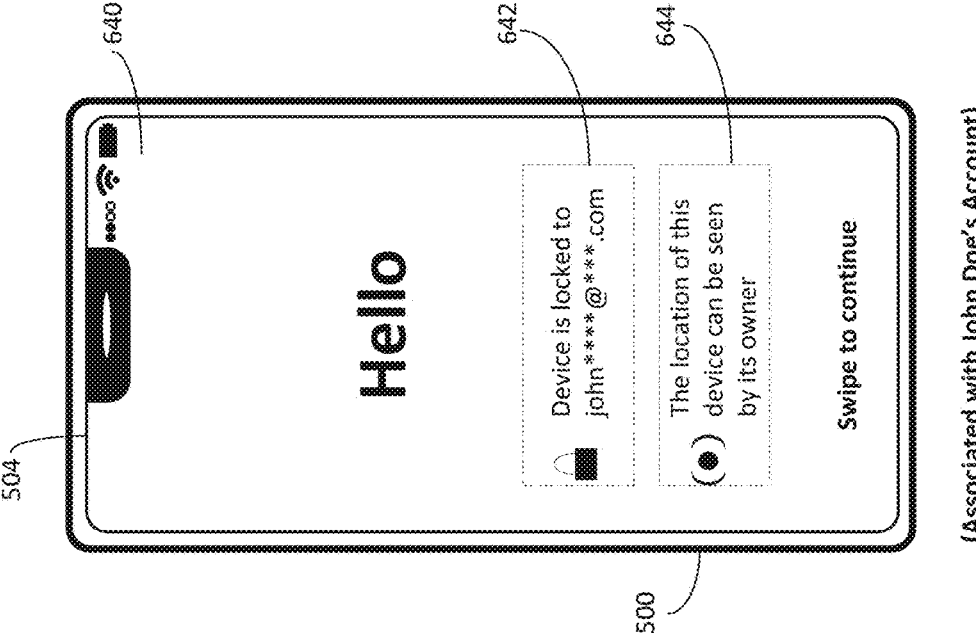
Figure 6K:
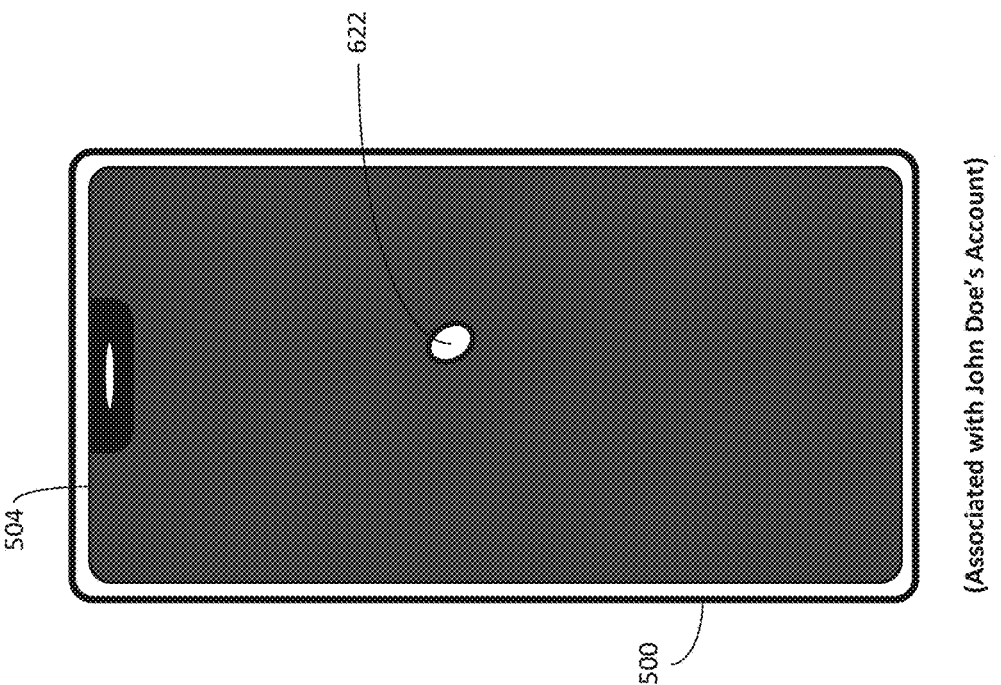

In some embodiments, after the electronic device 500 has finished the reset process, the electronic device 500 enters a sleep/low power state in which the display of the device is off. For example, in FIG. 6J, after the electronic device has finished performing the reset process, as shown in FIG. 6I, the electronic device enters a sleep/low power mode and the touch screen 504 is currently off (e.g., not displaying a user interface). In some embodiments, even after resetting the electronic device 500, the electronic device 500 maintains its associations with the user account that used with the electronic device prior the device being reset if the association with the user account was not removed prior to the electronic device being reset. For example, as shown in FIG. 6J, after the electronic device has been reset, the device's association with John Doe's account is still maintained (indicated by "(Associated with John Doe's Account)"). In FIG. 6K, while the electronic device 500 is in a sleep/lower power mode and while the electronic device is still associated with John Doe's account, the electronic device 500 detects a wake command corresponding to a request to turn on the touch screen 504. In some embodiments, the wake command is issued to the electronic device 500 when the electronic device detects a touch contact 622 while the touch screen is off, as shown in FIG. 6K. In some embodiments, the wake command is issued to the electronic device when the electronic device detects a tap/click directed to a power button of the electronic device while the touch screen 504 is off.

In some embodiments, after the electronic device 500 has completed the reset process, the electronic device in a state in which a new user account can be associated with the electronic device (e.g., a device setup state)—if a user account currently associated with the electronic device allows, or if the electronic device is not currently associated with a user account. For example, in FIG. 6L, in response to the electronic device 500 receiving the wake command, the electronic device 500 displays user interface 640. As shown in FIG. 6L, user interface 640 is displayed after the electronic device 500 has been reset and before a user starts a process for configuring the electronic device with a new user account. In some embodiments, user interface 640 is optionally the first user interface that is displayed by the electronic device 500 after the electronic device has been reset.

As shown in FIG. 6L, the user interface 640 includes a welcome message ("Hello"), an indication of how to initiate a process to begin configuring the electronic device ("Swipe to continue"), an indication 642 indicating that the electronic device is locked to John Doe's account, and an indication 644 indicating that the electronic device is sharing its location with John Doe's account. In some embodiments, visual indication 642 is displayed if the electronic device 500 is associated with a respective user account and if a setting of that user account is preventing other user accounts from being associated with the electronic device. In some embodiments, if the electronic device 500 is associated with a user account, but a setting of that user account is not preventing other accounts from being associated with the electronic device—or, if device 500 is not associated with a user account—then visual indication 642 is not included in the user interface 640. In some embodiments, if a user account (or a setting of a user account) is preventing another account from being associated with device 500, the electronic device 500 is unable to be associated with another user account until the user account is disassociated with the electronic device or the setting preventing another user account from being associated with the electronic is turned off.

In some embodiments, when the electronic device is locked to a particular user account, user interface 640 optionally includes an indication about the particular user account to which the electronic device is locked (or the user associated with the user account). For example, in FIG. 6L, indication 642 includes a redacted email address of the user account to which device 500 is currently locked.

In some embodiments, visual indication 644 is displayed if the electronic device 500 is associated with a respective user account and if a setting of that user account is causing the electronic device to share its location with the user account. In some embodiments, if the electronic device is associated with a user account, but a setting of that user account is not causing the electronic device to share its location with the user account—or if device 500 is not associated with a user account—then visual indication 644 is not included in the user interface 640. In some embodiments, if a user account (or a setting of a user account) is causing the electronic device to share its location with the user account, a user of that user account is able to access a location of the electronic device. Similarly, in some embodiments, if after an electronic device has been reset and the electronic device is not currently associated with any user account, user interface 640 does not include visual indications 642, 644, as show in FIG. 6L-1.

Figure 6M:
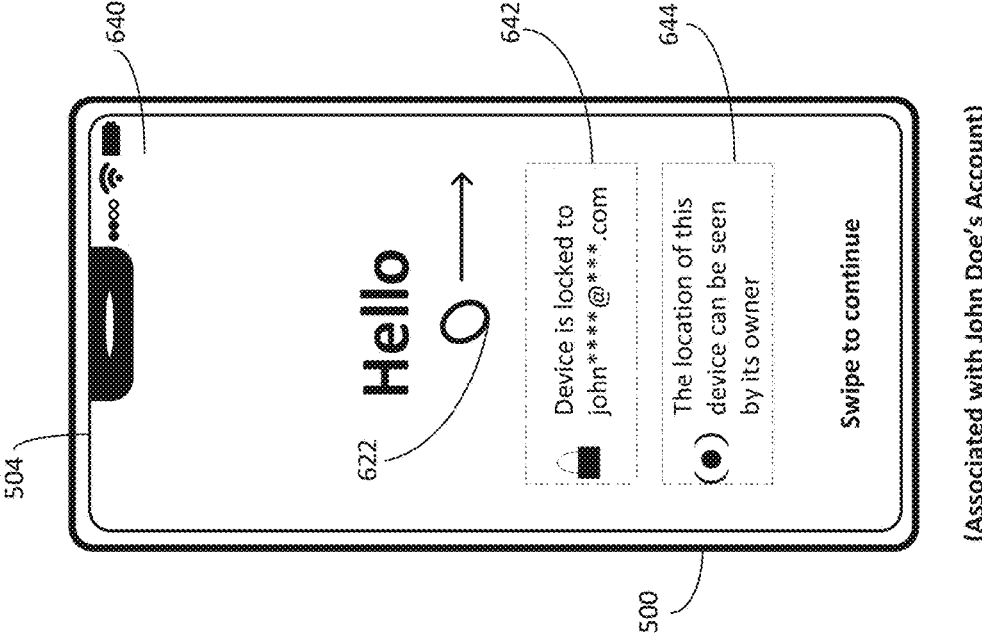

In FIG. 6M, while displaying user interface 640 and visual indications 642 and 644, the electronic device 500 detects a swipe (indicated by touch contact 622 moving to the right on touch screen 504) corresponding to a request to initiate the process of configuring the electronic device 500 with a new user account. In some embodiments, if an electronic device is unable to be configured with a new user account (because it is currently locked to another user account), the electronic device is not able to be configured with a new user account.

Instead, in some such embodiments, the electronic device requires account credentials of the user account currently associated with the electronic device before it allows a new user account to become associated with the electronic device. For example, in FIG. 6N, in response to receiving the request to configure the electronic device 500 with a new user account (e.g., as part of the process initiated in response to the input detected in FIG. 6M), the electronic device 500 displays a user interface 646 requesting the credentials of John Doe's Account (e.g., the user account to which device 500 is currently locked and/or with which device 500 is currently associated). In some embodiments, until the credentials of John Doe's Account are provided to the electronic device 500, a user of the electronic device 500 is unable to complete the process for configuring device 500 with their user account and/or perform functionality such as accessing a home screen of the device, launching applications, sending/receiving messages, etc. Thus, in some such embodiments, the electronic device does not allow the electronic device to be configured and used until the credentials of John Doe's Account are provided to the electronic device. For example, in FIG. 6N, until the credentials of John Doe's Account are provided to the electronic device 500, the electronic device does not allow the user to advance past user interface 646 and does not allow the user to access functions of the electronic device, including accessing the home screen 602 show in FIG. 6A.

Figures 1, 6L:
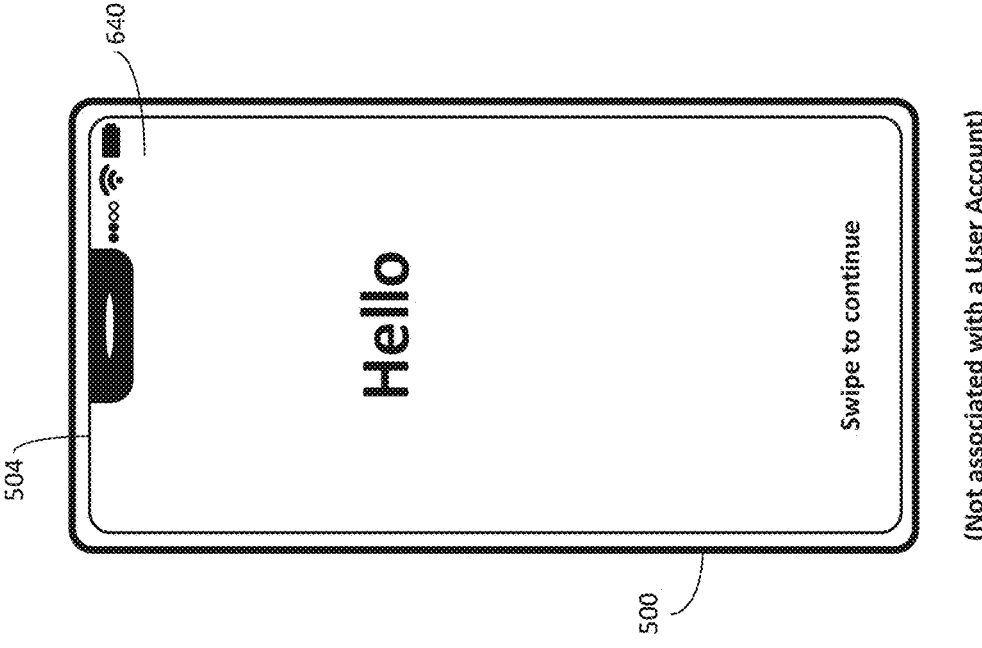
Figure 6O:
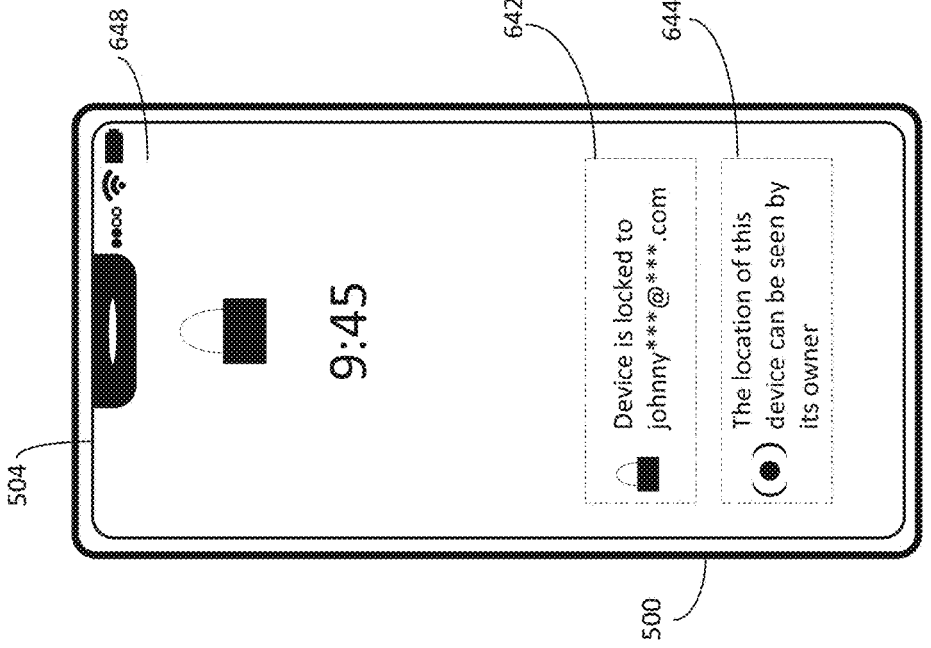
Figure 6N:
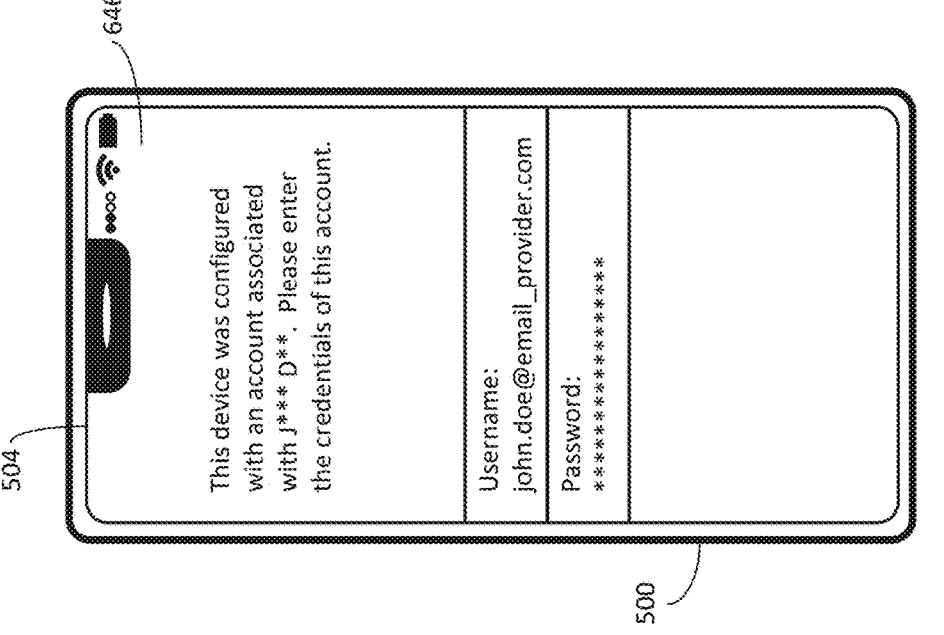

In the example of FIG. 6N, the account credentials of John Doe's account have been provided by the user, and the electronic device 500 is optionally able to complete the current configuration process and optionally initiate a process to disassociate the user account currently associated with the electronic device 500 (John Doe's Account). In some embodiments, a user can initiate a process to dissociate a currently associated user account during the configuration process described above and from a user interface such as user interface 646 shown in FIG. 6N. In some embodiments, a user can initiate a process to dissociate a currently associated user account from a settings application (e.g., from user interface 606, as described with reference to FIG. 6C). For example, John Doe's account optionally becomes disassociated with electronic device 500 when a user "signs out" or deletes the user account from the electronic device (e.g., by interacting with one or more user interfaces displayed in response to selecting item 608 in FIG. 6C). In some embodiments, after disassociating a user account from the electronic device, a new user account optionally can be associated with the electronic device when a user provides credentials of the new user account to the device 500 (e.g., signing in via a displayed user interface in response to selecting item 608 in FIG. 6C).

For example, before displaying the lock screen user interface 648 in FIG. 6O, electronic device 500 is disassociated with John Doe's Account and associated with Johnny Appleseed's Account, in a manner similar to what was described above. In some embodiments, if the electronic device 500 is associated with a user account when a lock screen or wake screen user interface is being displayed, the lock screen user interface includes information about that user account. In some embodiments, the lock screen or wake screen user interface is the first user interface displayed by device 500 in response to waking from a low or no-power state while device 500 is configured (e.g., while device 500 is not in a device setup state). For example, in FIG. 6O, because device 500 is associated with Johnny Appleseed's Account and that account is preventing other accounts from being associated with the device, the lock screen user interface includes visual indication 642 indicating that the electronic device is locked to Johnny Appleseed's Account. Similarly, because Johnny Appleseed's Account has access to the location of the electronic device, the lock screen user interface includes visual indication 644 indicating that the location of the electronic device can be accessed via the user account. In some embodiments, the visual indications displayed only include an indication of functionality associated with the user account (e.g., tracking the location of the device, device is locked, etc.), but not information about the user account. In some embodiments, the visual indications include both an indication of functionality associated with the user account and information about the account that is preventing the device from being associated with other user accounts (e.g., a profile photo associated with user account, redacted/obscured contact information associated with the user account, and/or unmasked contact information associated with the user account such as a full phone number, email, etc. of the user). One or more of the characteristics of indications 642 and 644 are optionally the same as one or more of the characteristics of indications 642 and 644 described with reference to FIG. 6L. Further, in some embodiments, one or more of indications 642 or 644 are displayed whether or not device 500 is locked or unlocked (e.g., having authentication a user using biometric identification, such as fingerprint or face recognition, for example) while displaying user interface 648.

In some embodiments, even if a user account is associated with the electronic device when displaying a lock screen user interface, the lock screen or wake screen user interface optionally does not include visual indications associated with the user account. For example, in FIG. 6O-1, even though device 500 is associated with Johnny Appleseed's Account and that account is preventing other user accounts from being associated with device 500, and that account has access to the location of the electronic device, lock screen user interface 648 does not include any visual indications associated with this functionality.

Figure 6P:
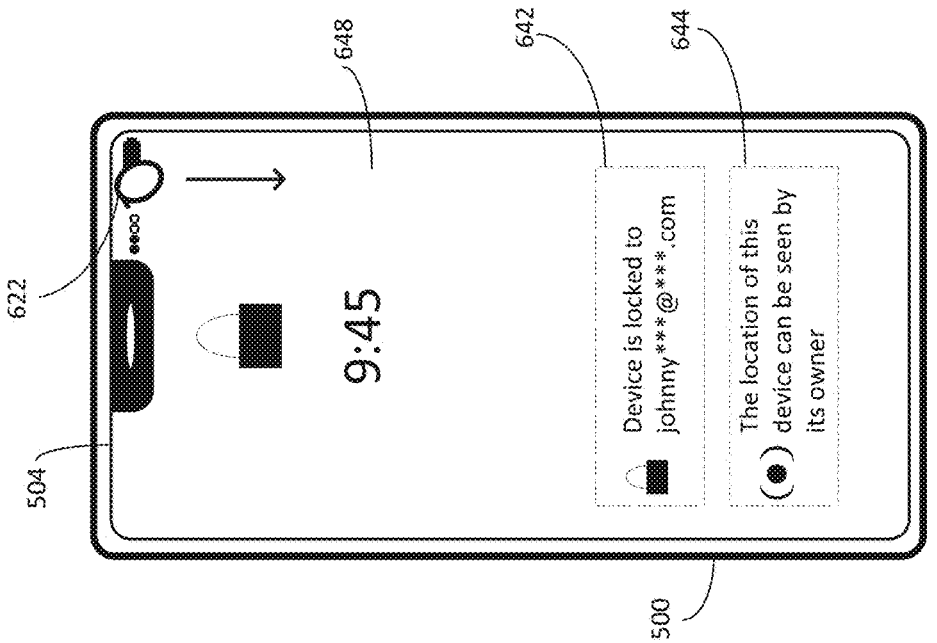
Figures 1, 6O:
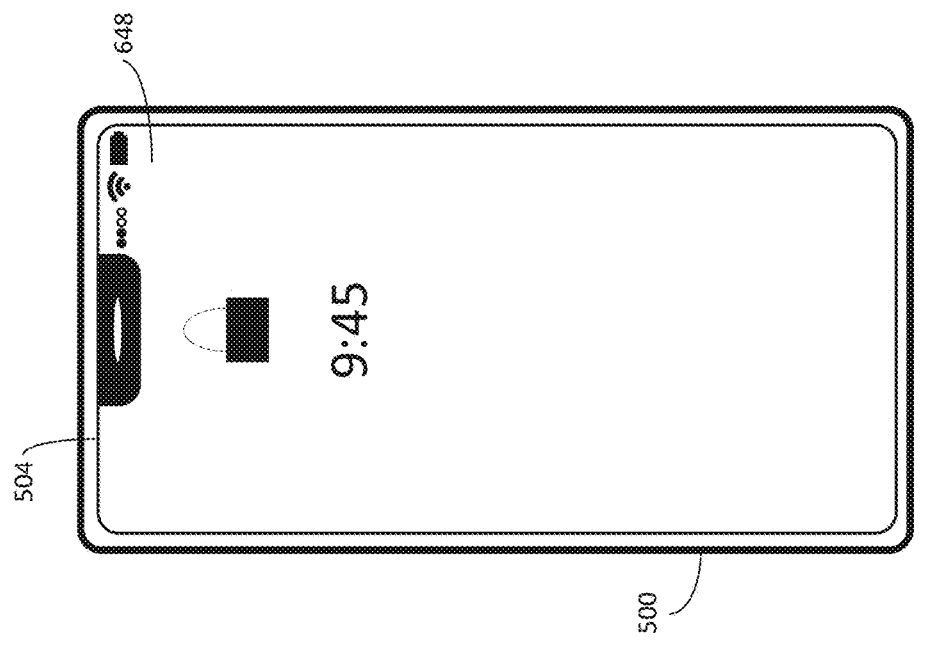
Figure 6R:
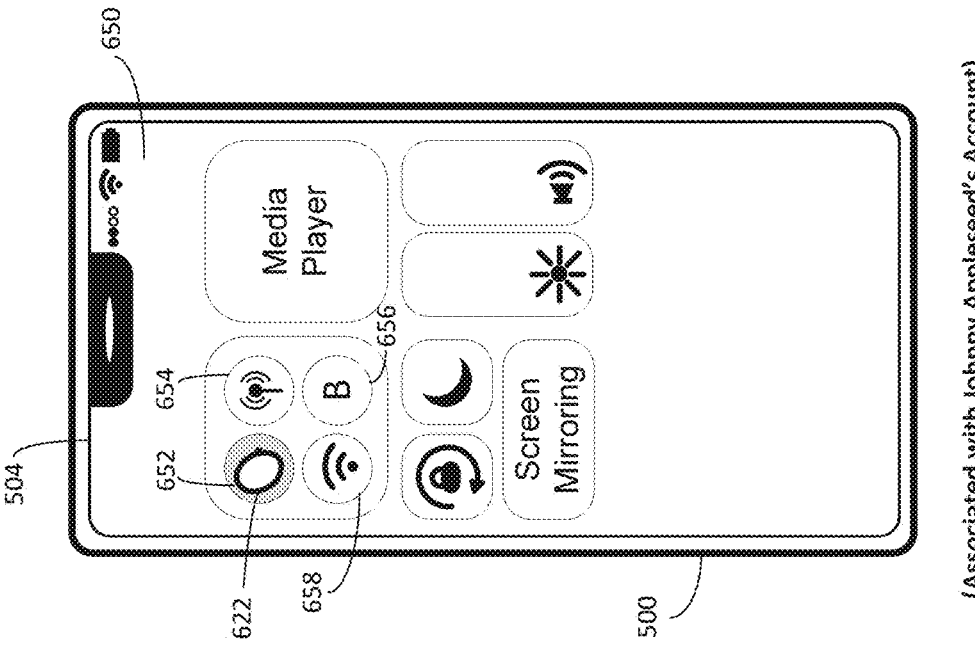
Figure 6Q:
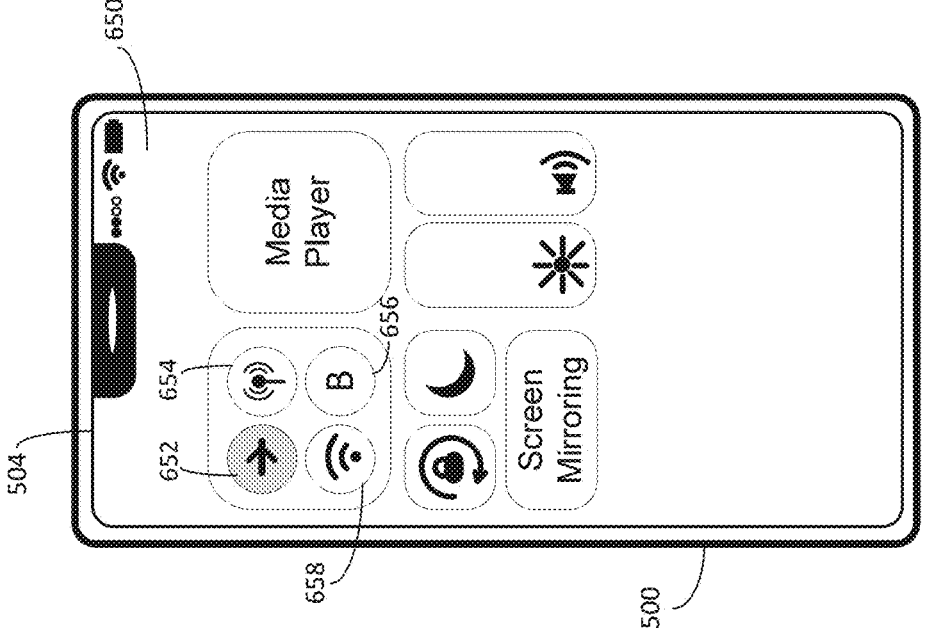

In FIG. 6P, while displaying the lock screen or wake screen user interface 648, and while device 500 is locked (e.g., before any successful authentication input, such as a password, a PIN code, facial authentication, fingerprint authentication, other biometric authentication, etc., is provided to device 500) the electronic device 500 detects a downward swipe starting from an upper-right portion of touch screen 504 (indicated by touch contact 622). In FIG. 6Q, in response to receiving the downward swipe, electronic device 500 displays user interface 650 while device 500 remains locked. User interface 650 is optionally a control center user interface that includes one or more controls for controlling one or more functionalities of device 500. For example, user interface 650 in FIG. 6Q includes toggle button 652 for turning airplane mode on or off (e.g., allows or restricts electronic device 500 from receiving or transmitting wireless signals), toggle button 654 for toggling cellular data on or off (e.g., allows or restricts electronic device 500 from using cellular data), toggle button 658 for toggling Wi-Fi on or off (e.g., allows or restricts electronic device 500 from using Wi-Fi), and toggle button 656 for toggling Bluetooth on/off (e.g., allows or restricts electronic device 500 from using Bluetooth). User interface 650 also includes various other selectable controls for controlling functionality of the electronic device, including controls for adjusting the display brightness of the touch screen 504, adjusting music playback volume, etc.

Figure 6T:
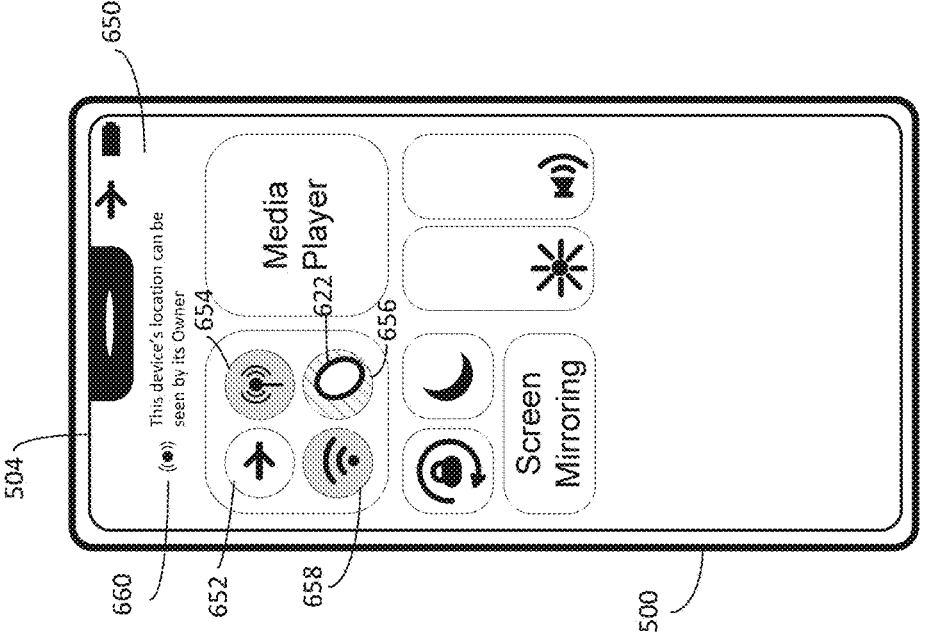
Figure 6S:
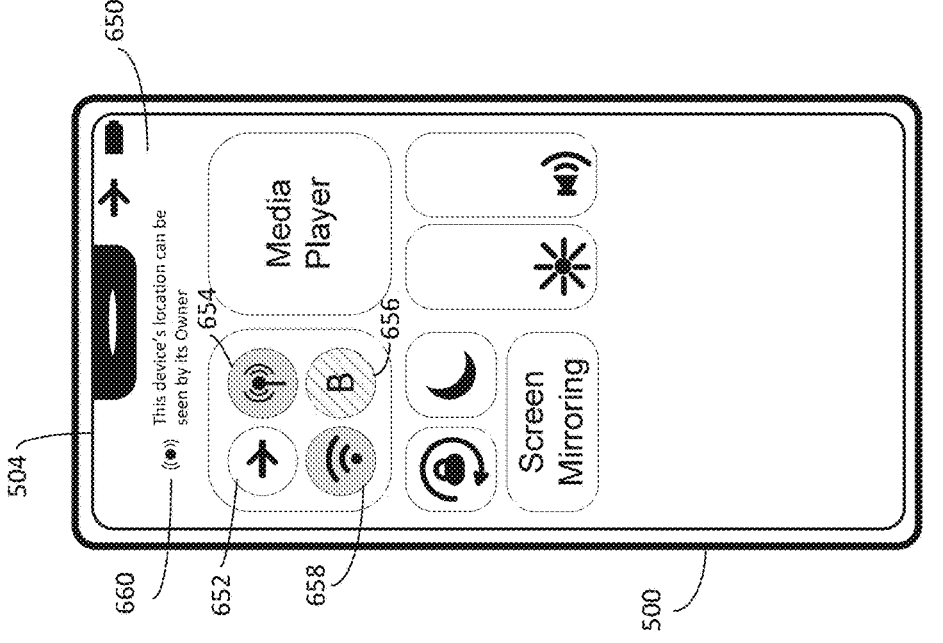

In the example of FIG. 6Q, toggle button 652, associated with an airplane mode of the device, is toggled off (represented by the gray-scale fill) indicating the electronic device is not in airplane mode. Toggle buttons 654-658 are toggled on indicating that the electronic device is allowing use of Wi-Fi, Bluetooth, and cellular data. In FIG. 6R, while toggle button 652—associated with an airplane mode of the device—is toggled off and while device 500 remains locked, the electronic receives a selection of toggle button 652 (indicated by touch contact 622). In FIG. 6S, in response to receiving the selection of toggle button 652, toggle 652 button toggles on. In some embodiments, the functions of the electronic that turn off in response to airplane mode toggling on are based on whether the electronic received the toggling on input in a device locked or device unlocked state. For example, in FIG. 6S, because the electronic device 500 received the request to toggle airplane mode on when the device was in a locked state, the electronic device restricts use of cellular data and Wi-Fi (indicated by toggle buttons 654 and 658 toggling to an off state (represented by gray-scale fill in toggle buttons 654 and 658)) while still allowing at least some communications via Bluetooth (represented by cross hatch fill in toggle button 656). Bluetooth communication is optionally not able to be toggled completely off when a device is airplane mode so that functionality associated with the user account with which device 500 is associated can continue to function—or stated differently, to prevent a user of device 500 from disabling such functionality while device 500 is locked. For example, when a device is unable to transmit information about a location of the electronic directly to the user account (e.g., with cellular or Wi-Fi signals because of airplane mode being turned on), the electronic device optionally utilizes Bluetooth to broadcast information about the location of device 500 to other electronic devices in range of the Bluetooth signal, which in turn allows the other electronic devices to transmit information about the location of the electronic device to the user account. In FIG. 6S, a user of Johnny Appleseed's Account still has access to the location of the electronic device even after airplane is toggled on because the device 500 is able to transmit information about its location via Bluetooth, as described above. Because Johnny Appleseed's Account still has access to the location of the electronic device, even while in airplane mode, user interface 650 includes an indicator 660 indicating that the location of the device 500 is being shared with Johnny Appleseed's account. Indicator 660 optionally has characteristics similar to or the same as indicators 642 and 644, which were described above. Additionally, indicator 660 is optionally displayed in the same region as toggle buttons 652-656 or is displayed in a different region of user interface 650. In some embodiments, if Johnny Appleseed's account did not have a setting for accessing the location of device 500 turned on (e.g., enabled), indicator 660 would not be included in user interface 650. In some such embodiments, Bluetooth communication could be fully turned off from user interface 650 while device 500 is locked. Alternatively, even in embodiments where a user account does not have a setting for accessing the location of device 500 turned on, Bluetooth communication is optionally not able to be fully turned off from user interface 650 while device 500 is locked.

In some embodiments, while the electronic device is in airplane mode while device 500 remains locked, Bluetooth remains at least partially active and cannot be toggled fully off (e.g., to allow device 500 to share location with a currently associated user account). In FIG. 6T, a selection of toggle button 656 (associated with the Bluetooth device setting) is detected while device 500 is locked and in airplane mode, and Bluetooth is in a "partially on" state. In FIG. 6U, in response to detecting the selection of Bluetooth toggle button 656, Bluetooth becomes fully enabled (indicated by solid fill of toggle button 656). In some embodiments, when Bluetooth is fully on, the device 500 is able to pair/connect with other Bluetooth devices and utilize Bluetooth functionality with no restrictions. Additionally, because airplane mode remains on, the user interface 650 continues to display indicator 660 to indicate that the location of the device is being shared with Johnny Appleseed's account. In some embodiments, if airplane was toggled off, the electronic device 500 would cease display of indicator 660 in the user interface 650.

Figure 6V:
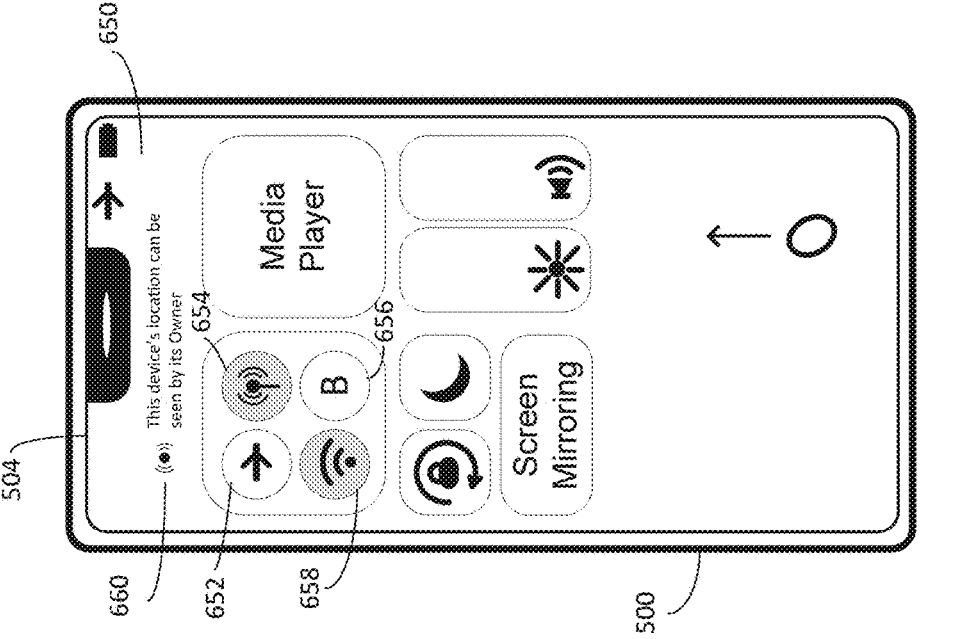
Figure 6U:
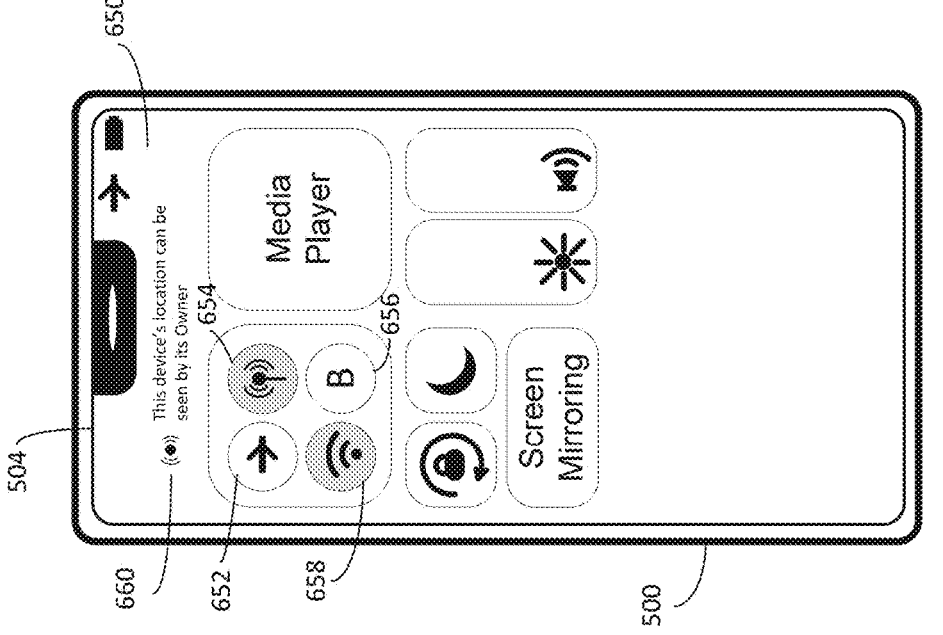

In FIG. 6V, while displaying user interface 650, the electronic device 500 detects a swipe in an upward direction on touch screen 504 (as indicated by touch contact 622). In FIG. 6W, in response detecting the swipe, the electronic device ceases display of user interface 650 and re-displays lock screen user interface 648, which was described above. Device 500 in FIG. 6W is still in a locked state.

Figure 6X:
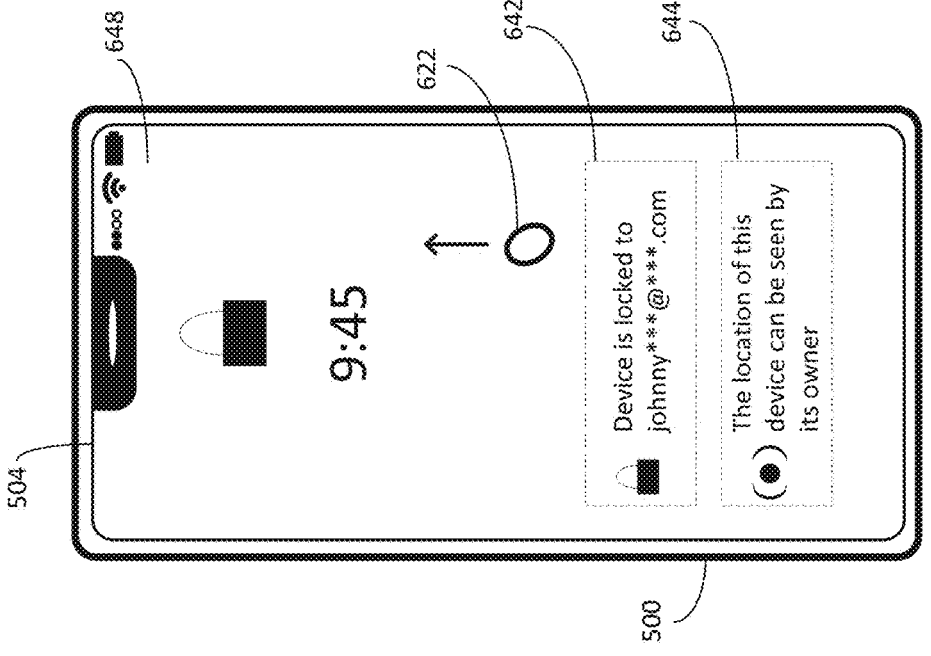
Figure 6W:
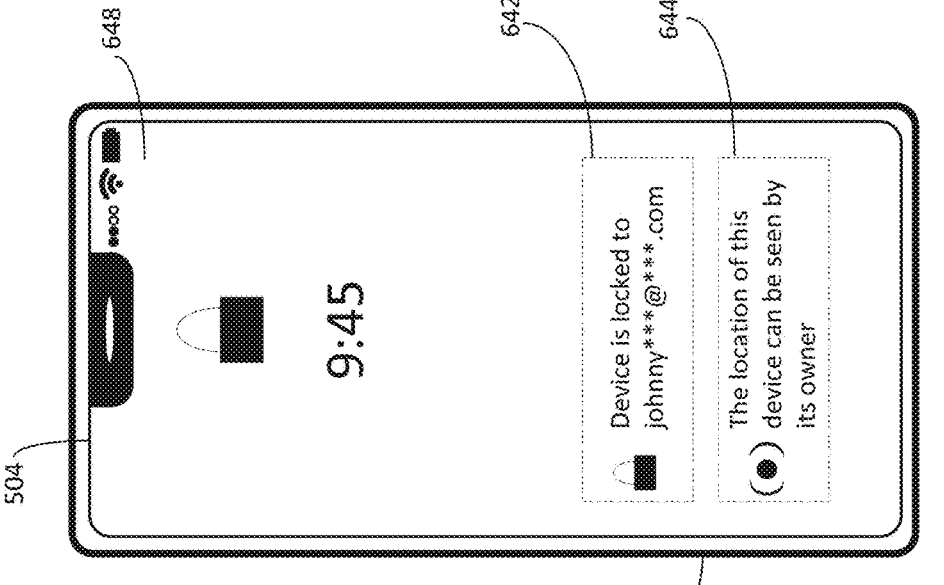
Figure 6Z:
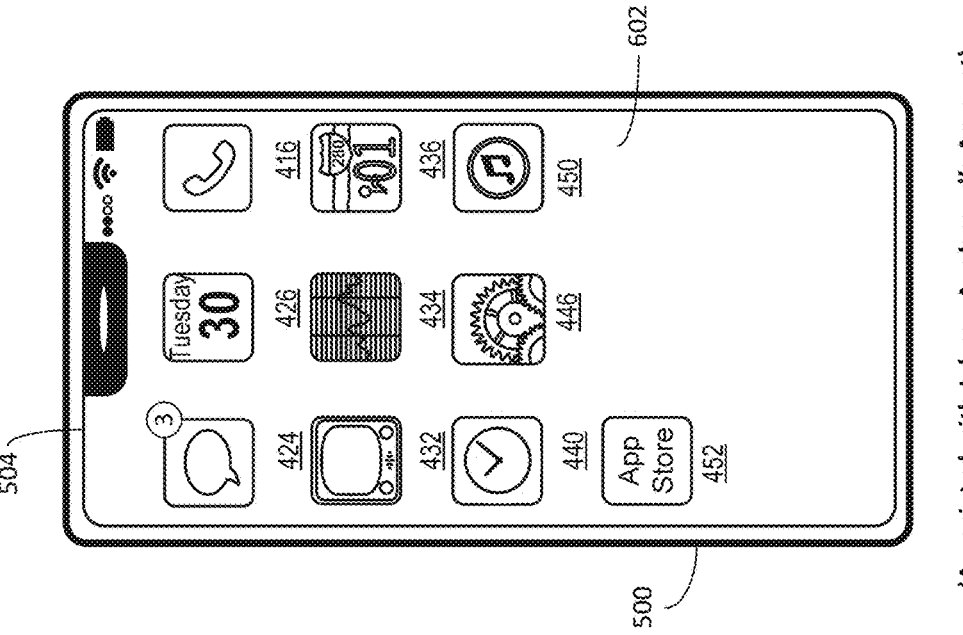
Figure 6Y:
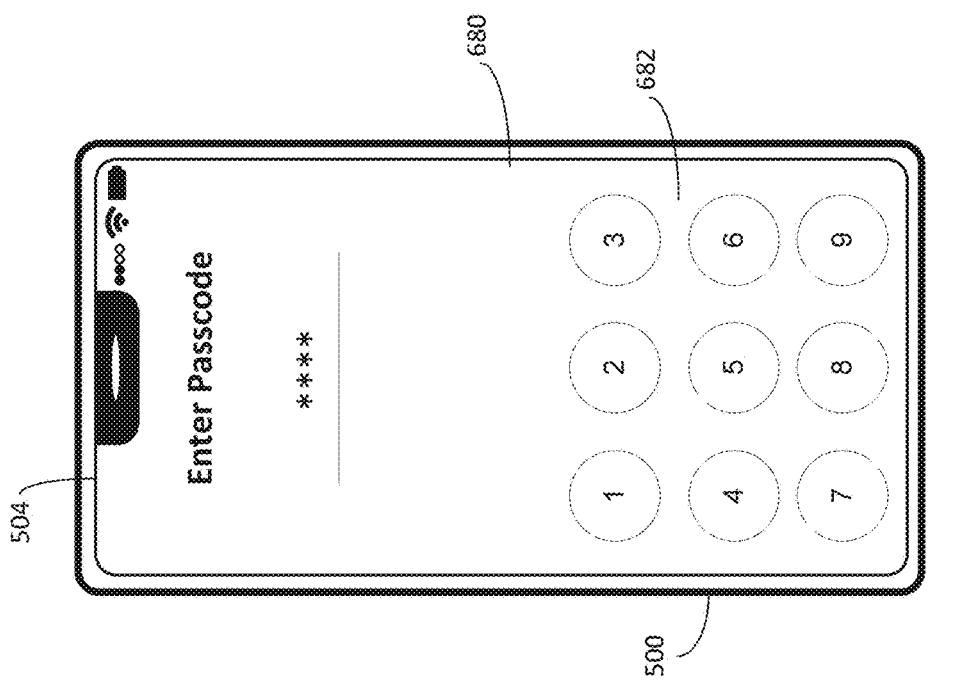
Figure 6B:
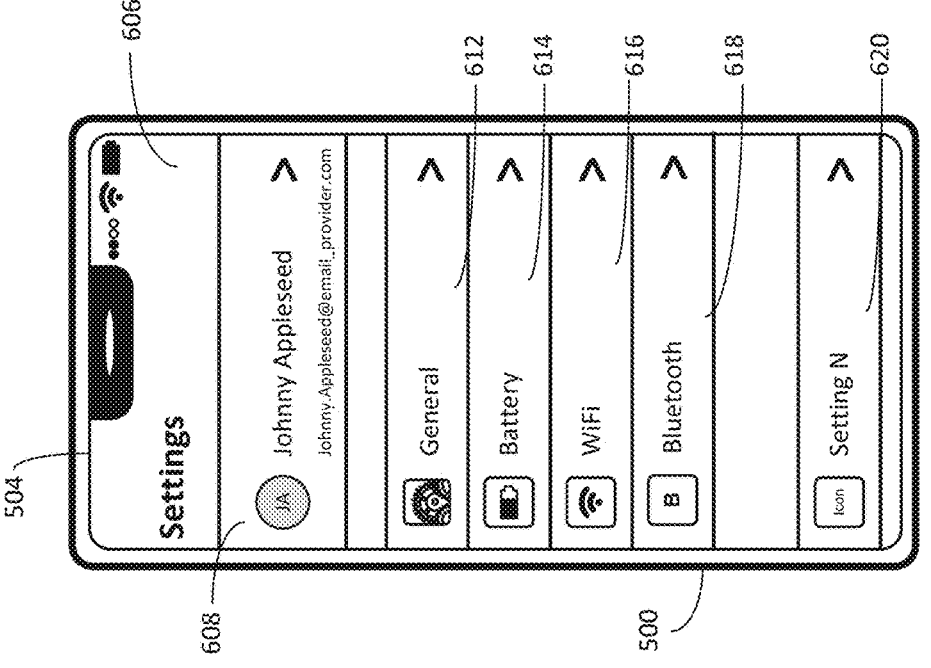
Figure 6A:
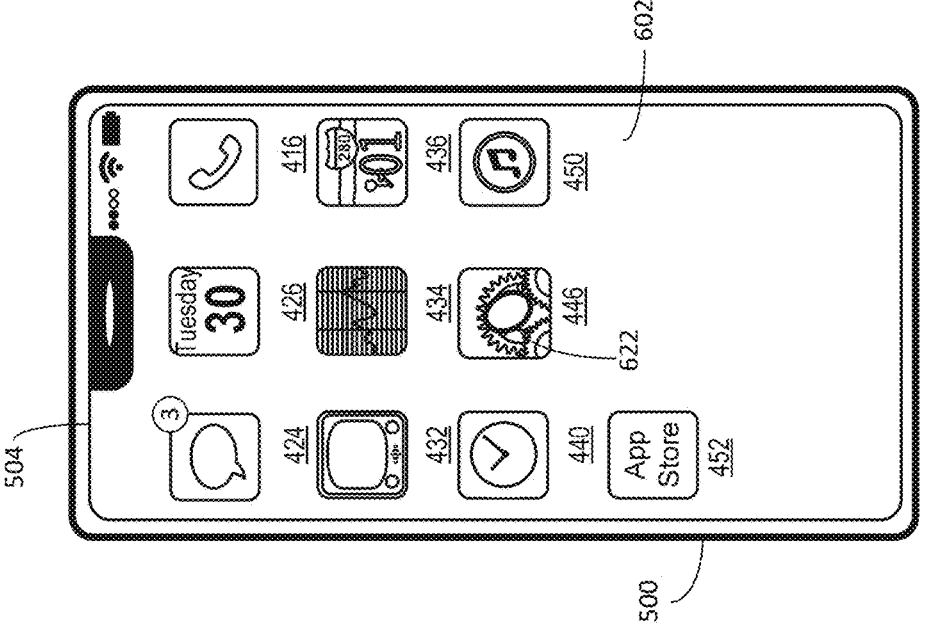
Figure 6D:
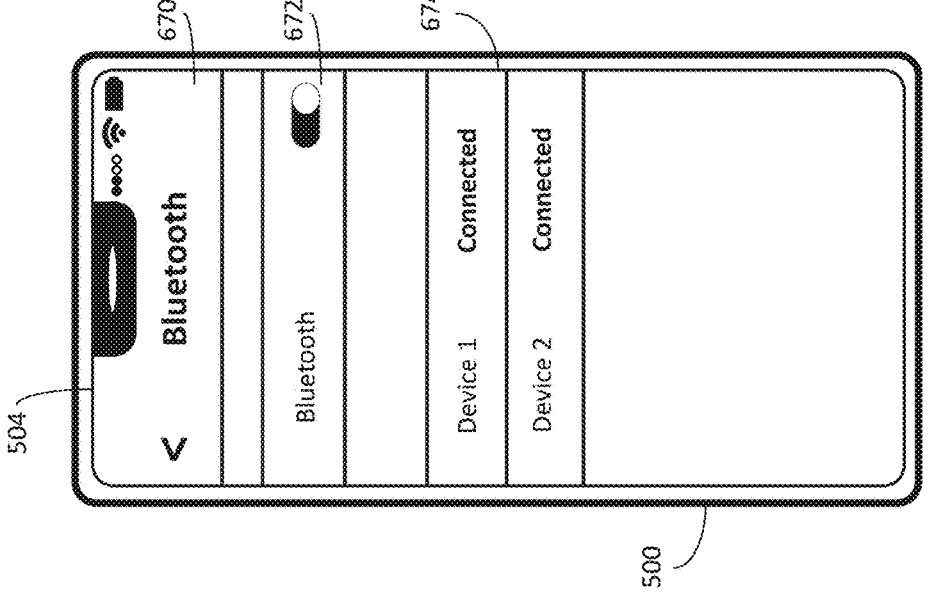
Figure 6C:
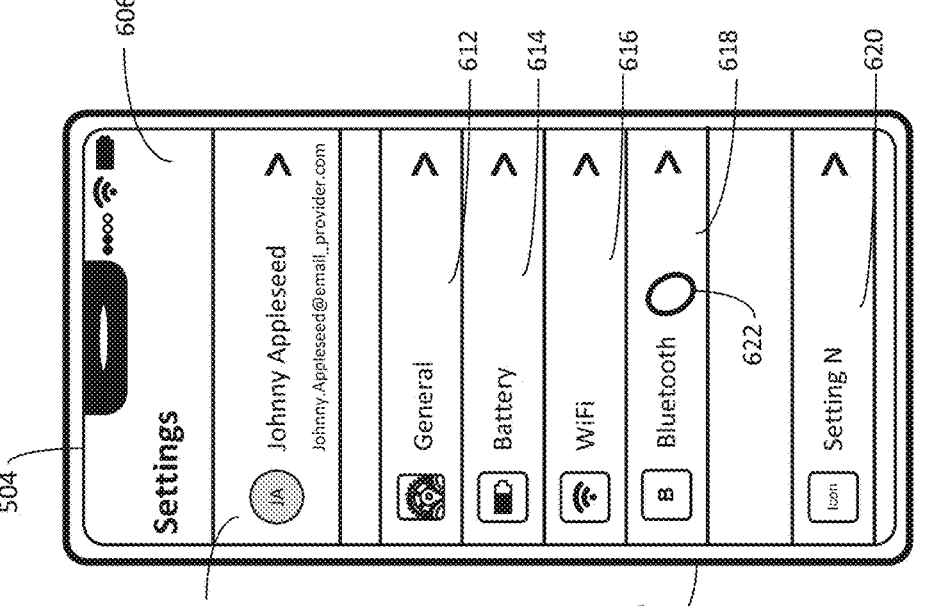
Figure 6F:
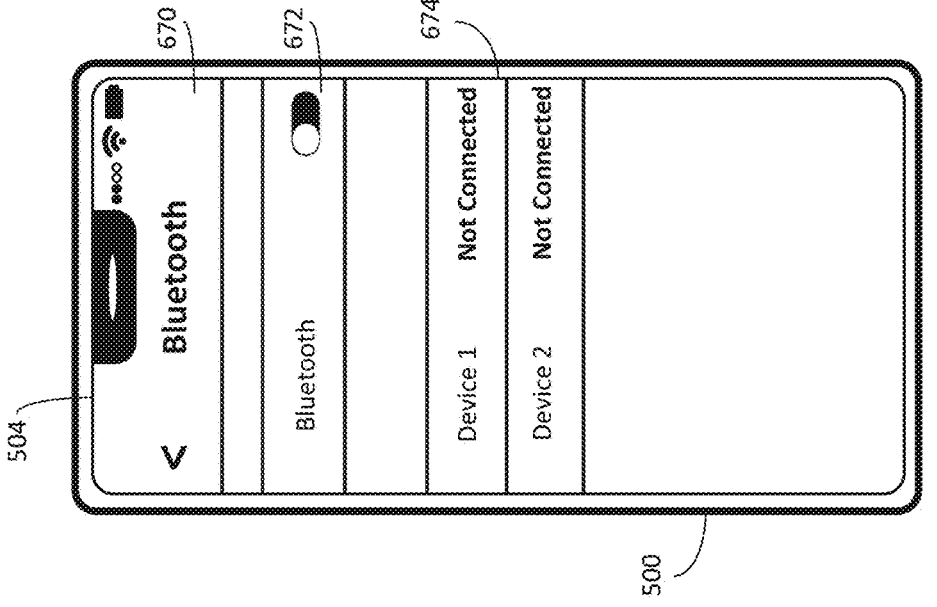
Figure 6E:
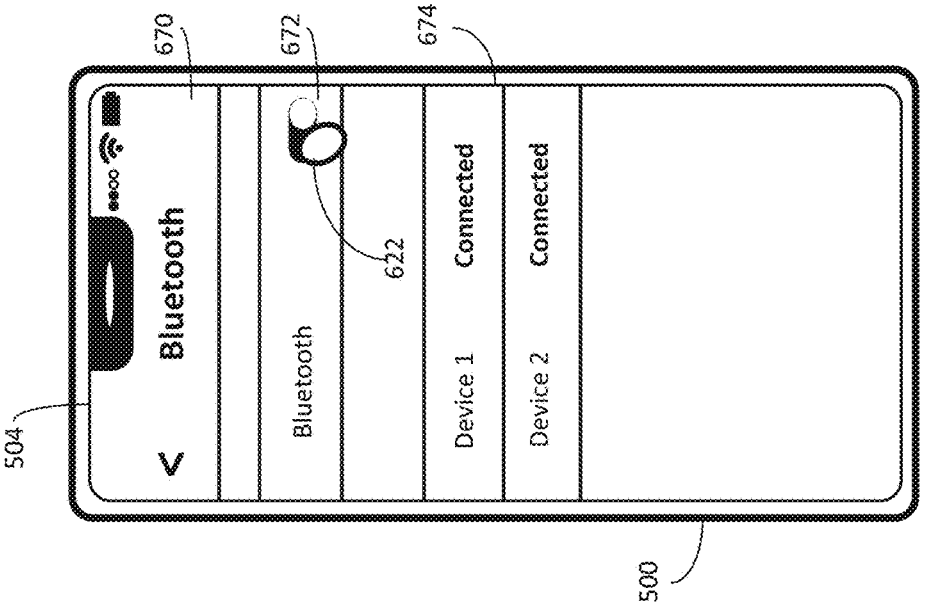
Figure 6H:
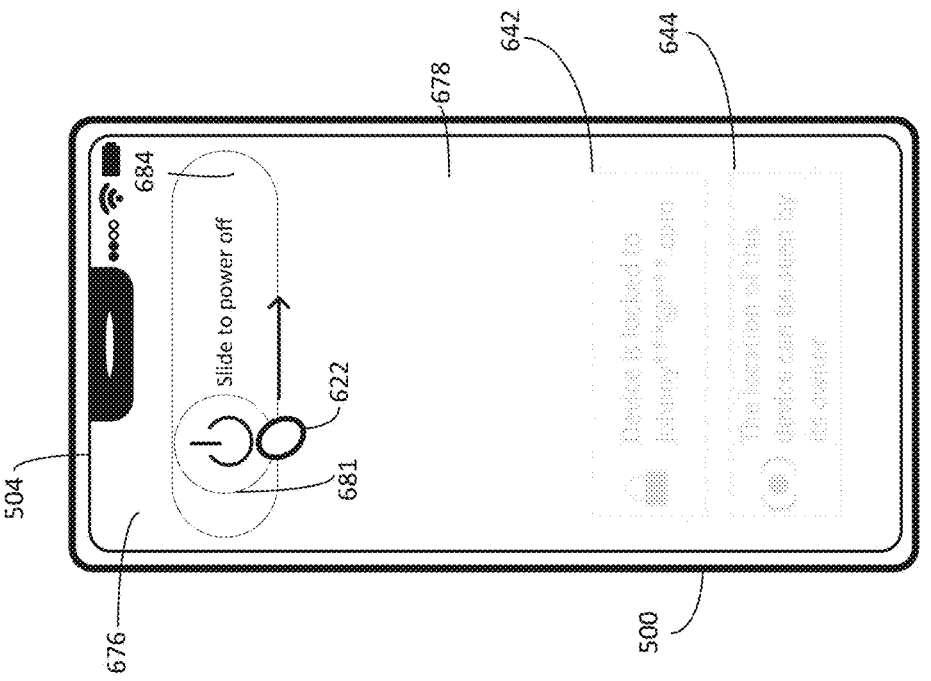
Figure 6G:
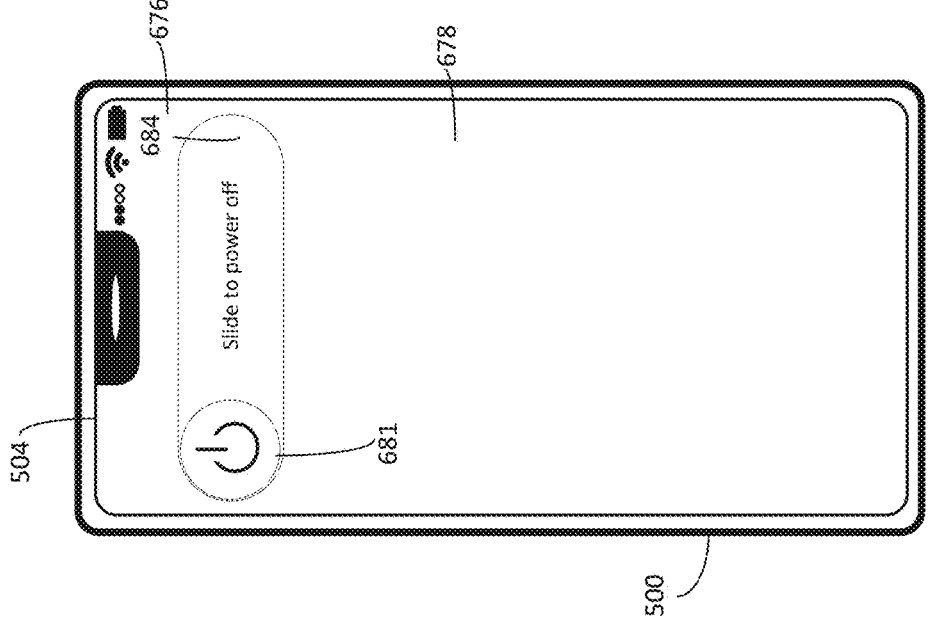
Figure 6J:
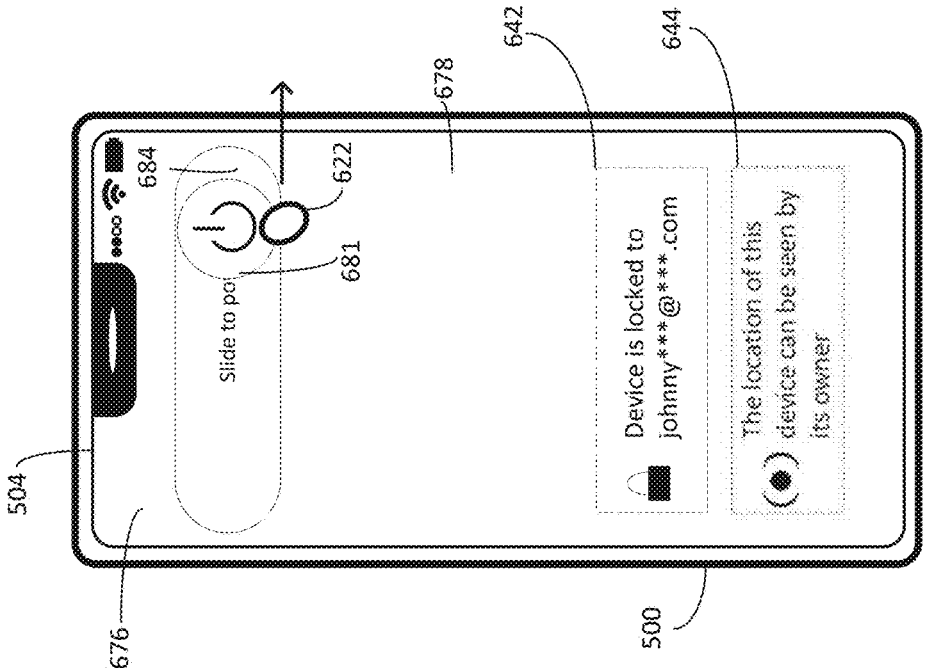
Figure 6I:
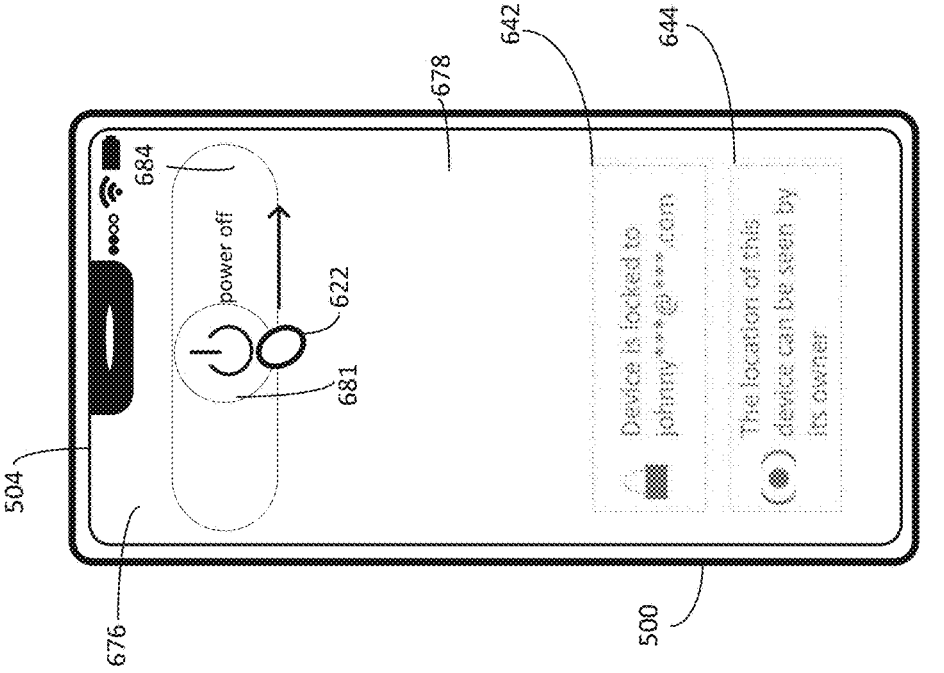
Figure 6L:
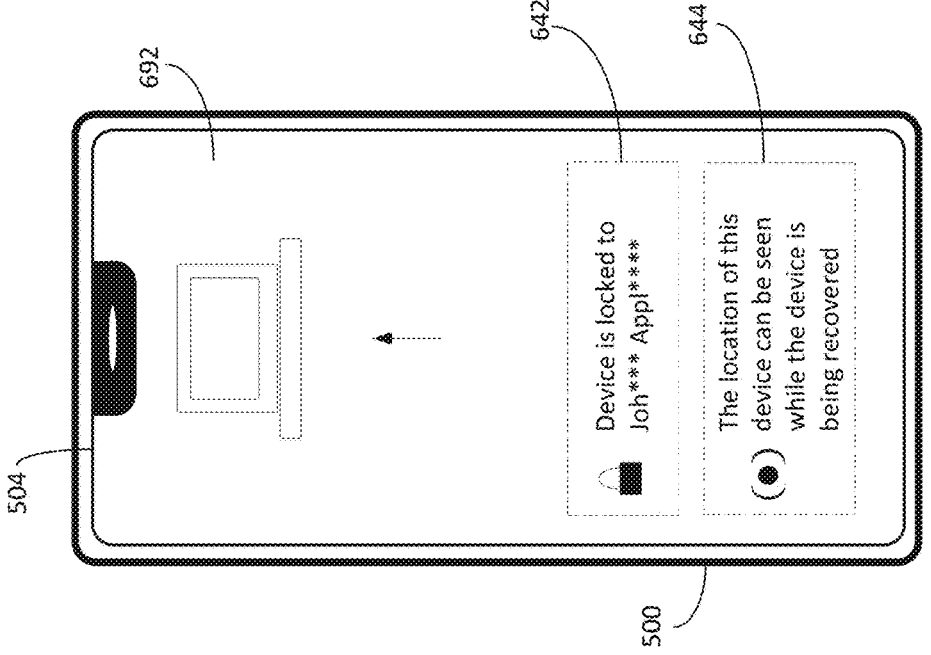
Figure 6K:
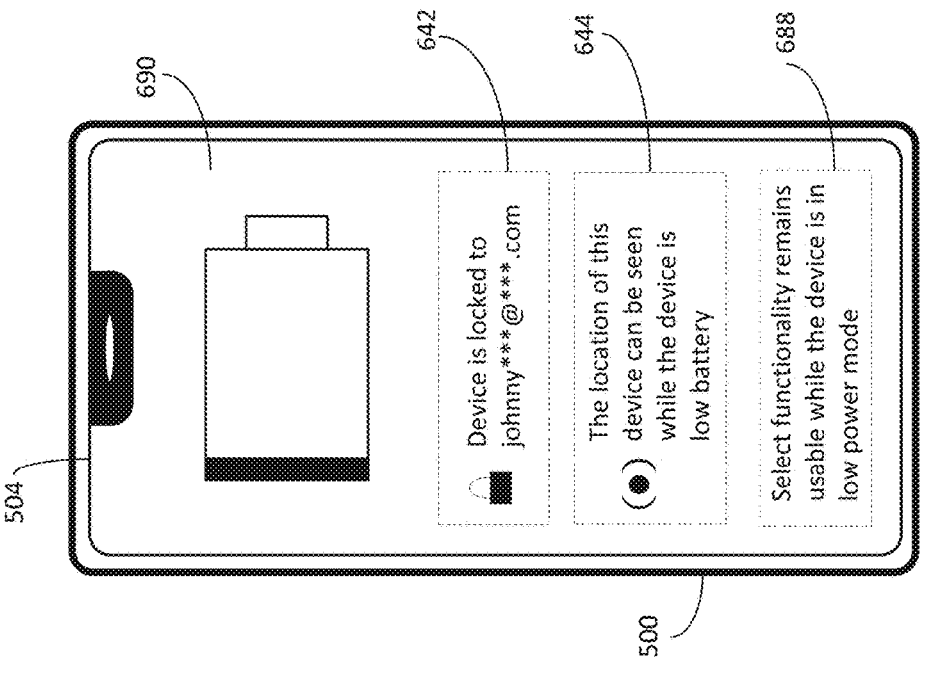
Figure 7B:
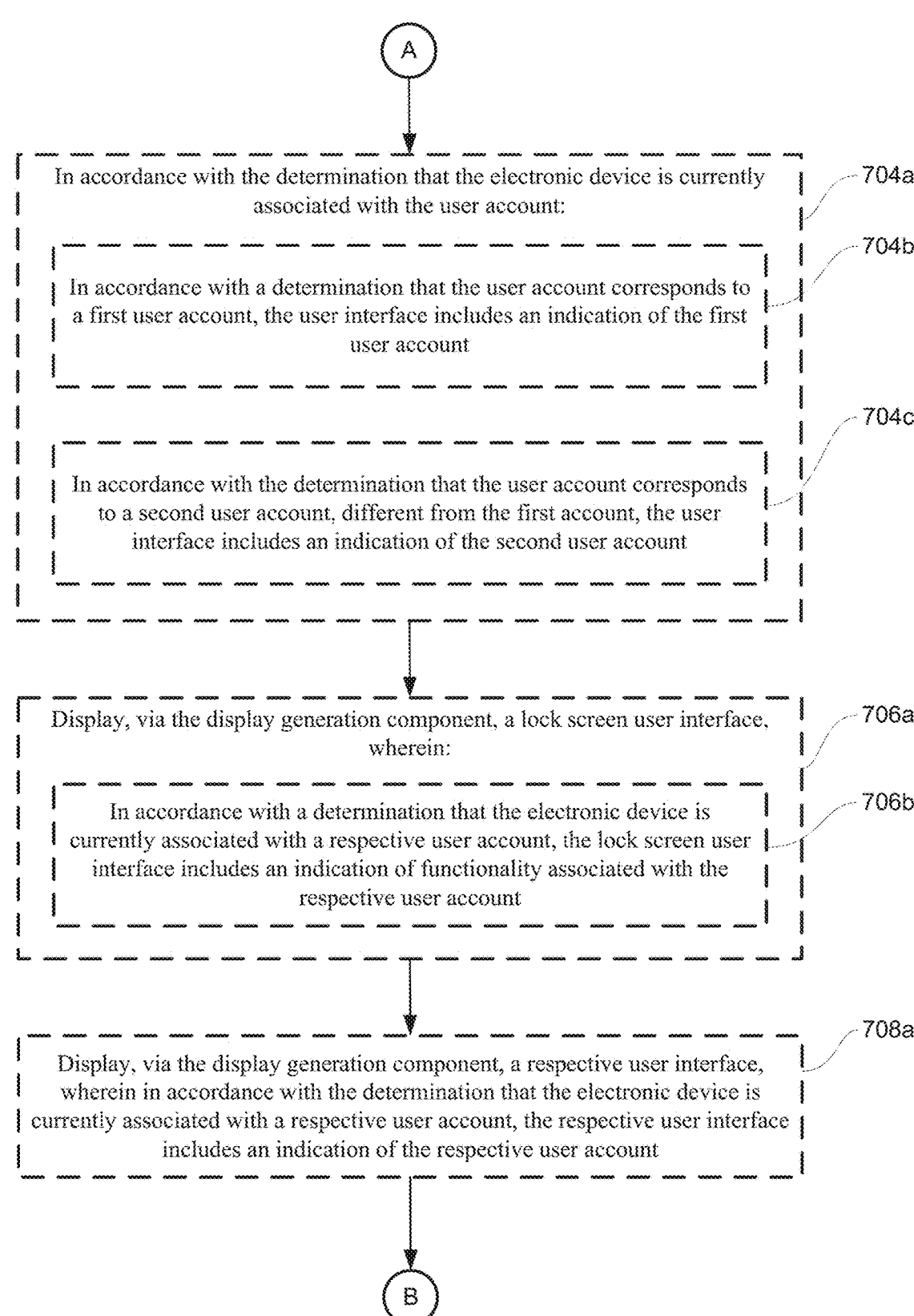
Figure 7D:
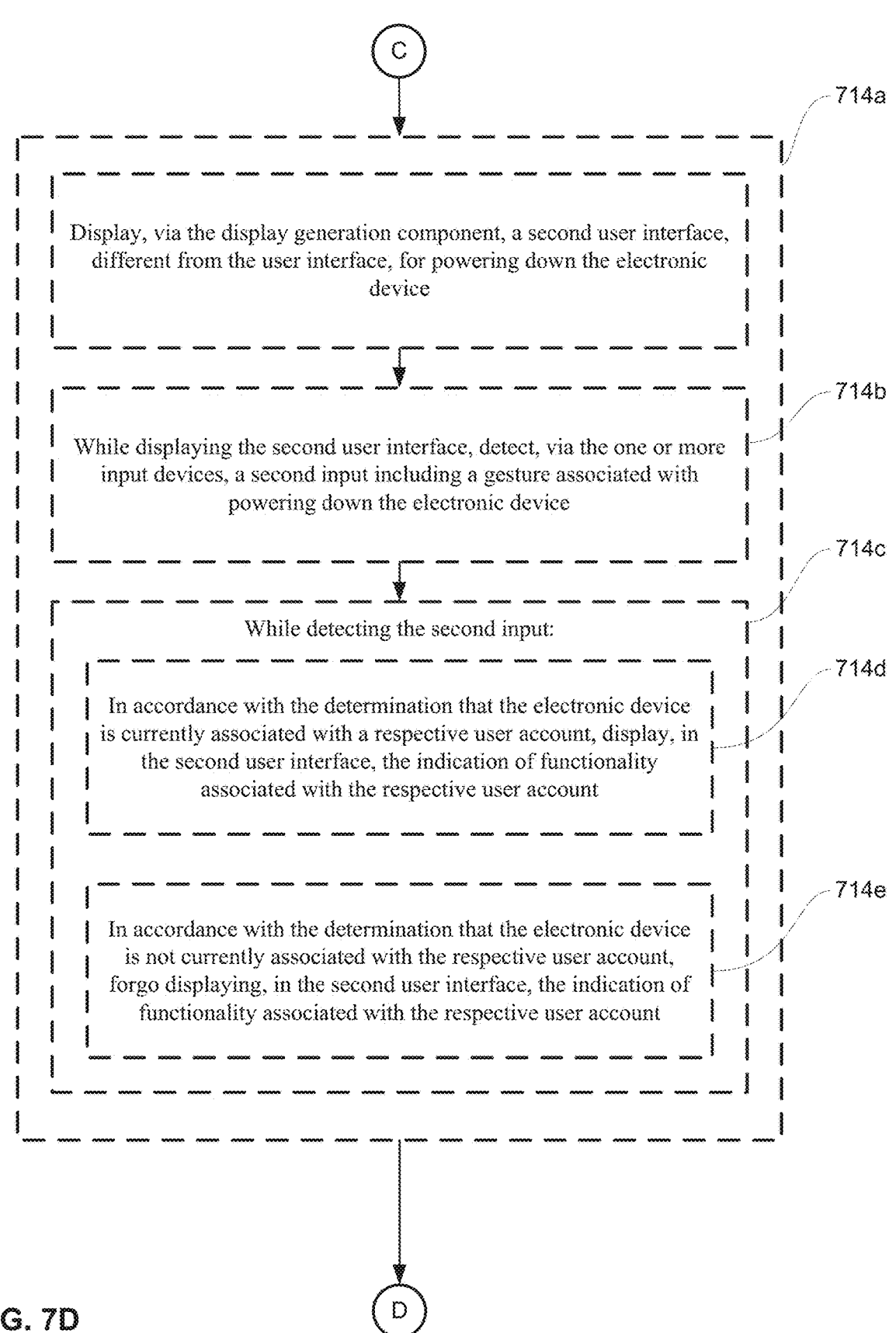
Figure 7F:
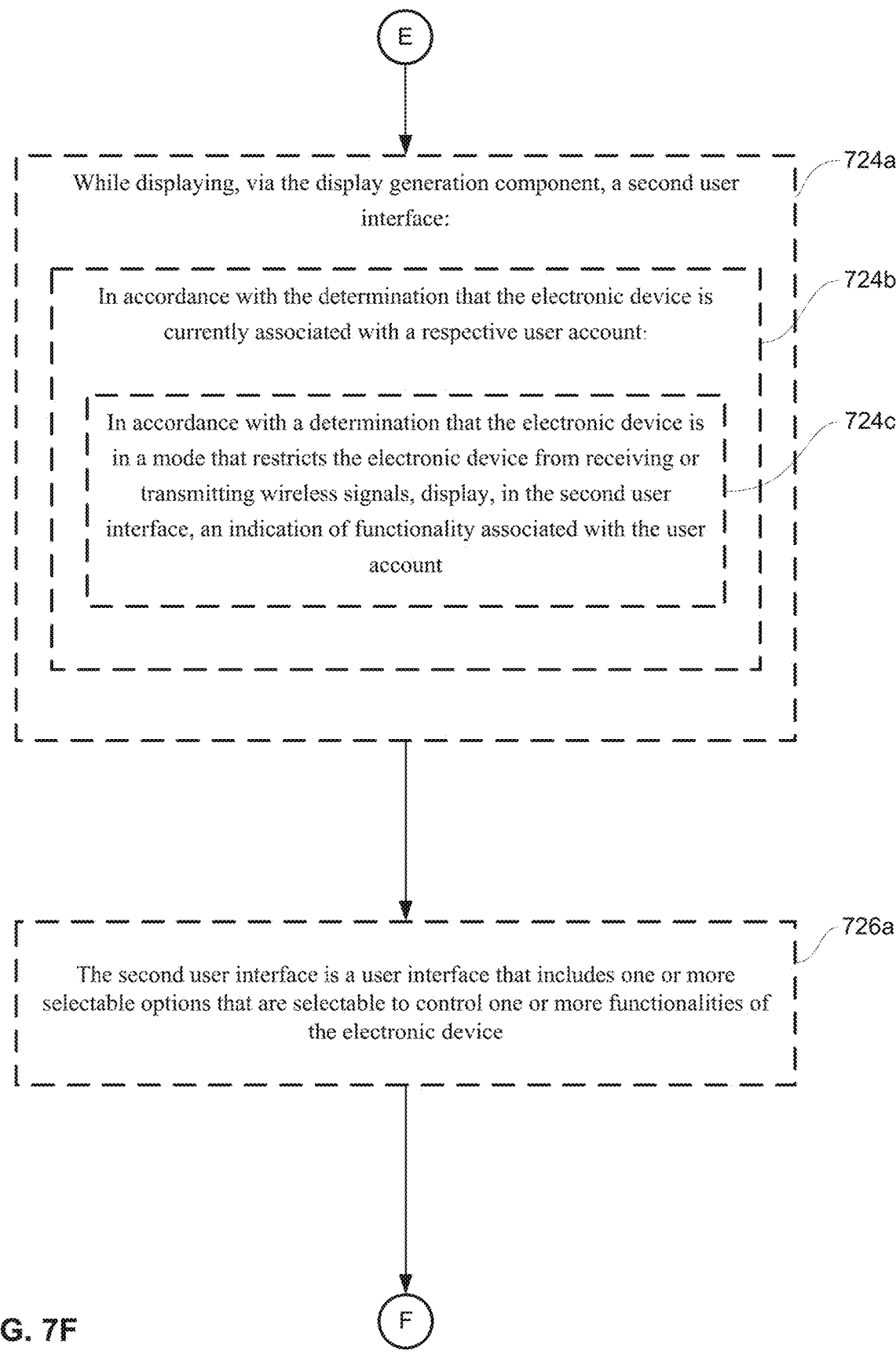

In FIG. 6X, while the electronic device is displaying lock screen user interface 648, the electronic device 500 receives a swipe up on touch screen 504 (indicated by touch contact 622 moving upward) to initiate a process to unlock device 500. In FIG. 6Y, in response to detecting the upward swipe, the electronic device 500 displays user interface 680. User interface 680 includes virtual keypad 682. Virtual keypad 682 is configured to accept selection of one or more keys in virtual keypad 682. When the one or more key selections satisfy criteria for unlocking the device (e.g., the keys selected correspond to the correct PIN code for device 500), the device optionally is unlocked and presents a home screen user interface 602, as shown in FIG. 6Z. The home screen user interface 602 illustrated in FIG. 6Z is similar to the home screen user interface 602 described with reference to FIG. 6B, but optionally displays different application and/or content based on profile and customization settings associated with Johnny Appleseed's Account. While the electronic device 500 is described as requiring a PIN code for unlocking the device, one of skill in the art would understand that various other forms of authentication, including biometric authentication, could be utilized (e.g., facial and/or touch authentication) for unlocking the electronic device without departing from the embodiments of the disclosure.

In some embodiments, while the device is displaying a home screen user interface, a user of the electronic device is able to launch one or more applications. For example, in FIG. 6AA, while electronic device 500 is displaying home screen user interface 602, while device 500 is unlocked, and while the electronic device is associated with Johnny Appleseed's Account, the electronic device 500 detects touch contact 622 selecting selectable option 446, which corresponds to a representation of a Settings application.

In FIG. 6BB, in response to receiving the selection of selectable option 446, the electronic device presents a user interface 606 of the Settings application. In some embodiments, if the device 500 is associated with a respective user account when displaying a user interface of a settings application, the user interface includes a selectable option for accessing information about the respective user account, such as selectable option 608. As illustrated in FIG. 6BB, selectable option 608 includes information about a name of a user associated with the user account ("Johnny Appleseed"), a profile icon associated with the user account, and an email address/username associated with the user account (Johnny.Appleseed@email_provider.com). In some embodiments, when selectable option 608 is selected, settings of the user account are able to be viewed and adjusted, such as if the electronic device is able to be associated with a new user account, if a user of the user account has access to the location of the electronic device, etc.

Additionally, user interface 606 includes selectable options corresponding to various settings of the electronic device 500, including selectable option 618 corresponding to managing Bluetooth settings on the device. In FIG. 6CC, the electronic device 500 detects a selection input directed to selectable option 618 via a tap of touch contact 622. In response to receiving the selection input, the electronic device 500 presents a Bluetooth settings user interface 670, as shown in FIG. 6DD. Bluetooth settings user interface 670 includes toggle button 672 (currently on) for toggling Bluetooth connections on the electronic device on/off, and a list of devices 674 currently connected to device 500 via Bluetooth.

In FIG. 6EE, the electronic device detects a selection input for toggling off toggle button 672. In 6FF, in response to receiving the selection input for toggling off toggle button 672, the electronic device 500 disables Bluetooth on the electronic device, and terminates the Bluetooth connection between device 500 and the Devices 1 and 2. Because Bluetooth connectivity was toggled off while the device was unlocked, the device allows Bluetooth communications on the device to be fully disabled—in contrast to not allowing Bluetooth communications to be toggled fully off when device 500 was in a locked state (as described with reference to FIGS. 6R-6U). It is understood that the control center user interface 650 described with reference to FIGS. 6Q-6U could similarly be accessed while device 500 is in an unlocked state, in which case Bluetooth communications could similarly be toggled fully off from user interface 650 (e.g., in response to toggling of airplane mode button 652 or toggling of Bluetooth button 656).

FIGS. 6GG-6II illustrate exemplary ways of providing an indication to a user about functionality associated with a user account when the device is being powered down. In FIG. 6GG, device 500 is displaying a user interface 676 associated with powering down device 500. User interface 676 includes a background 678 and draggable user interface element 681. In the example of FIG. 6GG, powering down the electronic device 500 requires user interface element 681 to be horizontally dragged to location 684 (or within a threshold distance of location 684).

In FIG. 6HH, the electronic device detects that touch contact 622 has started dragging the user interface element 681 towards location 684. In response to user interface element 681 moving towards location 684, and because device 500 is currently associated with a user account, indications 642 and/or 644 (as described above) begin to be displayed in user interface 676. In some embodiments, as touch contact 622 moves the draggable user interface element 681 closer to an ending location, indications 642 and 644 become more visibly displayed by device 500 (e.g., more visible to a user of the electronic device). For example, in FIG. 6II, the electronic device 500 detects further movement of user interface element 681 towards location 684. In response to detecting the further movement, device 500 decreases the translucency of indications 642 and/or 644 in accordance with the movement of user interface element 681. In FIG. 6JJ, the electronic device 500 again detects further movement of user interface element 681 towards location 684. In response to detecting the further movement, device 500 again decreases the translucency of indications 642 and/or 644 in accordance with the movement of user interface element 681. Thus, in some embodiments, visual indications 642 and/or 644 are more prominently displayed by device 500 (e.g., displayed with less transparency) as the gesture for powering off device 500 progresses (e.g., as touch contact 622 moves user interface element 681 to location 684).

While FIGS. 6GG-6JJ were described in the context of indications 642 and 644 being visually emphasized in accordance with the movement of user interface element 681, it would be understood to one of ordinary skill in the art that other ways exist for visually indicating functionality associated with a user account in user interface 676. For example, instead of visually emphasizing indications 642 and/or 644, visual indications 642 and/or 644 could instead be visually deemphasized in accordance with the movement of user interface element 681. Further, in some embodiments, a background of user interface 676 is deemphasized as the movement of user interface element 681 progresses while visual indications 642 and/or 644 remain displayed with a same visual characteristic (e.g., brightness, translucency, etc.), which results in visual indications 642 and/or 644 being displayed with more relative visual emphasis as the movement of user interface element 681 progresses. In some embodiments, visual indication 642 is displayed in user interface 676 if the electronic device 500 is associated with a respective user account and if a setting of that user account is preventing other user accounts from being associated with the electronic device. In some embodiments, if the electronic device 500 is associated with a user account, but a setting of that user account is not preventing other accounts from being associated with the electronic device—or, if device 500 is not associated with a user account—then visual indication 642 is not included in the user interface 676. In some embodiments, visual indication 644 is displayed in user interface 676 if the electronic device 500 is associated with a respective user account and if a setting of that user account is causing the electronic device to share its location with the user account. In some embodiments, if the electronic device is associated with a user account, but a setting of that user account is not causing the electronic device to share its location with the user account—or if device 500 is not associated with a user account—then visual indication 644 is not included in the user interface 676.

In some embodiments, when a device is in a low power mode, at least functionality associated with the user account associated with the device remains active. For example, in FIG. 6KK, device 500 is displaying low power user interface 690. Device 500 is optionally displaying low power user interface 690 because the battery of the electronic device is below a threshold charge level (e.g., less than 1% of the remaining battery). In some embodiments, at least some functionality associated with a user account that is associated with the device remains active while the device is in a low power mode. For example, in FIG. 6KK, the currently associated user account, Johnny Appleseed's Account, continues to prevent the electronic device 500 from being associated with another user account and also continues to have access to a location of the device. As a result, indications 642 and/or 644 (previously described above) are displayed in low power user interface 690. In some embodiments, the electronic device continues to transmit a current location of the device by utilizing a secondary battery of the electronic device. Additionally, in some embodiments, functions of the electronic device other than functionality associated with locking the electronic device and tracking a location of the device remain usable in a low power mode, such as functions of the electronic device that do not require power to be drawn from the battery to function (e.g., NFC transactions (e.g., for mobile purchases and/or transit transactions)). As shown in FIG. 6KK, when other functionality of the electronic device remains available/usable while device 500 is in the low power mode, low power user interface 690 includes indication 688 indicating the functionality of the device that remains usable while the device is in low power mode. In some embodiments, visual indication 642 is displayed in user interface 690 if the electronic device 500 is associated with a respective user account and if a setting of that user account is preventing other user accounts from being associated with the electronic device. In some embodiments, if the electronic device 500 is associated with a user account, but a setting of that user account is not preventing other accounts from being associated with the electronic device—or, if device 500 is not associated with a user account—then visual indication 642 is not included in the user interface 690. In some embodiments, visual indication 644 is displayed in user interface 690 if the electronic device 500 is associated with a respective user account and if a setting of that user account is causing the electronic device to share its location with the user account. In some embodiments, if the electronic device is associated with a user account, but a setting of that user account is not causing the electronic device to share its location with the user account—or if device 500 is not associated with a user account—then visual indication 644 is not included in the user interface 690. In some embodiments, visual indication 688 is optionally displayed in user interface 690 if a setting of a user account currently associated with the electronic device permits use of one or more functions of the electronic device while the device is in a low power mode. In some embodiments, visual indication 688 is optionally not displayed in the user interface 690 if a setting of the user account currently associated with the electronic device does not permit use of one or more functions of the electronic device while the device is in a low power mode.

In some embodiments, at least some functionality associated with the user account that is associated with an electronic device remains active while attempting to recover access to the electronic device. For example, in FIG. 6LL, device 500 is displaying recovery user interface 692. Device 500 is optionally displaying recovery user interface 692 because an Operating System of the device is corrupted. In some embodiments, at least some functionality associated with a user account that is associated with the device remains active while the device is being recovered. For example, in FIG. 6LL, the currently associated user account, Johnny Appleseed's Account, continues to prevent the electronic device 500 from being associated with another user account and also continues to have access to a location of the device. As a result, indications 642 and/or 644 (previously described above) are displayed in recovery user interface 692. In some embodiments, the electronic device continues to transmit a current location of the device and still transmits information about its location to the user account currently associated with the electronic device by executing this functionality on one or more processors of the computing device not associated with the corrupted operating system. It is understood that indicators 642 and 644 in user interface 692 optionally have the same characteristics of the indictors 642 and 644 described with reference to FIGS. 6HH-JJ, thus are optionally displayed and not displayed in a similar manner.

FIGS. 7A-7H are flow diagrams illustrating a method 700 of displaying visual indications to a user when an electronic device is associated with a particular user account in accordance with some embodiments, such as in FIGS. 6A-6LL. The method 700 is optionally performed at an electronic device such as device 100, device 300, or device 500 as described above with reference to FIGS. 1A-1B, 2-3, 4A-4B and 5A-5H. Some operations in method 700 are, optionally, combined and/or order of some operations is, optionally, changed.

As described below, the method 700 provides ways to display visual indications to a user when an electronic device is associated with a particular user account t. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device in communication with a display generation component and one or more input devices (e.g., a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the electronic device detects (702a), via the one or more input devices, a first input (e.g., an input such as a touch input, a mouse input, selection of a wake/power button, and/or a keyboard input, etc.), wherein the first input is detected while the electronic device is in a device setup state in which the device is prepared to be setup for use with a new user account (e.g., a state of the electronic device that optionally includes an operating system and one or more pre-installed applications, but does not include application-specific user data, user configured settings, and/ or personal user information. In some embodiments, the electronic device is in the device set-up state when it has not been configured, set-up, and/or initialized by a user. In some embodiments, the electronic device is in the device set-up state when the electronic device has been reset and/or erased to remove user specific data/information. In some embodiments, the first input wakes the device from an off or lower power state (e.g., in which the display generation component is off and/or not displaying content and/or displaying a screensaver or lower power user interface)) and before starting a process for configuring the electronic device for use with the new user account, such as touch contact 622 and the state of the device in FIG. 6K (e.g., before initiating a process to associate the electronic device with (e.g., functionality defined by) the new user account)). For example, the electronic device detects the first input while the device is in the device setup state and before a process to configure the electronic device with a new user account is initiated. In some embodiments, starting a process for configuring the electronic device with a new user account includes first displaying a user interface for setting a particular device setting (e.g., default language, Wi-Fi network, device password, etc.).

In some embodiments, in response to detecting the first input, the electronic device displays (702b), via the display generation component, a user interface of the electronic device, such as user interface 640 in FIG. 6L (e.g., a user interface that does not include user interface elements for accepting inputs that provide configuration information to the device). For example, in response to detecting the first input (e.g., while the device is in a device setup state and before starting a process to configure the electronic device with a new user account), the electronic device displays a default user interface of the device setup state, such as a starting/welcome user interface. In some embodiments, the starting user interface optionally includes one or more selectable options, which when selected and/or interacted with cause the electronic device to initiate a process for configuring the electronic device with a new user account. In some embodiments, when the electronic device is displaying the starting user interface, the electronic device is prepared to be associated with a new user account but has not started the process for configuring the electronic device with the new user account. In some embodiments, when an input is directed to a selectable option on the starting user interface, that input starts the process for configuring the device with the new user account.

In some embodiments, in accordance with a determination that the electronic device is currently associated with a user account that was used with the device prior to the device being reset to the device setup state (e.g., before the electronic device entered the device setup state, the electronic device was associated with a user account), the user interface includes an indication of functionality associated with the user account that was used with the device prior to the device being reset to the device setup state (702c), such as user interface 640 including indications 642 and 644 because device 500 is locked to and tracked by John Doe's Account (e.g., an indication of functionality enabled, in part, by the association with a respective user account). In some embodiments, an association between a respective user account and the electronic device is established when a user authorizes the electronic device to have access to the respective user account (e.g., a user provides the credentials of the respective user account to the electronic device) and/or when a user authorizes the association between the respective user account and the device. For example, the electronic device was previously associated with the respective user account before the device was placed into the current device setup state, and was not disassociated from the device before the device was placed into the device setup state (e.g., via an input to reset all settings and/or erase all data on the device). In some embodiments, the association between the device and the respective user account is stored on an external server, and therefore is not lost when the device is placed into the device setup state. In some embodiments, the device communicates with the external server before displaying the user interface to determine whether the device is currently/ already associated with a respective user account).

For example, if the electronic device is associated with a respective user account (e.g., a relationship between the respective user account and the electronic device exists), the user interface displayed in response to detecting the first input includes an indication of functionality associated with that respective user account. In some embodiments, one or more setting(s) of the respective user account control one or more function(s) associated with the electronic device. In such embodiments, a setting of the respective user account optionally controls whether other respective user accounts can be associated with the electronic device. For example, a setting of the respective user account optionally restricts other accounts (e.g., accounts other than the respective user account) from being associated with the electronic device while the device is associated with the respective user account. If a setting of the respective user account that restricts other accounts from being associated with the electronic device is enabled, an indication of this restriction is optionally displayed in the user interface. Similarly, a second respective setting of the respective user account (e.g., different from the setting that restricts other accounts from being associated with the electronic device) optionally enables a location of the electronic device to be tracked (e.g., accessible) via one or more applications (e.g., using the respective account). If the second respective setting of the respective user account that allows a location of the electronic device to be tracked is enabled, the user interface optionally includes an indication that the location of the electronic device is being tracked (e.g., or is accessible) via the one or more applications. In some embodiments, the indication of functionality associated with the respective user account includes an indication associated with one or more functionalities enabled, in part, by the respective user account. In some embodiments, the indication is a visual indication that includes a graphical and/or textual representation of the functionality associated with the first account.

In some embodiments, in accordance with a determination that the electronic device is not currently associated with a user account (e.g., an association does not exist between a user account and the electronic device), the user interface does not include the indication of functionality associated with the user account (702d), such as user interface 640 in FIG. 6L-1 not including indications 642 and 644. (e.g., does not include an indication of functionality enabled by a respective user account). In some embodiments, an association does not exist between a respective user account and the electronic device because a user did not authorize the electronic device to obtain access to a respective user account (e.g., did not provide the credentials of the respective user account to the electronic device) and/or when a user has revoked an authorization allowing the electronic device to have access to the respective user account. For example, the electronic device was previously associated with the respective user account and the electronic device before the device was put in the current device setup state (e.g., via an input to reset all settings and/or erase all data on the device), and was disassociated from the device before the device was placed in the device setup state (e.g., via input to reset all settings and/or erase all data on the device). In some embodiments, the electronic device communicates with an external server before displaying the user interface to determine if a device is not associated with a user account.). For example, because the electronic device is not associated with a respective user account, the electronic device can be associated with any respective user account, and thus, the user interface does not include an indication that the electronic is restricting which accounts can be associated with the electronic device. Similarly, because the electronic device is not associated with a respective user account, the location of the electronic device is not tracked (e.g., accessible) via one or more application, and thus, an indication associated with the tracking of a location of the electronic device is not displayed in the user interface. In some embodiments, the electronic device can only be associated with a single user account at a given moment in time.

The above-described manner of displaying a user interface with an indication of account functionality when an electronic device is associated with a particular account and not displaying the user interface with the indication of account functionality when the electronic device is not associated with the first account provides enhanced security by informing a user if the electronic device is associated with a respective user account, even in situations in which such an association is generally missing, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with the determination that the electronic device is currently associated with the user account (704a) (e.g., if the electronic device was associated with a user account before being reset and/or being placed in the device setup state, and the association with that user account still exists), in accordance with a determination that the user account corresponds to a first user account, the user interface includes an indication of the first user account (704b), such as indication 652 in FIG. 6L including a portion of John Doe's email address (john**@*.com). For example, if the device is in a device setup state and associated with the first user account when the user interface is displayed, the user interface includes an indication of the user account currently associated with the electronic device (e.g., the first user account).

In some embodiments, the indication of the first user account optionally includes an avatar associated with the first user account (e.g., a profile photo), redacted/obscured contact information associated with the first user account (e.g., a redacted email, phone number, name of a user associated with the first user account), information about the association between the electronic device and the first user account (e.g., a date/time when the user account become associated with the electronic device, how long the first user account has been associated with the first user account), etc.). In some embodiments, the indication of the association with the first user account is selectable to contact the user associated with the first user account, without displaying the complete contact information of the user (e.g., the complete phone number and/or email of the user). In some embodiments, the indication of the first user account is selectable to view a message from the user of the first user account (e.g., a message indicating that this electronic is lost/stolen and/or a message indicating a way of contacting the user (e.g., current owner) of the electronic device). In some embodiments, if the first user account is associated with a business, the indication of the first user account includes a logo, contact information, address or other information about the business associated with the first user account.

In some embodiments, in accordance with the determination that the user account corresponds to a second user account, different from the first account, the user interface includes an indication of the second user account (704c), such as indicator 642 in FIG. 6L including information about a different email address if device 500 were associated with a user account other than John Doe's account. For example, if the device is in a device setup state and associated with the second user account when the user interface is displayed, the user interface includes an indication of the user account currently associated with the electronic device (e.g., the second user account). In some embodiments, the indication of the second user account optionally includes an avatar associated with the second user account (e.g., a profile photo), redacted/obscured contact information associated with the second user account (e.g., a redacted email, phone number, name of a user associated with the second user account), information about the association between the electronic device and the second user account (e.g., a date/time when the second user account become associated with the electronic device, how long the second user account has been associated with the first user account), etc.). In some embodiments, the indication of the association with the second user account is selectable to contact the user associated with the second user account, without displaying the complete contact information of the user (e.g., the complete phone number and/or email of the user). In some embodiments, the indication of the second user account is selectable to view a message from the user of the second user account (e.g., a message indicating that this electronic is lost/stolen and/or a message indicating a way of contacting the user (e.g., current owner) of the electronic device). In some embodiments, if the second user account is associated with a business, the indication of the second user account includes a logo, contact information, address or other information about the business associated with the first user account.

The above-described manner of displaying a user interface that includes an indication of a respective user account when the electronic device is associated with a respective user account provides enhanced security by informing a (e.g., unauthorized) user that a user account is currently associated with the electronic device, which simplifies the interaction between the user and the electronic device and enhances the operability of the electronic device and makes the user-device interface more efficient (e.g., by avoiding an unauthorized user from proceeding with use or setup of the device), which additionally reduces power usage and improves battery life of the electronic device by enabling the user to use the electronic device more quickly and efficiently.

In some embodiments, the electronic device displays (706a), via the display generation component, a lock screen user interface, such as lock screen user interface 648 in FIG. 6O (e.g., a user interface that is displayed while the phone is locked (e.g., user access to the electronic is being restricted), and requires user authentication (e.g., facial authentication, fingerprint authentication, other biometric authentication, password authentication, etc.) before moving away from the lock screen user interface).

In some embodiments, in accordance with a determination that the electronic device is currently associated with a respective user account, the lock screen user interface includes an indication of functionality associated with the respective user account (706b), such as lock screen user interface 648 including indications 642 and 644 because device 500 is currently locked to and tracked by Johnny Appleseed's Account. For example, if the electronic device is displaying a lock screen user interface while the electronic device is associated with a respective user account, the lock screen user interface includes an indication of functionality associated with the first user account. In some embodiments, the respective user account corresponds to a user account that was associated with the electronic device before the device was reset if the electronic device is currently in a device setup state and is associated with a user account. In some embodiments, the respective user account corresponds to a new or current user account (e.g., a user account different than the account that was associated with the electronic device prior to the electronic device being reset to the device setup state) if the lock screen user interface is being displayed after the device has been setup with the new account (e.g., whether or not the device has been reset to the device setup state). In some embodiments, the indication of functionality includes an indication that the respective user account is preventing another user account (e.g., an account different from the respective user account) from being associated with the electronic device if the respective user account is preventing the another user account from being associated with the electronic device until the respective user account is disassociated with the electronic device. In some embodiments, the indication of functionality includes an indication that the location of the electronic is accessible by a user of the respective user account if the respective user account has access to the location of the electronic device. In some embodiments, the indication of functionality associated with a respective user account is not included in the lock screen user interface if the electronic device is not associated with a user account when the lock screen user interface is displayed.

The above-described manner of including an indication of functionality associated with a respective user account when the electronic device is associated with the respective user account provides enhanced security by informing a (e.g., unauthorized) user of the electronic of functionality enabled on the electronic device while in a locked state, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device displays (708a), via the display generation component, a respective user interface (e.g., a device user interface such as an account configuration user interface, an account login user interface, a purchasing user interface, a settings user interface, a low power user interface, a recovery mode user interface, etc.), wherein in accordance with the determination that the electronic device is currently associated with a respective user account, the respective user interface includes an indication of the respective user account, such as user interface 640 in FIG. 6M, lock screen user interface 648 in FIG. 6O, user interface 650 in FIG. 6S, user interface 676 in FIGS. 6HH-6JJ, user interface 690 in FIG. 6KK, and user interface 692 in FIG. 6LL including information (e.g., redacted name/email) about the user account currently associated with device 500 (e.g., that is preventing the electronic device from being associated with another user account).

For example, if the electronic device is associated with a respective user account when a user interface of the electronic device is displayed, the user interface includes an indication of the respective user account currently associated with the electronic device. The respective user interface optionally corresponds to a user interface that is displayed while the electronic device in a device setup state or when the electronic device is not in a device setup state. In some embodiments, the indication of the respective user account optionally includes an avatar associated with the respective user account (e.g., a profile photo), redacted/obscured contact information associated with the respective user account (e.g., a redacted email, phone number, name of a user associated with the respective user account), information about the association between the electronic device and the respective user account (e.g., a date/time when the respective user account become associated with the electronic device, how long the respective user account has been associated with the first user account), etc.). In some embodiments, the indication of the respective user account is selectable to contact the user of the respective user account, without displaying the complete contact information of the user (e.g., the complete phone number and/or email of the user). In some embodiments, the indication of respective user account is selectable to view a message from the user of the first user account (e.g., a message indicating that this electronic is lost/stolen and/or a message indicating a way of contacting the user (e.g., current owner) of the electronic device). In some embodiments, if the respective user account is associated with a business, the indication of the respective user account includes a logo, contact information, address or other information about the business associated with the first user account. In some embodiments, based on whether the electronic device is displaying the respective user interface while the electronic in a device setup state, the indication of the respective user account optionally includes more, less, or different information about the respective user account with which it is currently associated as compared to when the electronic device is not in a setup state. In some embodiments, the respective user account is a user account that the electronic device was associated with before the device was reset if the respective user interface is being displayed while the electronic device is in a device setup state. In some embodiments, the respective user account is a user account that the electronic device was associated with during the device setup state (e.g., a current user account) and/or another device configuration process.

The above-described manner of displaying an indication of a respective user account in a user interface, regardless of whether the device is or is not in a device setup state provides enhanced security by informing a (e.g., unauthorized) user about a user account already associated with the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device displays (710a), via the display generation component, a second user interface, different from the user interface, associated with a low power mode of the electronic device, such as low power user interface 690 in FIG. 6KK (e.g., a user interface that is displayed when a battery of the electronic device is below a threshold charge level (e.g., 1%, 2%, 5%, 10%, 20% remaining battery)). In some embodiments, the electronic device displays the second user interface when only a portion of the operating system of the electronic device is able to run due to insufficient charge of the battery. In some embodiments, the second user interface is displayed when a input is received to display a third user interface but is not available to be displayed because the battery of the electronic device is below a threshold amount of charge. In some embodiments, the electronic device automatically ceases display of a prior user interface (e.g., a home screen user interface, such as described with reference to FIG. 4A), and displays the second user interface, in response to the battery of the electronic device falling below the threshold charge level. In some embodiments, the second user interface includes a visual indication that indicates that the battery of the electronic device requires charging.

In some embodiments, in accordance with the determination that the electronic device is currently associated with a respective user account, the second user interface includes the indication of functionality associated with the user account (710b), such as user interface 690 including indications 642 and 644 because device 500 is currently associated with Johnny Appleseed's Account. For example, while the electronic device is displaying the second (e.g., low power) user interface, the second user interface includes an indication of functionality associated with a respective user account if the electronic device is currently associated with the respective user account (e.g., an indication of functionality similar to the indication of functionality included in the above mentioned respective user interface). In some embodiments, the indication of functionality includes an indication of the functionality associated with the user account that remains active while the device is in the low power mode. For example, functionality of the respective user account that does not require power to be drawn from the battery (e.g., NFC transactions) and/or functionality of the respective user account that remains active even when the battery is below a threshold amount of charge (e.g., functionality that operates during the power reserve mode or via use of a secondary battery). In some embodiments, the electronic device supports mobile purchases and transit related transactions via NFC transactions, thus in some embodiments, the indication of functionality includes an indication that mobile purchases and/or transit transactions are available while the device is in a low power mode. In some embodiments, the respective user account prevents another user account from being associated with the electronic device (e.g., while in the low power mode). In some such embodiments, the indication of functionality includes an indication that the electronic device cannot be associated with another user account. In some embodiments, the location of the electronic device is accessible by the respective user account while the electronic device is in low power mode. In some such embodiments, the indication of functionality includes an indication that the location of the electronic device is accessible by the respective user account. In some embodiments, the respective user account corresponds to a user account that was associated with the electronic device before the device was reset if the electronic device is currently in a device setup state and is associated with a respective user account. In some embodiments, the respective user account corresponds to a current or new user account (e.g., a user account different than the account that was associated with the electronic device prior to the electronic device being reset to the device setup state) if the second user (e.g., low power) interface is being displayed after the device has been setup with the current or new account.

In some embodiments, in accordance with the determination that the electronic device is not currently associated with a respective user account, the second user interface does not include the indication of functionality associated with the respective user account (710c), such as low power user interface 690 not including indications 642 and 644 if device 500 were not currently associated with a user account. For example, if the second user interface (e.g., a low power user interface) is being displayed while the electronic device is not associated with a respective user account, the low power user interface is not displayed with an indication of functionality associated with the respective user account. The above-described manner of displaying an indication of functionality associated with a respective user account while the device is displaying a low power user interface and associated with a respective user account provides enhanced security by informing a user of functionality enabled on the electronic device, even while the electronic device is in a low power mode, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device displays (712a), via the display generation component, a second user interface, different from the user interface, associated with a process for recovering access to the electronic device, such as recovery user interface 692 in FIG. 6LL (e.g., a user interface that is displayed when performing and/or initiating a process to recover/restore access to the electronic device due to, for example, a corrupted operating system state on the device). In some embodiments, the second user interface includes a visual indication that indicates that the electronic device needs to be connected to another electronic device (e.g., via USB to a computer) to proceed with recovery of the electronic device.

In some embodiments, in accordance with a determination that the electronic device is currently associated with a respective user account, the second user interface includes an indication of functionality associated with a respective user account (712b), such as including indications 642 and 644 in the recovery user interface 692, in FIG. 6LL, because electronic device 500 is currently associated with Johnny Appleseed's Account. For example, while the electronic device is displaying the second (e.g., recovery) user interface, the second user interface includes an indication of functionality associated with a respective user account if the electronic device is currently associated with the respective user account (e.g., an indication of functionality similar to the indication of functionality included in the above mentioned respective user interface). In some embodiments, the indication of functionality includes an indication of the functionality associated with the respective user account that remains active while the device is initiating and/or performing a process to recover/restore access to the electronic device. For example, while the electronic device is attempting to recover access to the electronic device, the respective user account prevents another user account from being associated with the electronic device. In some such embodiments, the indication of functionality includes an indication that the electronic device cannot be associated with another user account. In some embodiments, the location of the electronic device is accessible by the respective user account while the electronic device is being recovered. In some such embodiments, the indication of functionality includes an indication that the location of the electronic device is accessible by the respective user account. In some embodiments, the respective user account corresponds to a user account that was associated with the electronic device before the device was reset if the electronic device is currently in a device setup state and is associated with a respective user account. In some embodiments, the respective user account corresponds to a current or new user account (e.g., a user account different than the account that was associated with the electronic device prior to the electronic device being reset to the device setup state) if the second (e.g., recovery) user interface is being displayed after the device has been setup with the current or new account.

In some embodiments, in accordance with a determination that the electronic device is not currently associated with the respective user account, the second user interface does not include the indication of functionality associated with the respective user account (712c), such as recovery user interface 692, in FIG. 6LL, not including indications 642 and 644 if the device 500 were not associated with any user account. For example, if the second user interface (e.g., recovery user interface) is being displayed while the electronic device is not associated with a respective user account, the recovery user interface is not displayed with an indication of functionality associated with the respective user account.

The above-described manner of displaying an indication of functionality associated with a user account while the device is associated with recovering/restoring access to the electronic device provides enhanced security by informing a user of functionality enabled on the electronic device via the user account, even while the electronic device is being recovered, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device displays (714a), via the display generation component, a second user interface, different from the user interface, for powering down the electronic device, such as user interface 676 in FIGS. 6GG-6JJ (e.g., a user interface configured to initiate a process to power down the electronic device). In some embodiments, while displaying the second user interface, the electronic device detects (714b), via the one or more input devices, a second input including a gesture associated with powering down the electronic device, such as the touch contact 622 moving draggable user interface element 681 in FIG. 6HH-6JJ (e.g., detecting a contact from a finger of a user moving in a particular manner (e.g., from a starting location to an ending location) to power down the electronic device). For example, the second user interface optionally includes a user interface element that must be moved from a first location to a second location (e.g., horizontally) to power down the electronic device. The gesture optionally includes a touchdown of the contact on the user interface element at the first location, and movement of the contact from the first location to the second location.

In some embodiments, while detecting the second input (714*c*) (e.g., while detecting the finger of the user performing the gesture to power down the electronic device), in accordance with the determination that the electronic device is currently associated with a respective user account, the electronic device displays (714*d*), in the second user interface, the indication of functionality associated with the respective user account, such as user interface 676 including indications 642 and 644 when touch contact 622 moves draggable user interface element 681. For example, while the electronic device is displaying the second (e.g., powering down) user interface, the second user interface includes an indication of functionality associated with a respective user account if the electronic device is currently associated with the respective user account (e.g., an indication of functionality similar to the indication of functionality included in the above mentioned respective user interface). In some embodiments, the indication of functionality includes an indication of the functionality associated with the user account that remains active when the device is off. For example, functionality of the respective user account that does not require power to be drawn from the battery (e.g., NFC transactions) and/or functionality of the respective user account that remains active even when the electronic device is off (e.g., functionality that draws power from the battery while the device is off or draws power from a secondary battery when the device is off). In some embodiments, the electronic device supports mobile purchases and transit related transactions via NFC transactions, thus in some embodiments, the indication of functionality includes an indication that mobile purchases and/or transit transactions are available while the device is off. In some embodiments, the respective user account prevents another user account from being associated with the electronic device (e.g., while the device is off). In some such embodiments, the indication of functionality includes an indication that the electronic device cannot be associated with another user account. In some embodiments, the location of the electronic device is accessible by the respective user account while the electronic device is off. In some such embodiments, the indication of functionality includes an indication that the location of the electronic device is accessible by the respective user account while the device is off. In some embodiments, the respective user account corresponds to a user account that was associated with the electronic device before the device was reset if the electronic device is currently in a device setup state and is associated with a respective user account. In some embodiments, the respective user account corresponds to a current or new user account (e.g., a user account different than the account that was associated with the electronic device prior to the electronic device being reset to the device setup state) if the second user (e.g., low power) interface is being displayed after the device has been setup with the current or new account.

In some embodiments, in accordance with the determination that the electronic device is not currently associated with the respective user account, the electronic device forgoes (714*e*) displaying, in the second user interface, the indication of functionality associated with the respective user account, such as not displaying indications 642 and 644 in FIG. 6HH if no user account is associated with device 500. For example, if the second user interface (e.g., powering down user interface) is being displayed while the electronic device is not associated with a respective user account, the powering down user interface is not displayed with an indication of functionality associated with the respective user account. The above-described manner of displaying an indication of functionality associated with a user account as a user is performing a gesture to power down the electronic device provides enhanced security by informing a user of functionality enabled on the electronic device via the user account, even after the electronic device is off, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while detecting the gesture associated with powering down the electronic device, the electronic device visually deemphasizes (716*a*) the indication of functionality associated with the user account in accordance with progression of the gesture associated with powering down the electronic device, such as device 500 visually emphasizing indications 642 and 644 as touch contact 622 drags draggable user interface element 681 in FIGS. 6HH-6JJ. For example, while a user is performing the gesture for powering down the electronic device, the indication of functionality fades out (e.g., deemphasizes gradually, such as by decreasing brightness, increasing translucency, etc.) as the gesture for powering down the electronic device advances. As the gesture for powering off the electronic device concludes (e.g., criteria for powering down the electronic device is satisfied, such as the contact reaching the second location in the user interface for powering down the device), the indication of functionality associated with the user account is optionally fully obscured or not displayed (e.g., unobservable to a user of the electronic device). In some embodiments, the moment at which the gesture for powering down the electronic device is initially detected corresponds to the moment when the indication of functionality is the most (e.g., visually) prominent. The above-described manner of visually deemphasizing the indication of functionality as a gesture for powering the electronic device advances provides an efficient way of indicating functionality of a respective user account that will be available even after powering down the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while detecting the gesture associated with powering down the electronic device, the electronic device visually emphasizes (718*a*) the indication of functionality associated with the user account in accordance with progression of the gesture associated with powering down the electronic device, such as the display characteristics of indications 642 and 644 in FIGS. 6HH-6JJ. For example, while a user is performing a gesture for powering down the electronic device, the indication of functionality becomes more visually prominent (e.g., visually emphasized, such as by increasing brightness, increasing translucency, etc.) as the gesture progresses/advances. In some embodiments, the moment at which the gesture for powering off the electronic concludes and subsequently causes the electronic device to power down, the indication of functionality is at its highest level of visual prominence (e.g., highest level of visibility). In some embodiments, the moment at which the gesture for powering off the electronic is detected and subsequently initiates the process for powering down the electronic device, the indication of functionality is at its lowest level of visual prominence (e.g., fully obscured or not displayed).

The above-described manner of visually emphasizing the indication of functionality as a gesture for powering the electronic device advances provides an efficient way of indicating functionality of a user account that will be available even after powering down the electronic device, without the need to consume display resources to display the indication until power-down is closer to be achieved, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, visually emphasizing the indication of functionality associated with the user account in accordance with the progression of the gesture includes maintaining a visual characteristic of the indication of functionality associated with the user account while visually deemphasizing a remainder of the second user interface in accordance with the progression of the gesture associated with powering down the electronic device (720a), such if in FIGS. 6HH-6JJ the visual indications remained at a same display characteristic as draggable user interface element 681 moves and the rest of user interface 676 fades out. For example, while a user is performing a gesture for powering down the electronic device, the indication of functionality remains displayed with a same visual characteristic (e.g., same level of brightness, same level of translucency, etc.) while other portions of the second user interface are visually deemphasized (e.g., fade away, reduced brightness, increased translucency) as the gesture progresses/advances.

The above-described manner of maintaining a visual characteristic of indication of functionality associated with a respective user account as other portions of the second user interface are visually deemphasized in accordance with the progression of the gesture provides an efficient way of indicating functionality of a user account that will be available even after powering down the electronic device, without the need to consume increased display resources to make the indication visible as the gesture proceeds, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, visually emphasizing the indication of functionality associated with the user account in accordance with the progression of the gesture includes increasing a visual characteristic of the indication of functionality associated with the user account in accordance with the progression of the gesture associated with powering down the electronic device (722a), such as the display characteristics of indications 642 and 644 in FIGS. 6HH-6JJ. For example, while a user is performing a gesture for powering down the electronic device, a characteristic associated with the display of the indication of functionality (e.g., gradually) increases as the gesture progresses/advances. In some embodiments the brightness level, opacity level and/or visibility level of the indication of functionality (e.g., gradually) increases in accordance with the progression of the gesture for powering down the electronic device.

The above-described manner of increasing a visual characteristic associated with the indication of functionality as the gesture progresses/advances provides an efficient way of indicating functionality of a respective user account that will be available even after powering down the electronic device, without the need to consume display resources to display the indication until power-down is closer to be achieved, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying, via the display generation component, a second user interface (724a), in accordance with the determination that the electronic device is currently associated with a respective user account (724b) (e.g., if the electronic device was associated with a respective user account before being reset to the device setup state and that association still exists while in the device setup state or if the electronic device is associated with a current user account or becomes associated with a new user account during the device setup state), in accordance with a determination that the electronic device is in a mode that restricts the electronic device from receiving or transmitting wireless signals (724b), the electronic device displays (724c), in the second user interface, an indication of functionality associated with the user account, such as, in FIG. 6R, displaying indicator 660 in user interface 650 because airplane mode was toggled on in FIG. 6S. For example, if the electronic device is currently in a (e.g., airplane) mode that is restricting the electronic device from receiving messages, phone calls, and/or other features of the electronic device over a cellular network, the second user interface includes an indication of functionality associated with the respective user account. In some embodiments, if the electronic device is not currently in a mode which is restricting the electronic device from receiving messages, phone calls, and/or other features of the electronic over a cellular network, the second user interface does not include an indication of functionality associated with the respective user account.

In some embodiments, the indication of functionality includes an indication of the functionality associated with the user account that remains active while the device is restricting the transmission and/or receiving of wireless signals (e.g., via a cellular network). For example, functionality of the respective user account that continues to operate even if a connection to a cellular network cannot be established and/or functionality of the respective user account that remains active while the electronic device is restricting the transmission/receiving of wireless signals (e.g., via a cellular network) (e.g., functionality that operates regardless of the mode of the electronic device). In some embodiments, the electronic device supports mobile purchases and transit related transactions via NFC transactions, thus in some embodiments, the indication of functionality includes an indication that mobile purchases and/or transit transactions are available while the device is unable to receive and/or transmit wireless signals (e.g., via a cellular network). In some embodiments, the respective user account prevents another user account from being associated with the electronic device (e.g., while the device is unable to receive and/or transmit wireless signals (e.g., via a cellular network)). In some such embodiments, the indication of functionality includes an indication that the electronic device cannot be associated with another user account. In some embodiments, the location of the electronic device is accessible by the respective user account while the electronic device is unable to receive and/or transmit wireless signals (e.g., via a cellular network). In some such embodiments, the indication of functionality includes an indication that the location of the electronic device is accessible by the respective user account while the device is unable to receive and/or transmit wireless signals (e.g., via a cellular network). In some embodiments, the respective user account corresponds to a respective user account that was associated with the electronic device before the device was reset if the electronic device is currently in a device setup state and is associated with a respective user account. In some embodiments, the respective user account corresponds to a new user account (e.g., a user account different than the account that was associated with the electronic device prior to the electronic device being reset to the device setup state) if the second user interface is being displayed after the device has been setup with the new account.

The above-described manner of displaying an indication of functionality associated with the electronic while the electronic device is in a mode that is restricting the transmission and receiving of wireless signals (e.g., via a cellular network) provides an efficient way of indicating functionality of a user account that is available, even while the electronic device has a portion of signal reception/transmission functionality unavailable, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the second user interface is a user interface that includes one or more selectable options that are selectable to control one or more functionalities of the electronic device (726a), such as user interface 650 including toggle buttons 652-658. For example, the second user interface includes one or more selectable options to control functionality of the electronic device, including, but not limited to, selectable options to control whether the electronic device is able to receive or transmit wireless signals (e.g., via a cellular network), such as a control to enable or disable the above-described mode of the electronic device, to control whether the electronic device is able to receive/transmit Wi-Fi signals, to control whether the electronic device is able to receive/transmit cellular signals, and/or to control whether the electronic device is able to receive/transmit Bluetooth signals. In some embodiments, the one or more selectable options are displayed in a first region of the second user interface and the indication of functionality associated with the respective user account is located in a second region of the second user interface, different from the first region (e.g., above the first region). In some embodiments, when a respective selectable option is selected, the state of the electronic device toggles between the on/off states, unless the switching of states would cause the electronic device to disable functionality associated with the respective user account.

The above-described manner of displaying the indication of functionality associated with the user account provides an efficient way of indicating functionality of a user account that is available, even if the or more selectable option were to be selected by a user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device displays (728a), via the display generation component, a respective user interface, such as user interface 640 in FIG. 6M, lock screen user interface 648 in FIG. 6O, user interface 650 in FIG. 6S, user interface 676 in FIGS. 6HH-6JJ, user interface 690 in FIG. 6KK, and user interface 692 in FIG. 6LL (e.g., a user interface that is displayed while the electronic is/is not in the device setup state, such as an account configuration user interface, an account login user interface, a purchasing user interface, a settings user interface, a low power user interface, a recovery mode user interface, etc.)). In some embodiments, in accordance with a determination that the electronic device is currently associated with a respective user account (e.g., if an association with a respective user account exists while the electronic device is/is not in the device setup state) (728b), in accordance with a determination that a location of the electronic device is accessible to the respective user account, the indication of functionality includes an indication indicating that the location of the electronic device is accessible to the respective user account (728c), such as indicator 644 in the above mentioned user interface including textual information indicating the device's location is accessible by the user account currently associated with the device 500. For example, if the electronic device is associated with a respective user account that has access to location information of the electronic device, the user interface includes an indication indicating that the location of the electronic device is accessible by the respective user account. The respective user interface optionally corresponds to a user interface that is displayed while the electronic device in a device setup state or when the electronic device is not in a device setup state. In some embodiments, when a respective user account has access to location information about the electronic device, a user is able to initiate a process to find the electronic device (e.g., as will be discussed with reference to methods 1100 and/or 1300). In some embodiments, the electronic device shares its location with another electronic device (e.g., that is within a threshold distance), which in turn, communicates directly or indirectly a location of the electronic device to an application associated with the respective user account.

In some embodiments, in accordance with a determination that the location of the electronic device is not accessible to the respective user account, the indication of functionality does not include an indication indicating that the location of the electronic device is accessible to the respective user account (728d), such as the above mentioned user interface not including indicator 644 if a user account is not currently associated with device 500. For example, if a respective user account does not have access to location information of the electronic device, the user interface does not include an indication indicating that the location of the electronic device is accessible by the respective user account.

The above-described manner of displaying an indication that a user account has access to location information about the electronic device in a user interface, regardless of whether the device is or is not in a device setup state, provides enhanced security by informing a (e.g., unauthorized) user about a user account that access to the location of the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device receives (730a), via the one or more input devices, a second input corresponding to a request to enable a mode that restricts the electronic device from receiving or transmitting wireless signals, such as device 500 receiving a request to toggle button 652 corresponding to airplane on via touch contact 622 (e.g., a mode restricting the electronic device from receiving messages, phone calls, and/or other features of the electronic device over a cellular network). For example, the second input is optionally selection of an on/off toggle for enabling the mode from a control center user interface, such as previously described. In some embodiments, in response to receiving the second input, in accordance with a determination that one or more criteria are satisfied (e.g., the device is currently locked, and has not been unlocked via biometric or other authentication), the electronic device restricts (730b) the electronic device from receiving or transmitting wireless signals without preventing the respective user account from having access to the location of the electronic device, such as, in FIG. 6S, while airplane mode is toggled off, indicator 660 indicates the location of the device is still accessible by the currently associated user account. It is understood that the technology via which the respective user account is able to access the location of the electronic device is intended to be used for lost and stolen device tracking, and clearly inform users of the electronic device when such access is occurring or possible. For example, if the electronic device is locked when the request to restrict the electronic device from receiving/transmitting of wireless signals is received, the electronic device disables some types of wireless signals that do not prevent the respective user account from having access to a location of the electronic device. In some embodiments, a user interface includes selectable options for toggling on/off one or more settings of the electronic (e.g., such as toggling settings as cellular, Wi-Fi, Bluetooth, and/or airplane mode). If an input is received to toggle airplane mode on (e.g., to restrict the electronic device from receiving or transmitting wireless signals), the electronic device optionally toggles the electronic device to a state which does not affect functionality associated with the respective user account if the electronic device is in a locked state (e.g., restricting user access to the electronic device). For example, if the electronic device toggles the airplane mode on (e.g., to restrict the electronic device from receiving or transmitting all types of wireless signals), functionality associated with the respective user account, such as having access to a location of the electronic device, would optionally be disabled because the electronic is unable to transmit, via wireless signals, a location of the electronic device. Thus, in some embodiments, in response to receiving the input to restrict the electronic device from receiving or transmitting wireless signals, the electronic device does not restrict particular signals (e.g., Bluetooth signals) that would cause the respective user account to be unable to access a location of the electronic device, but does restrict other signals (e.g., signals required for streaming music, sending/receiving of emails, sending/receives of text messages, browsing internet applications with cellular data, etc.). For example, in response to receiving an input to toggle an airplane mode of the electronic device on, Bluetooth signals optionally remain (e.g., partially) enabled (e.g., to continue to allow a respective user account to view a location of the electronic device) while other wireless signals (e.g., Wi-Fi, cellular, etc.) are disabled in accordance with the input. In some embodiments, the electronic device provides an indication that Bluetooth signals remain (e.g., partially) enabled on the electronic device by displaying the selectable option corresponding to the Bluetooth signal with a visual appearance different than the visual appearance corresponding to settings that are on or off.

The above-described manner of continuing to allow a respective user account to have access to a location of the electronic when an input is received to turn off the transmission or receiving of wireless signals provides enhanced security by disabling settings of the electronic that do not affect functionality associated with the respective user account, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more criteria include a criterion that is satisfied when the electronic device is in a locked state, and is not satisfied when the electronic device is in an unlocked state (732a). In some embodiments, in response to receiving the second input, in accordance with a determination that the one or more criteria are not satisfied, the electronic device restricts (732b) the electronic device from receiving or transmitting wireless signals including preventing the user account from having access to the location of the electronic device, such as in FIG. 6EE touch contact 622 toggling off Bluetooth, and in response, Bluetooth is toggled off in FIG. 6FF. For example, if the second input corresponding to the request to enable a mode that restricts the electronic device from receiving or transmitting wireless signals is receive while the device is unlocked (e.g., user access to the electronic device is not being restricted), the electronic device is unable to receive or transmit wireless signals including the wireless signals that allows a respective user account to have access to the physical location of the electronic device. In some embodiments, the second input is received while the electronic device is displaying a user interface that includes selectable (e.g., toggle-able) options for controlling if the electronic device is able to receive particular wireless signals (e.g., Wi-Fi, Bluetooth, cellular) and selectable option for controlling if the electronic is able to receive/transmit all types of wireless signals. In some embodiments, if an input is received selecting a selectable option for controlling if the electronic is able to receive/transmit all types of wireless signals and the selectable option is toggled on (e.g., the electronic device is currently able to transmit or receive wireless signals), the electronic device switches to a mode that restricts the electronic device from receiving/transmitting all (or at least the signals that were disabled when the device was locked, and additional signals or functionalities that were not disabled when the device was locked) types of wireless signals, which in turn restricts the respective user from accessing the location of the electronic device. In some embodiments, if an input is received selecting the selectable option for controlling if the electronic is able to receive/transmit all (or more) types of wireless signals and the selectable option is toggled off (e.g., the electronic device is currently not able to transmit or receive wireless signals), the electronic device switches to a mode that allows the electronic device to receive/transmit all (or the more) types of wireless signals, which in turn, allows the respective user account access to the location of the electronic device.

The above-described manner of preventing the respective user account from having access to a location of the electronic device when input is received to restrict the electronic from receiving and/or transmitting wireless signal while the electronic device is unlocked provides enhanced security by only allowing authorized users of the electronic device to prevent a respective user account from having access to the location of the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIGS. 7A-7H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300 and 1500) are also applicable in an analogous manner to method 700 described above with respect to FIGS. 7A-7H. For example, the association of the electronic device with a user account and/or its ability to be tracked by the user account described above with reference to method 700 optionally have one or more of the characteristics of tracking objects or devices, etc., described herein with reference to other methods described herein (e.g., methods 900, 1100, 1300 and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7H are, optionally, implemented by components depicted in FIGS. 1A-1B. For example, detecting operation 702*a* and displaying operation 702*b* are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Notification of Separation From a Remote Locator Object or Device

Users interact with electronic devices in many different manners. In some embodiments, an electronic device is able to track the location of an object such as a remote locator object and/or another electronic device configured to be tracked by the electronic device. In some embodiments, the remote locator object (and/or device), which supports location tracking functions, can be attached to items that do not support location tracking functions. The embodiments described below provide ways in which an electronic device provides an alert that a remote locator object that is associated with the user has become separated from the user, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8I:
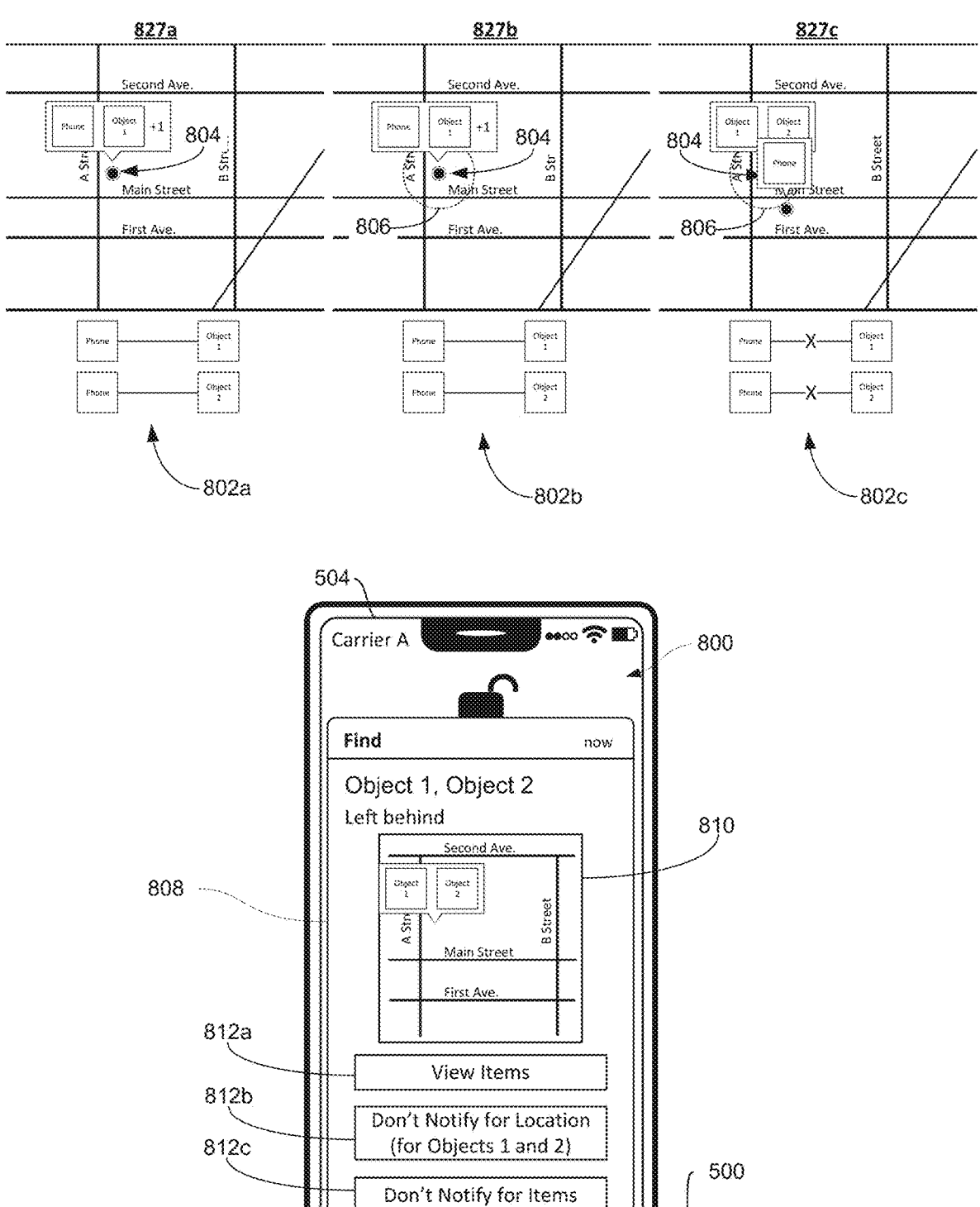
FIGS. 8A-8T illustrate exemplary ways in which an electronic device displays notifications of a separation with a remote locator object (and/or device) in accordance with some embodiments of the disclosure.
Figures 1, 8J:
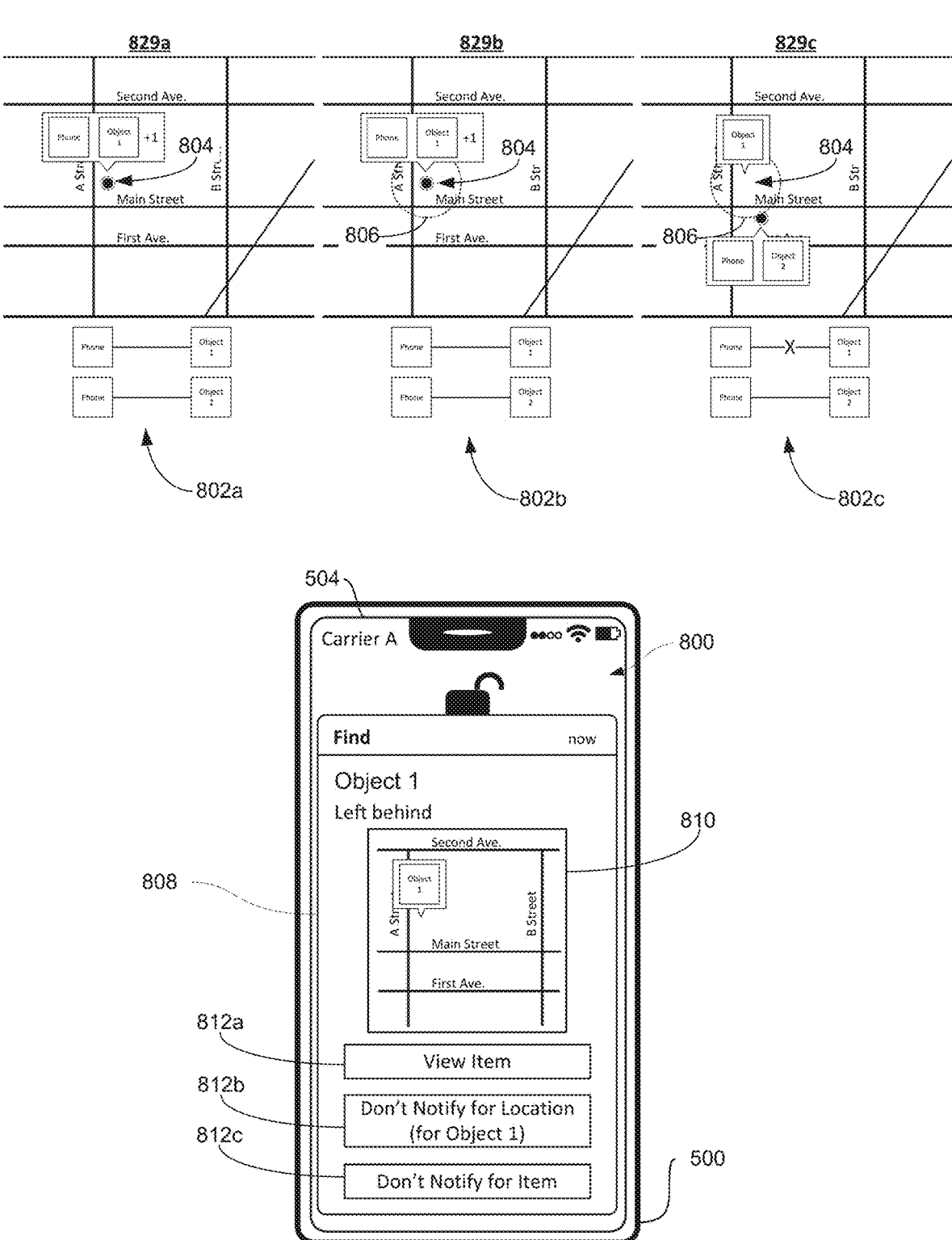
Figure 8J:
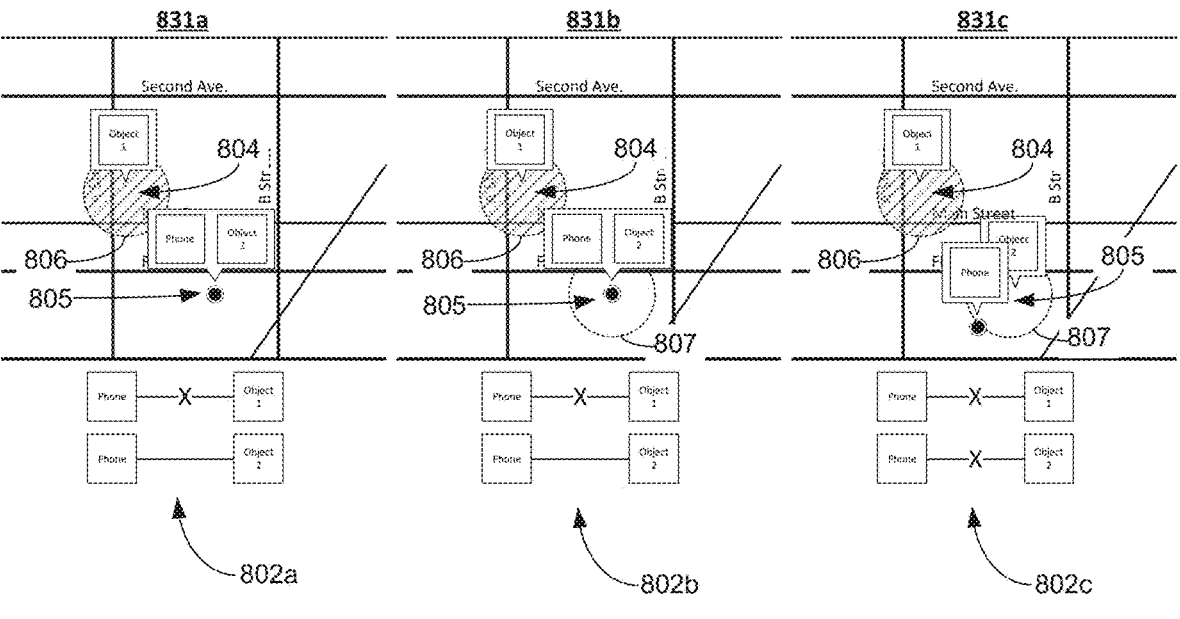
Figure 2:
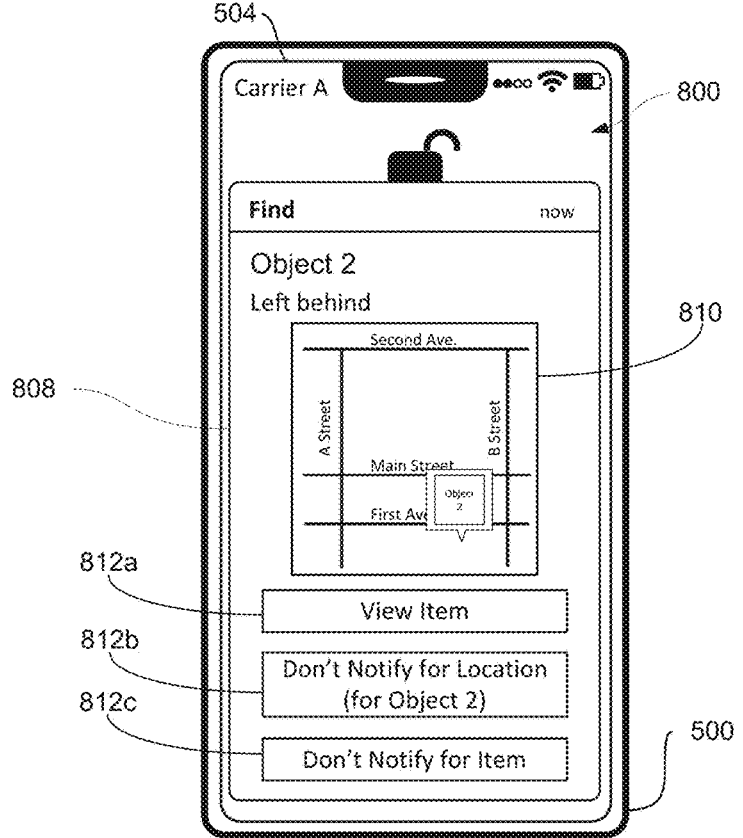
Figure 8L:
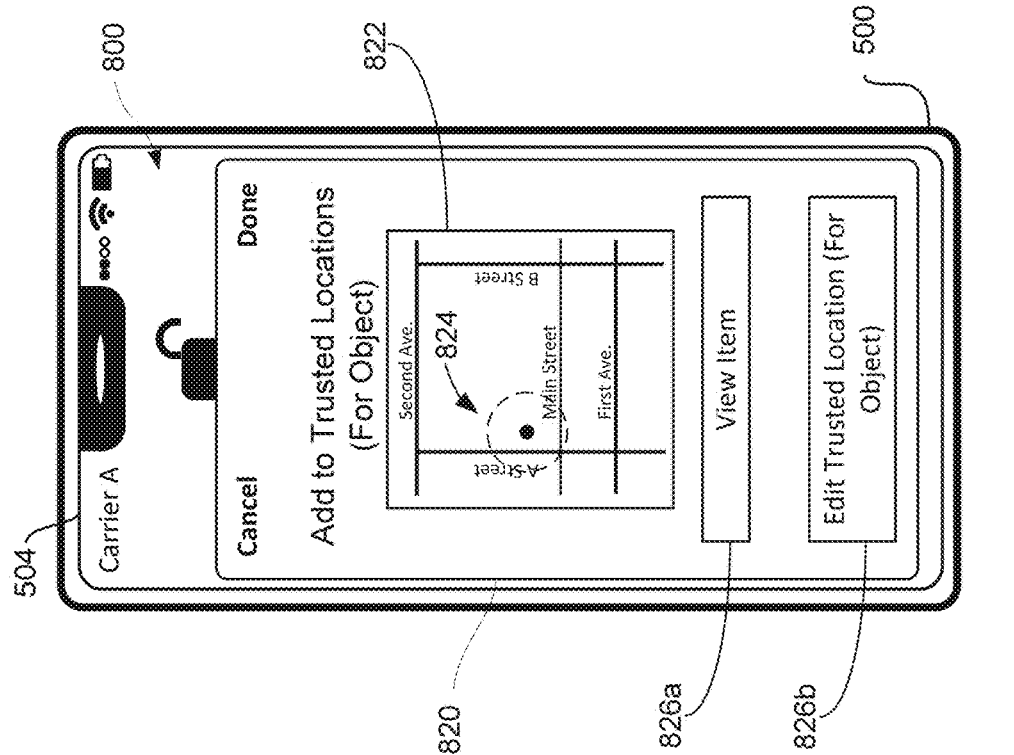
Figure 8K:
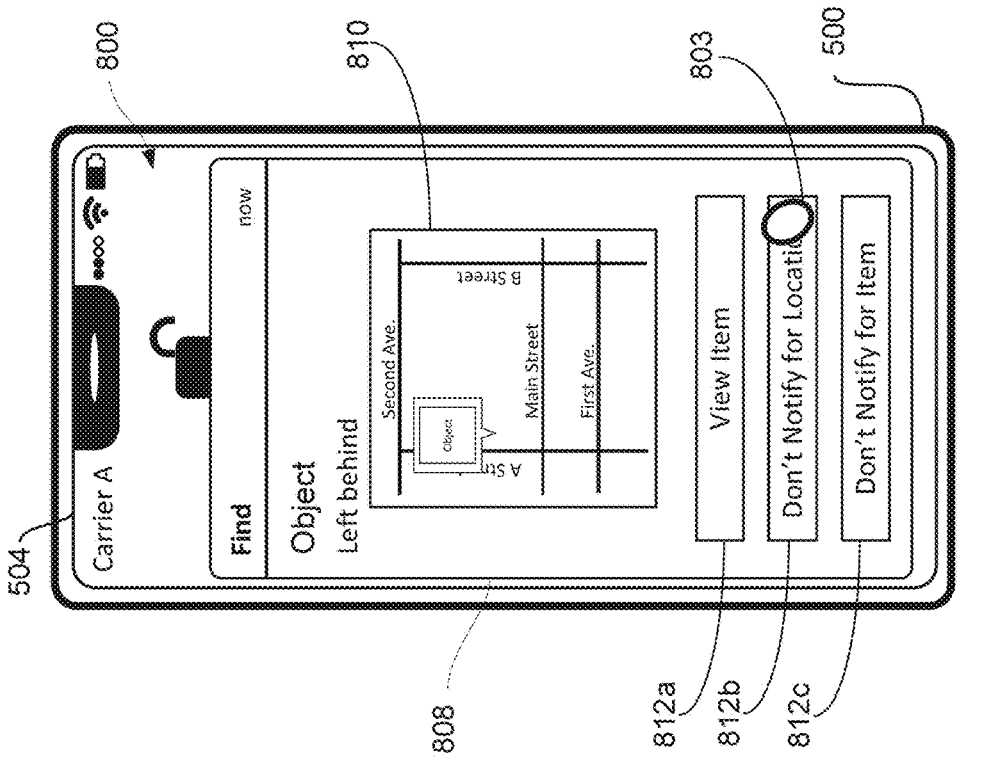
Figure 8N:
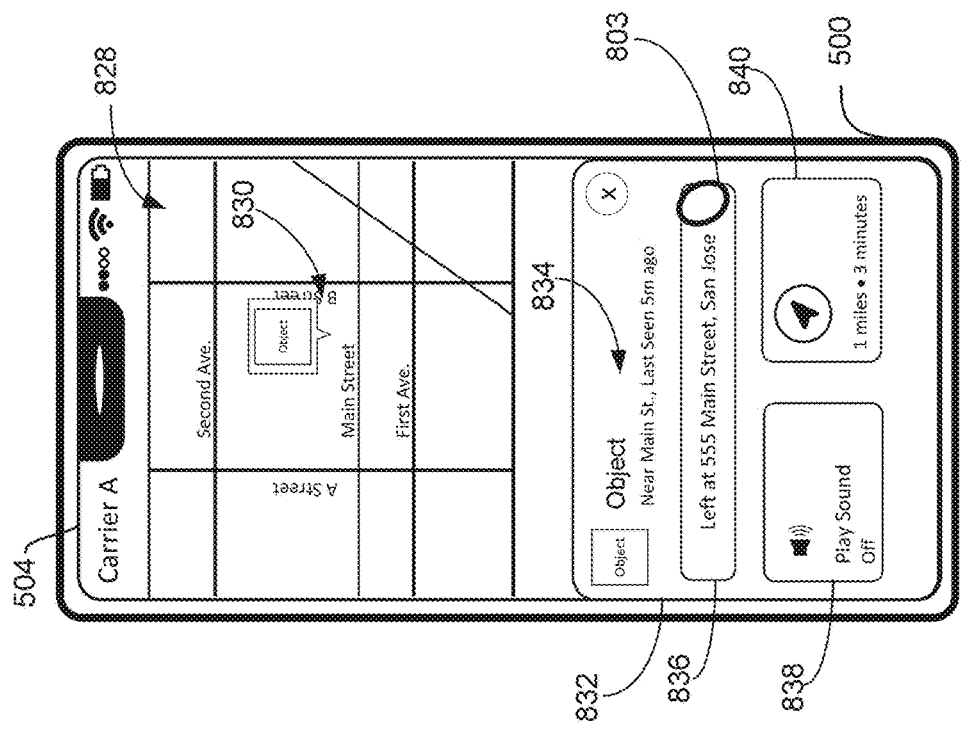
Figure 8M:
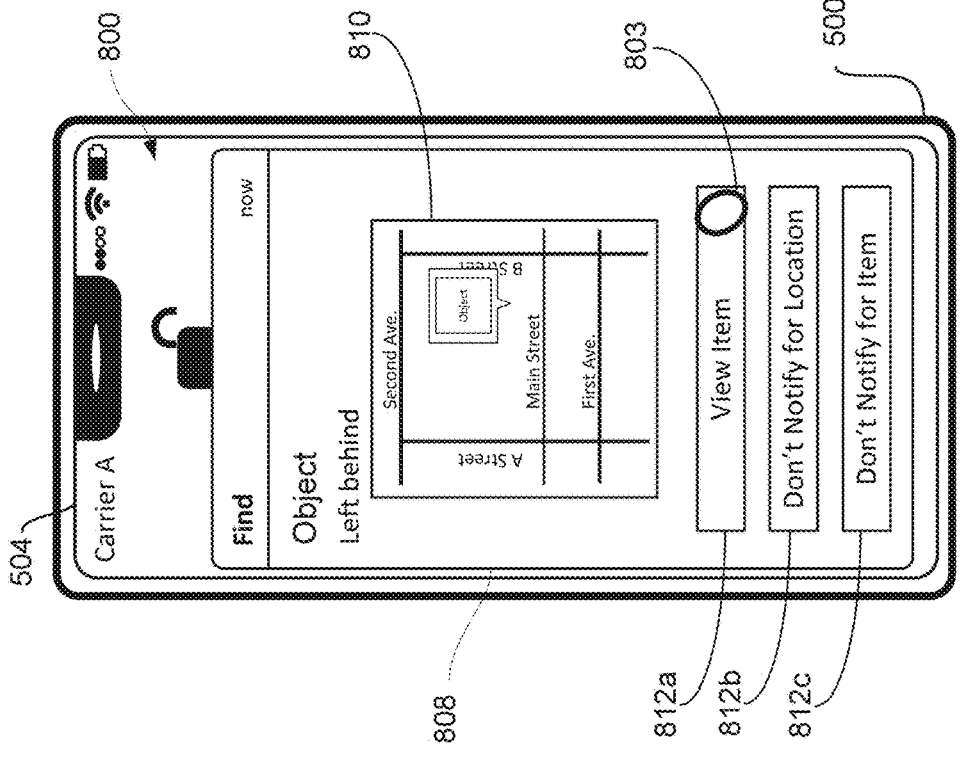
Figure 8P:
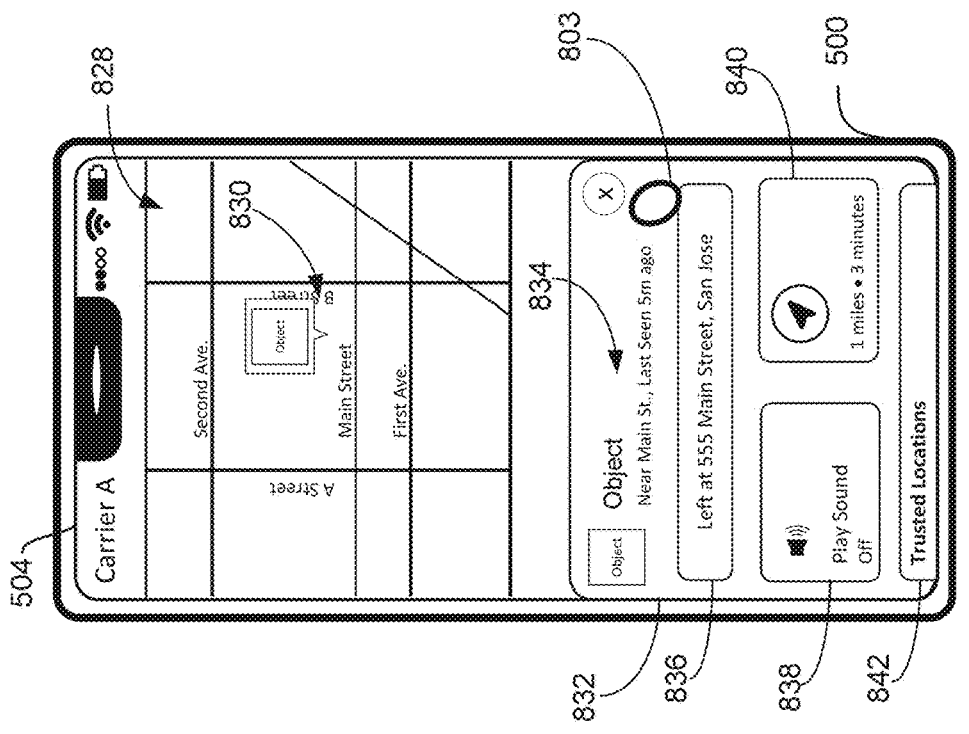
Figure 8O:
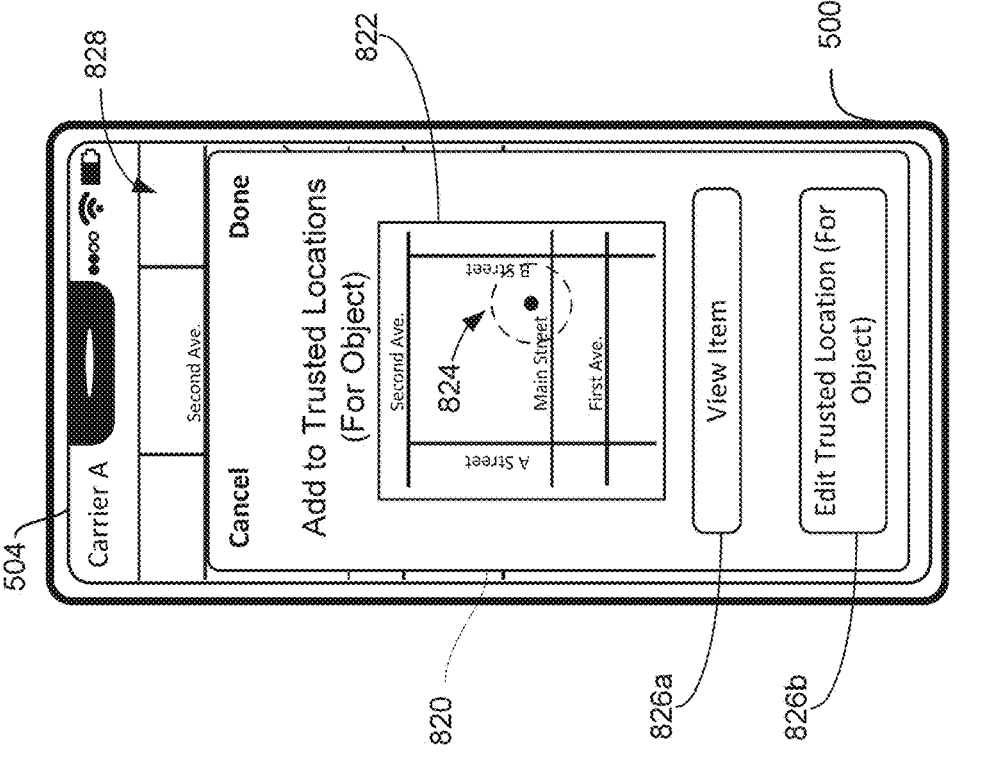
Figure 8R:
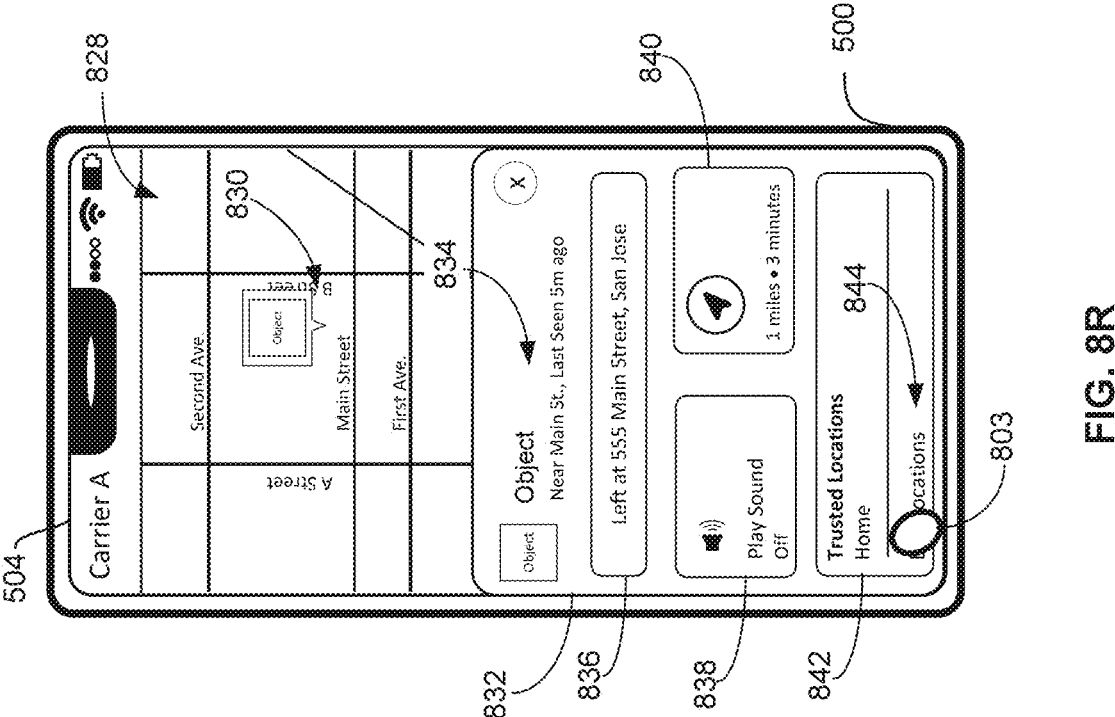
Figure 8Q:
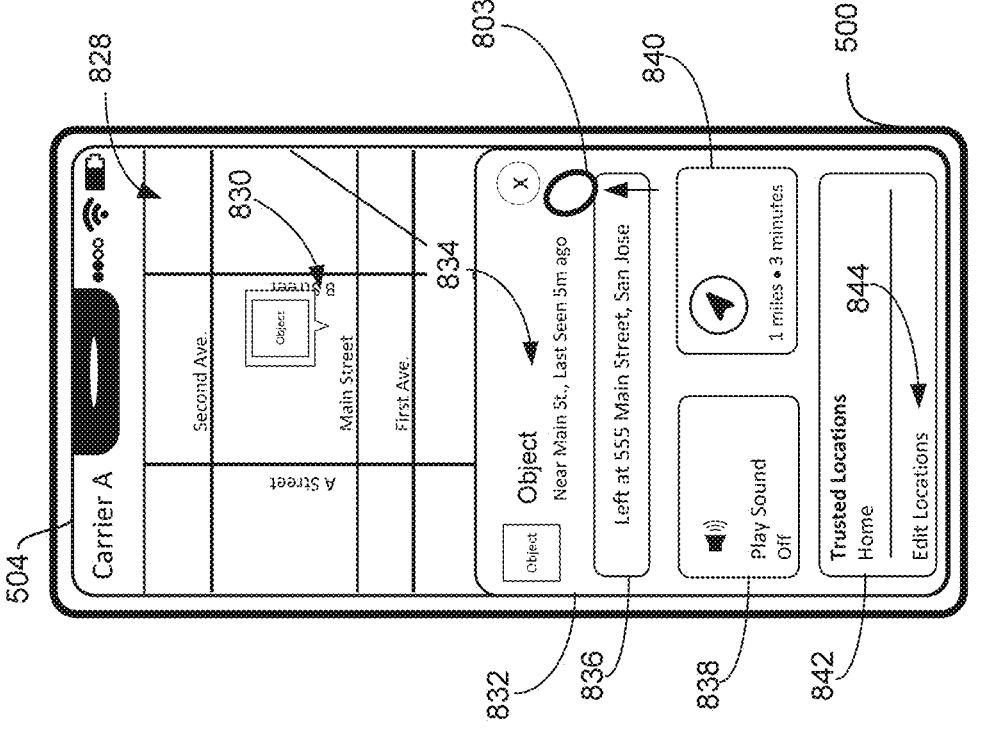
Figure 8T:
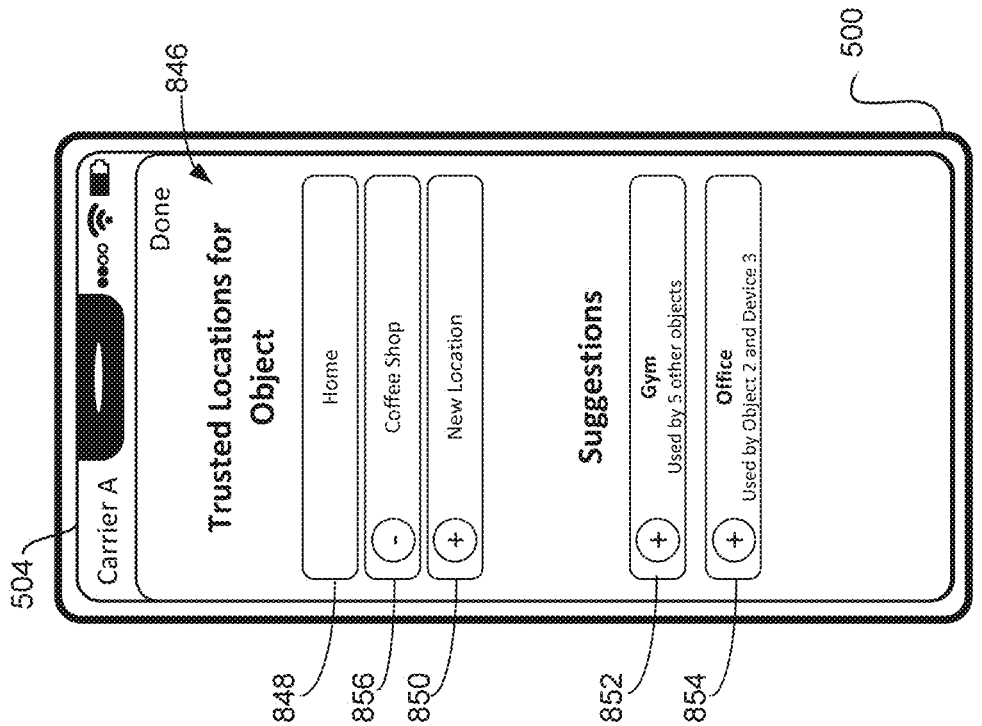

FIGS. 8A-8T illustrate exemplary ways in which an electronic device displays notifications of a separation with a remote locator object (and/or device) in accordance with some embodiments of the disclosure. The embodiments in these figures are used to illustrate the processes described below, including the processes described with reference to FIGS. 9A-9J.

FIGS. 8A-8T illustrate an electronic device 500 displaying notifications of separation from one or more remote locator objects. The figures illustrate separation from remote locator object(s), but it is understood that the electronic device is optionally similarly configurable to generate notifications of separation from one or more electronic devices (e.g., left and/or right earbuds, smart watch, laptop, tablet computer, etc.), and optionally responds in the same manner as illustrated in FIGS. 8A-8T to such separations.

FIG. 8A illustrates an exemplary device 500 that includes touch screen 504. As shown in FIG. 8A, the electronic device 500 presents a lock screen user interface 800 (e.g., a wake screen user interface). In some embodiments, lock screen user interface 800 is the user interface that is displayed when electronic device 500 is awoken (e.g., from a sleep (low power) or locked state). One or more of the examples described with reference to FIGS. 8A-8T describe notifications displayed by device 500 while device 500 is displaying the lock screen user interface 800, but it is understood that in some embodiments, device 500 similarly displays the illustrated notifications while device 500 is displaying other user interfaces (e.g., a home screen user interface, such as described with reference to FIG. 4A, a user interface of an application installed on device 500, etc.).

As mentioned previously, device 500 is optionally able to display notifications when an object or a device is separated from the device 500 (e.g., separated from a location corresponding to the user of device 500). In some embodiments, the object is referred to as a remote locator object. A remote locator object is optionally a device with a battery, one or more wireless antenna and a processor (e.g., a low power processor) that enable the device to function as a special-purpose remote locator object when associated with or attached to another physical object (e.g., wallet, purse, backpack, suitcase, car, set of keys, or the like). In some embodiments, the remote locator object is a multi-purpose device with location tracking capabilities such as a smartphone, tablet, computer, or watch. In some embodiments, a remote locator object is capable of transmitting location data to the electronic device. For example, a remote locator object optionally includes a GPS locator. In some embodiments, a remote locator object does not include location tracking capability and relies on other electronic devices to receive location data. In some embodiments, a remote locator object is able to wirelessly communicate with other electronic devices, such as the electronic device 500 (e.g., over Bluetooth, RF, IR, NFC, Wi-Fi, etc.).

In some embodiments, the trigger that causes device 500 to generate a separation alert that indicates that a given object has been separated from device 500 is different depending on one or more movement characteristics of device 500 and/or the object when (or before) the separation occurs. For example, in some embodiments, when device 500 and/or the object have settled down at a location (e.g., moved less than a threshold distance (e.g., 3, 5, 10, 30 feet) during a threshold amount of time (e.g., 1, 5, 10, 20, 30 minutes) after arriving at that location), the trigger used by device 500 to generate a separation alert is optionally based on a geofence that is established (e.g., by device 500) at that location once device 500 and the object have settled down at that location.

In particular, with reference to FIG. 8A, as shown in map 811*a*, device 500 (represented by "Phone" in maps 811) and the object have arrived at location 804. In some embodiments, a Bluetooth connection (or other wired or wireless connection) is active between device 500 and the object, as indicated by the unbroken line between device 500 and the object in schematic 802*a*. The schematics 802 in the figures optionally correspond to any one of a number of signals that can be used as indicative of separation between device 500 and the object. For example, in some embodiments, a loss or reduction below a threshold strength (e.g., 1%, 5%, 10%, 30%, 50%) of the Bluetooth (or other) connection between device 500 and the object is a signal that is indicative of separation between device 500 and the object. In some embodiments, additionally or alternatively, if the object is a magnetic accessory that attached to device 500 magnetically, the determination by device 500 that the accessory is not (or no longer) attached to device 500 is a signal that is indicative of separation between device 500 and the object. Device 500 responds in various ways to such signals, as is described herein.

In FIG. 8A, after having settled at location 804 as previously described, device 500 and/or the object define geofence 806 around location 804, as shown in map 811*b*. In some embodiments, location 804 is at the center of the geofenced area 806. In some embodiments, the radius of the geofenced area is 3, 5, 10, 20, 40, 50, or 100 feet. In map 811*c*, device 500 has moved away from the object to a distance sufficient to break the Bluetooth connection between device 500 and the object, as shown in schematic 802*c* with the broken line between device 500 and the object. However, device 500 remains within geofence 806. Therefore, device 500 does not generate a separation alert, as shown in FIG. 8A.

In FIG. 8B, similar to FIG. 8A, device 500 and the object have settled at location 804, and a geofence 806 has been established around that location, as shown in maps 813*a* and 813*b*. In map 813*c*, device 500 has moved away from the object to a distance sufficient to break the Bluetooth connection between device 500 and the object, as shown in schematic 802*c*, and in contrast to FIG. 8A, device 500 has just exited geofence 806 (e.g., determined based on a GPS and/or location sensor on device 500). In response to device 500 exiting geofence 806, device 500 generates (e.g., displays on touch screen 504) separation alert 808. In some embodiments, device 500 generates separation alert 808 in the scenario of FIG. 8B regardless of whether the Bluetooth (or other) connection between device 500 and the object is broken. In some embodiments, device 500 only generates separation alert 808 in the scenario of FIG. 8B if the Bluetooth (or other) connection between device 500 and the object is broken. For example, if the object is an accessory (e.g., magnetic or otherwise) of device 500 that attaches (e.g., magnetically or otherwise) to device 500, in the scenario of FIG. 8B, device 500 optionally generates a separation alert for the object if, upon exiting the geofence 806, the object is detached from device 500.

Separation alert 808 in FIG. 8B indicates that the object has been left behind, and includes a map 810 of the last known location of the object (e.g., indicated by an icon associated with the object being displayed at a location on the map 810 that corresponds to the last known location of the object). In some embodiments, the last known location of the object is the location at which device 500 last detected the object prior to exiting geofence 806, or is the location at which device 500 last detected object even after exiting geofence 806.

Separation alert 808 also includes selectable option 812*a* that is selectable to display additional information about the object (as will be described in more detail later), selectable option 812*b* that is selectable to configure device 500 to no longer generate separation alerts for the object if it is left behind at the last known location of the object (e.g., to designate the last known location of the object as a trusted location for that object, as will be described in more detail later), and selectable option 812*c* that is selectable to configure device 500 to no longer generate separation alerts for the object, even if the various criteria for generating a separation alert for the object would have otherwise been met (as will be described in more detail later).

In some embodiments, if device 500 and/or the object are moving or have recently been moving at the time of separation from each other, rather than utilizing a geofence to trigger the generation of separation alerts, device 500 utilizes the Bluetooth (or other) connection status between device 500 and the object to generate the separation alert. For example, in FIG. 8C, device 500 and the object are moving from location 804*a* shown in map 815*a* to location 804*b* shown in map 815*b*. In map 815*c*, device 500 has continued moving while the object remains at location 804*b*; and, due to the continued movement of device 500, the Bluetooth (or other) connection between device 500 and the object has been lost, as indicated in schematic 802*c*. In some embodiments, because device 500 and the object were recently (e.g., within the past 5, 10, 15, 20, 30 minutes) moving together (e.g., while remaining within 0.5, 1, 2, 3, 5, 10 feet of one another) at the time of the loss of the connection between device 500 and the object, in response to detecting the loss of the connection between device 500 and the object, device 500 generates separation alert 808 for the object, as shown in FIG. 8C. As previously mentioned, it is understood that the status of the connection between device 500 and the object could correspond to an attachment status between device 500 and the object (e.g., if the object is an accessory that attaches to device 500, magnetically or otherwise), and that a lost connection between the two items as described herein could correspond to detection by device 500 that the object has been detached from device 500—in such embodiments, device 500 would optionally respond in the same manner as described herein with respect to the loss of a Bluetooth connection between device 500 and the object.

In FIG. 8C, as previously described, separation alert 808 includes a map 810 of the last known location of the object, selectable option 812a that is selectable to display additional information about the object, and selectable option 812c that is selectable to configure device 500 to no longer generate separation alerts for the object. In some embodiments, if device 500 generates the separation alert 808 while device 500 and/or the object are moving or have recently moved (e.g., if device 500 generates the separation alert 808 based on the Bluetooth (or other) connection status between device 500 and the object, rather than based on a geofence as described with reference to FIGS. 8A-8B), the separation alert 808 does not include a selectable option to designate the last-known location of the object as a trusted location for that object. The separation alert 808 optionally does not include such an option, because if device 500 and/or the object were moving or recently moving when the separation between the two items occurred, the last-known location for the object is likely different from the actual current location of the object and/or the last-known location for the object is likely not a location that would be likely to be designated as a trusted location for the object.

In some embodiments, the separation alert 808 generated by device 500 for a given object only includes options 812b and/or 812c the first N (e.g., 1, 2, 3, 5, 10) times a separation alert is generated for that object (e.g., whether based on Bluetooth (or other) connection status, or based on a geofence). In subsequent separation alerts for that object, device 500 optionally does not include options 812b and/or 812c in the separation alert. For example, in FIG. 8D, device 500 and the object have been separated in the same manner as in FIG. 8C, subsequent to the separation illustrated in FIG. 8C. Because the separation alert 808 in FIG. 8D is the second (or Nth) separation alert generated for the object by device 500, the separation alert 808 does not include options 812b and/or 812c, as shown in FIG. 8D.

In some embodiments, in order for device 500 to generate a separation alert for a given object, device 500 and the object must have left a trusted location (e.g., previously designated for that object by the user) together prior to the separation of device 500 and the object (e.g., before the separation, but on the same day as the separation; before the separation, but in the same hour as the separation; before the separation, but in the same week as the separation; etc.). For example, in FIG. 8E, as shown in map 819a, a trusted location 814 has been designated (e.g., for the object). Trusted location 814 optionally corresponds to the location of the user's home, the location of the user's work, the location of the user's gym, etc. As shown in map 819a, device 500 and the object are both within trusted location 814 at location 804a within trusted location 814. As shown in map 819b, device 500 and the object both move and leave trusted location 814 together to location 804b. While moving (or after having recently moved), the Bluetooth (or other) connection between device 500 and the object has been lost, as shown in map 819c and schematic 802c. In response, because device 500 and the object both left trusted location 814 together prior to (e.g., earlier in the day of) the separation of the object from device 500 shown in map 819c, device 500 generates separation alert 808, as shown in FIG. 8E.

In contrast, in FIG. 8F, device 500 and the object did not leave a trusted location together; therefore, device 500 does not generate a separation alert when the Bluetooth (or other) connection between device 500 and the object is lost. In particular, as shown in map 821a, device 500 is at location 816 within trusted location 814, while the object is at location 804 outside of the trusted location 814. In map 821a, the Bluetooth (or other) connection between device 500 and the object is not established, as indicated in schematic 802a. As shown in map 821b, device 500 exits trusted location 814 without the object, and joins the object at location 804. In map 821b, the Bluetooth (or other) connection between device 500 and the object is active or established, as indicated in schematic 802b. In map 821c, device 500 separates from the object (similar to map 819c in FIG. 8E), which causes the Bluetooth (or other) connection between device 500 and the object to be lost, as indicated in schematic 802c. In response to the loss of the connection between device 500 and the object, device 500 does not generate a separation alert in FIG. 8F (as it did in FIG. 8E), because device 500 and the object did not leave a trusted location together prior to the separation of device 500 and the object. In some embodiments, the requirement that device 500 and the object of interest leave a trusted location together helps to reduce the number of unnecessary separation alerts that might be generated for objects that separate from device 500 in a given period of time (e.g., a day) by restricting those separations that trigger the generation of separation alerts to be with respect to objects that, for example, started the day at a trusted location with device 500.

Device 500 is optionally able to generate separation alerts in the context of multiple objects, as will be described with reference to FIGS. 8G through 8J-2. For example, in FIG. 8G, as shown in map 823a, device 500 and Object 1 are at location 816 within trusted location 814. Object 2 is at location 804 outside of trusted location 814. The Bluetooth (or other) connection between device 500 and Object 1 is active, and the Bluetooth (or other) connection between device 500 and Object 2 is not active, as indicated in schematic 802a. In map 823b, device 500 and Object 1 leave trusted location 814 together, move to location 804 together, which is where Object 2 is located. In map 823b, the Bluetooth (or other) connections between device 500 and Objects 1 and 2 are active, an indicative in schematic 802b. While moving (or after having recently moved), device 500 moves away from Objects 1 and 2, which both remain at location 804, as shown in map 823c, and the Bluetooth (or other) connections between device 500 and Objects 1 and 2 are lost, as indicated in schematic 802c. In response to the loss of the Bluetooth (or other) connections between device 500 and Objects 1 and 2, device 500 generates separation alert 808, as shown in FIG. 8G. Separation alert 808 is only for Object 1 and not for Object 2, because only Object 1 left a trusted location 814 together with device 500 (e.g., earlier that day) prior to the separation of device 500 from Objects 1 and 2.

In contrast, in FIG. 8H, device 500, Object 1 and Object 2 all leave trusted location 814 together, as shown in map 825a. Device 500 is, similar to FIG. 8G, separated from both Objects 1 and 2, which remain at location 804, in map 825c while device 500 was moving (or was recently moving). In response to the loss of the Bluetooth (or other) connections between device 500 and Objects 1 and 2 (as indicated in schematic 802c), device 500 generates separation alert 808, as shown in FIG. 8H. Separation alert 808 in FIG. 8H is for both Objects 1 and 2 (e.g., a combined separation alert), because the criteria for generating a separation alert was satisfied for both Objects 1 and 2, including the requirement that the objects leave a trusted location together with device 500 prior to the separation. The combined separation alert 808 in FIG. 8H includes an indication that both Objects 1 and 2 have been left behind, a map that indicates the location(s) of Objects 1 and 2, and selectable option 812*a* that is selectable to display more information about Objects 1 and 2. It is understood that while the requirement for leaving a trusted location has been illustrated in the context of separation alerts triggered by the Bluetooth (or other) connection status between device 500 and object(s), the requirement is optionally similarly applicable to separation alerts triggered based on geofence(s).

FIG. 8I illustrates another scenario involving multiple objects. In FIG. 8I, device 500 and Objects 1 and 2 have settled down at location 804, as shown in map 827*a*. The Bluetooth (or other) connections between device 500 and Objects 1 and 2 are active, as indicated in schematic 802*a*. In response to having settled down, geofence 806 is established as shown in map 827*b*, as previously described. While geofence 806 is established, device 500 moves and exits geofence 806 while Objects 1 and 2 remain at location 804, as shown in map 827*c*. At the time device 500 exits geofence 806, the Bluetooth (or other) connections between device 500 and Objects 1 and 2 have already been lost, as indicated by schematic 802*c*.

In response to exiting geofence 806, device 500 generates separation alert 808, as shown in FIG. 8I. Separation alert 808 in FIG. 8I is a combined separation alert for Objects 1 and 2 that indicates that both objects have been left behind, and that includes a map 810 of the locations of Objects 1 and 2 and selectable option 812*a* that is selectable to display additional information about Objects 1 and 2, as previously described. The separation alert 808 of FIG. 8I also includes selectable options 812*b* and 812*c* (e.g., because the separation alert is the Nth or less separation alert for one or more of Objects 1 and 2). While the inclusion of selectable options 812*b* and 812*c* are shown in the context of a geofenced-based combined separation alert, it is understood that Bluetooth (or other) connection status-based combined separation alerts optionally also include selectable option 812*c* (e.g., if the separation alert is the Nth or less separation alert for one or more of Objects 1 and 2). Selectable option 812*b* is optionally selectable to designate the current location 804 of Objects 1 and 2 as a trusted location for both Objects 1 and 2. Selectable option 812*c* is optionally selectable to configure device 500 to not generate separation alerts for either of Objects 1 and 2.

In FIG. 8J-1, device 500, Object 1 and Object 2 have all settled down at location 804, as indicated in map 829*a* and as in FIG. 8I. The Bluetooth (or other) connections between device 500 and Objects 1 and 2 are active, and indicated by schematic 802*a*. In map 829*b*, as in FIG. 8I, geofence 806 is established. In map 829*c*, device 500 and Object 2 exit geofence 806 together, while Object 1 remains at location 804 within geofence 806. Further, as indicated by schematic 802*c*, the Bluetooth (or other) connection between device 500 and Object 2 is active at the time device 500 and Object 2 exit geofence 806, and the Bluetooth (or other) connection between device 500 and Object 1 is lost (or has already been lost) at the time device 500 and Object 2 exit geofence 806.

In response to exiting geofence 806, device 500 generates separation alert 808 as shown in FIG. 8J-1. Separation alert 808 is only for Object 1, and not for Object 2, because Object 2 remains with device 500 when device 500 exits geofence 806. Further, in addition to indicating that Object

1 has been left behind, and indicating the last known location for Object 1, the separation alert includes selectable option 812*a* that is selectable to display additional information about Object 1 (but not Object 2), selectable option 812*b* that is selectable to designate location 804 as a trusted location for Object 1 (but not Object 2), and selectable option 812*c* that is selectable to configure device 500 to not generate separation alerts for Object 1 (e.g., while continuing to generate separation alerts for Object 2).

In some embodiments, device 500 and/or object(s) continue to establish new geofences as they settle down at new locations, whether or not prior geofences triggered the generation of separation alerts (e.g., whether or not objects have been left behind at prior geofence locations). For example, in FIG. 8J-2, after geofence 806 has been established and Object 1 has been left behind (e.g., and a separation alert has been generated for Object 1), as described with reference to FIG. 8J-1 and as indicated by the shaded geofence 806 in map 831*a*, device 500 and Object 2 settle down at location 805, and geofence 807 is established around location 805, as shown in map 831*b*. While geofence 807 is established, device 500 moves and exits geofence 807 while Object 2 remains at location 805 within geofence 807. In response to exiting geofence 807, device 500 generates separation alert 808, which is a separation alert only for Object 2 and not for Object 1. The separation alert optionally includes one or more of the elements previously described, including a map 810 that indicates the location of Object 2 (and not Object 1), a selectable option 812*a* that is selectable to display additional information about Object 2 (and not Object 1), a selectable option 812*b* that is selectable to designate the last known location for Object 2 as a trusted location for Object 2 (but not for Object 1), and selectable option 812*c* that is selectable to configure device 500 to not generate separation alerts for Object 2 (e.g., while continuing to generate separation alerts for Object 1).

Various user interfaces that are accessible from the separation alerts described herein (e.g., with reference to FIGS. 8A through 8J-2) will now be described. For example, in FIG. 8K, device 500 detects selection of selectable option 812*b* (e.g., via a tap of contact 803) in separation alert 808 for an object. In response, device 500 displays user interface 820 for designating the last known location for that object as a trusted location for that object, as shown in FIG. 8L. User interface 820 includes a map 822 that includes an indication of the proposed trusted location 824 for the object that includes (e.g., is centered around) the last known location for the object. User interface 820 also includes a selectable option 826*a* that is selectable to display additional information about the object (e.g., the same or similar information as would be displayed in response to selection of selectable option 812*a* in FIG. 8K), and a selectable option 826*b* that is selectable to initiate a process for the user of device 500 to edit the proposed trusted location 824 for the object (e.g., editing the size, location, name, etc. of the proposed trusted location 824). In some embodiments, in response to detecting selection of "Done" in user interface 820, device 500 designates the proposed trusted location 824 as a trusted location for the object, and in response to detecting selection of "Cancel" in user interface 820, device 500 does not designate the proposed trusted location 824 as a trusted location for the object.

FIG. 8M illustrates the separation alert 808 of FIG. 8K. In FIG. 8M, device 500 detects selection of selectable option 812*a* for displaying additional information about the object (e.g., via a tap of contact 803). In response to the selection of selectable option 812*a*, device 500 displays user interface 828 (e.g., of an object and/or device location tracking application installed on device 500, as described in this disclosure). User interface 828 includes a representation of a map that includes the last known location for the object, a representation (e.g., icon) 830 of the object at a location on the map corresponding to the last known location for the object, and user interface element or "card" 832 for the object. User interface element 832 includes information 834 about the object, including one or more of a representation (e.g., icon) of the object, an indication of the last known location of the object (e.g., "Near Main St."), or an indication of a time at which the last known location of the object was last updated (e.g., "Last Seen 5 m [minutes] ago").

If the object has been determined by device 500 to have been left behind at a location (e.g., based on a geofence or based on a Bluetooth (or other) connection status between device 500 and the object), user interface element 832 for the object also includes a selectable option 836 that is selectable to designate the last known location of the object as a trusted location for the object. Selectable option 836 optionally also includes an indication of the last known location of the object, such as an address of the last known location of the object. User interface 832 also includes a selectable option 838 that is selectable to cause the object to emit an audible sound (e.g., to aid a user in locating the object), and a selectable option 840 that is selectable to initiate a process to locate the object, as is described in more detail with reference to methods 1100 and 1300. Selectable option 840 optionally includes an indication of a current distance between device 500 and the last known location of the object, and an indication of an estimated time for walking/driving/cycling/etc. from the current location of device 500 to the last known location of the object.

In FIG. 8N, device 500 detects selection of selectable option 836 (e.g., via a tap of contact 803). In response, device 500 displays user interface 820, as shown in FIG. 8O. User interface 820 in FIG. 8O optionally has one or more of the characteristics of user interface 820 in FIG. 8L.

FIG. 8P illustrates user interface 828, as previously described. In some embodiments, user interface element 832 includes a trusted locations region 842, as shown in FIG. 8P, that indicates the trusted locations (if any) that have been designated for the object with which user interface 832 is associated. In FIG. 8P, device 500 detects touchdown of contact 803 in user interface element 832, and movement of contact 803 upward on touch screen 504, as shown in FIG. 8Q. In response, device 500 displays more of user interface element 832 as it has been dragged upwards in user interface 828, as shown in FIG. 8Q. As shown in FIG. 8Q, the trusted locations region 842 of user interface element 832 includes a listing of trusted locations that have already been designated for the object (e.g., "Home", which optionally corresponds to the home address of the user of device 500), and a selectable option 844 that is selectable to manage the locations that are designated as trusted locations for the object.

Figure 8S:
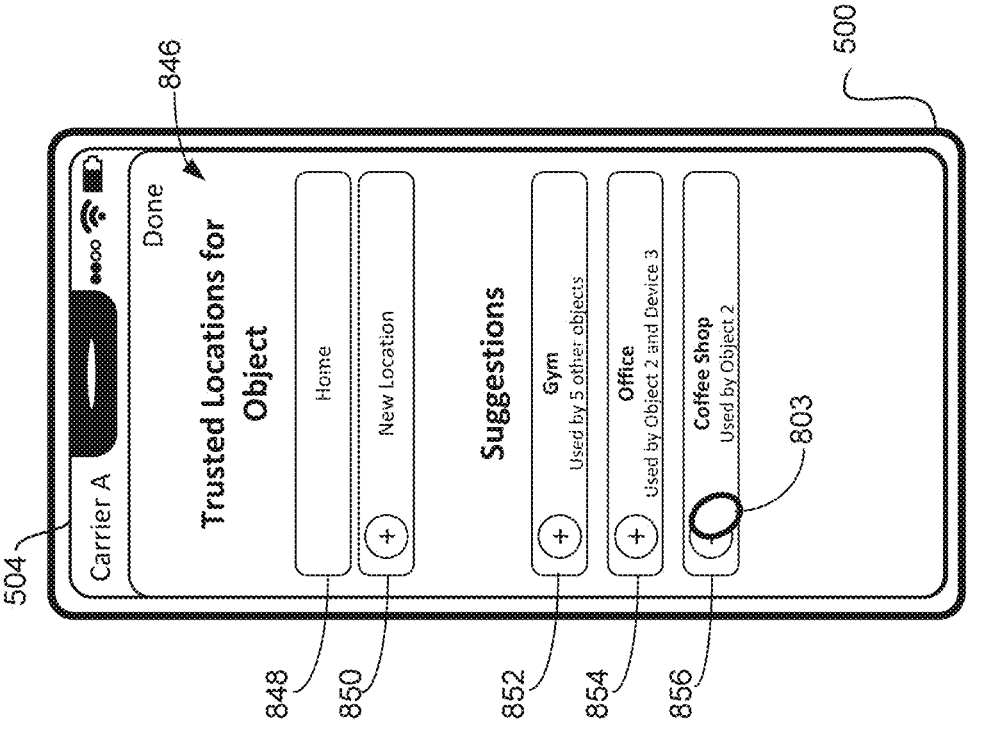
Figure 9A:
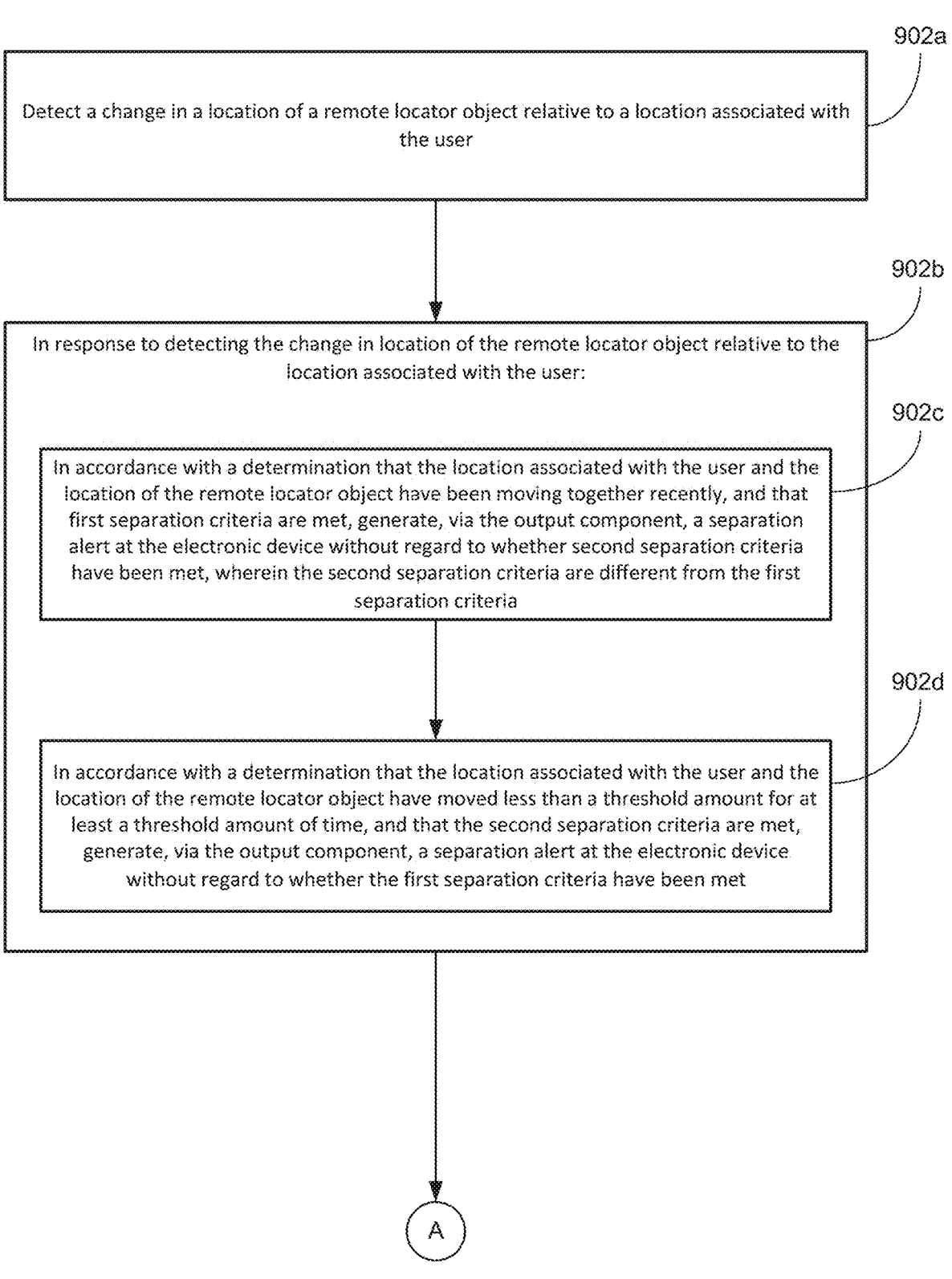
Figure 9B:
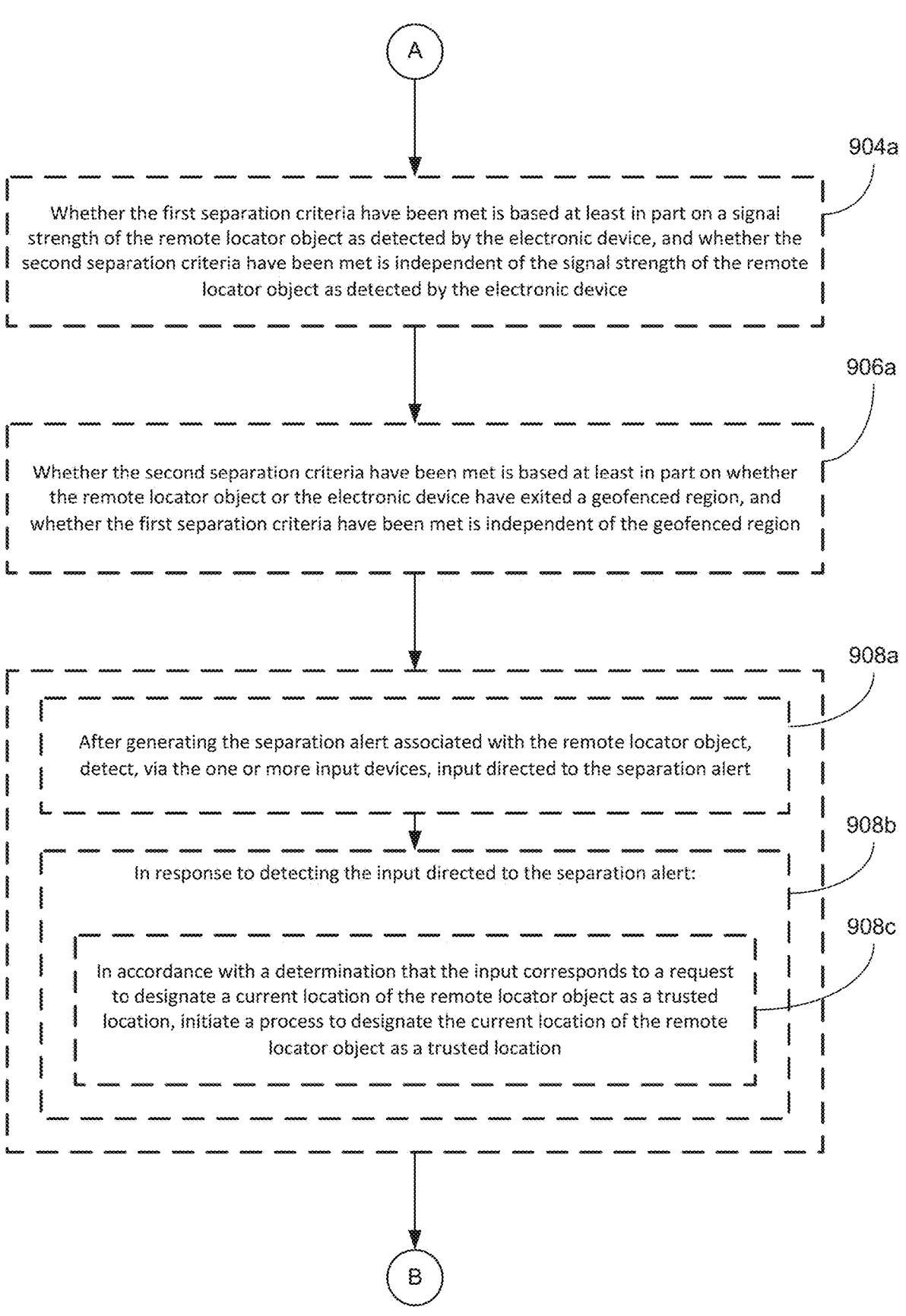
Figure 9C:
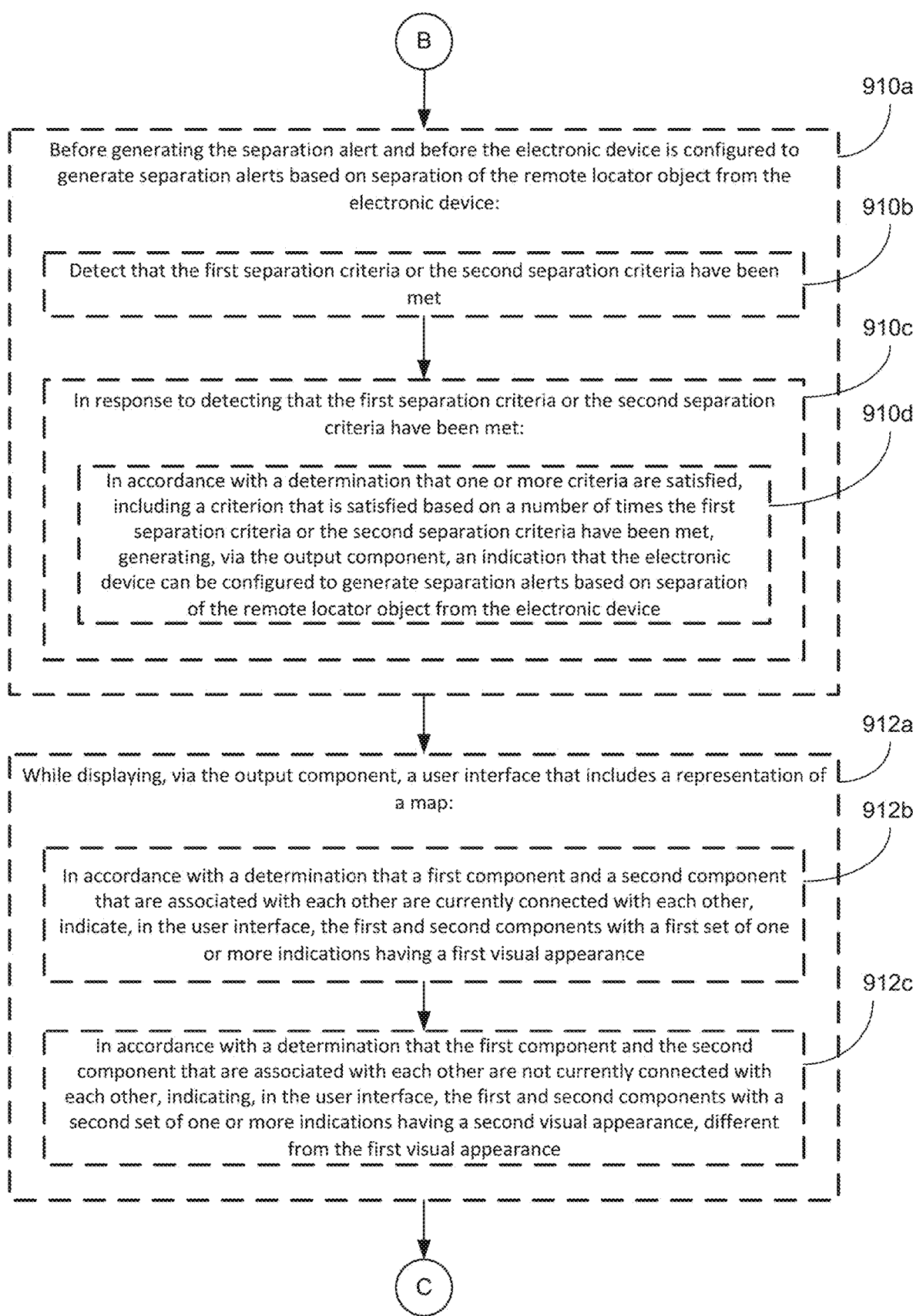
Figure 9D:
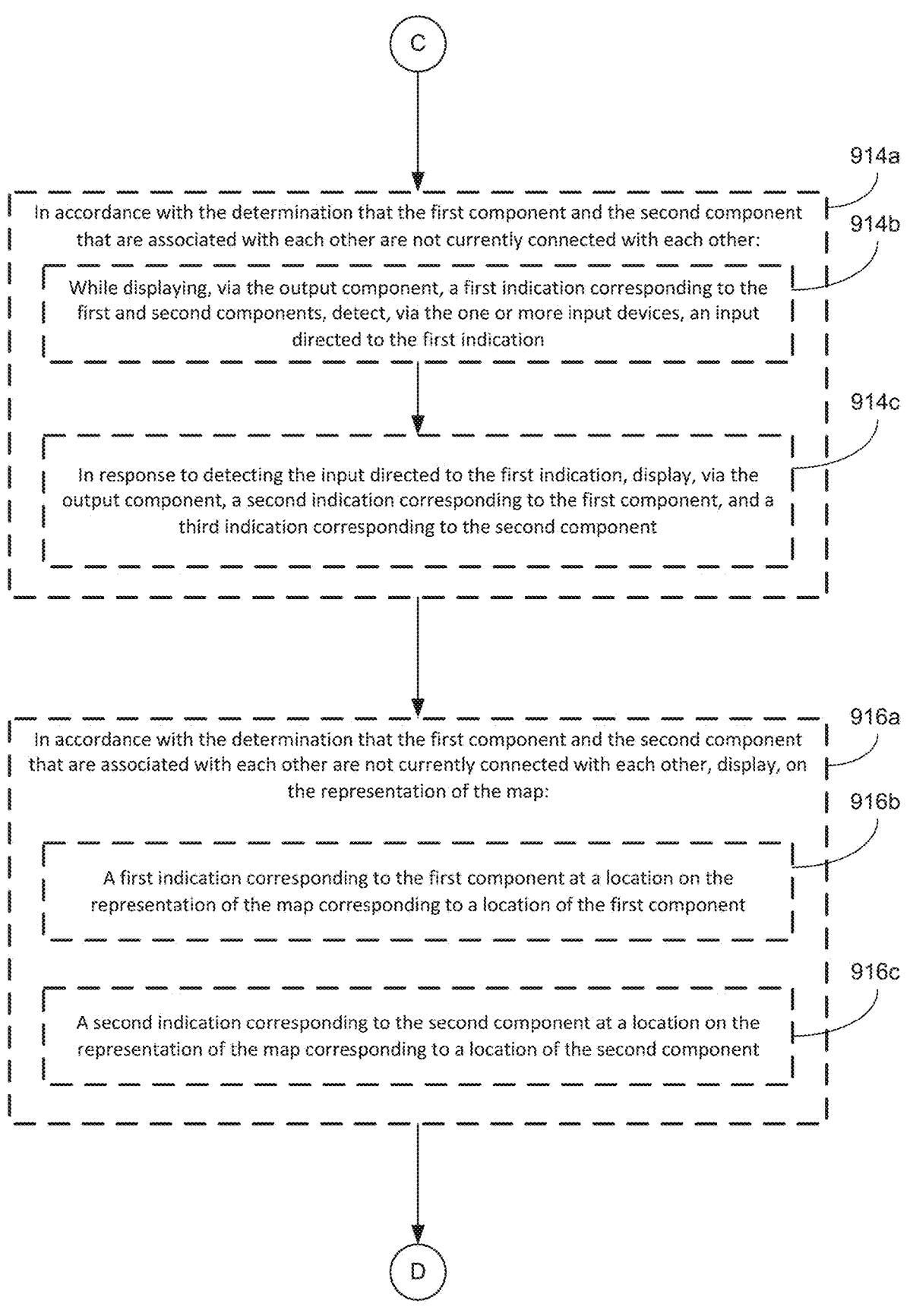
Figure 9G:
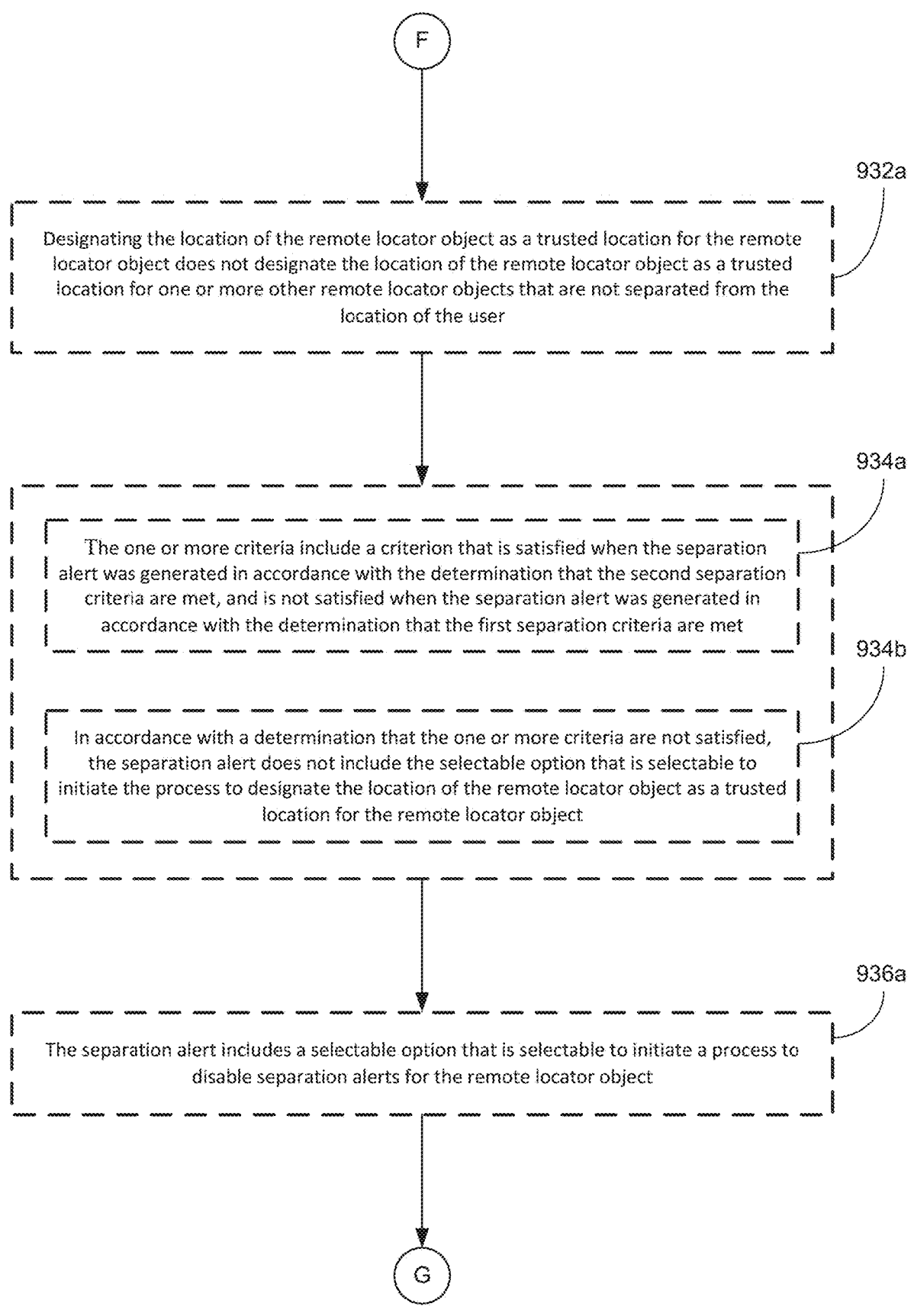
Figure 9H:
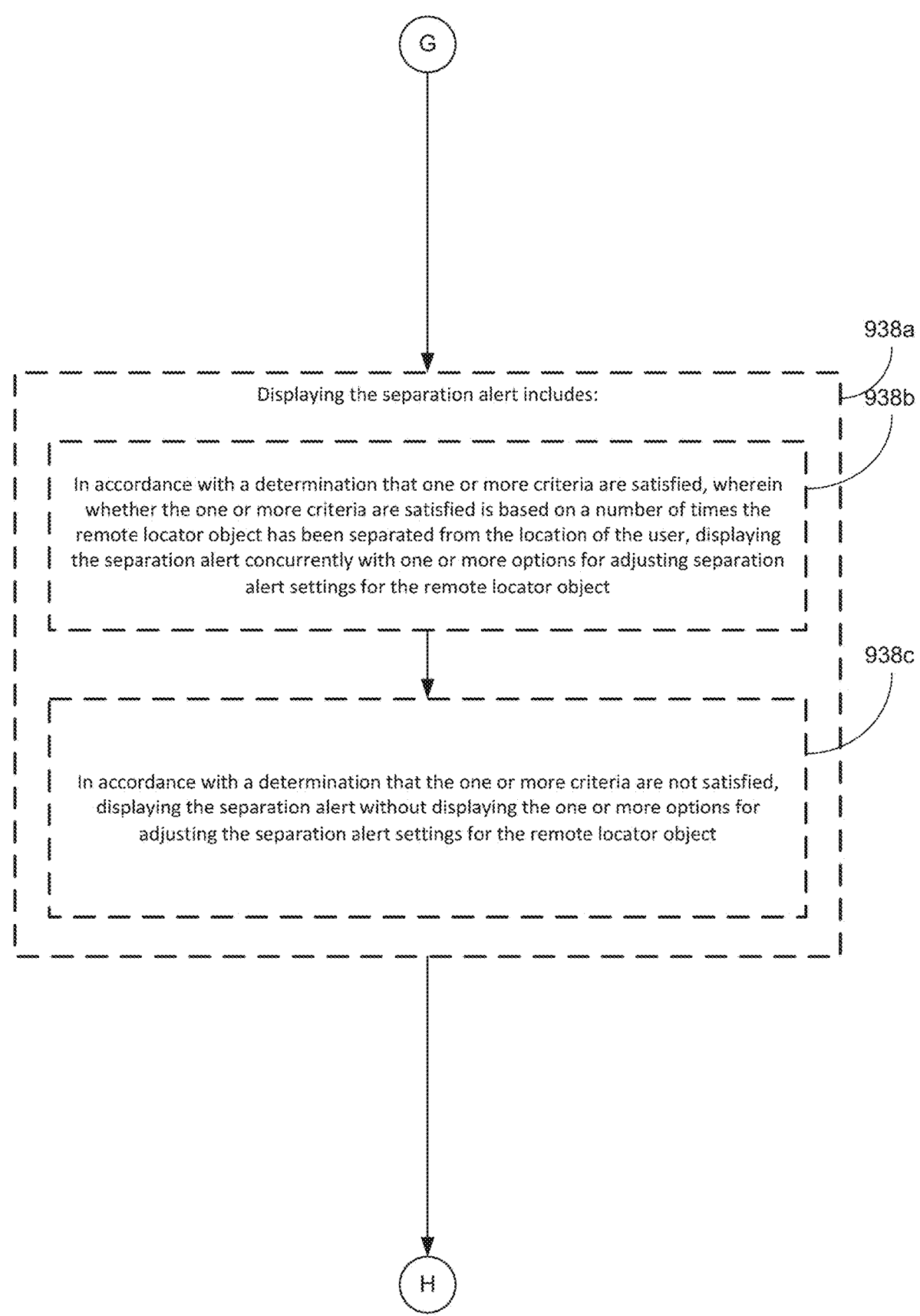
Figure 9I:
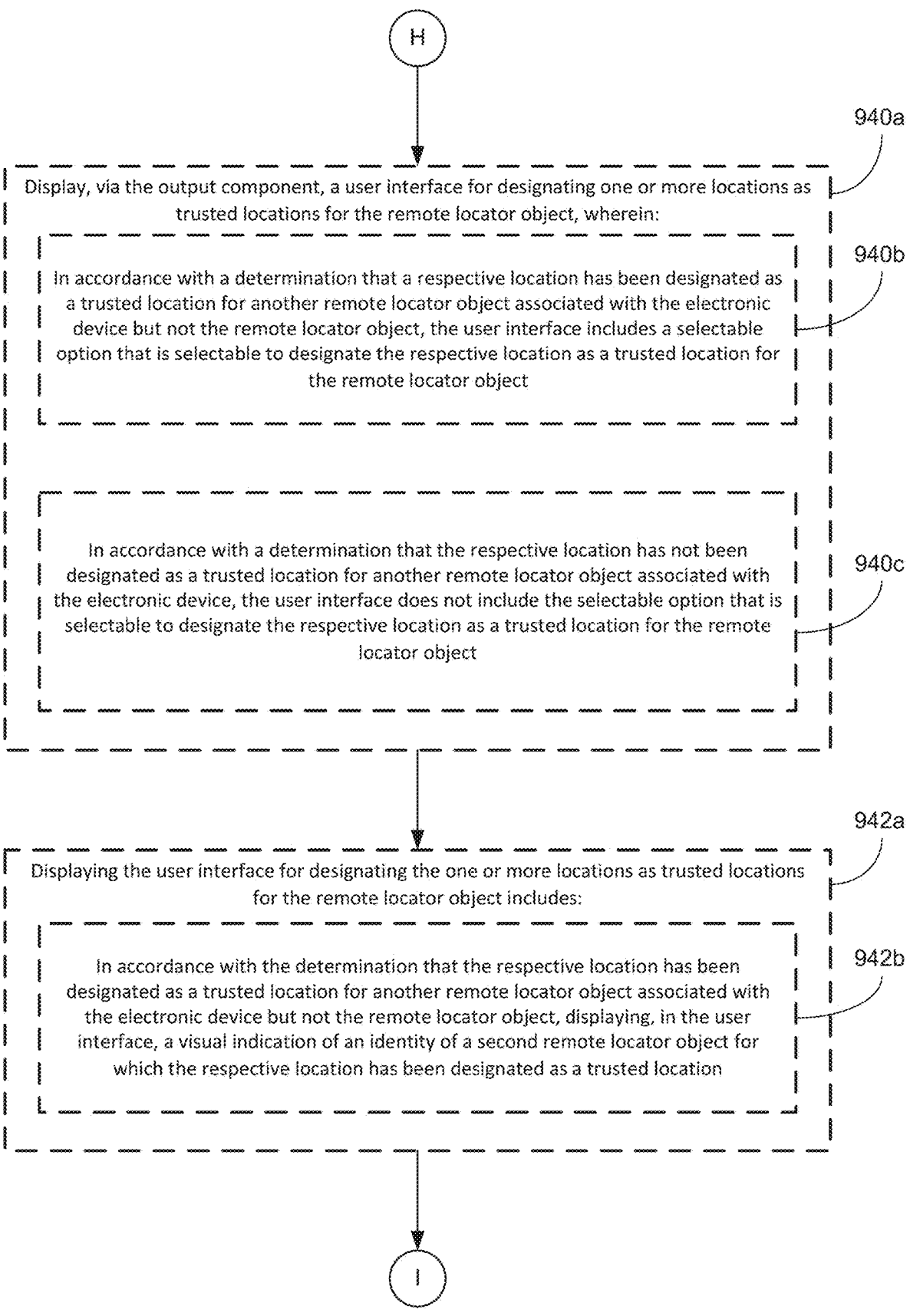

In FIG. 8R, device 500 detects selection of selectable option 844. In response, device 500 displays user interface 846, as shown in FIG. 8S, which is a user interface for managing the trusted locations for the object. User interface 846 includes a first region that includes representations of the current trusted locations for the object (e.g., representation 848 corresponding to "Home"), and a second region that includes representations of trusted locations that are suggested by device 500 as potential trusted locations for the object. The first region also includes a selectable option 850 that is selectable for the user to manually designate a trusted location for the object. Representation 848 is optionally selectable to display additional information about the "Home" trusted location (e.g., an address for "Home", a map of the area including "Home", the object(s) for which "Home" is designated as a trusted location, etc.), and representation(s) of suggested trusted locations in the second region are optionally similarly selectable to display additional information about those respective suggested trusted locations.

As mentioned above, the second region of user interface 846 includes representations of one or more suggested locations as potential trusted locations for the object. The locations included in the second region are optionally locations that are already designated as trusted locations for other objects or devices associated with the user of device 500 and/or for which device 500 is configured to track locations and/or generate separation alerts. For example, in FIG. 8S, user interface 846 includes representation 852 corresponding to the "Gym" trusted location, representation 854 corresponding to the "Office" trusted location, and representation 856 corresponding to the "Coffee Shop" trusted location. Representations 852, 854 and 856 optionally include information about which objects and/or how many objects use their respective locations as trusted locations. For example, representation 852 includes an indication of how many other objects (other than the object with which user interface 846 is associated) use the "Gym" as a trusted location. Additionally or alternatively, representation 854 includes an indication that the "Office" is used by Object 2 and Device 3 as a trusted location, and representation 856 includes an indication that the "Coffee Shop" is used by Object 2 as a trusted location. In some embodiments, if none of the other objects or devices associated with the user of device 500 and/or for which device 500 is configured to track locations and/or generate separation alerts has a trusted location designated, user interface 846 does not include suggested trusted locations for the object.

In some embodiments, representations 852, 854 and 856 (or the (+) indications in representations 852, 854 and 856) are selectable to designate their corresponding locations as a trusted location for the object. For example, in FIG. 8S, device 500 detects selection of representation 856 (e.g., via a tap of contact 803). In response, device 500 designates the "Coffee Shop" as a trusted location for the object, as shown in FIG. 8T. Representation 856 of the "Coffee Shop" is removed from the second region of user interface 846, and is now displayed in the first region of user interface 846. Further, representations of trusted locations in the first region (or the (−) indications in the representations of trusted locations) are optionally selectable to remove those locations as trusted locations for the object. For example, in FIG. 8T, if device 500 were to detect selection of representation 856, device 500 would optionally remove the "Coffee Shop" as a trusted location for the object, would remove representation 856 from the first region of user interface 846, and would optionally display representation 856 in the second region of user interface 846. In some embodiments, because at least one trusted location is required for an object for device 500 to generate separation alerts for that object (as previously described), device 500 does now allow all trusted locations to be removed for the object in user interface 846. In some embodiments, device 500 does not allow removal of the "Home" trusted location (as shown in FIG. 8T by the lack of a (−) indication in representation 848). In some embodiments, device 500 instead prevents the removal of the last-remaining trusted location for the object.

FIGS. 9A-9J are flow diagrams illustrating a method 900 of displaying notifications of a separation with a remote locator object (and/or device) in accordance with some embodiments, such as in FIGS. 8A-8T. The method 900 is optionally performed at an electronic device such as device 100, device 300, or device 500 as described above with reference to FIGS. 1A-1B, 2-3, 4A-4B and 5A-5H. Some operations in method 900 are, optionally combined and/or order of some operations is, optionally, changed.

As described below, the method 900 provides ways to display notifications of a separation with a remote locator object (and/or device). The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device (e.g., device 500) in communication with one or more wireless antenna, an output component, and one or more input devices (e.g., a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.).

In some embodiments, the electronic device detects (902a) a change in a location of a remote locator object relative to a location associated with the user, such as "Phone" and "Object 1" and/or "Object 2" changing locations relative to one another in FIGS. 8A through 8J-2 (e.g., detecting a change in the location of the electronic device while the remote locator object remains stationary, detecting a change in the location of the remote locator object while the electronic device remains stationary, or detecting that the remote locator object and the electronic device moved in different directions or by different amounts). In some embodiments, detecting the change includes monitoring (e.g., continuously or periodically) the position of the remote locator object (e.g., absolute position or position relative to the electronic device) and/or the position of the device (e.g., absolute position or position relative to the remote locator object). In some embodiments, the location information is obtained via one or more sensors such as a GPS locator, a compass, etc. In some embodiments, a remote locator object is capable of transmitting location data to the electronic device. For example, a remote locator object optionally includes a GPS locator. In some embodiments, a remote locator object does not include location tracking capability and relies on other electronic devices to receive location data. In some embodiments, the indication of the change in location of the remote locator object is received from a server or another electronic device. In some embodiments, the detecting of the change in the location of the remote locator object occurs while the remote locator object is associated with a user. In some embodiments, the remote locator object is setup to be associated with the user of the electronic device. In some embodiments, a remote locator object is a device with a battery, one or more wireless antenna and a processor (e.g., a low power processor) that enables the device to function as a special-purpose remote locator object when associated with another physical object (e.g., wallet, purse, backpack, suitcase, car, set of keys, or the like). In some embodiments, the remote locator object is a multi-purpose device with location tracking capabilities such as a smartphone, tablet, computer, or watch. In some embodiments, a remote locator object is capable of transmitting location data to the electronic device. For example, a remote locator object optionally includes a GPS locator. In some embodiments, a remote locator object does not include location tracking capability and relies on other electronic devices to receive location data. In some embodiments, a remote locator object is able to wirelessly communicate with other electronic devices, such as the electronic device (e.g., over Bluetooth, RF, IR, NFC, Wi-Fi, etc.). In some embodiments, the remote locator object has an uninitialized state and an initialized state. For example, when the remote locator object is first manufactured, the remote locator object is in an uninitialized state. In the uninitialized state, the remote locator object is optionally not assigned a label and/or associated with any particular user, user account or electronic device. In the initialized state, the remote locator object is optionally assigned a label and/or associated with a respective user, user account and/or electronic device (e.g., the electronic device).

In some embodiments, in response to detecting the change in location of the remote locator object relative to the location associated with the user (902c), in accordance with a determination that the location associated with the user and the location of the remote locator object have been moving together recently (e.g., such as Phone and Object moving together recently in FIG. 8C), and that first separation criteria are met, such as the connection between Phone and Object being broken as indicated in schematic 802c in FIG. 8C (e.g., if the user and the remote locator object have recently (e.g., within the past 5 minutes, 30 minutes, 1 hour, 3 hours, 8 hours, 12 hours, etc.) been within a threshold distance of each other (e.g., 6 inches, 1 foot, 3 feet, 10 feet, etc.) and have moved (e.g., more than a threshold amount) together (e.g., moved while not becoming further than the threshold distance apart). In some embodiments, the first separation criteria includes a requirement that the electronic device, the user of the electronic device, and/or the remote locator object are currently moving (e.g., changing locations, optionally moving by at least a threshold amount such as more than 3 feet, 10 feet, 30 feet, 200 feet, etc., and/or moving at a velocity greater than a threshold velocity such as 1, 2, 5, 10, 20 feet/second and/or has been moving for a threshold amount of time such as 1 minute, 5 minutes, 30 minutes, 1 hour, 2 hours, etc.) and/or has not been stationary (e.g., has not moved by more than the threshold amount) for at least a threshold amount of time (e.g., 1 minute, 5 minutes, 30 minutes, 1 hour, 2 hours, etc.). In some embodiments, the criterion is satisfied if either the electronic device or the remote locator object (or both) are moving (e.g., optionally moving together, within a threshold distance from each other, such as 1 foot, 3 feet, 10 feet, 50 feet, etc.) optionally until, for example, the first separation criteria is satisfied (e.g., until the remote locator object becomes separated from the electronic device). In some embodiments, the first separation criteria are satisfied if the remote locator object and the electronic device lose wireless connectivity (e.g., Bluetooth connectivity, NFC connectivity, etc.). For example, the remote locator object is paired with the electronic device via a Bluetooth connection and while the device is in motion, the Bluetooth connection between the remote locator object and the electronic device is lost (e.g., the remote locator object moves out of the effective range of Bluetooth connectivity such that the Bluetooth connection is broken). In such a scenario, the device optionally determines (e.g., optionally after the connection has been lost for a threshold amount of time without reconnecting, such as 5 seconds, 30 seconds, 1 minute, 5 minutes, etc.), that the remote locator object has been separated from the electronic device and thus the first separation criteria are satisfied. Thus, in some embodiments, if the electronic device and the remote locator object are not stationary for a threshold amount of time, the wireless connectivity between the remote locator object and the electronic device is used to determine whether the remote locator object is still with the electronic device or has been separated from the electronic device.), the electronic device generates (902c), via the output component, a separation alert at the electronic device without regard to whether second separation criteria have been met, wherein the second separation criteria are different from the first separation criteria, such as separation alert 808 in FIG. 8C (e.g., displaying a notification or other alert at the electronic device indicating that the remote locator object is no longer with the user and/or electronic device and/or that the remote locator object has been separated from the user and/or electronic device). In some embodiments, the notification is selectable to display information associated with the remote locator object, such as to display the current location or the most recent known location of the remote locator object.

In some embodiments, in accordance with a determination that the location associated with the user and the location of the remote locator object have moved less than a threshold amount for at least a threshold amount of time (e.g., such as Phone and Object being relatively stationary in FIG. 8B), and that the second separation criteria are met, such as Phone leaving geofence 806 in FIG. 8B (e.g., if the electronic device, the user of the electronic device, and/or the remote locator object are determined to not be moving and/or are stationary (e.g., not changing locations, or optionally not moving by at least a threshold amount such as more than 3 feet, 10 feet, 30 feet, 200 feet, etc.) for at least a threshold amount of time (e.g., 1 minute, 5 minutes, 30 minutes, 1 hour, 2 hours, etc.). In some embodiments, the second separation criteria are based on the geographical location of the remote locator object and/or the electronic device. In some embodiments, in response to determining that the electronic device and/or the remote locator object has remained at a respective location (e.g., at a particular geographic location, at a particular GPS location, at a particular place of business, at a particular defined location, such as home or work, etc.) for the threshold amount of time, the location of the remote locator object and/or the electronic device is identified as the settled location of the remote locator object and/or electronic device such that if the remote locator object and/or the electronic device leave the settled location without the other (e.g., the electronic device leaves without the remote locator object or the remote locator object leaves without the electronic device), then it is determined that the remote locator object has been separated from the electronic device and the second separation criteria are met. For example, a geographical "fence" (e.g., a geofence with a predetermined size, such as 3 feet, 10 feet, 50 feet, 150 feet, ¼ mile, or a dynamic size based on the size of the location where the remote locator object is determined to be, such as the size of the building, size of the landmark, etc.) is created around the settled location of the remote locator object such that if the remote locator object and/or electronic device exits the geofence without the other device, an alert is triggered. In some embodiments, if the electronic device and/or remote locator object move within the area of the settled location (e.g., within the place of business, within the building, within a threshold distance such as 3 feet, 10 feet, 50 feet, 150 feet, ¼ mile, etc.), but do not leave the settled location, then the remote locator object is not determined to be separated from the electronic device and the second separation criteria are not met, optionally even if the remote locator object is not near the electronic device (e.g., not within 1 foot, 3 feet, 10 feet, 30 feet, etc.) and/or optionally even if the remote locator object no longer has wireless connectivity with the electronic device (e.g., even if the first separation criteria are met).), the electronic device generates (902d), via the output component, a separation alert at the electronic device without regard to whether the first separation criteria have been met, such as the separation alert 808 in FIG. 8B (e.g., displaying a notification or other alert at the electronic device indicating that the remote locator object is no longer with the user and/or electronic device and/or that the remote locator object has been separated from the user and/or electronic device). In some embodiments, the notification is selectable to display information associated with the remote locator object, such as to display the current location or the most recent known location of the remote locator object. The above-described manner of determining whether a remote locator object is separated from the user based on either a first process or a second process (e.g., by using the first process if the first criteria are satisfied or using the second process if the second criteria are satisfied) provides a context-specific method of determining whether the remote locator object has been separated from the user, which simplifies the interaction between the user and the electronic device and enhances the operability of the electronic device and makes the user-device interface more efficient (e.g., by using the process for determining whether the remote locator object has been separated from the electronic device that is suited to the situation, which provides a more accurate and/or a faster method of determining that the remote locator object has been separated from the electronic device), which additionally reduces power usage and improves battery life of the electronic device by enabling the user to use the electronic device more quickly and efficiently.

In some embodiments, whether the first separation criteria have been met is based at least in part on a signal strength of the remote locator object as detected by the electronic device, such as the connection between Phone and Object as indicated by schematic 802c in FIG. 8C (e.g., if the wireless signal that establishes the wireless connectivity between the remote locator object and the electronic device (e.g., Bluetooth, NFC, Wi-Fi Direct, etc.), falls below a threshold level (e.g., below 50% signal strength, 30% signal strength, 10% signal strength, no signal, etc.), then the first separation criteria are satisfied), and whether the second separation criteria have been met is independent of the signal strength of the remote locator object as detected by the electronic device (904a), such as described with reference to FIG. 8B and schematic 802c in FIG. 8B (e.g., the second separation criteria is based on the geographic location of the remote locator object and/or the electronic device such that if the remote locator object and/or electronic device leave the geographic location without the other, then the second separation criteria are satisfied, without regard to the signal strength between the remote locator object and the electronic device). The above-described manner of determining whether a remote locator object is separated from the user provides a context-specific method of determining whether the remote locator object has been separated from the user, which simplifies the interaction between the user and the electronic device and enhances the operability of the electronic device and makes the user-device interface more efficient (e.g., by using criteria for determining whether the remote locator object has been separated from the electronic device that are suited to the situation, which provides a more accurate and/or a faster method of determining that the remote locator object has been separated from the electronic device), which additionally reduces power usage and improves battery life of the electronic device by enabling the user to use the electronic device more quickly and efficiently.

In some embodiments, whether the second separation criteria have been met is based at least in part on whether the remote locator object or the electronic device have exited a geofenced region, such as Phone leaving geofence 806 in FIG. 8B, and whether the first separation criteria have been met is independent of the geofenced region (906*a*), such as described with reference to FIG. 8C (e.g., the second separation criteria is based on the geographic location of the remote locator object and/or the electronic device such that if the remote locator object and/or electronic device leave the geographic location without the other, then the second separation criteria are satisfied, without regard to whether the first separation criteria are met. Similarly, the first separation criteria are satisfied optionally without regard to whether the remote locator object and/or the electronic device have left a given geographic area without the other.). The above-described manner of determining whether a remote locator object is separated from the user provides a context-specific method of determining whether the remote locator object has been separated from the user, which simplifies the interaction between the user and the electronic device and enhances the operability of the electronic device and makes the user-device interface more efficient (e.g., by using criteria for determining whether the remote locator object has been separated from the electronic device that are suited to the situation, which provides a more accurate and/or a faster method of determining that the remote locator object has been separated from the electronic device), which additionally reduces power usage and improves battery life of the electronic device by enabling the user to use the electronic device more quickly and efficiently.

In some embodiments, after generating the separation alert associated with the remote locator object, the electronic device detects (908*a*), via the one or more input devices, input directed to the separation alert, such as contact 803 in FIG. 8K (e.g., a selection input, such as a tap input on a location associated with a displayed separation alert). In some embodiments, in response to detecting the input directed to the separation alert (908*b*), in accordance with a determination that the input corresponds to a request to designate a current location of the remote locator object as a trusted location, the electronic device initiates (908*c*) a process to designate the current location of the remote locator object as a trusted location, such as user interface 820 in FIG. 8L (e.g., in response to the input directed to the separation alert, display a user interface associated with the separation alert). In some embodiments, the user interface includes information associated with the separation alert, such as information about the current location of the remote locator object, the previously known location of the remote locator object, the distance of the remote locator object from the user/electronic device, and/or the time at which the remote locator object was separated from the user. In some embodiments, the user interface includes one or more affordances to perform one or more functions, such as to navigate to the remote locator object, to find the remote locator object, to cause the remote locator object to play a sound, and/or to add the current location of the remote locator object as a trusted location for the remote locator object. In some embodiments, a trusted location is a location at which separation alerts are not triggered if a separation alert would otherwise be generated (e.g., if any of the separation criteria are satisfied), except that the remote locator object is within a threshold radius/distance of the trusted location (e.g., within 6 inches, 1 foot, 3 feet, 20 feet, 100 feet, etc.). In some embodiments, the radius of the trusted location is adjustable by the user and each trusted location has its own set radius. In some embodiments, the radius of the trusted location is automatically sized based on the location of the trusted location. For example, if the trusted location is a business's building, the size of the trusted location is the area of the business's building and if the trusted location is a park, the boundary of the trusted location is the boundary of the park, etc. In some embodiments, each remote locator object and/or device has its own unique set of trusted locations. In some embodiments, a trusted location is a trusted person. For example, when a remote locator object is determined to be with a trusted person (e.g., is following the trusted person's location or is within a certain threshold distance, such as 6 inches, 1 foot, 3 feet, 20 feet, 100 feet, etc., of the trusted person), then a separation alert is not generated. The above-described manner of designating a trusted location provides a quick and efficient way of doing so, which simplifies the interaction between the user and the electronic device and enhances the operability of the electronic device and makes the user-device interface more efficient (e.g., by not requiring input for identifying the location of the trusted location, and using the current location of the remote locator object instead), which additionally reduces power usage and improves battery life of the electronic device by enabling the user to use the electronic device more quickly and efficiently.

In some embodiments, before generating the separation alert and before the electronic device is configured to generate separation alerts based on separation of the remote locator object from the electronic device (910*a*) (e.g., the user has not yet enabled the generation of separation alerts based on the location of the remote locator object), the electronic device detects (910*b*) that the first separation criteria or the second separation criteria have been met (e.g., detecting that either the first or second separation criteria have been met, or any other trigger condition has been met, such that a separation alert is being generated, will be generated, or otherwise would have been generated (e.g., if separation alerts were enabled)). In some embodiments, in response to detecting that the first separation criteria or the second separation criteria have been met (910*c*), in accordance with a determination that one or more criteria are satisfied, including a criterion that is satisfied based on a number of times the first separation criteria or the second separation criteria have been met (e.g., if the first or second separation criteria have never before been satisfied based on the location of the remote locator object, if this is the first time the first or second criteria have been satisfied based on the location of the remote locator object, or if the number of times the first or second separation criteria have been satisfied is within a threshold number of times (e.g., first time, first 5 times, first 10 times, etc.), then the one or more criteria are satisfied. In some embodiments, the determination is based on the number of times the separation criteria have been satisfied on the electronic device (e.g., regardless of whether separation criteria have been satisfied on other devices that are also registered to or otherwise associated with the user). In some embodiments, the determination is based on the number of times the separation criteria have been satisfied for the user of the device (e.g., across multiple devices registered to or otherwise associated with the user).), the electronic device generates (910d), via the output component, an indication that the electronic device can be configured to generate separation alerts based on separation of the remote locator object from the electronic device, such as the separation alerts 808 shown in FIGS. 8B-8C (e.g., generate a pop-up, a notification, an alert, etc., that provides information about separation alerts and/or is selectable to configure the device to generate separation alerts for the remote locator object). In some embodiments, the indication is selectable or otherwise interactable to display a user interface that includes information about separation alerts and optionally includes an affordance that is selectable to initiate a process to enable separation alerts to be generated on the electronic device (e.g., optionally for multiple electronic devices registered to the user, optionally for all remote locator objects, optionally for only the remote locator object that triggered the indication to be generated). In some embodiments, if the one or more criteria are not satisfied, the indication that the electronic device can be configured to generate separation alerts based on separation of the remote locator object from the electronic device is optionally not displayed and/or is displayed with fewer options for configuring separation alerts for the remote locator object, as will be described below. The above-described manner of facilitating configuration of separation alerts provides a quick and efficient way of configuring the electronic device to generate separation alerts for a remote locator object, which simplifies the interaction between the user and the electronic device and enhances the operability of the electronic device and makes the user-device interface more efficient (e.g., by not requiring separate, potentially erroneous input, for configuring the electronic device to generate separation alerts for the remote locator object), which additionally reduces power usage and improves battery life of the electronic device by enabling the user to use the electronic device more quickly and efficiently.

Figure 12B:
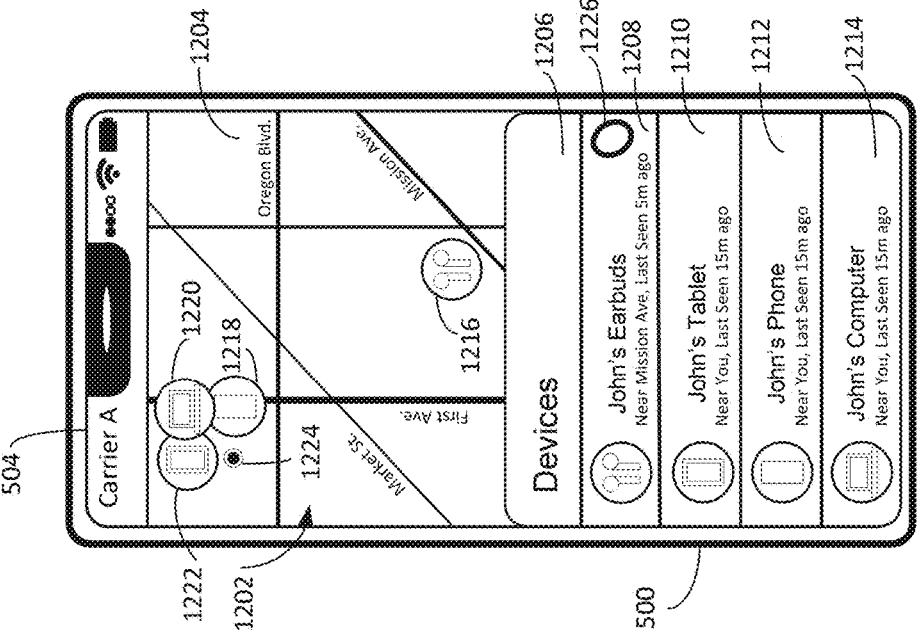
FIGS. 12A-12TT illustrate exemplary ways in which an electronic device facilitates finding associated components that are at one or more physical locations in accordance with some embodiments of the disclosure.
Figure 12A:
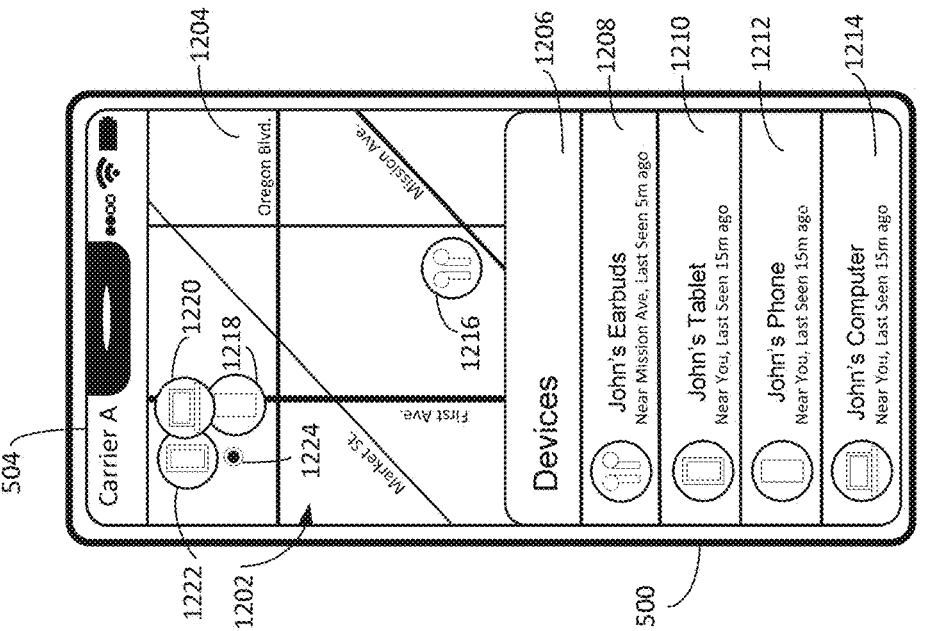
Figure 12D:
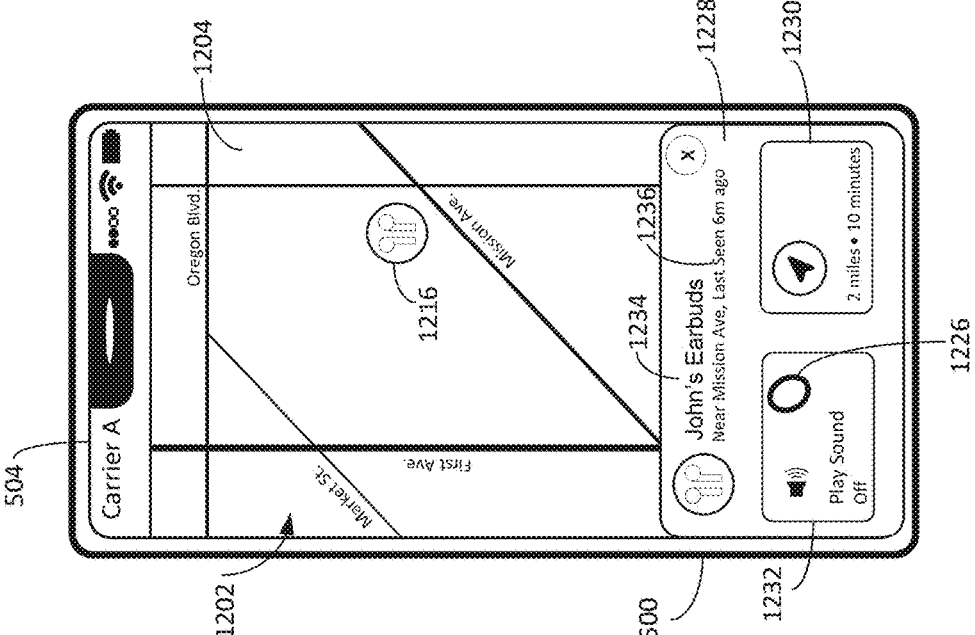
Figure 12C:
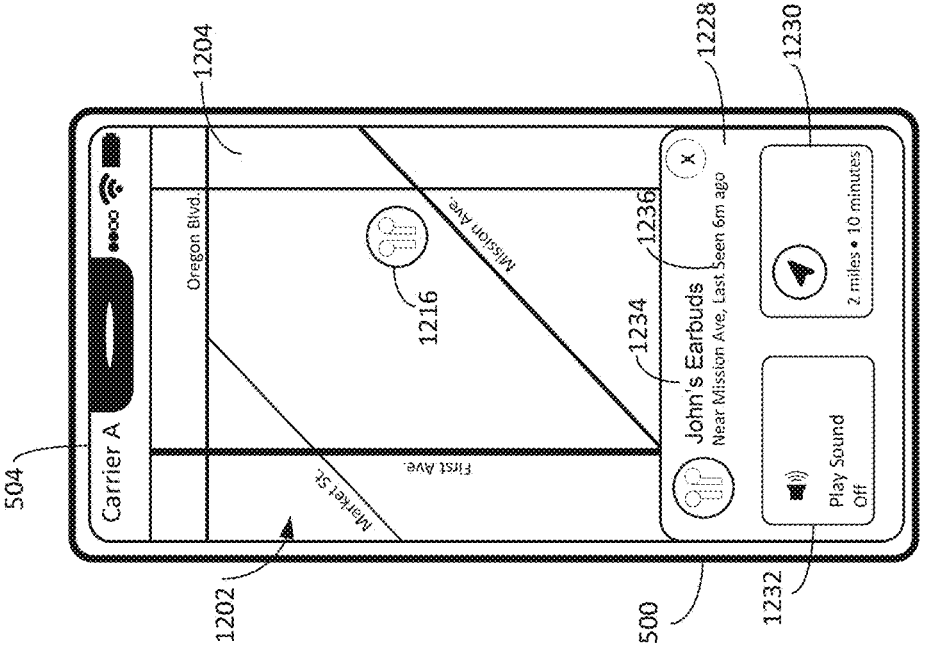
Figure 12F:
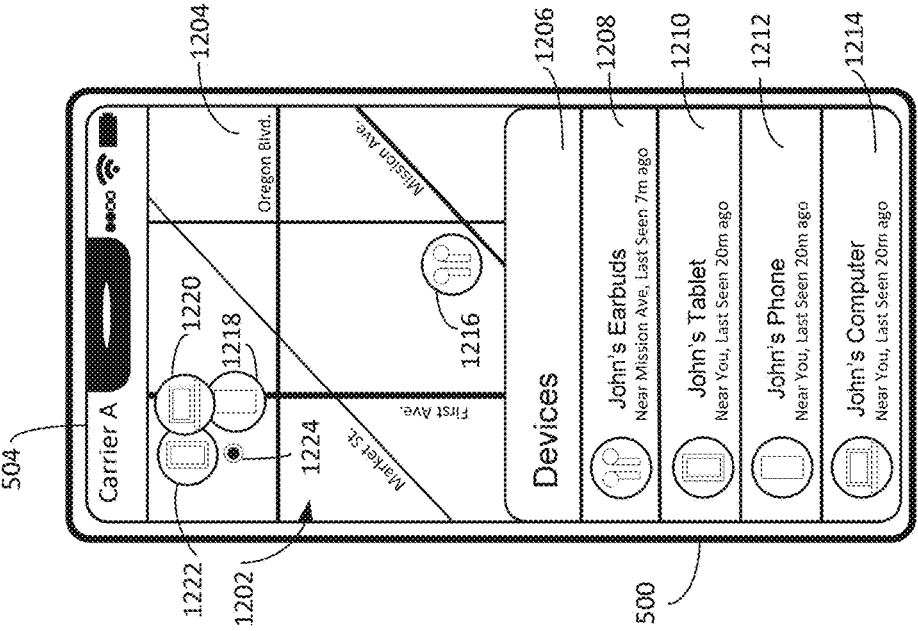
Figure 12E:
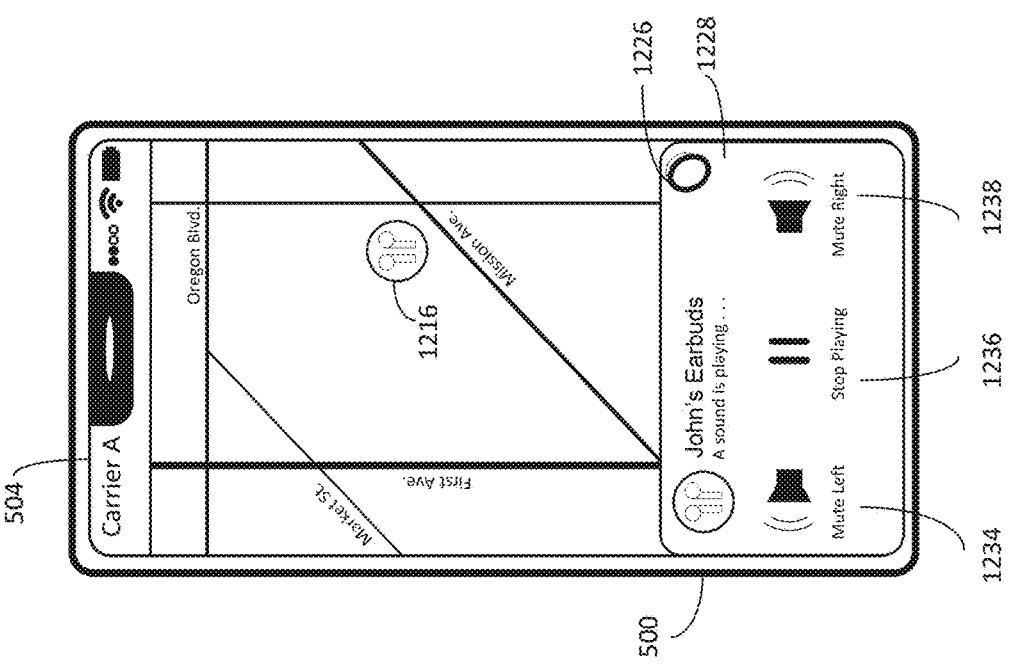
Figure 12H:
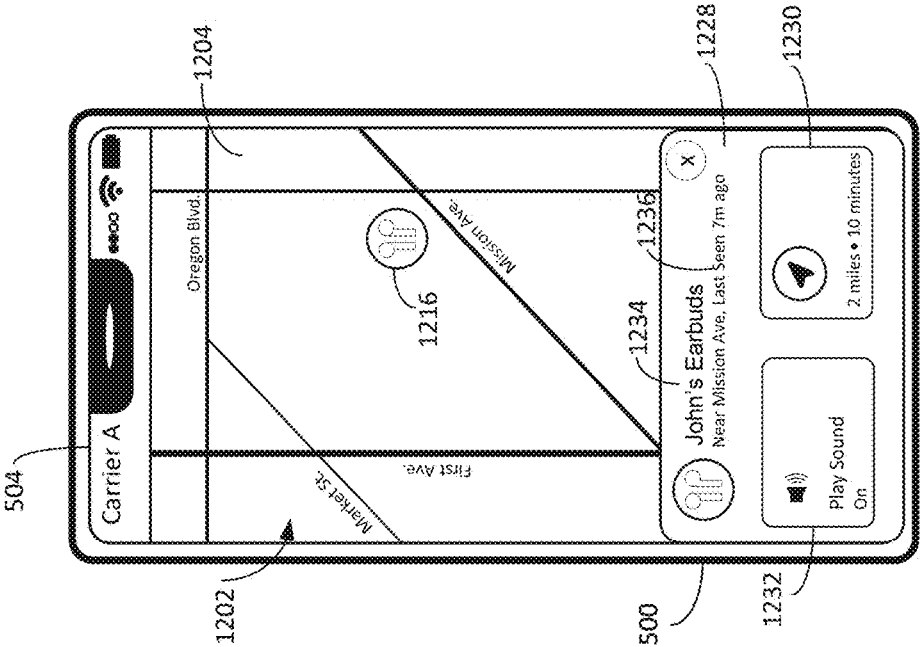
Figure 12G:
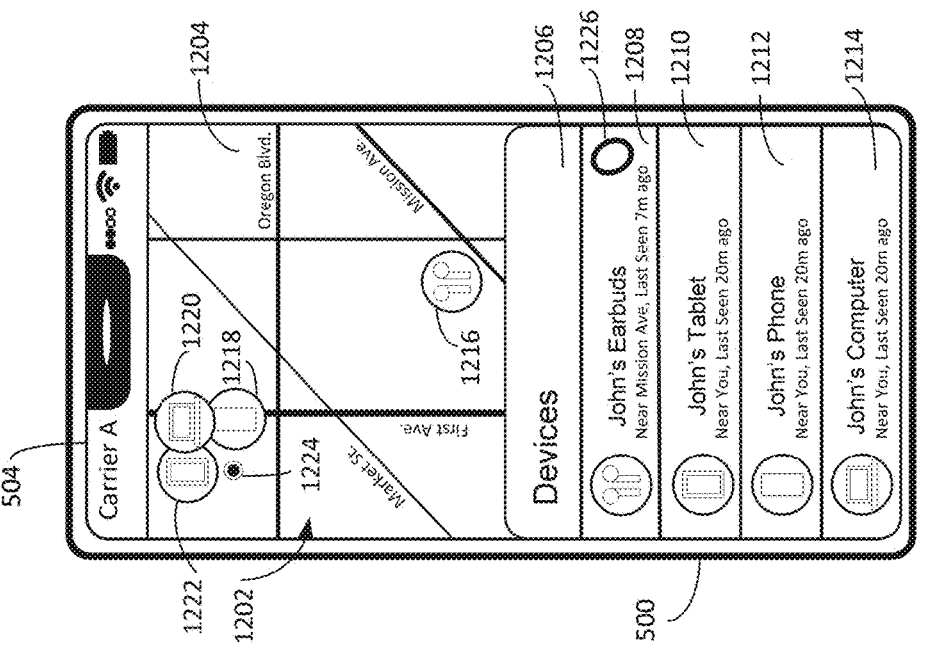
Figure 12J:
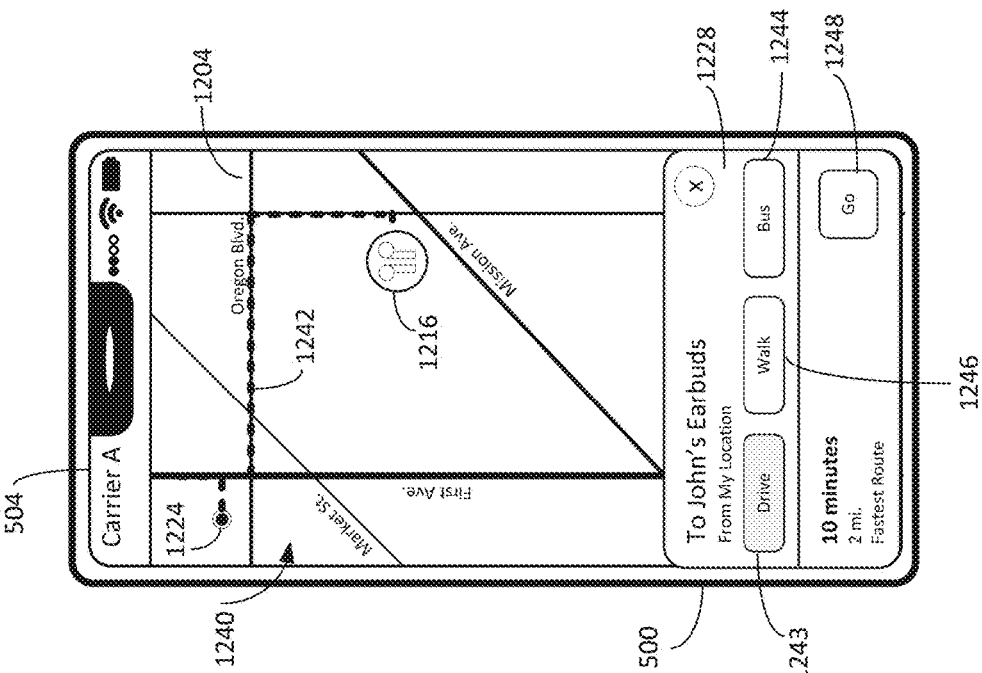
Figure 12I:
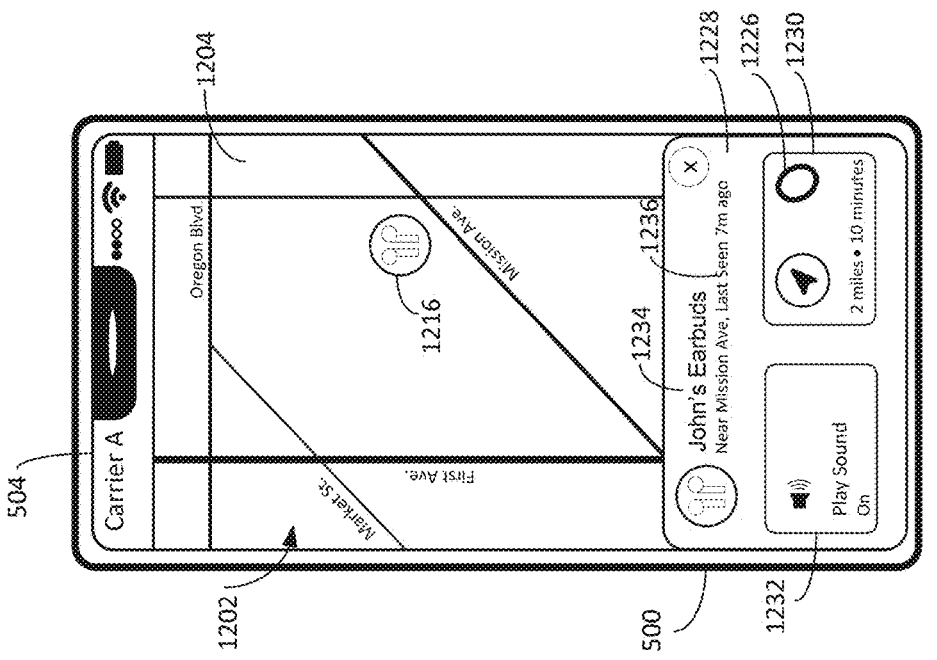
Figure 12L:
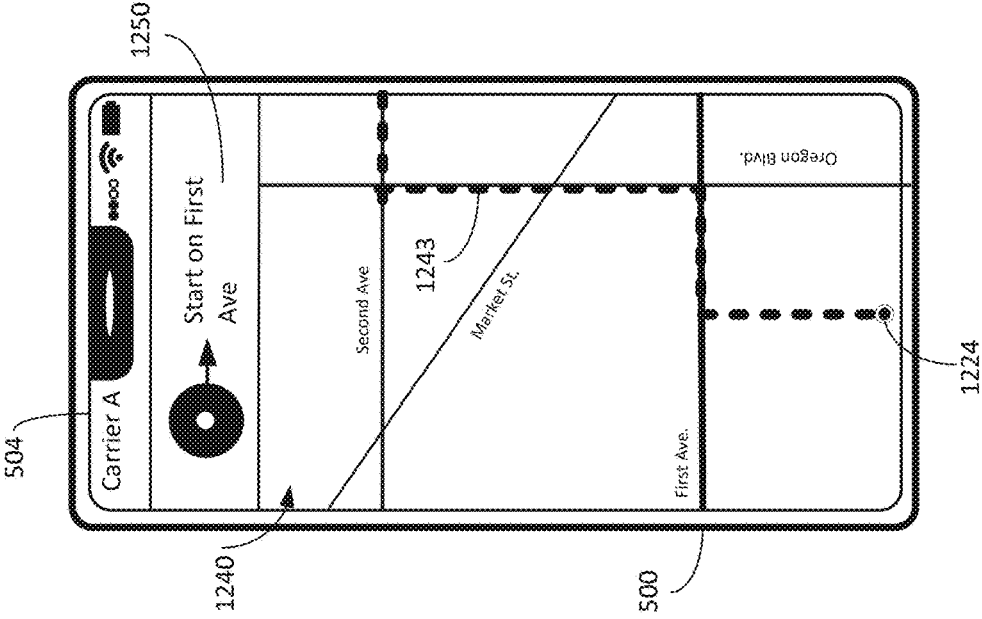
Figure 12K:
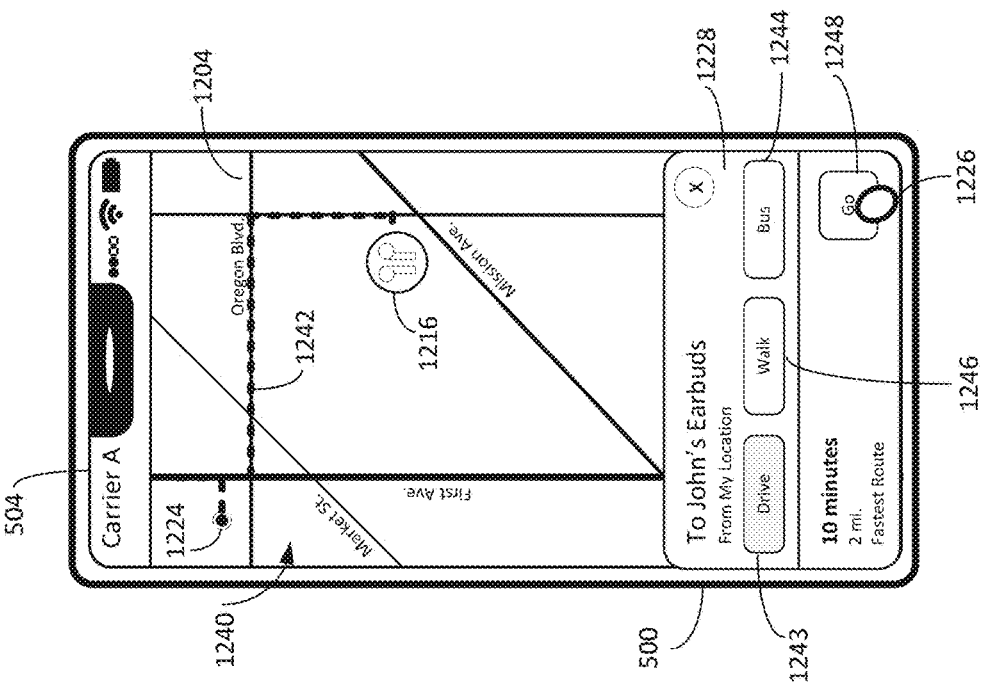
Figure 12N:
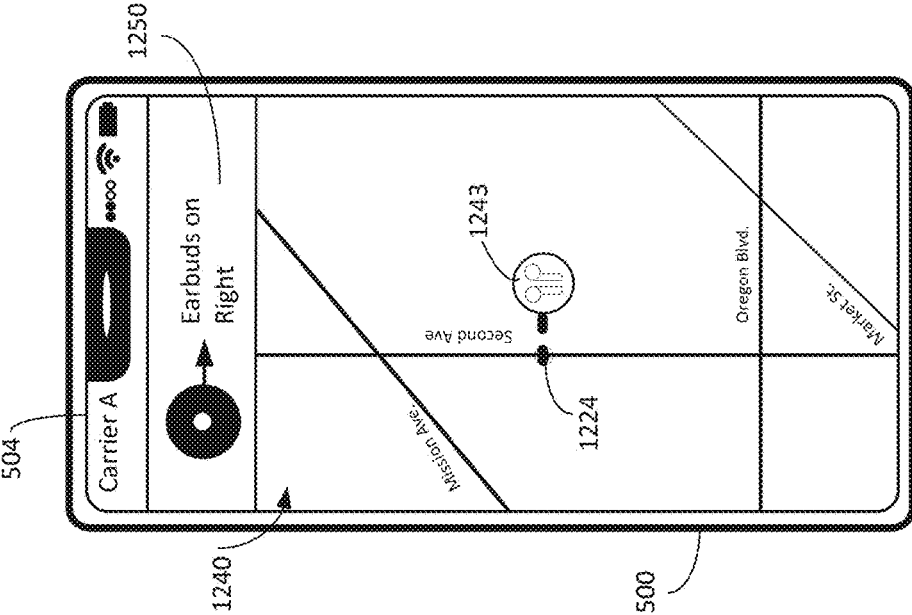
Figure 12M:
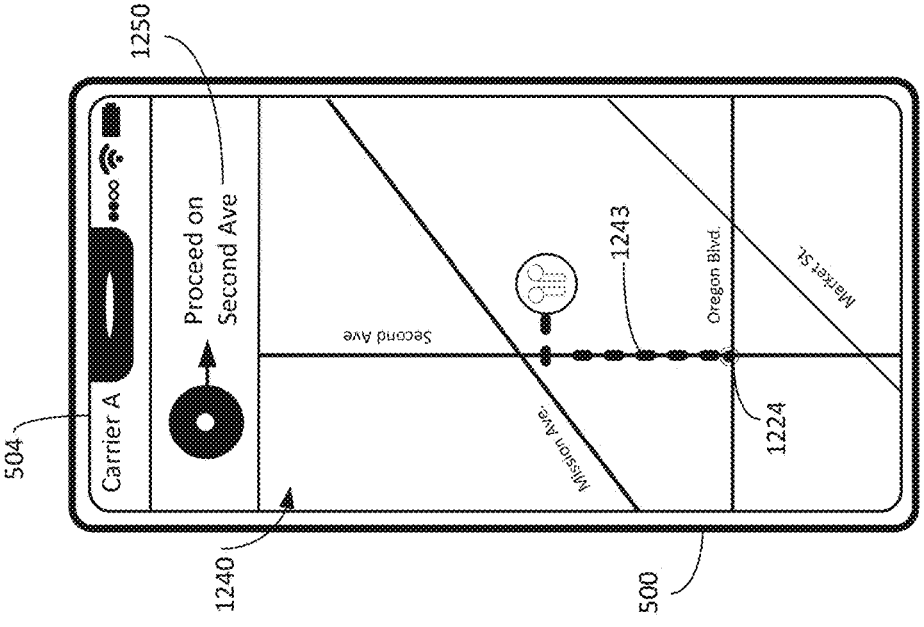
Figure 12P:
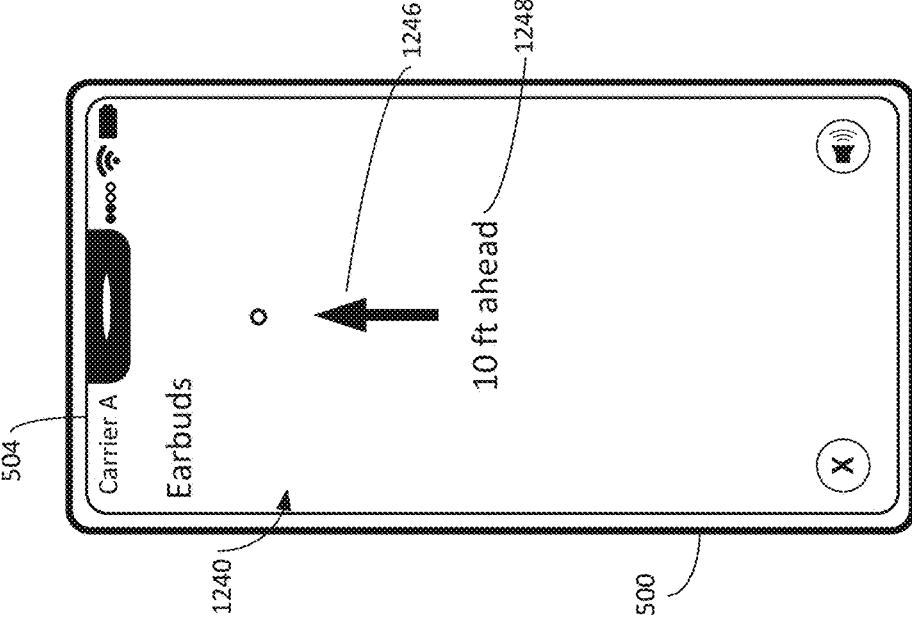
Figure 12O:
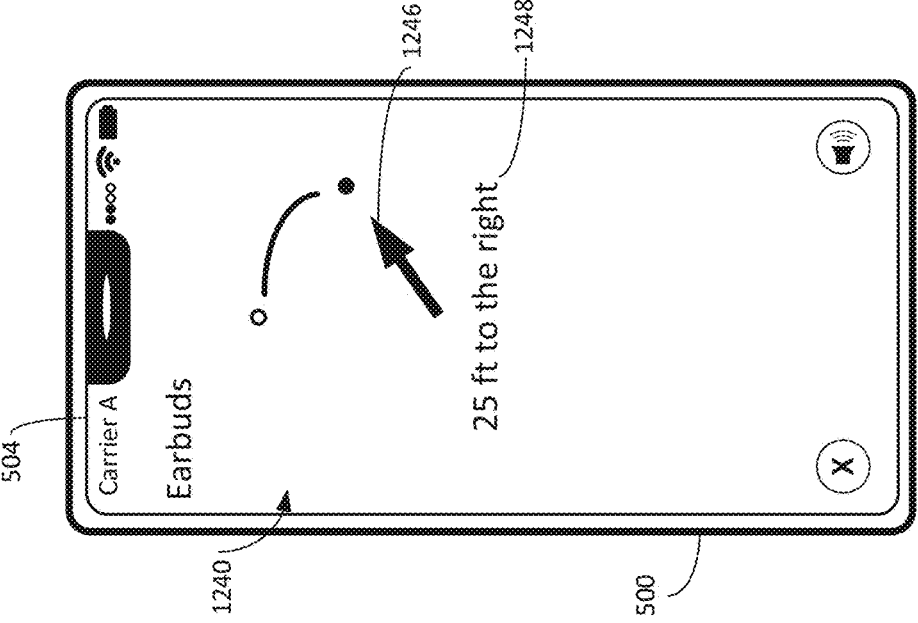
Figure 12R:
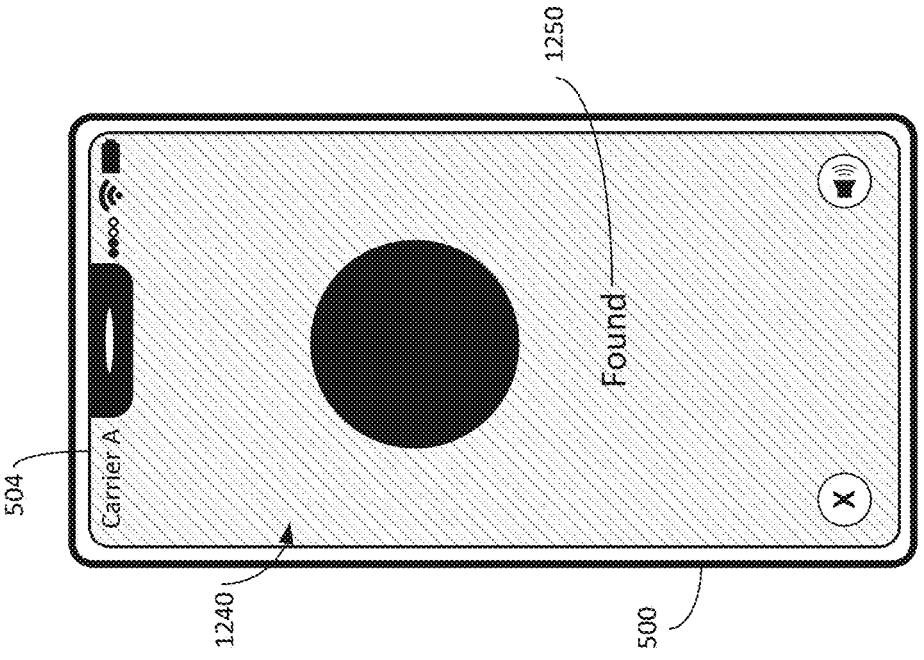
Figure 12Q:
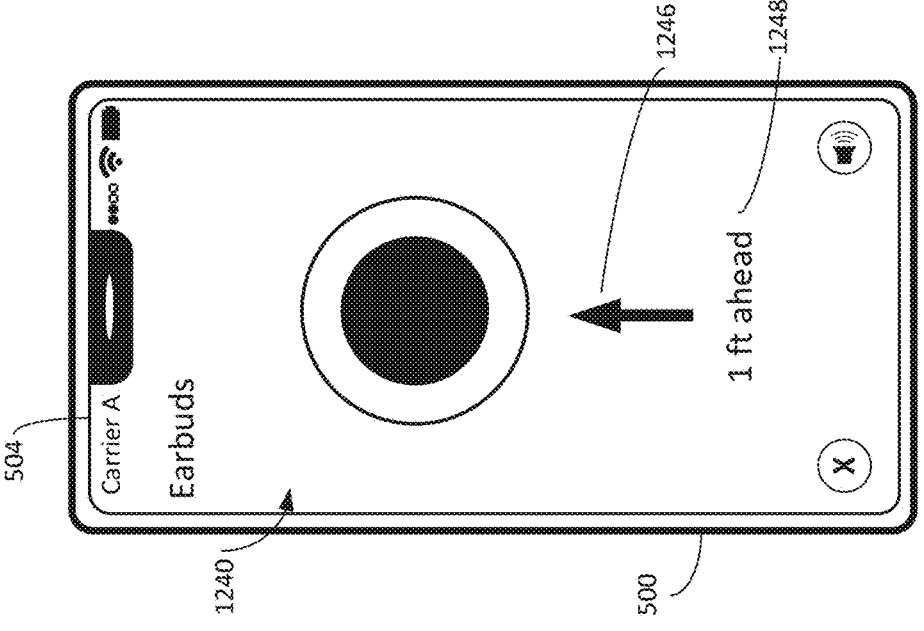
Figure 12T:
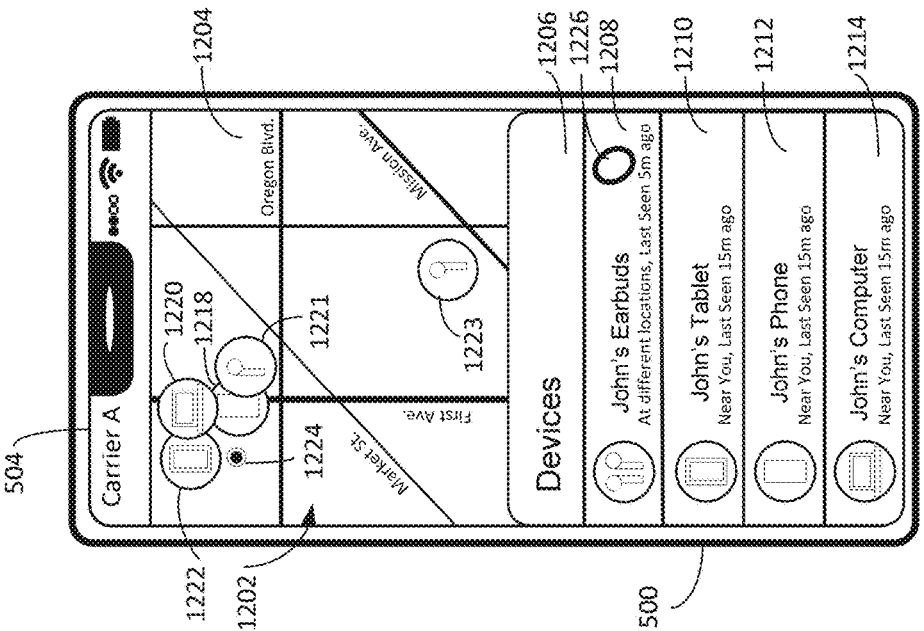

In some embodiments, while displaying, via the output component, a user interface that includes a representation of a map (912a), such as user interface 828 in FIG. 8N that optionally shares one or more characteristics of user interface 1202 in FIGS. 12A-12TT that is optionally reachable by selection of selectable option 812a (e.g., a user interface that optionally includes information about a current location of one or more tracked objects (e.g., remote locator objects, such as the remote locator object, devices, contacts who have shared location information, etc.). In some embodiments, the user interface includes a representation of a map that includes one or more representations (e.g., icons) of tracked objects at respective locations on the representation of the map corresponding to their current or last known physical locations), in accordance with a determination that a first component and a second component that are associated with each other are currently connected with each other, such as in FIG. 12A (e.g., the first and second components are components of an electronic device that can be physically separated from each other and which can be in wireless (e.g., Bluetooth, NFC, Wi-Fi, etc.) communication with each other. In some embodiments, the first and second components are left and right wireless earbuds. In some embodiments, the left and right wireless earbuds are currently connected with each other when they are both in a storage and/or charging case, when they are both in respective ears of a user, and/or when they are within a threshold distance (e.g., 1, 2, 3, 5, 10, 20, 30, 50 feet—in some embodiments, based on the wireless connectivity range of the wireless connectivity protocol with which they are connected) of each other.), the electronic device indicates (912b), in the user interface, the first and second components with a first set of one or more indications having a first visual appearance, such as indicating John's Earbuds on map 1204 with indication 1216 (e.g., displaying the first and second components in the user interface with a first visual appearance that indicates that the first and second components are connected with each other (e.g., physically and/or wirelessly)). In some embodiments, the first and second components are grouped together and treated as one object (e.g., as opposed to two separate components of the same object). In some embodiments, the electronic device displays a single representation of the set of the first and second components on the map in the user interface at the location of the set of the first and second components (e.g., as opposed to displaying separate representations of each of the first and second components on the map).

Figure 12S:
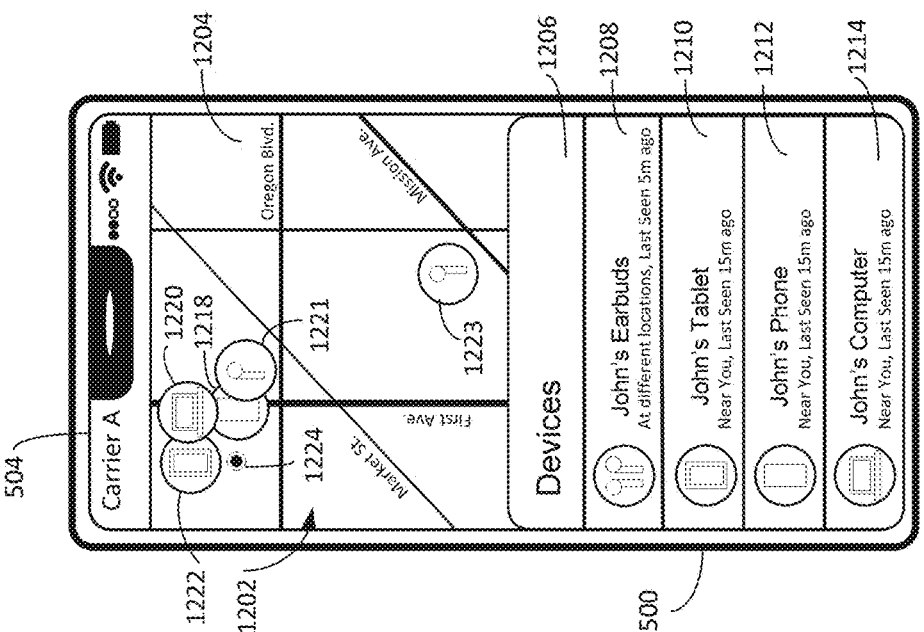

In some embodiments, in accordance with a determination that the first component and the second component that are associated with each other are not currently connected with each other, such as John's Left and Right Earbuds in FIG. 12S, the electronic device indicates (912c), in the user interface, the first and second components with a second set of one or more indications having a second visual appearance, different from the first visual appearance, such as indicating John's Left and Right Earbuds with different indications 1221 and 1223 (e.g., if the first component and second component are not physically connected with each other and/or if the first component and second component are not wirelessly connected with each other (e.g., the first and second components are out of wireless range from each other), then display the first and second components in the user interface with a second visual appearance). In some embodiments, the first and second components are displayed as separate objects in the user interface (e.g., the representation of the map includes a first indicator for the first component and a second indicator for the second component, each displayed at their respective locations on the map) such that the user is able to see that the location of the first component is different from the location of the second component. The above-described manner of displaying different indications of the first and/or second components provides a quick and efficient way of indicating appropriate location information for the components based on whether the components are connected with each other, which simplifies the interaction between the user and the electronic device and enhances the operability of the electronic device and makes the user-device interface more efficient (e.g., by not consuming display or processing resources for two separate representations when the components are connected with each other), which additionally reduces power usage and improves battery life of the electronic device by enabling the user to use the electronic device more quickly and efficiently.

In some embodiments, in accordance with the determination that the first component and the second component that are associated with each other are not currently connected with each other (914a) (e.g., determining that the first component and second component are separated by a certain amount of distance such that the first component and second component are not (e.g., cannot possibly be) connected (e.g., wirelessly) with each other (e.g., more than 50 feet, more than 500 feet, more than 1 mile, etc.), and/or receiving information from one or both components that the first component is not able to communicate with the second component and/or vice versa), while displaying, via the output component, a first indication corresponding to the first and second components (e.g., displaying one entry that corresponds to the set that includes the first and second components. For example, displaying, in a listing of tracked objects in the map user interface, an item in the list (e.g., a row in the list) that corresponds to the collection of the first and second components), the electronic device detects (914*b*), via the one or more input devices, an input directed to the first indication (e.g., a tap input on a location associated with the entry), such as selection of indication 1208 in FIG. 12S. In some embodiments, in response to detecting the input directed to the first indication, the electronic device displays (914*c*), via the output component, a second indication corresponding to the first component, and a third indication corresponding to the second component, such as indications 1252 and 1254 in FIG. 12U (e.g., expanding the first entry (e.g., replacing the first entry, or displaying, optionally near the first entry) a second entry associated with the first component and a third entry associated with the second component). For example, if the first and second component are not connected with each other, selecting the entry associated with the set causes display of individual entries for each component (e.g., to treat them as separate components, as opposed to a single unit). In some embodiments, if the first component and second component are connected with each other, then selecting the entry does not cause display of individual entries for each component in the list of tracked objects. In some embodiments, the indication of the first component is selectable to display location information for the first component (e.g., separate from location information for the second component), and the indication of the second component is selectable to display location information for the second component (e.g., separate from location information for the first component). The above-described manner of expanding a given entry into two entries corresponding to the first and second components provides an ability for a user to specifically indicate which of two or more associated components is the component of interest when the components are not connected with each other (e.g., not at the same location), which simplifies the interaction between the user and the electronic device and enhances the operability of the electronic device and makes the user-device interface more efficient (e.g., by not wasting resources on facilitating locating of components that are not of interest), which additionally reduces power usage and improves battery life of the electronic device by enabling the user to use the electronic device more quickly and efficiently.

Figure 12V:
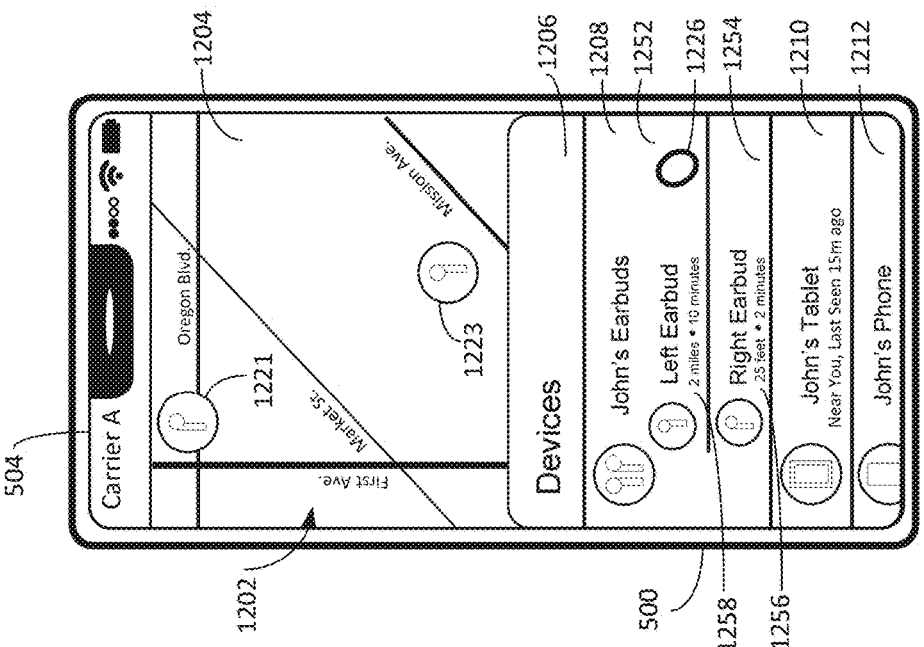
Figure 12U:
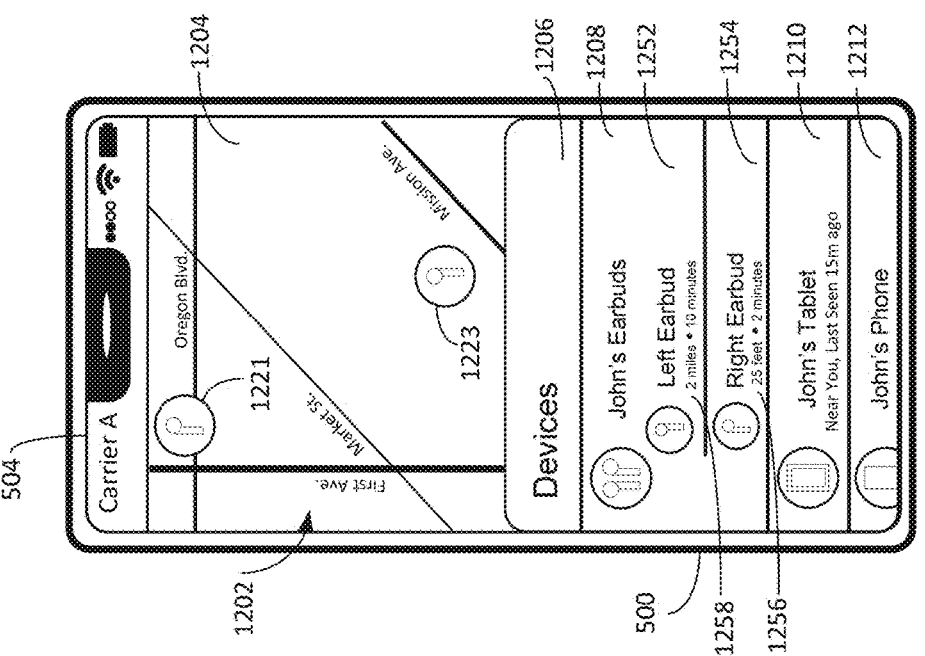

In some embodiments, in accordance with the determination that the first component and the second component that are associated with each other are not currently connected with each other, the electronic device displays (916*a*), on the representation of the map, a first indication corresponding to the first component at a location on the representation of the map corresponding to a location of the first component (916*b*) (e.g., displaying, on the representation of the map, a representation (e.g., icon, image, etc.) of the first component (e.g., left earbud) at a location on the representation of the map corresponding to the determined location of the first component (e.g., the current location, the last known location, etc.)), and a second indication corresponding to the second component at a location on the representation of the map corresponding to a location of the second component (916*c*), such as indications 1221 and 1223 in FIG. 12U (e.g., displaying, on the representation of the map, a second representation (e.g., icon, image, etc.) of the second component (e.g., right earbud), different from the first representation of the first component, at a location on the representation of the map corresponding to the determined location of the second component (e.g., the current location, the last known location, etc.). In some embodiments, each representation is selectable to display information and/or perform one or more functions associated with the respective component, such as to display the address at which the respective component is located, to cause the respective component to play a sound, to navigate to the respective component, etc.). The above-described manner of separately displaying indications of the components provides a quick and efficient manner of indicating individualized location information for the different components, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

Figure 12X:
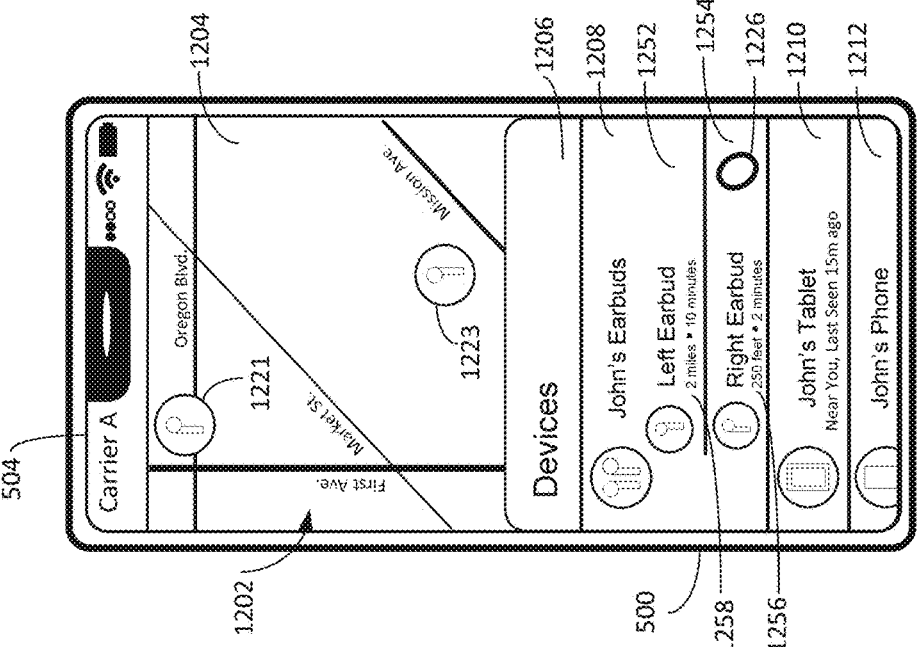
Figure 12W:
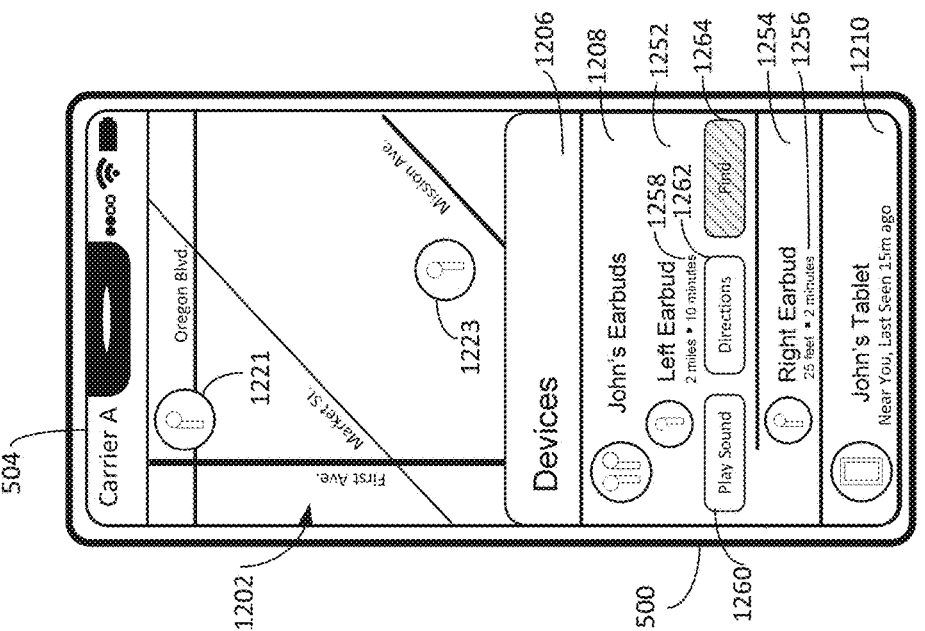
Figure 12Z:
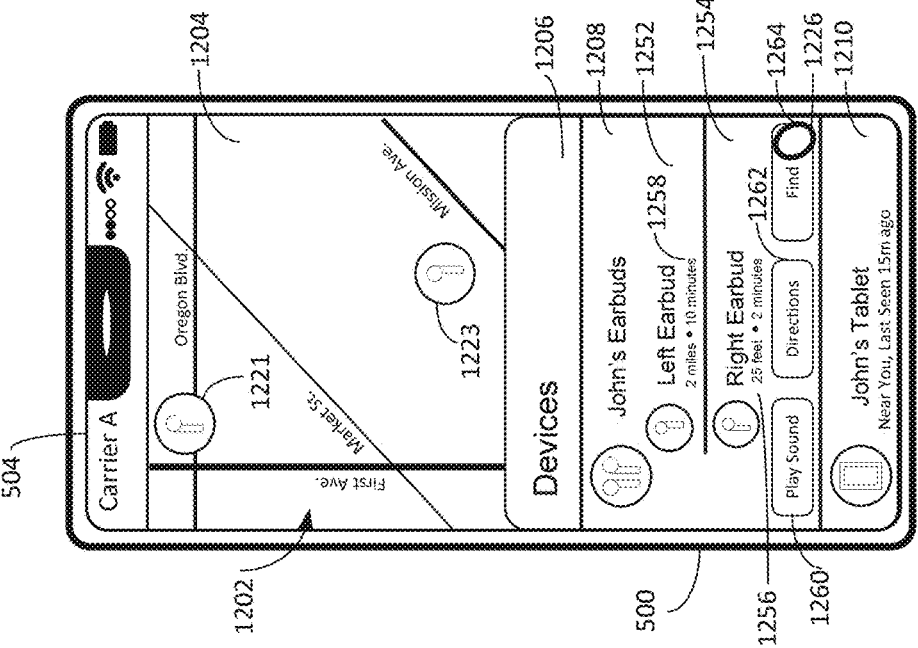

In some embodiments, while displaying, via the output component, a finding user interface, providing an option to switch between finding the first component and finding the second component (918*a*), such as finding interface 1240 in FIG. 12AA including options 1250 and 1252 that is reachable in response to selection of option 1264 in FIG. 12Z or option 1230 in FIG. 12TT, which optionally corresponds to option 840 in FIG. 8N (e.g., while performing a process to find the first and/or the second component, displaying a finding user interface that includes one or more options to select which component of the collection of the first, second, etc. components to find). For example, the finding user interface includes a first representation of the first component and a second representation of the second component, both of which are selectable to cause the process to find the respective component (e.g., and not the other component). In some embodiments, the finding user interface includes the option to switch between finding the first component and second component if the first and second component are not currently connected with each other and the finding user interface does not include the option to switch between finding the first component and the second component if the first and second components are currently connected with each other (e.g., the finding user interface displays information for finding the collection of the first, second, third, etc. components, rather than displaying information for finding individual ones of the first, second, third, etc. components). In some embodiments, the finding user interface has one or more of the characteristics of the finding user interface of methods 1100 and/or 1300. The above-described manner of providing for options to switch between finding the first or second components provides a quick and efficient manner of finding different components of associated components, which simplifies the interaction between the user and the electronic device and enhances the operability of the electronic device and makes the user-device interface more efficient (e.g., by avoiding potentially erroneous inputs for trying to initiate finding another component of the associated components), which additionally reduces power usage and improves battery life of the electronic device by enabling the user to use the electronic device more quickly and efficiently.

In some embodiments, the separation alert includes a representation of a map and a visual indication of the remote locator object displayed at a location on the representation of the map that corresponds to the location of the remote locator object (920a), such as the representation of Object on map 810 in separation alert 808 in FIG. 8B (e.g., the notification that the remote locator object has been separated from the user includes a map and a representation (e.g., icon, image, etc.) of the remote locator object at a location on the map corresponding to the current location and/or last known location of the remote locator object). The above-described manner of displaying a map in the separation alerts provides a quick and efficient manner of indicating the location of the remote locator object, which simplifies the interaction between the user and the electronic device and enhances the operability of the electronic device and makes the user-device interface more efficient (e.g., without requiring separate input for viewing information about the location of the remote locator object), which additionally reduces power usage and improves battery life of the electronic device by enabling the user to use the electronic device more quickly and efficiently.

In some embodiments, the separation alert includes a selectable option that is selectable to display a user interface associated with the remote locator object, wherein the user interface associated with the remote locator object includes additional information for locating the remote locator object (922a), such as selectable option 812a in FIG. 8M (e.g., the notification includes a button and/or the notification itself is selectable to display a user interface associated with the remote locator object). In some embodiments, the user interface associated with the remote locator object includes information about the remote locator object and optionally includes selectable options to perform one or more functions associated with the remote locator object, including an option that is selectable to find the remote locator object (e.g., display navigation instructions or directions to reach the location of the remote locator object). The above-described manner of including the selectable option in the separation alert provides a quick and efficient manner of accessing a user interface associated with the remote locator object, which simplifies the interaction between the user and the electronic device and enhances the operability of the electronic device and makes the user-device interface more efficient (e.g., by avoiding potentially erroneous input for accessing the user interface associated with the remote locator object), which additionally reduces power usage and improves battery life of the electronic device by enabling the user to use the electronic device more quickly and efficiently.

In some embodiments, the user interface associated with the remote locator object includes a visual indication that indicates a location at which the remote locator object was separated from the location of the user, and the visual indication is selectable to initiate a process to designate the location at which the remote locator object was separated from the location of the user as a trusted location for the remote locator object (924a), such as indication 836 in FIG. 8N (e.g., the user interface associated with the remote locator object includes an indication of the current location of the remote locator object and/or the last known location of the remote locator object. For example, the user interface includes the address (e.g., or nearest address) of the remote locator object or the name of the location of the remote locator object (e.g., name of the business, landmark, etc.). In some embodiments, the user interface includes a selectable option that is selectable to add the current location of the remote locator object (e.g., or last known location of the remote locator object) as a trusted location (e.g., a location at which separation alerts are not triggered if a separation alert would otherwise be generated (e.g., if any of the separation criteria are satisfied), except that the remote locator object is within a threshold radius/distance of the trusted location (e.g., within 6 inches, 1 foot, 3 feet, 20 feet, 100 feet, etc.)) such that future separation alerts are not generated if the remote locator object is at the same location.). The above-described manner of including the selectable option in the user interface associated with the remote locator object provides a quick and efficient manner of designating the current location of the remote locator object as a trusted location, which simplifies the interaction between the user and the electronic device and enhances the operability of the electronic device and makes the user-device interface more efficient (e.g., by avoiding potentially erroneous input for designating the current location of the remote locator object as a trusted location), which additionally reduces power usage and improves battery life of the electronic device by enabling the user to use the electronic device more quickly and efficiently.

In some embodiments, in accordance with a determination that one or more criteria are satisfied (e.g., the electronic device and/or remote locator object were not moving together when the remote locator object was determined to be separated from the electronic device, such as described earlier with reference to the second separation criteria), the separation alert includes a selectable option that is selectable to initiate a process to designate the location of the remote locator object as a trusted location for the remote locator object (926a), such as selectable option 812b in FIG. 8B (e.g., the separation alert includes an option to designate the current location of the remote locator object (e.g., or the last known location of the remote locator object) as a trusted location (e.g., a location at which separation alerts are not triggered if a separation alert would otherwise be generated (e.g., if any of the separation criteria are satisfied), except that the remote locator object is within a threshold radius/distance of the trusted location (e.g., within 6 inches, 1 foot, 3 feet, 20 feet, 100 feet, etc.))). In some embodiments, the one or more criteria are satisfied if the separation alert is generated because the user moved away from the location of the remote locator object (e.g., and the remote locator object remained stationary). In some embodiments, if the one or more criteria are not satisfied (e.g., if the user remained stationary and the remote locator object moved away from the location of the user), the notification does not include the selectable option. The above-described manner of including the selectable option in the separation alert provides a quick and efficient manner of designating the current location of the remote locator object as a trusted location, which simplifies the interaction between the user and the electronic device and enhances the operability of the electronic device and makes the user-device interface more efficient (e.g., by avoiding potentially erroneous input for designating the current location of the remote locator object as a trusted location), which additionally reduces power usage and improves battery life of the electronic device by enabling the user to use the electronic device more quickly and efficiently.

In some embodiments, the process to designate the location of the remote locator object as a trusted location for the remote locator object includes (928a), in accordance with a determination that the remote locator object has been separated from the location of the user at the location of the remote locator object without a respective set of one or more other remote locator objects being separated from the location of the user at the location of the remote locator object, also designating the location of the remote locator object as a trusted location for the remote locator object without designating the location of the remote locator object as a trusted location for other remote locator objects in the respective set of one or more other remote locator objects (928b), such as selectable option 812b in FIG. 8J-1 being selectable to designate the current location of Object 1 as a trusted location for Object 1 without designating that location a trusted location for Object 2 (e.g., if the separation alert is associated with one remote locator object that separated from the user, then selecting the option to designate the current location of the remote locator object as a trusted location causes the current location of the remote locator object to be added as a trusted location for the remote locator object, but does not cause the current location of the remote locator object to be added as a trusted location for other remote locator objects associated with the electronic device (e.g., remote locator objects that remain with the electronic device/user).). The above-described manner of including the selectable option for this remote locator object but not others in the separation alert provides a quick and efficient manner of designating the current location of the remote locator object as a trusted location, which simplifies the interaction between the user and the electronic device and enhances the operability of the electronic device and makes the user-device interface more efficient (e.g., by avoiding potentially erroneous input for designating the current location of the remote locator object as a trusted location), which additionally reduces power usage and improves battery life of the electronic device by enabling the user to use the electronic device more quickly and efficiently.

In some embodiments, the process to designate the location of the remote locator object as a trusted location for the remote locator object includes (930a), in accordance with a determination that the remote locator object (e.g., a first remote locator object) and a second remote locator object (different from the first remote locator object) have been separated from the location of the user at the location of the remote locator object (930b) (e.g., if two remote locator objects have been separated from the user (e.g., both remote locator objects individually satisfy either the first or the second separation criteria) and the two remote locator objects are together and/or optionally within a threshold distance from each other (e.g., within 1 foot, 3 feet, 20 feet, at the same location, at the same business, at the same landmark, etc.).), designating (930c) the location of the remote locator object as a trusted location for the remote locator object (e.g., selecting the option on the separation alert to designate the current location as a trusted location causes the current location of the remote locator object to be added as a trusted location for the remote locator object), and designating (930d) the location of the remote locator object as a trusted location for the second remote locator object, such as selectable option 812b in FIG. 8I being selectable to designate the current location of Objects 1 and 2 as a trusted location for Objects 1 and 2 (e.g., selecting the option on the separation alert to designate the current location as a trusted location causes the current location of the remote locator object to be added as a trusted location for both the remote locator object and the second remote locator object). For example, one separation alert is generated for the separation of both the remote locator object and the second remote locator object, and thus setting the current location as the trusted location applies to both the remote locator object and the second locator object. In some embodiments, if a third remote locator object is with the remote locator object and second locator object and also satisfies the separation criteria, the location of the remote locator object is also added as a trusted location for the third remote locator object. However, if the third remote locator object is with the remote locator object and the second locator object, but does not satisfy the separation criteria, the location optionally is not added as a trusted location for the third remote locator object (e.g., the separation alert is not associated with the third remote locator object). The above-described manner of including the selectable option for a plurality of remote locator objects provides a quick and efficient manner of designating the current location of the remote locator object as a trusted location for multiple remote locator objects that have been separated from the electronic device, which simplifies the interaction between the user and the electronic device and enhances the operability of the electronic device and makes the user-device interface more efficient (e.g., by avoiding the need for multiple inputs to designate individual trusted locations for each of the multiple remote locator objects), which additionally reduces power usage and improves battery life of the electronic device by enabling the user to use the electronic device more quickly and efficiently.

In some embodiments, designating the location of the remote locator object as a trusted location for the remote locator object does not designate the location of the remote locator object as a trusted location for one or more other remote locator objects that are not separated from the location of the user (932a), such as Object 2 in FIG. 8J-1 (e.g., in response to selecting the option to designate the current location as a trusted location, the location of the remote locator object is not added as a trusted location for other remote locator objects that are with the user, are not with the user, and/or are otherwise being tracked by the electronic device, which do not satisfy the separation criteria). Thus, in some embodiments, a separation alert is associated with remote locator object(s) that satisfy the separation criteria such that interacting with the separation alert (e.g., such as by selecting the option on the separation alert for designating the location of the object as a trusted location) performs functions for the associated remote locator object(s) (e.g., the objects that triggered the separation alert), but does not perform functions for remote locator object(s) not associated with the separation alert (e.g., objects that did not trigger the separation alert). Thus, even if a given location is designated as a trusted location for a first remote locator object (e.g., thus causing the device to not generate separation alerts if the first remote locator object is separated from the electronic device while the first remote locator object is at the given location), it is not designated as a trusted location for a second remote locator object (e.g., thus still causing the device to generate separation alerts if the second remote locator object is separated from the electronic device while the second remote locator object is at the given location). The above-described manner of designated independent trusted locations for different remote locator objects provides for flexible and robust designation of trusted locations for different remote locator objects, which simplifies the interaction between the user and the electronic device and enhances the operability of the electronic device and makes the user-device interface more efficient (e.g., by avoiding overly broad designations of trusted locations), which additionally reduces power usage and improves battery life of the electronic device by enabling the user to use the electronic device more quickly and efficiently.

In some embodiments, the one or more criteria include a criterion that is satisfied when the separation alert was generated in accordance with the determination that the second separation criteria are met, and is not satisfied when the separation alert was generated in accordance with the determination that the first separation criteria are met (934*a*), such indicated by separation alert 808 in FIG. 8A including selectable option 812*b* for designating the current location of Object as a trusted location for Object (e.g., the separation alert includes the selectable option to designate the current location (e.g., or last known location) of the remote locator object if the criteria that triggered the separation alert is that remote locator object has remained stationary (e.g., or moved less than the threshold amount) while the user moved away from the remote locator object). In some embodiments, in accordance with a determination that the one or more criteria are not satisfied, the separation alert does not include the selectable option that is selectable to initiate the process to designate the location of the remote locator object as a trusted location for the remote locator object (934*b*), such as separation alert 808 in FIG. 8C not including selectable option 812*b* for designating the current location of Object as a trusted location for Object (e.g., if the separation alert was triggered while either the remote locator object or the user are in motion (e.g., not stationary), then the separation alert does not include the option to designate the current location of the remote locator object as a trusted location). In some embodiments, the option is not provided because a fixed location is not able to be determined as a result of the remote locator object being in motion. In some embodiments, if the separation alert was triggered due to the first separation criteria being satisfied and it is determined that the remote locator object is with another user (e.g., following the location of another user), then the separation alert optionally includes an option to designate the other user as a trusted user. In some embodiments, a trusted user acts like a moving trusted location such that if the remote locator object would otherwise trigger a separation alert, but is determined to be in the possession of or with (e.g., within a threshold distance of, such as 1, 2, 3, 5, 10, 15 feet of) a trusted user, a separation alert is not generated. The above-described manner of selectively including the selection option in the separation alert ensures that a process for designated a trusted location based on the location of the remote locator object is not initiated when the location of the remote locator object may not be suitable for doing so, which simplifies the interaction between the user and the electronic device and enhances the operability of the electronic device and makes the user-device interface more efficient (e.g., by avoiding erroneous designation of trusted locations, which then requires further input for correction), which additionally reduces power usage and improves battery life of the electronic device by enabling the user to use the electronic device more quickly and efficiently.

In some embodiments, the separation alert includes a selectable option that is selectable to initiate a process to disable separation alerts for the remote locator object (936*a*), such as selectable option 812*c* in FIGS. 8B-8C (e.g., the separation alert includes a selectable option to disable future separation alerts for the remote locator object that triggered the separation alert (e.g., without designating the current location of the remote locator object as a trusted location for the remote locator object)). In some embodiments, in response to detecting selection of the selectable option, the electronic device disables separate alerts for the remote locator object such that future separations of the remote locator object from the electronic device (e.g., in accordance with the first or second separation criteria) will not cause the electronic device to generate a separation alert for the remote locator object. In some embodiments, if the separation alert is associated with multiple remote locator objects (e.g., if multiple remote locator objects are with each other or near each other and/or satisfy the separation criteria), the selectable option is selectable to disable future separation alerts for the multiple remote locator objects. The above-described manner of including the selection option in the separation alert provides a quick and efficient manner of disabling separation alerts for a given remote locator object, which simplifies the interaction between the user and the electronic device and enhances the operability of the electronic device and makes the user-device interface more efficient (e.g., by avoiding the need for additional, potentially erroneous inputs, for disabling separation alerts for this remote locator object, optionally without doing so for other remote locator objects), which additionally reduces power usage and improves battery life of the electronic device by enabling the user to use the electronic device more quickly and efficiently.

In some embodiments, displaying the separation alert includes (938*a*), in accordance with a determination that one or more criteria are satisfied, wherein whether the one or more criteria are satisfied is based on a number of times the remote locator object has been separated from the location of the user, displaying the separation alert concurrently with one or more options for adjusting separation alert settings for the remote locator object (938*b*), such as options 812*b* and/or 812*c* in FIG. 8B (e.g., the separation alert includes selectable options, such as an option to set the location of the remote locator object as a trusted location and/or an option to disable future separation alerts for the remote locator object, if the separation alert has not been generated or the first/second separation criteria have not been satisfied for the remote locator object more than a threshold number of times (e.g., 1 time, 3 times, 5 times, 10 times, 50 times, 100 times, etc.)). In some embodiments, the number of times that a separation alert has been generated is unique for each remote locator object (e.g., each remote locator object has an associated counter that tracks the number of times separation alerts have been generated and/or the first/second separation criteria have been satisfied) or the number of times that a separation alert has been generated is unique for the user (e.g., separation alerts and/or satisfaction of the first/second separation criteria, optionally triggered by any remote locator object and optionally displayed on any of the user's devices, are tracked to determine how many separation alerts have been generated and/or the first/second separation criteria have been satisfied), or the number of times that a separation alert has been generated is unique to the electronic device (e.g., without regard to the number of separation alerts that are generated on other devices that are associated with the user).

In some embodiments, in accordance with a determination that the one or more criteria are not satisfied, displaying the separation alert without displaying the one or more options for adjusting the separation alert settings for the remote locator object (938*c*), such as separation alert 808 in FIG. 8D not includes options 812*b* and/or 812*c* (e.g., if more than the threshold number of separations have been generated (e.g., unique for the remote locator object, unique for the device, and/or unique for the user, as described above), then the separation alert does not include the one or more options). In some embodiments, even if the separation alert does not include the one or more options, the separation alert is selectable to display a user interface associated with the remote locator object(s) that triggered the alert, which includes options to perform the functions associated with the one or more options that are no longer included on the separation alert. For example, the user is able to select the separation alert to display a user interface associated with the remote locator object and from the user interface, select an option to designate a new trusted location for the remote locator object or to silence and/or disable future separation alerts for the remote locator object. The above-described manner of selectively including the selectable option(s) in the separation alert provides a quick and efficient manner of facilitating separation alert settings changes while avoiding unnecessary use of resources for including the selectable options when they are likely not needed, which simplifies the interaction between the user and the electronic device and enhances the operability of the electronic device and makes the user-device interface more efficient (e.g., by avoiding accidental changes of separation alert settings when those settings have not been accessed via the separation alert previously), which additionally reduces power usage and improves battery life of the electronic device by enabling the user to use the electronic device more quickly and efficiently.

In some embodiments, the electronic device displays (940*a*), via the output component, a user interface for designating one or more locations as trusted locations for the remote locator object, such as user interface 846 in FIG. 8S (e.g., a user interface that allows a user to set certain geographic locations as trusted locations for the remote locator object). In some embodiments, the user interface includes a list of locations that have already been set as trusted locations (e.g., for the remote locator object or other remote locator objects), which optionally are able to be toggled on or off. In some embodiments, the user interface includes an option to add a new location as a trusted location. In some embodiments, in accordance with a determination that a respective location has been designated as a trusted location for another remote locator object associated with the electronic device but not the remote locator object, the user interface includes a selectable option that is selectable to designate the respective location as a trusted location for the remote locator object (940*b*), such as selectable options 852, 854, 856 in FIG. 8S, (e.g., the user interface includes one or more suggestions of possible locations that have been designated as trusted locations for other remote locator objects or other devices. In some embodiments, the suggestions are selectable to add the respective location as a trusted location for the remote locator object.). In some embodiments, in accordance with a determination that the respective location has not been designated as a trusted location for another remote locator object associated with the electronic device, the user interface does not include the selectable option that is selectable to designate the respective location as a trusted location for the remote locator object (940*c*), such as a location not appearing under "Suggestions" in FIG. 8S if that location is not designated as a trusted location for a remote locator object (e.g., if a given location has not been designated as a trusted location for another remote locator object, the user interface does not include the suggestion of the given location as a trusted location for the remote locator object). In some embodiments, the user interface includes smart suggestions based on the user's and/or electronic device's location history and/or travel history. For example, the user interface includes a suggestion to add the user's work or home address as a trusted location (e.g., if, for example, the user's work or home address has not yet been added as a trusted location). The above-described manner of suggesting trusted locations provides a quick and efficient manner of setting trusted locations for the remote locator object that are likely candidates for being trusted locations, which simplifies the interaction between the user and the electronic device and enhances the operability of the electronic device and makes the user-device interface more efficient (e.g., by avoiding the need for extra, potentially erroneous input, for finding and/or designating previously-designated trusted locations as trusted locations for the remote locator object), which additionally reduces power usage and improves battery life of the electronic device by enabling the user to use the electronic device more quickly and efficiently.

In some embodiments, displaying the user interface for designating the one or more locations as trusted locations for the remote locator object includes (942*a*), in accordance with the determination that the respective location has been designated as a trusted location for another remote locator object associated with the electronic device but not the remote locator object, displaying, in the user interface, a visual indication of an identity of a second remote locator object for which the respective location has been designated as a trusted location (942*b*), such as the identifications of "Object 2" and "Device 3" for the "Office" suggested location in FIG. 8S (e.g., the suggested locations includes an indication of the names of the items and/or remote locator objects that have the respective suggested location as a trusted location). For example, a respective suggested location includes a textual indication that it is a "trusted location for 'Keys'". In some embodiments, the respective suggested location additionally or alternatively includes an indication of the number of remote locator objects for which the respective suggested location has been designated as a trusted location. The above-described manner of indicating information about the other remote locator objects with which the suggested trusted location is associated provides a quick and efficient manner of conveying relevant information about the suggested trusted location, which simplifies the interaction between the user and the electronic device and enhances the operability of the electronic device and makes the user-device interface more efficient (e.g., by conveying information that confirms whether the suggested location should be designated as a trusted location for the remote locator object based on its relationship with the other items for which the suggested location is designated a trusted location), which additionally reduces power usage and improves battery life of the electronic device by enabling the user to use the electronic device more quickly and efficiently.

In some embodiments, displaying the user interface for designating the one or more locations as trusted locations for the remote locator object includes (944*a*), in accordance with the determination that the respective location has been designated as a trusted location for another remote locator object associated with the electronic device but not the remote locator object, displaying, in the user interface, a visual indication of a number of other remote locator objects associated with the electronic device for which the respective location has been designated as a trusted location (944*b*), such as the indication of "Used by 5 other objects" for the "Gym" suggested location in FIG. 8S (e.g., the suggested locations includes an indication of how many items have the respective suggested location as a trusted location. For example, a respective suggested location includes a textual indication that it is "used by two other devices".). The above-described manner of indicating information about the other remote locator objects with which the suggested trusted location is associated provides a quick and efficient manner of conveying relevant information about the suggested trusted location, which simplifies the interaction between the user and the electronic device and enhances the operability of the electronic device and makes the user-device interface more efficient (e.g., by conveying information that confirms whether the suggested location should be designated as a trusted location for the remote locator object based on how many other items are using that suggested location as a trusted location), which additionally reduces power usage and improves battery life of the electronic device by enabling the user to use the electronic device more quickly and efficiently.

In some embodiments, the first separation criteria and the second separation criteria include a criterion that is satisfied when, prior to generating the separation alert, the location associated with the user and the location of the remote locator object exited a trusted location together, and is not satisfied when, prior to generating the separation alert, the location associated with the user and the location of the remote locator object did not exit a trusted location together (946a), such as described with reference to trusted location 814 in FIGS. 8E-8F (e.g., separation alerts are enabled to be generated if the remote locator object and the user were together at some point in the past (e.g., optionally for more than a threshold amount of time, such as 10 minutes, 1 hour, 4 hours, 8 hours, 12 hours, etc., and/or optionally within a last threshold amount of time, such as 10 minutes, 1 hour, 4 hours, 8 hours, 12 hours, etc.)). In some embodiments, separation alerts are enabled to be generated if the remote locator object and the user were both located at a trusted location (e.g., home, work, etc.) and left the trusted location together (e.g., or within a threshold distance from each other, such as 1 foot, 3 feet, 10 feet, 20 feet, etc.). In some embodiments, separation alerts are enabled to be generated once a day (or any other period of time, such as for every 12 hour period, for every 24 hour period, for every 1-week period, etc.). For example, if the user leaves home with a remote locator object and at some point later in the day, is separated from the remote locator object, a separation alert is generated. However, if the user leaves another location (e.g., leaves a non-trusted location in the morning) with the remote locator object (e.g., without having been with the remote locator object in a trusted location earlier that day), then separation alerts are not subsequently generated for the remote locator object (e.g., for the remainder of the day, until the user/device and the remote locator object return together to a trusted location), even if the separation criteria are otherwise satisfied (e.g., even if the user/device becomes separated from the remote locator object). In some embodiments, whether separation alerts are generated for the remote locator object is reset every time the user returns to a trusted location and/or resets once a day such that the user must then exit the trusted location with the remote locator object to re-enable separation alerts. In some embodiments, requiring separation alerts to be enabled for the day (e.g., by requiring the user and the remote locator object be in the same trusted location and leave the trusted location together) automatically disables separation alerts for remote locator objects in instances when the remote locator object(s) are likely intentionally left behind. The above-described manner of selectively enabling separation alerts for a remote locator object based on whether the device and the remote locator object were together in a trusted location ensures that unnecessary separation alerts are not generated, which simplifies the interaction between the user and the electronic device and enhances the operability of the electronic device and makes the user-device interface more efficient (e.g., by avoiding consumption of resources for generating a separation alert in circumstances where leaving the remote locator object behind intentionally is more likely), which additionally reduces power usage and improves battery life of the electronic device by enabling the user to use the electronic device more quickly and efficiently.

In some embodiments, the first separation criteria and the second separation criteria include a criterion that is satisfied when at least one trusted location has been designated for the remote locator object, and is not satisfied when at least one trusted location has not been designated for the remote locator object (948a), such as described with reference to trusted location 816 in FIGS. 8E-8F (e.g., if no trusted location has yet been defined for the remote locator object, then do not generate separation alerts even if separation alerts would otherwise be generated). In some embodiments, defining a trusted location (e.g., home, work, etc.) for a remote locator object allows the device to determine whether the remote locator object and the user left the trusted location together, which is optionally a requirement for enabling separation alerts (e.g., for the day). The above-described manner of selectively enabling separation alerts for a remote locator object based on whether a trusted location has been designated for the remote locator object ensures that unnecessary separation alerts are not generated, which simplifies the interaction between the user and the electronic device and enhances the operability of the electronic device and makes the user-device interface more efficient (e.g., by avoiding consumption of resources for generating a separation alert in circumstances where leaving the remote locator object behind intentionally is more likely), which additionally reduces power usage and improves battery life of the electronic device by enabling the user to use the electronic device more quickly and efficiently.

It should be understood that the particular order in which the operations in FIGS. 9A-9J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300 and 1500) are also applicable in an analogous manner to method 900 described above with respect to FIGS. 9A-9J. For example, presenting separation notifications described above with reference to method 900 optionally has one or more of the characteristics of locating objects or receiving notifications about object status or separation, etc., described herein with reference to other methods described herein (e.g., methods 700, 1100, 1300 and 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 9A-9J are, optionally, implemented by components depicted in FIGS. 1A-1B. For example, detecting operation 902a and generating operations 902c and 902d are optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Locator Processes for a Device or a Remote Locator Object

Users interact with electronic devices in many different manners. In some embodiments, an electronic device or a remote locator object is able to report its location to an electronic device in different ways (e.g., using different locator processes). For example, a first device or remote locator object may be compatible with a first locator process (e.g., based on ultra-wideband radio technology), while a second device or remote locator object may be compatible with a second locator process (e.g., based on Bluetooth communication technology) but not the first locator process. The embodiments described below provide ways in which an electronic device utilizes a first or second locator process for locating a device or a remote locator object based on the device or remote locator object being located, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10B:
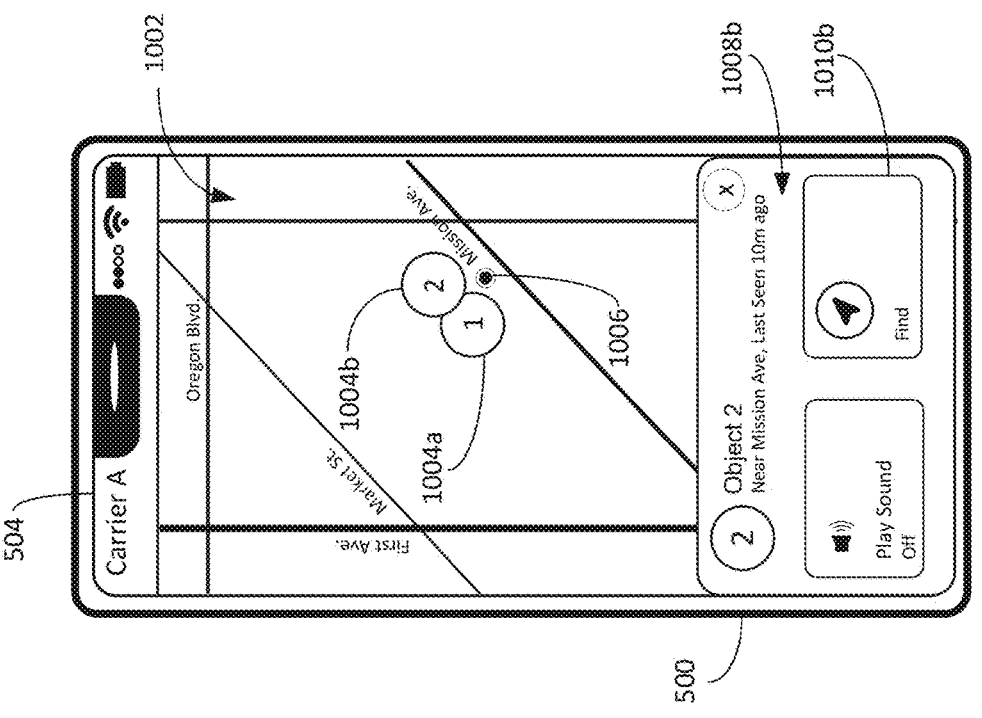
FIGS. 10A-10T illustrate exemplary ways in which an electronic device utilizes a first or second locator process for locating a device or a remote locator object based on the device or remote locator object being located in accordance with some embodiments of the disclosure.
Figure 10A:
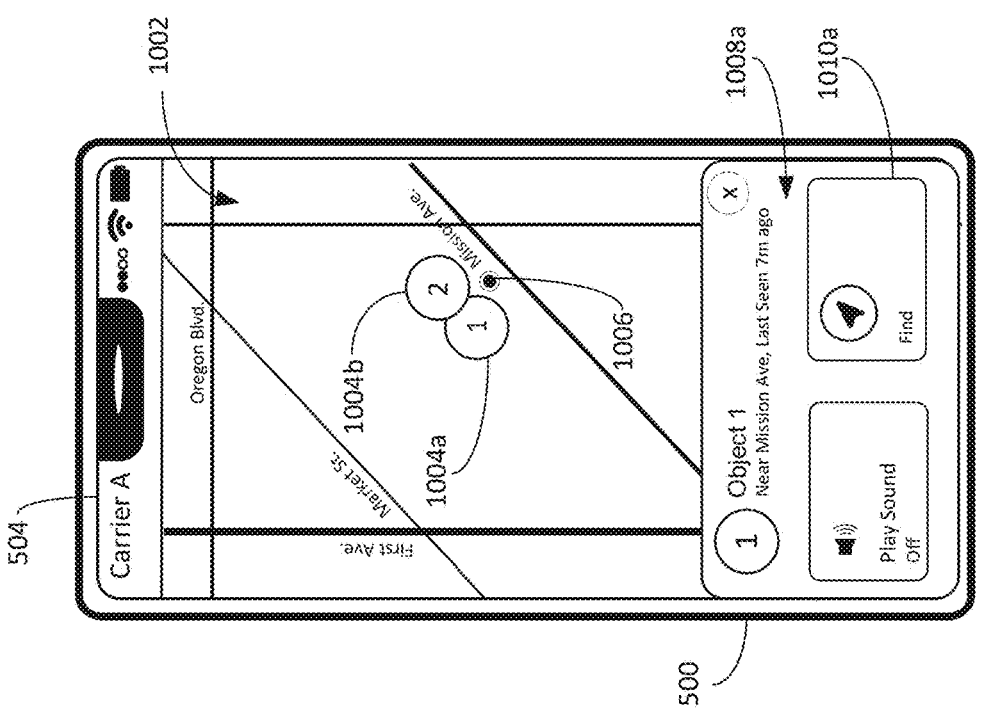
Figure 10D:
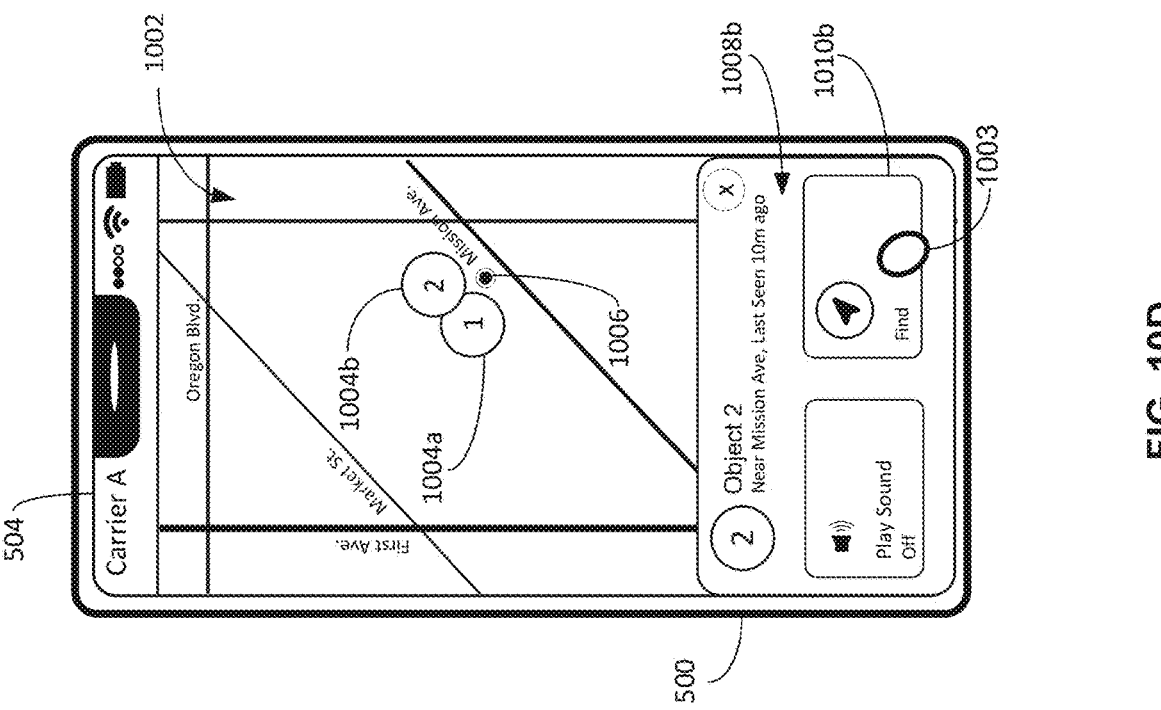
Figure 10C:
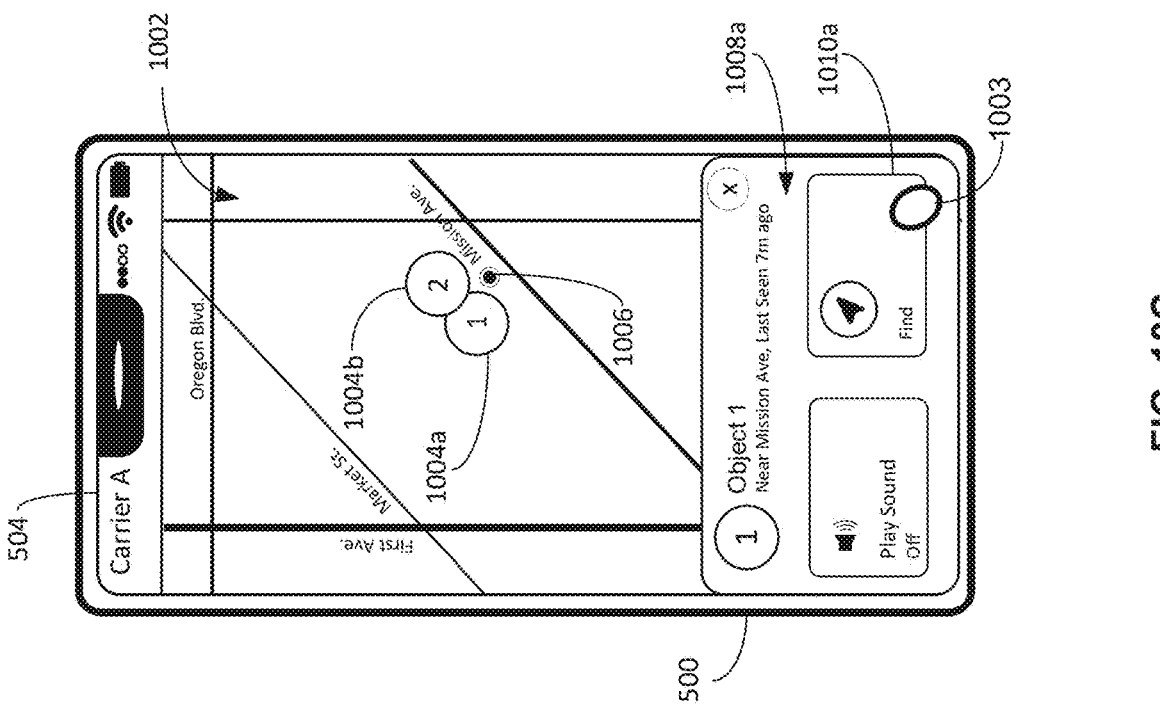
Figures 10E, 10F:
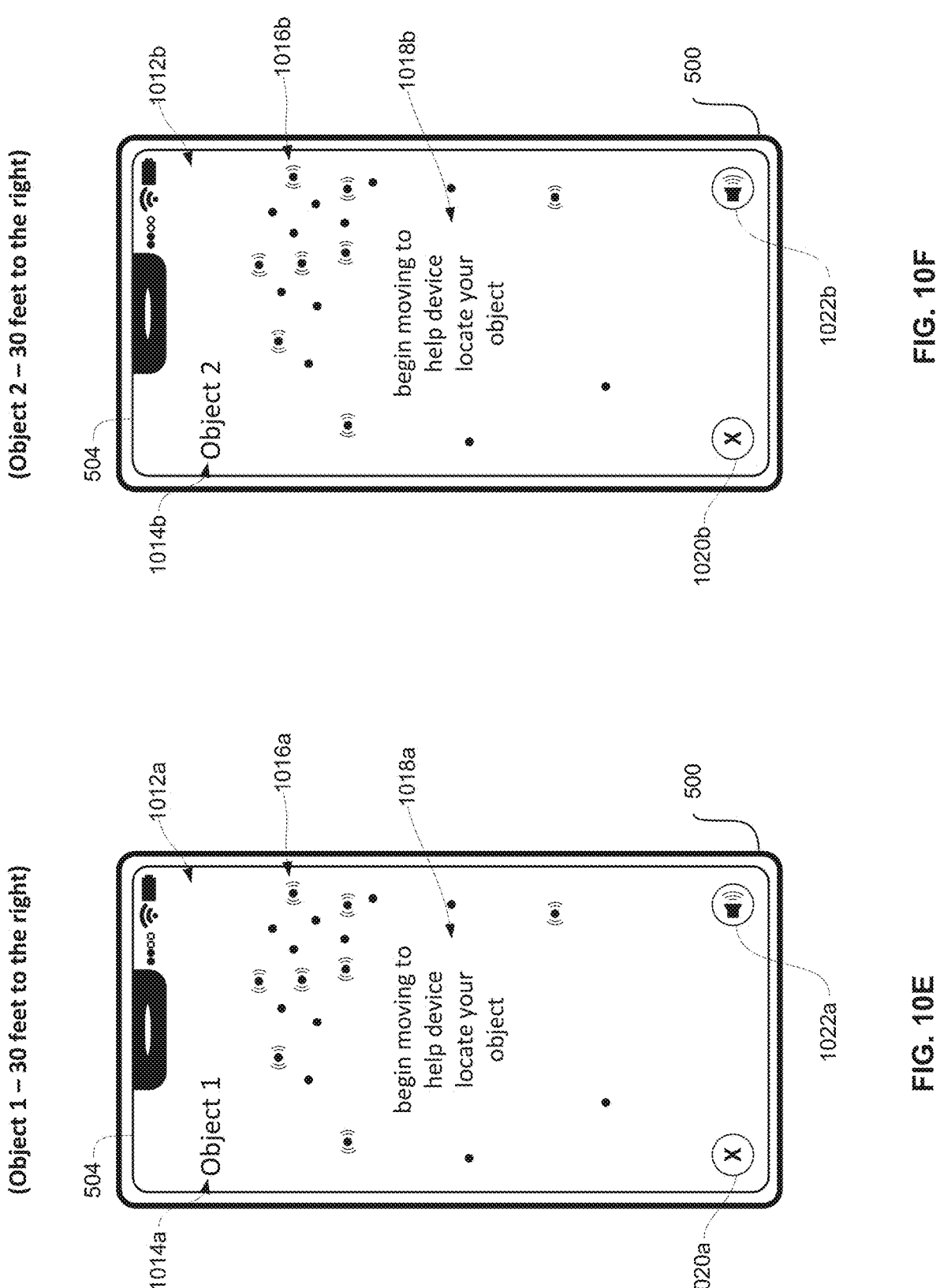
Figures 10G, 10H:
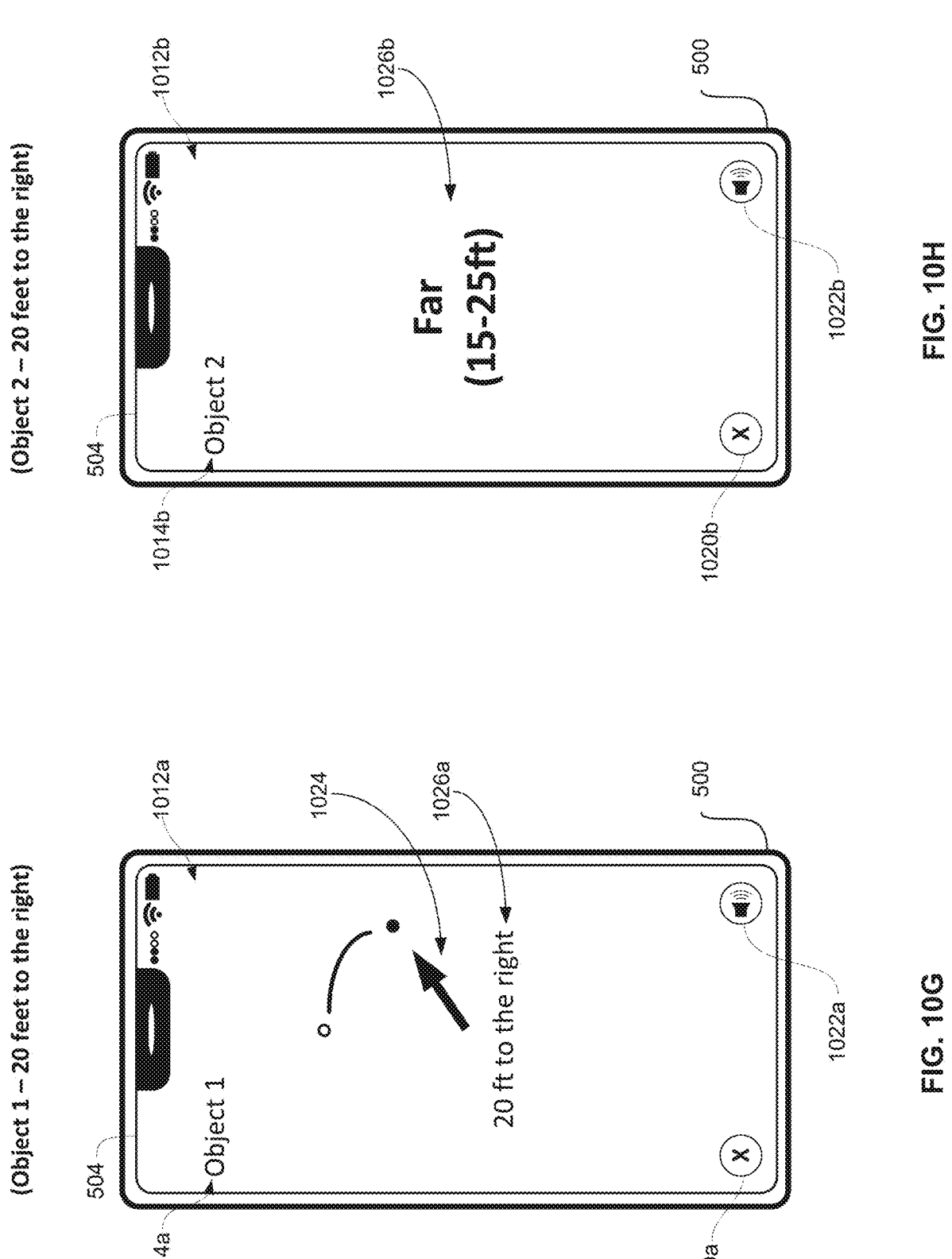
Figures 10I, 10J:
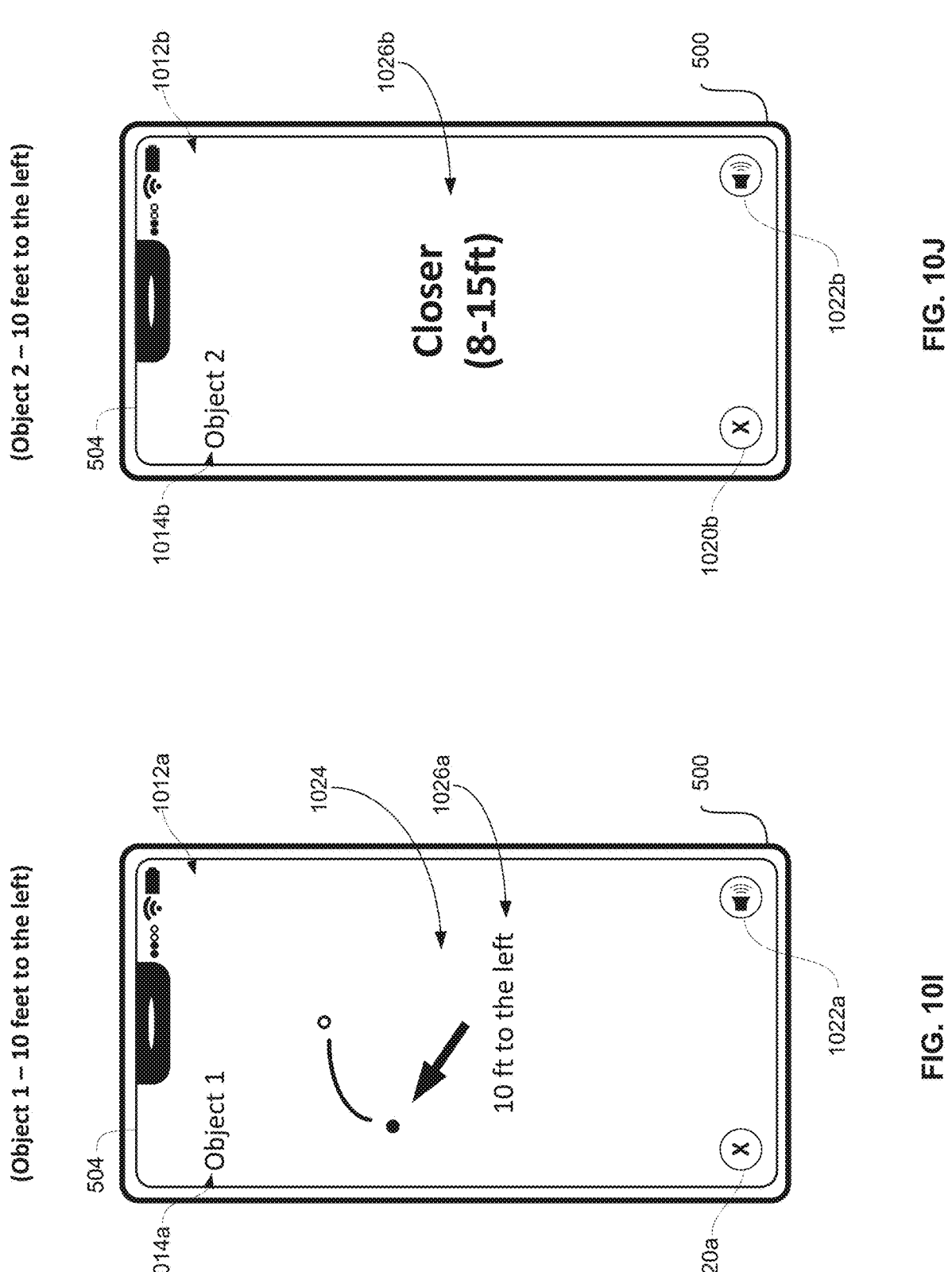
Figures 10M, 10N:
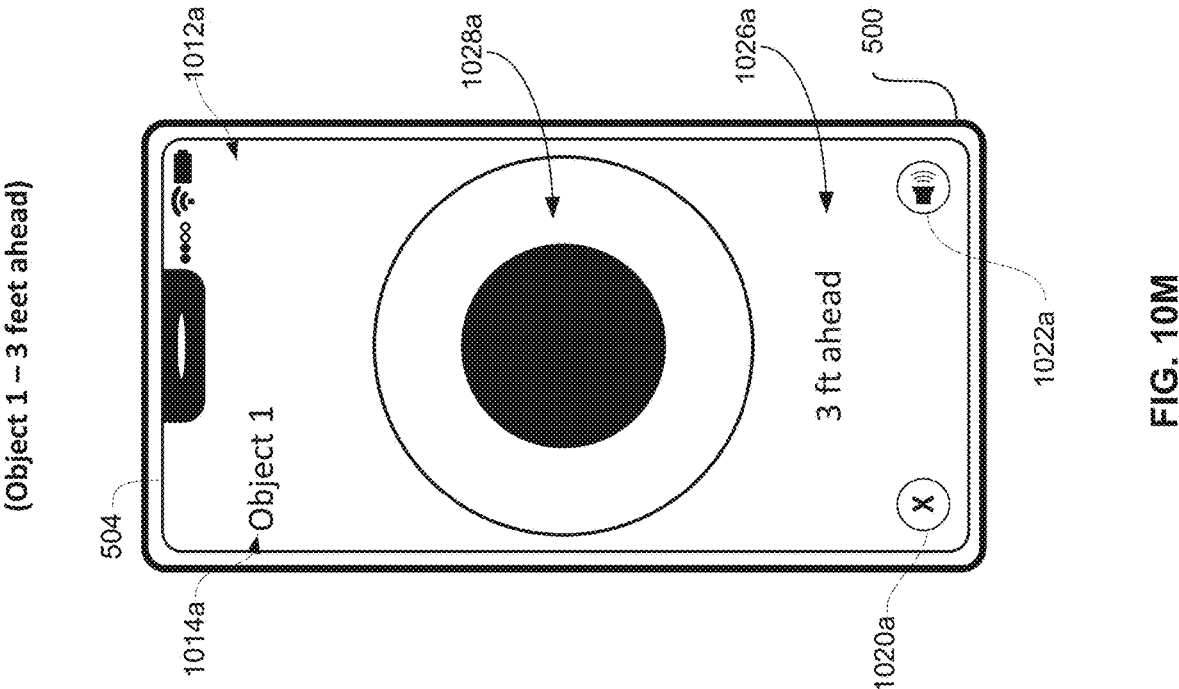
Figures 10O, 10P:
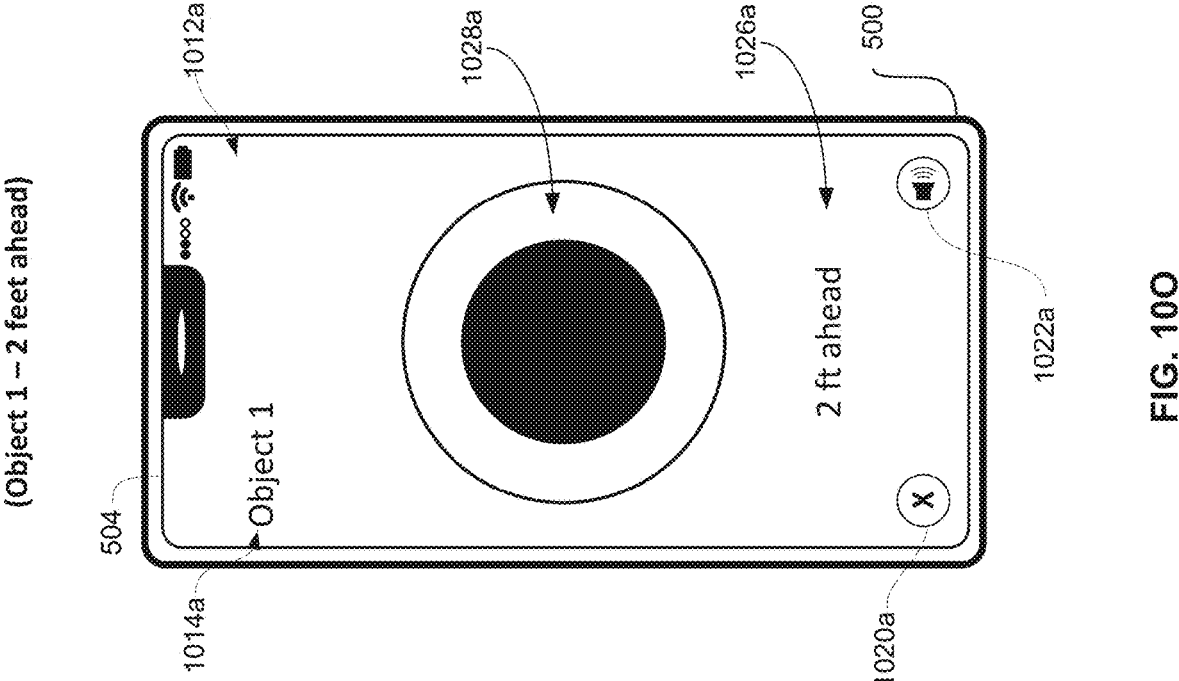
Figure 10T:
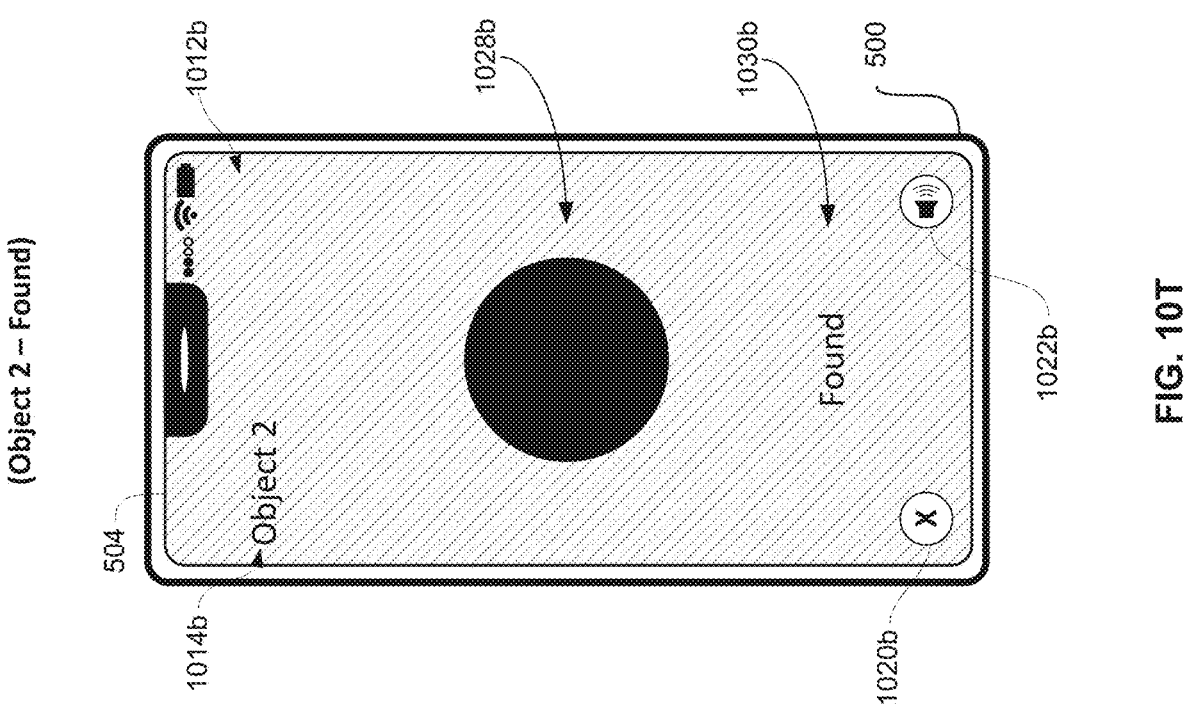

FIGS. 10A-10T illustrate exemplary ways in which an electronic device utilizes a first or second locator process for locating a device or a remote locator object based on the device or remote locator object being located in accordance with some embodiments of the disclosure. The embodiments in these figures are used to illustrate the processes described below, including the processes described with reference to FIGS. 11A-11F.

As will be described below, FIGS. 10A-10T illustrate two different locator processes being utilized by device 500 to locate a first or a second object. The first object ("Object 1") is compatible with the first locator process (e.g., because Object 1 and/or device 500 include circuitry or other components for utilizing the first locator process), and the second object ("Object 2") is compatible with the second locator process, but not the first locator process (e.g., because Object 2 and/or device 500 do not include circuitry or other components for utilizing the first locator process, but do include circuitry or other components for utilizing the second locator process). In some embodiments, the first locator process is able to determine the distance between device 500 and Object 1 and the directional position of Object 1 relative to device (e.g., straight ahead, to the right, to the left, behind, etc.). For example, the first locator process includes utilizing the Angle of Arrival (AoA) and/or the Angle of Departure (AoD) features of Bluetooth 5.0 and/or features of ultra-wideband radio technology. In some embodiments, the second locator process is able to determine a distance between device 500 and Object 2, but is not able to determine the directional position of Object 2 relative to device 500. Further, in some embodiments, the distance determination of the second locator process is less accurate than the distance determination of the first locator process. While description of FIGS. 10A-10T is provided in the context of device 500 locating "objects" (e.g., remote locator objects, as described in this disclosure), it is understood that the features of the embodiments described with reference to FIGS. 10A-10T apply analogously to the context of device 500 locating other electronic devices (e.g., earbuds, smart watches, tablet computers, etc.).

FIGS. 10A-10B illustrate an exemplary device 500 (e.g., at different times) that includes touch screen 504. In FIGS. 10A-10B, device 500 is displaying user interface 1002, which is optionally a user interface of an object and/or device location tracking application installed on device 500. User interface 1002 includes a representation of a map, a representation 1006 of the current location of device 500 on the representation of the map (e.g., at a location on the map corresponding to the physical location of device 500 determined using a GPS sensor on device 500, for example), a representation (e.g., icon) 1004a corresponding to Object 1 at a location on the representation of the map corresponding to the last known location of Object 1, and a representation (e.g., icon) 1004b at a location on the representation of the map corresponding to the last known location of Object 2. In FIG. 10A, user interface 1002 includes user interface element 1008a corresponding to Object 1, and including a selectable option 1010a that is selectable to initiate a locator process for locating Object 1. Similarly, in FIG. 10B, user interface 1002 includes user interface element 1008b corresponding to Object 2, and including a selectable option 1010b that is selectable to initiate a locator process for locating Object 2. As previously described, Object 1 is optionally compatible with the first locator process mentioned earlier, and Object 2 is optionally compatible with the second locator process mentioned earlier, but not the first locator process mentioned earlier. In some embodiments, both the first and the second locator processes are locator processes used by device 500 when the object being located is relatively close to device 500 (e.g., within 15, 25, 50, 75, 100, 200, 400 feet of device 500). In some embodiments, if the object being located is relatively far from device 500 (e.g., greater than 500 feet away), device 500 optionally utilizes a different, third locator process that includes displaying, on the map in user interface 1002, walking/cycling/driving directions to the object being located (e.g., as described with reference to method 1300)—Objects 1 and 2 are optionally equally compatible with the third locator process.

In FIGS. 10C-10D, device 500 detects selection of selectable options 1010a and 1010b (e.g., via tap of contact 1003), respectively, for initiating locator processes for locating Objects 1 and 2, respectively. Because Objects 1 and 2 are relatively close to device 500, device 500 initiates the first or second locator processes described above. Further, because Object 1 is compatible with the first locator process, device 500 initiates the first locator process for locating Object 1, as shown in FIG. 10E. Analogously, because Object 2 is compatible with the second locator process but not the first locator process, device 500 initiates the second locator process for locating Object 2, as shown in FIG. 10F.

As shown in FIG. 10E, Object 1 is 30 feet to the right of device 500, and the first locator process optionally starts with a user interface 1012a that indicates 1018a that device 500 needs to be moved (e.g., closer to Object 1) for the first locator process to continue. In some embodiments, the first locator process (e.g., based on ultra-wideband radio technology communication between device 500 and Object 1) requires a minimum signal strength or signal-to-noise ratio to be able to provide distance and/or directionality information for locating Object 1. User interface 1012a in FIG. 10E optionally includes dots 1016a that move around user interface 1012a (e.g., and does not include distance and/or directionality information for locating Object 1) until device 500 is moved close enough to Object 1 for the first locator process to continue.

As shown in FIG. 10F, Object 2 is 30 feet to the right of device 500, and the second locator process also optionally starts with a user interface 1012b that indicates 1018b that device 500 needs to be moved (e.g., closer to Object 2) for the second locator process to continue. In some embodiments, the second locator process (e.g., based on Bluetooth communication between device 500 and Object 2) requires a minimum signal strength or signal-to-noise ratio to be able to provide distance information for locating Object 2. User interface 1012b in FIG. 10F optionally also includes dots 1016b that move around user interface 1012b (e.g., and does not include distance information for locating Object 2) until device 500 is moved close enough to Object 2 for the second locator process to continue. User interfaces 1012a and 1012b also both include selectable options 1020a and 1020b, which are selectable to exit the first and second locator processes, respectively (e.g., and return to the user interfaces of FIGS. 10A-10D), and selectable options 1022a and 1022b, which are selectable to cause Objects 1 and 2, respectively, to emit audible sounds. Therefore, in some embodiments, the first locator process and the second locator process both start with the same user interface 1012a/1012b.

In FIGS. 10G-10H, device 500 and/or Objects 1 or 2 have moved such that Objects 1 and 2 are now 20 feet to the right of device 500, which optionally provides sufficient signal for the first and second locator processes to continue. In response, in FIG. 10G in which device 500 is utilizing the first locator process to locate Object 1, device 500 updates user interface 1012a to include directional indication 1024 and distance/direction indication 1026a. Directional indication 1024 graphically indicates the relative direction of Object 1 relative to device 500 (e.g., an arrow pointing towards Object 1). Distance/direction indication 1026a textually indicates the distance between device 500 and Object 1 (e.g., "20 ft."), and optionally also indicates the relative direction of Object 1 relative to device 500 (e.g., "to the right"). Directional indication 1024 is optionally updated by device 500 in real-time as the relative direction of Object 1 changes (e.g., due to positional or orientational movement of device 500 and/or Object 1). Further, distance/direction indication 1026a is also optionally updated by device 500 in real-time as the distance and/or relative direction of Object 1 changes (e.g., due to positional or orientational movement of device 500 and/or Object 1). For example, if Object 1 changes to being 19 feet from device 500, device 500 would optionally update indication 1026a to indicate "19 ft. to the right".

In FIG. 10H in which device 500 is utilizing the second locator process to locate Object 2, device 500 updates user interface 1012b to include distance indication 1026b, and user interface 1012b does not include a directional indication of Object 2 relative to device 500 (e.g., because the second locator process is not able to determine the relative direction of Object 2 relative to device 500). Distance indication 1026b is optionally an indication that provides a coarse indication of the distance between device 500 and Object 2 (e.g., corresponding to and/or indicating ranges of distance between device 500 and Object 2), rather than a direct indication of the distance between device 500 and Object 2 (e.g., such as in user interface 1012a in FIG. 10G). For example, in FIG. 10H, Object 2 is 20 feet to the right of device 500. As a result, device 500 displays distance indication 1026b that indicates that Object 2 is "Far" from device 500, which optionally corresponds to Object 2 being 15-25 feet from device 500, but does display an indication of 20 feet in user interface 1012b. In some embodiments, indication 1026b is a less precise indication of distance as compared with indication 1026a in user interface 1012a. Device 500 optionally displays the distance range of 15-25 feet corresponding to "Far" in user interface 1012b, and optionally does not display the distance range of 15-25 feet in user interface 1012b. In contrast to indications 1024 and 1026a in user interface 1012a, indication 1026b optionally does not update in response to any change in distance between device 500 and Object 2, because indication 1026b optionally corresponds to a range of distances rather than a singular or direct distance between device 500 and Object 2. For example, if Object 2 were to move to being 19 feet from device 500, device 500 would optionally leave indication 1026b unchanged in user interface 1012b, because indication 1026b ("Far") optionally corresponds to a range of distances (e.g., 15-25 feet) that includes the original and the updated distance between device 500 and Object 2. Therefore, in some embodiments, once the object being located is within a threshold distance of device 500 (e.g., within 20 or 25 feet of device 500), the user interfaces of the first and second locator processes diverge as described.

In FIGS. 10I-10J, device 500 and/or Objects 1 or 2 have moved such that Objects 1 and 2 are now 10 feet to the left of device 500. In response, in FIG. 10I in which device 500 is utilizing the first locator process to locate Object 1, device 500 updates directional indication 1024 (e.g., to be pointed towards the left) and distance/direction indication 1026a to indicate that Object 1 is 10 feet to the left of device 500. As described previously, directional indication 1024 is optionally updated by device 500 in real-time as the relative direction of Object 1 changes (e.g., due to positional or orientational movement of device 500 and/or Object 1). Further, distance/direction indication 1026a is also optionally updated by device 500 in real-time as the distance and/or relative direction of Object 1 changes (e.g., due to positional or orientational movement of device 500 and/or Object 1).

In FIG. 10J in which device 500 is utilizing the second locator process to locate Object 2, because Object 2 is now no longer within the "Far" range of distances of 15-25 feet, but is now within the "Closer" range of distances of 8-15 feet, device 500 updates distance indication 1026b to indicate "Closer" (which corresponds to the range of distances of 8-15 feet)—user interface 1012b continues to not include a directional indication of Object 2 relative to device 500, and continues to not include an indication of 10 feet, as described previously, but rather includes a less precise indication of distance of Object 2 from device 500. Thus, the user interfaces of the first and second locator processes continue to differ as described.

In FIGS. 10K-10L, device 500 and/or Objects 1 or 2 have moved such that Objects 1 and 2 are now 5 feet in front of device 500. In response, in FIG. 10K in which device 500 is utilizing the first locator process to locate Object 1, device

500 updates directional indication 1024 (e.g., to be pointed straight ahead of device 500) and distance/direction indication 1026a to indicate that Object 1 is 5 feet in front or ahead of device 500. As described previously, directional indication 1024 is optionally updated by device 500 in real-time as the relative direction of Object 1 changes (e.g., due to positional or orientational movement of device 500 and/or Object 1). Further, distance/direction indication 1026a is also optionally updated by device 500 in real-time as the distance and/or relative direction of Object 1 changes (e.g., due to positional or orientational movement of device 500 and/or Object 1).

In FIG. 10L in which device 500 is utilizing the second locator process to locate Object 2, because Object 2 is now no longer within the "Closer" range of distances of 8-15 feet, but is now within the "Nearby" range of distances of 3-8 feet, device 500 updates distance indication 1026b to indicate "Nearby" (which corresponds to the range of distances of 3-8 feet)—user interface 1012b continues to not include a directional indication of Object 2 relative to device 500, and continues to not include an indication of 5 feet, as described previously, but rather includes a less precise indication of distance of Object 2 from device 500. Thus, the user interfaces of the first and second locator processes continue to differ as described.

In FIGS. 10M-10N, device 500 and/or Objects 1 or 2 have moved such that Objects 1 and 2 are now 3 feet in front of device 500. In some embodiments, when the object being located is within a threshold distance (e.g., the same threshold distance for both the first and the second locator processes, or a different threshold distance for the first and the second locator processes) of device 500, device 500 displays a geometric shape on the locator process user interfaces, as will now be described. In some embodiments, the threshold distance is three feet from device 500. In some embodiments, the threshold distance of FIGS. 10M-10N is less than the threshold distance that causes device 500 to switch from displaying the user interfaces of FIGS. 10E-10F to displaying the user interfaces of FIGS. 10G-10H.

In response to Object 1 being within the threshold distance (e.g., 3 feet) of device 500, in FIG. 10M in which device 500 is utilizing the first locator process to locate Object 1, device updates user interface 1012a to include a geometric shape indicator 1028a. In some embodiments, indicator 1028a is a circle, a square, a triangle, etc. In some embodiments, the shape of indicator 1028a corresponds to the shape of Object 1 (e.g., the object being located), such that different objects being located result in a different shape of indicator 1028a displayed by device 500. In some embodiments, indicator 1028a includes an inner geometric shape (e.g., a filled circle) within a larger outer geometric shape (e.g., an unfilled circle). As Object 1 becomes closer to device 500, device 500 optionally updates display of indicator 1028a such that the inner geometric shape remains constant, but the outer geometric shape becomes smaller and smaller until it reaches the inner geometric shape (e.g., when Object 1 is at the same location as device 500), as will be described. In FIG. 10M, device 500 also updates indicator 1026a to indicate that Object 1 is three feet ahead of device 500. Further, device 500 ceases displaying directional indicator 1024 that was displayed previously in FIG. 10K, for example.

In response to Object 2 being within the threshold distance (e.g., 3 feet) of device 500, in FIG. 10N in which device 500 is utilizing the second locator process to locate Object 2, device updates user interface 1012b to include a geometric shape indicator 1028b. In some embodiments, indicator 1028b is the same indicator as indicator 1028a in FIG. 10M, though is optionally updated differently than indicator 1028a in FIG. 10M, as will be described. Indicator 1028b is optionally a circle, a square, a triangle, etc. In some embodiments, the shape of indicator 1028b corresponds to the shape of Object 2 (e.g., the object being located), such that different objects being located result in a different shape of indicator 1028b displayed by device 500. In some embodiments, indicator 1028b includes an inner geometric shape (e.g., a filled circle) within a larger outer geometric shape (e.g., an unfilled circle). As Objects 2 becomes closer to device 500—but optionally only as it gets closer by certain predetermined intervals of distance, as will be described—device 500 optionally updates display of indicator 1028b such that the inner geometric shape remains constant, but the outer geometric shape becomes smaller and smaller until it reaches the inner geometric shape (e.g., when Object 2 is at the same location as device 500), as will be described. In FIG. 10N, device 500 also updates indicator 1026b to indicate that Object 2 is within the "Very Close" range of distances of zero to three feet (e.g., by updating indicator 1026b to indicate "Very Close" (which corresponds to the range of distances of zero to three feet)—user interface 1012b continues to not include a directional indication of Object 2 relative to device 500.

In some embodiments, the sizes and/or shapes of indicators 1028a and 1028b displayed by device 500 in the first and second locator processes, respectively, are the same at the moment they are displayed. For example, upon the object being located being within three feet of device 500 (e.g., the threshold distance at which device 500 switches from displaying the user interfaces of FIGS. 10K-10L to displaying the user interfaces of FIGS. 10M-10N), device 500 displays the same size and/or shape indicator in user interfaces 1012a and 1012b in the first and second locator processes, respectively.

However, as mentioned previously, after indicators 1028a and 1028b are displayed by device 500, device 500 optionally updates indicators 1028a and 1028b differently as a function of the distance between device 500 and the object being located depending on which locator process is being utilized by device 500. For example, in FIGS. 10O-10P, device 500 and/or Objects 1 or 2 have moved such that Objects 1 and 2 are now 2 feet in front of device 500. In response, in FIG. 10O in which device 500 is utilizing the first locator process to locate Object 1, device 500 updates indicator 1028a to reduce the size of the outer geometric shape (e.g., while maintaining the size of the inner geometric shape) to correspond to a distance of two feet from device 500. Device 500 also updates indicator 1026a to indicate that Object 1 is now 2 feet in front of device 500.

In contrast, in FIG. 10P in which device 500 is utilizing the second locator process to locate Object 2, device 500 does not update indicator 1028b in response to Object 2 moving from three feet away from device 500 to two feet away from device 500—device 500 optionally displays the inner and outer geometric shapes of indicator 1028b at the same size as they were displayed in FIG. 10N. This is optionally the case because in the second locator process, distance between the object being located and device 500 needs to change by some minimum distance or predefined interval(s) of distance(s) before device 500 updates indicator 1028b. For example, the distance between the object being located and device 500 needs to change by two feet to cause device 500 to update indicator 1028b. In some embodiments, the sizes of the geometric shapes of indicator 1028b in FIGS. 10N and 10P optionally correspond to Object 2 being in the range of two to three feet from device 500—and because Object 2 remains within that range of two to three feet from device 500 in FIG. 10P, device 500 maintains display of indicator 1028b at the same size at which it was displayed in FIG. 10N. In FIG. 10P, device 500 also maintains display of indicator 1026b to indicate "Very Close" (which corresponds to the range of distances of zero to three feet), and user interface 1012b continues to not include a directional indication of Object 2 relative to device 500.

In FIGS. 10Q-10R, device 500 and/or Objects 1 or 2 have moved such that Objects 1 and 2 are now 1 foot in front of device 500. In response, in FIG. 10Q in which device 500 is utilizing the first locator process to locate Object 1, device 500 updates indicator 1028a to again reduce the size of the outer geometric shape (e.g., while maintaining the size of the inner geometric shape) to correspond to a distance of one foot from device 500. Device 500 also updates indicator 1026a to indicate that Object 1 is now 1 foot in front of device 500.

In FIG. 10R in which device 500 is utilizing the second locator process to locate Object 2, device 500 also updates indicator 1028b in response to Object 2 moving from two feet away from device 500 to one foot away from device 500 by reducing the size of the outer geometric shape (e.g., while maintaining the size of the inner geometric shape) to correspond to a distance of one foot from device 500. The sizes of the outer and inner geometric shapes of indicator 1028b in FIG. 10R optionally correspond to a distance range of zero to two feet (or just under two feet) of Object 2 from device 500. Therefore, device 500 optionally updates indicator 1028b to the sizes shown in FIG. 10R in response to Object 2 becoming less than two feet from device 500, and optionally maintains the sizes of indicator 1028b until Object 2 is located. In some embodiments, the sizes of the inner and outer geometric shapes of indicators 1028a and 1028b in FIGS. 10Q-R are the same. In FIG. 10R, device 500 also maintains display of indicator 1026b to indicate "Very Close" (which corresponds to the range of distances of zero to three feet), and user interface 1012b continues to not include a directional indication of Object 2 relative to device 500.

Figure 10S:
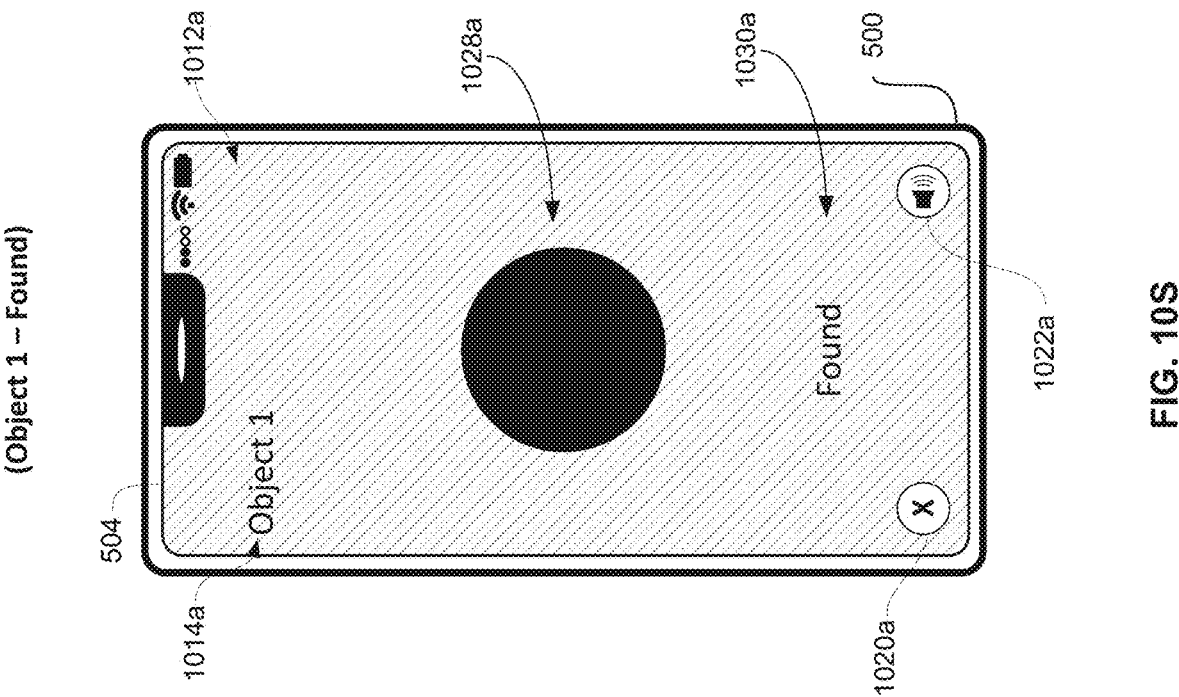
Figure 11A:
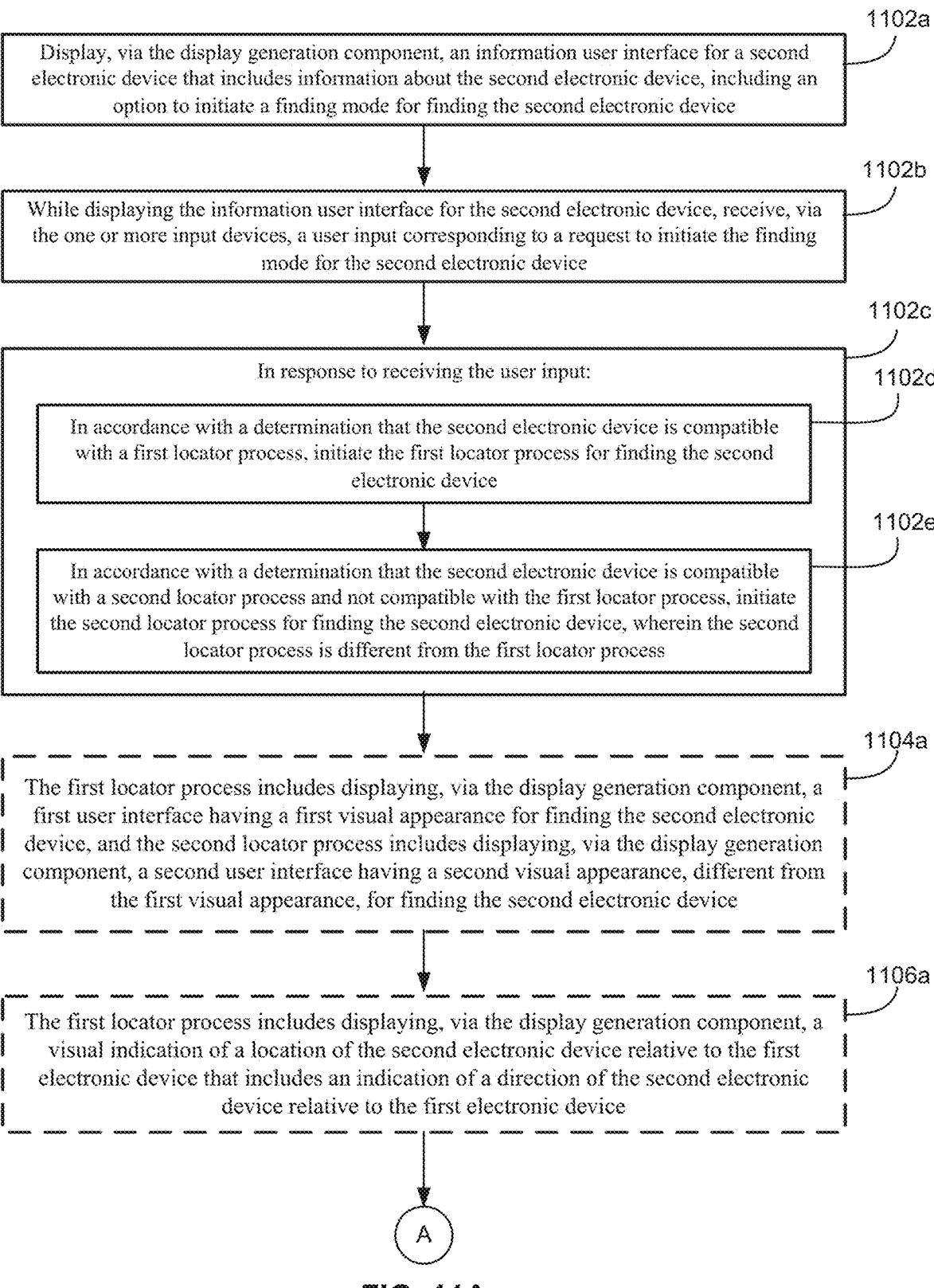
FIGS. 11A-11F are flow diagrams illustrating a method 1100 of utilizing a first or second locator process for locating a device or a remote locator object based on the device or remote locator object being located in accordance with some embodiments.
Figure 11B:
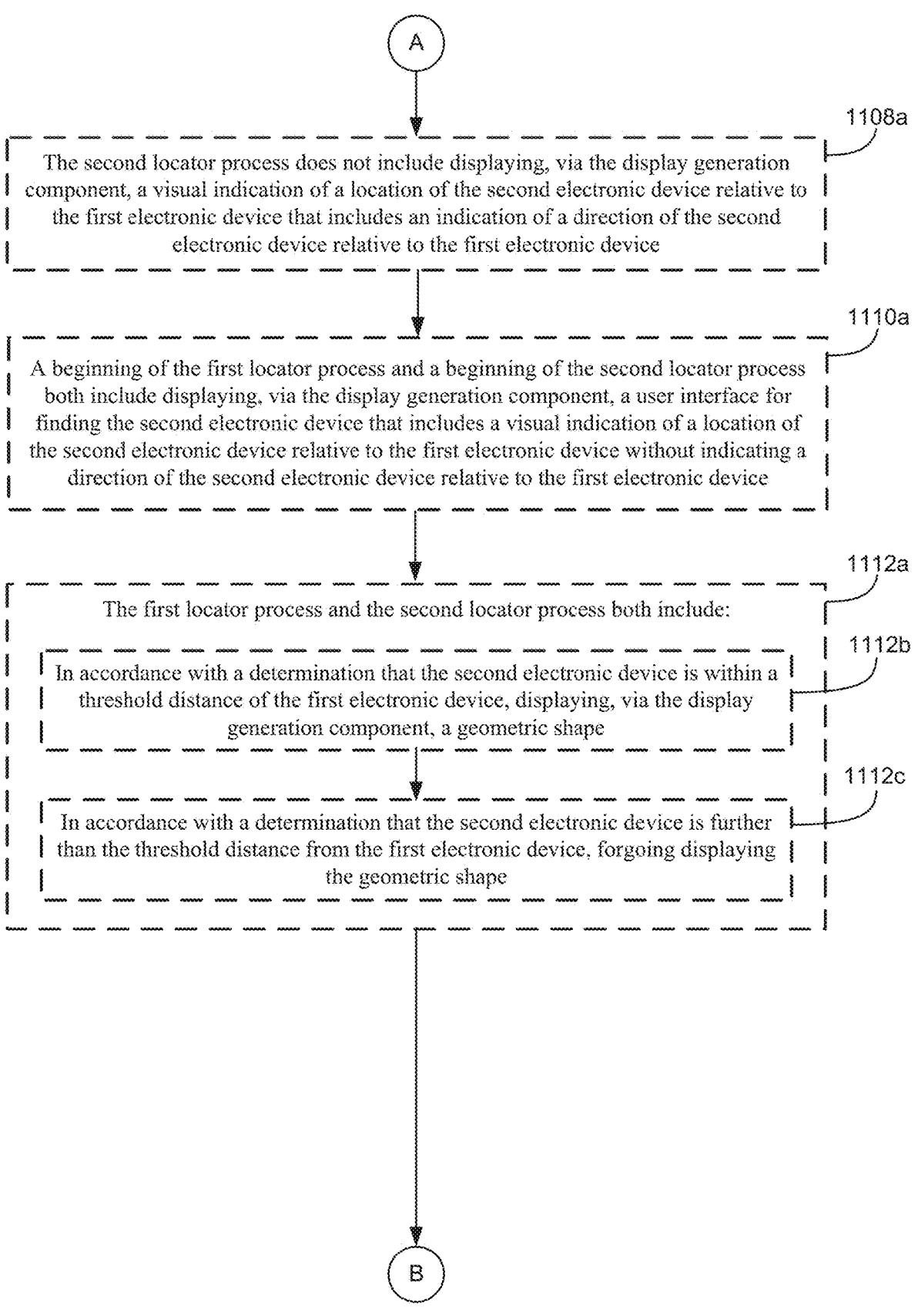
Figure 11C:
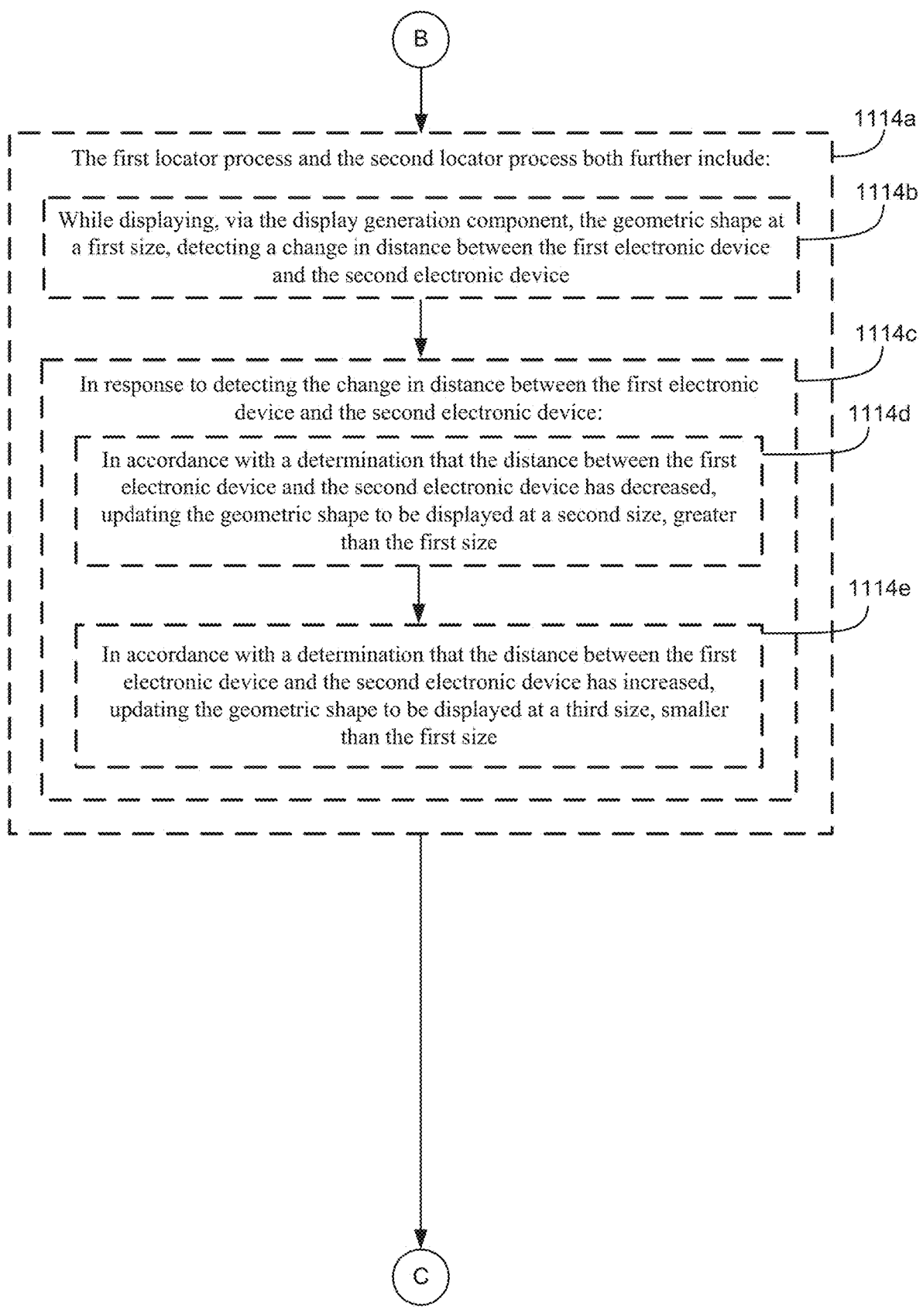
Figure 11D:
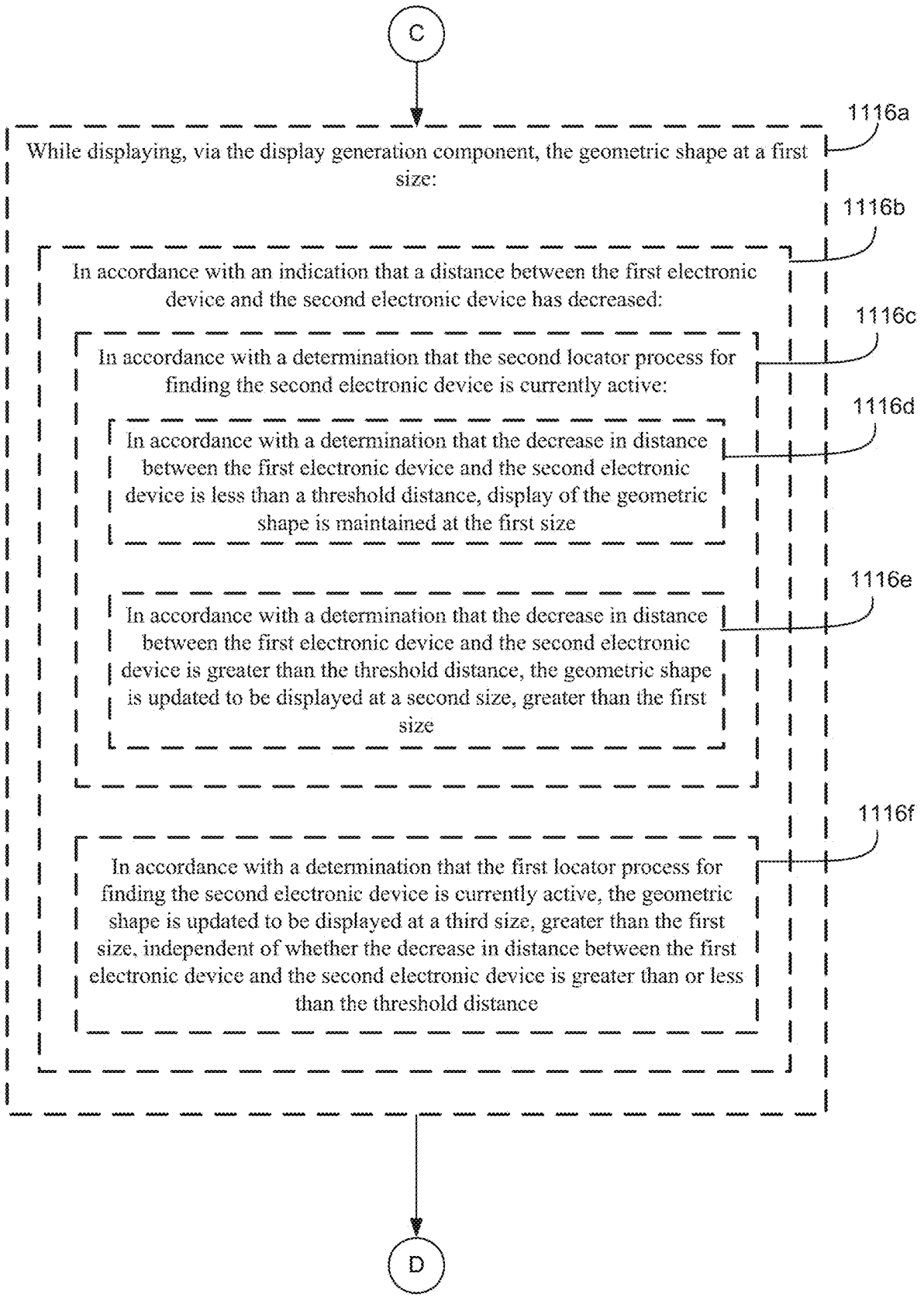
Figure 11E:
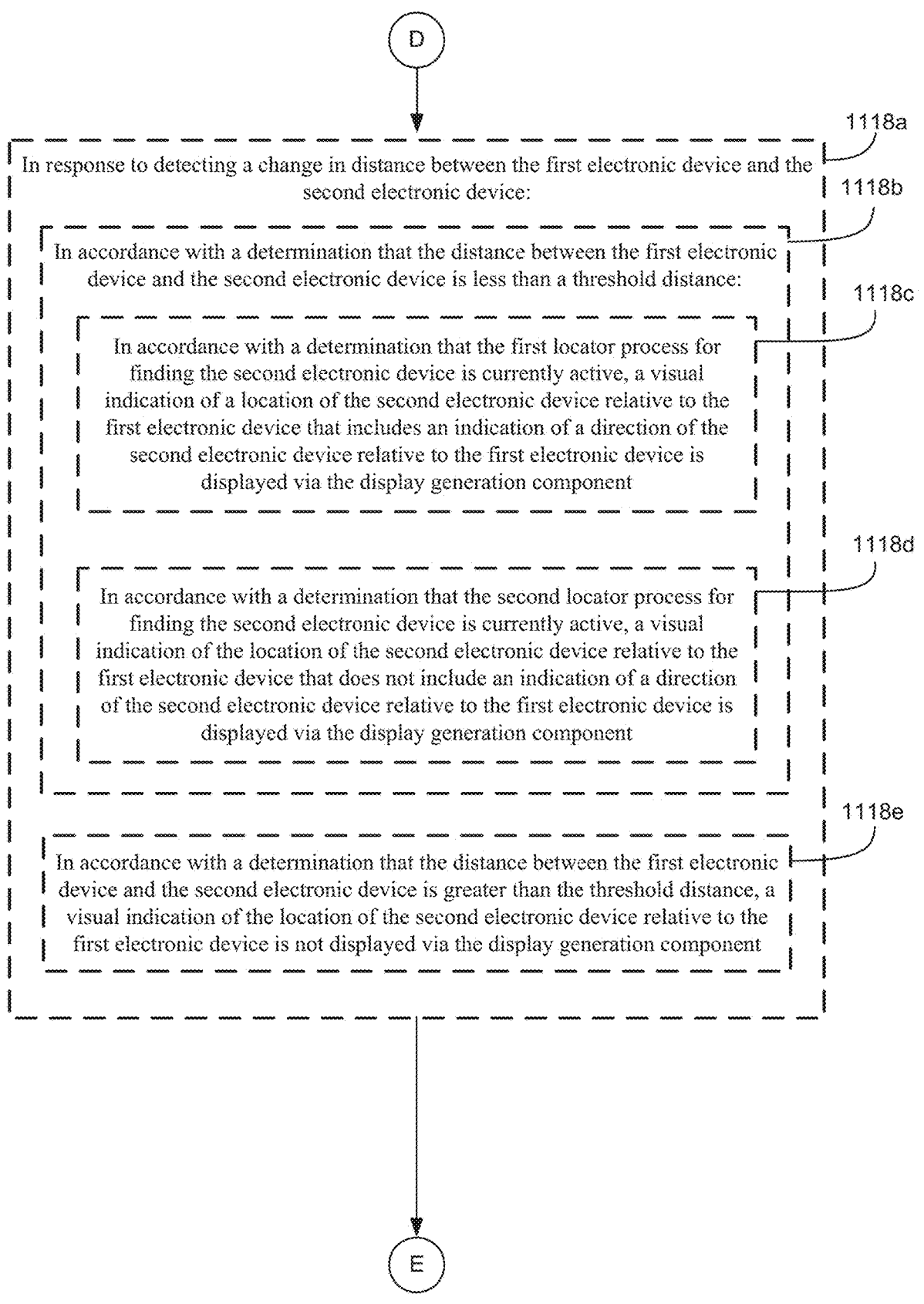
Figure 11F:
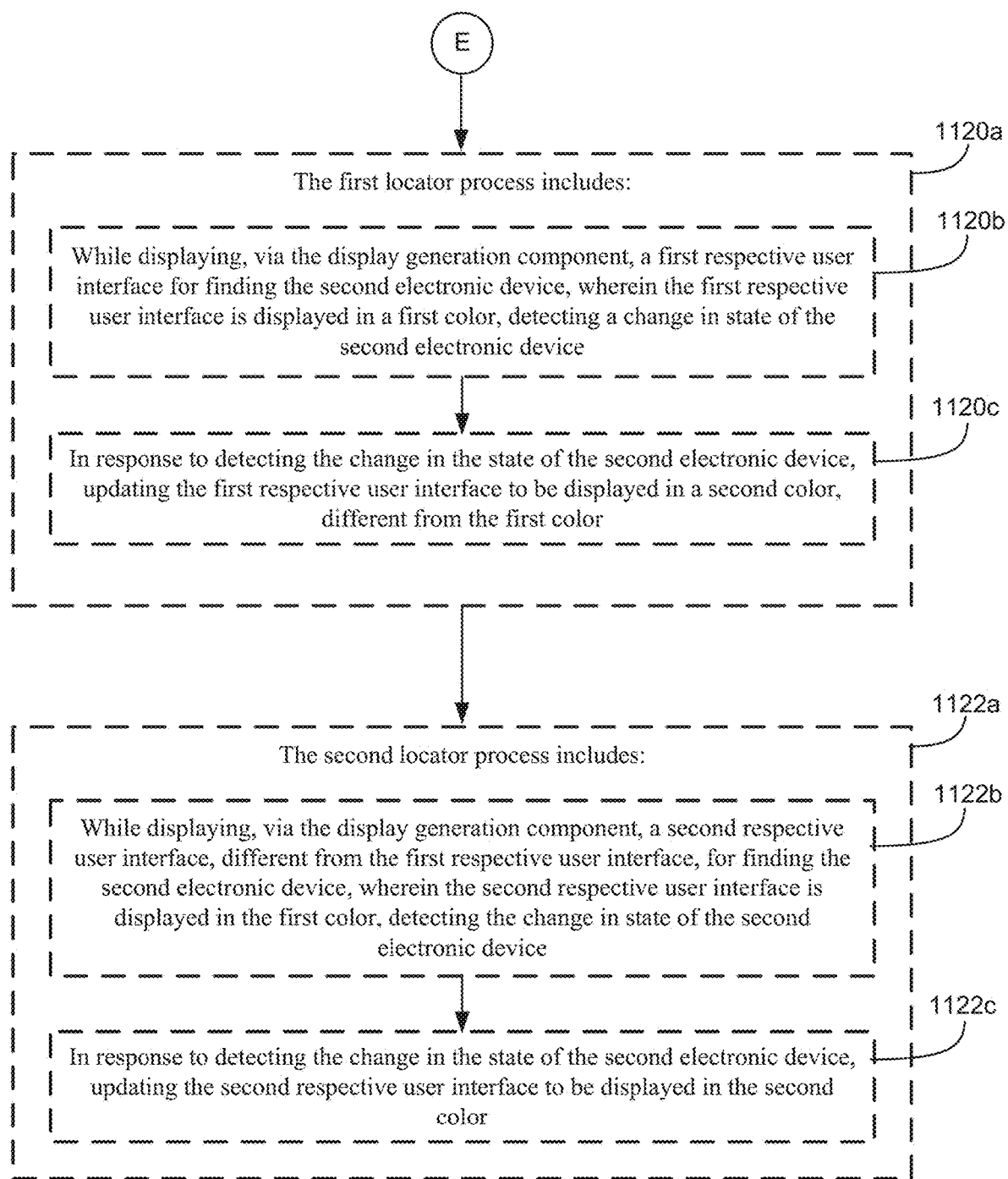

In FIGS. 10S-10T, Objects 1 and 2 have been designated as found in response to, for example, Objects 1 and 2 changing status (e.g., having been placed in their respective cases, having started charging, having been placed in a user's ear (e.g., if they are earbuds), having been placed on a user's wrist (e.g., if they are smart watches), having been attached to device 500 (e.g., magnetically) if they are attachable accessories, etc.) and/or being within 0.5, 1, 2, 4, 6, 12 inches of device 500. In FIG. 10S in which device 500 is utilizing the first locator process to locate Object 1, in response to Object 1 being designated as found (e.g., in response to changing status), device 500 optionally updates indicator 1028a to only include the inner geometric shape (e.g., at the same size at which it was displayed in FIG. 10Q) and to not include the outer geometric shape, and updates indicator 1030a to indicate the changed status of Object 1 (e.g., "Found" or "Placed in Ear" or "Charging" or "Attached", etc.). Additionally or alternatively, device 500 updates user interface 1012a (e.g., the background of user interface 1012a) to have a different color than it had before in FIGS. 10A-10R, for example. In some embodiments, the background color of user interface in FIGS. 10A-10R was white, black, or grey, and the background color of user interface in FIG. 10S in response to Object 1 being designated as found is green, for example. Indicator 1028a is optionally displayed over the current background color in FIGS. 10A-10S.

Device 500 that is utilizing the second locator process optionally updates user interface 1012b similarly or in the same manner as device 500 that is utilizing the first locator process. For example, in FIG. 10T in which device 500 is utilizing the second locator process to locate Object 2, in response to Object 2 being designated as found (e.g., in response to changing status), device 500 optionally updates indicator 1028b to only include the inner geometric shape (e.g., at the same size at which it was displayed in FIG. 10R) and to not include the outer geometric shape, and updates indicator 1030b to indicate the changed status of Object 2 (e.g., "Found" or "Placed in Ear" or "Charging" or "Attached", etc.). Additionally or alternatively, device 500 updates user interface 1012b (e.g., the background of user interface 1012b) to have a different color than it had before in FIGS. 10A-10R, for example. In some embodiments, the background color of user interface in FIGS. 10A-10R was white, black, or grey, and the background color of user interface in FIG. 10T in response to Object 2 being designated as found is green, for example. Indicator 1028b is optionally displayed over the current background color in FIGS. 10A-10T. The background color of user interface 1012a through the various stages of the first locator process, including the stage at which Object 1 is designated as found, is optionally the same as the background color of user interface 1012b through the various stages of the second locator process, including the stage at which Object 2 is designated as found, and are optionally updated in the same way in response to Objects 1 and 2 being designated as found in the first and second locator processes. Thus, in some embodiments, the first locator process and the second locator process both end with device 500 displaying the same user interface in both processes in response to the objects being located being designated as found (e.g., based on a change in status of the objects being located).

FIGS. 11A-11F are flow diagrams illustrating a method 1100 of utilizing a first or second locator process for locating a device or a remote locator object based on the device or remote locator object being located in accordance with some embodiments, such as in FIGS. 10A-10T. The method 1100 is optionally performed at an electronic device such as device 100, device 300, or device 500 as described above with reference to FIGS. 1A-1B, 2-3, 4A-4B and 5A-5H. Some operations in method 1100 are, optionally combined and/or order of some operations is, optionally, changed.

As described below, the method 1100 provides ways to utilize a first or second locator process for locating a device or a remote locator object based on the device or remote locator object being located. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1100 is performed at a first electronic device (e.g., device 500) in communication with one or more wireless antenna, a display generation component, and one or more input devices (e.g., a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the electronic device displays (1102a), via the display generation component, an information user interface for a second electronic device that includes information about the second electronic device, such as user interfaces 1008a and 1008b in FIGS. 10A-10B (e.g., a map user interface that optionally includes an indication of the location of the second electronic device on a map and/or one or more affordances for changing settings for the second electronic device and/or performing operations associated with the second electronic device such as causing the second electronic device to emit a sound, for example, to assist in finding the second electronic device), including an option to initiate a finding mode for finding the second electronic device, such as options 1010a and 1010b in FIGS. 10A-10B (e.g., an affordance that is selectable to initiate a process to find the second electronic device (e.g., similar to a finding user interface as described with reference to method 1300). In some embodiments, the second electronic device is a remote locator object, as described above with respect to method 900. In some embodiments, the second electronic device is a mobile device similar to the first electronic device. In some embodiments, the second electronic device is any device that is able to gather and provide location information to the first electronic device (e.g., directly, via a server, via another electronic device, etc.). In some embodiments, the process for finding the second electronic device includes displaying a map user interface optionally with one or more navigation directions (e.g., driving directions, transit directions, etc.) for navigating to a location associated with the second electronic device (e.g., the last known location for the second electronic device, provided to the first electronic device from the second electronic device). In some embodiments, the process for finding the second electronic device includes displaying a finding user interface that indicates the distance of the first electronic device from the second electronic device (e.g., 5 feet away, 10 feet away, 20 feet away, etc.) and/or the position of the second electronic device relative to the first electronic device (e.g., forward, to the left, behind, etc.) (e.g., optionally without providing navigation directions on a map).

In some embodiments, while displaying the information user interface for the second electronic device, the electronic device receives 1102b, via the one or more input devices, a user input corresponding to a request to initiate the finding mode for the second electronic device, such as selection of options 1010a and 1010b in FIGS. 10C-10D (e.g., a tap on the selectable affordance or a selection input while the selectable affordance has a focus or a voice input for initiating the finding mode for the second electronic device.

In some embodiments, in response to receiving the user input (1102c), in accordance with a determination that the second electronic device is compatible with a first locator process (e.g., if the second electronic device has a first set of locator capabilities and/or technology and is able to provide a first set of location information to the first electronic device), the electronic device initiates (1102d) the first locator process for finding the second electronic device, such as shown in FIG. 10E with respect to Object 1 (e.g., initiating a method for finding the second electronic device that optionally takes advantage of the ability of the second electronic device to provide information to the first electronic device such that the first electronic device can determine both the distance and relative direction of the second electronic device compared to the first electronic device). For example, the first locator process is able to determine the distance between the second electronic device (e.g., 5 feet away, 10 feet away, 50 feet away, etc.) and the first electronic device and the directional position of the second electronic device relative to the first electronic device (e.g., straight ahead, to the left, to the right, behind, etc.). For example, the first locator process includes the Angle of Arrival (AoA) and/or the Angle of Departure (AoD) features of Bluetooth 5.0 and/or ultra-wide band radio technology) In some embodiments, the first locator process includes displaying both distance information and direction information (e.g., optionally concurrently or not concurrently). In some embodiments, using the first locator process provides the first electronic device with more accurate distance and/or direction information than using the second locator process described below.

In some embodiments, in response to receiving the user input (1102c), in accordance with a determination that the second electronic device is compatible with a second locator process and not compatible with the first locator process (e.g., the second electronic device has a second set of locator capabilities and/or technology (e.g., does not include the first set of locator abilities)) and is able to provide a second set of location information to the first electronic device, but not the first set of information to the first electronic device, the electronic device initiates (1102e) the second locator process for finding the second electronic device, wherein the second locator process is different from the first locator process, such as shown in FIG. 10F with respect to Object 2 (e.g., initiating a method for finding the second electronic device that takes into account the inability to determine the relative direction of the second electronic device and/or the inability to provide the more accurate and/or precise distance and/or direction capabilities of the first locator process). For example, the second locator process is able to determine a distance between the second electronic device and the first electronic device, but is not able to determine the directional position of the second electronic device relative to the first electronic device (e.g., the first electronic device is able to determine how far away the second electronic device is, but not whether the second electronic device is in front, to the left, behind, to the right, etc. and/or the first electronic device is able to determine distance and/or direction to a lesser degree of accuracy and/or precision than with the first locator process). In some embodiments, the second locator process includes displaying the distance information, but does not include displaying direction information.

The above-described manner of initiating a respective locator process for locating an electronic device (e.g., based on whether the electronic device to be found is compatible with a first or second type of locator process) provides a quick and efficient manner of selecting an appropriate locator process for locating the electronic device (e.g., automatically, based on the capabilities of the electronic device being found, without requiring the user to perform additional inputs to select the type of locator process), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first locator process includes displaying, via the display generation component, a first user interface having a first visual appearance for finding the second electronic device, such as user interface 1012a in FIG. 10G, and the second locator process includes displaying, via the display generation component, a second user interface having a second visual appearance, different from the first visual appearance, for finding the second electronic device (1104a), such as user interface 1012b in FIG. 10H. For example, the first user interface of the first locator process includes information about the relative location/orientation/direction of the second electronic device with respect to the first electronic device and information about a distance between the first electronic device and the second electronic device, and the second user interface includes information about the distance between the first electronic device and the second electronic device, but does not include information about the relative location/orientation/direction of the second electronic device with respect to the first electronic device. In some embodiments, the first user interface has a different arrangement/structure than the second user interface. For example, in some embodiments, the first user interface includes a visual indication of the relative location/orientation/direction of the second electronic device with respect to the first electronic device in a center region of the user interface, and a visual indication of the distance between the devices in an outer region of the user interface, and the second user interface includes a visual indication of the distance between the devices in the center region of the user interface. In some embodiments, the visual indications of the distance between the devices are different in the first and second user interfaces.

The above-described manner of displaying user interfaces with different visual appearances depending on the finding process provides a quick and efficient manner of indicating the finding process that is currently in effect, which simplifies the interaction between the user and the electronic device and enhances the operability of the electronic device and makes the user-device interface more efficient (e.g., by avoiding erroneous interaction with the device meant for a different finding process), which additionally reduces power usage and improves battery life of the electronic device by enabling the user to use the electronic device more quickly and efficiently.

In some embodiments, the first locator process includes displaying, via the display generation component, a visual indication of a location of the second electronic device relative to the first electronic device that includes an indication of a direction of the second electronic device relative to the first electronic device (1106a), such as indication 1024 in FIG. 10G. For example, during the first locator process, the first electronic device is able to determine the distance of the second electronic device from the first electronic device and determine the relative orientation or direction of the second electronic device with respect to the first electronic device (e.g., straight ahead, ahead and to the right, to the right, etc.). In some embodiments, during the first locator process, the first electronic device displays a user interface that includes a visual indication of the distance and a visual indication of the relative orientation. For example, the first locator process is based on ultra-wideband radio technology.

The above-described manner of indicating the location of the second electronic device when the finding process is able to do so provides a quick and efficient manner of providing directions to the second electronic device, which simplifies the interaction between the user and the electronic device and enhances the operability of the electronic device and makes the user-device interface more efficient (e.g., by avoiding incorrect movements for finding the second electronic device), which additionally reduces power usage and improves battery life of the electronic device by enabling the user to use the electronic device more quickly and efficiently.

In some embodiments, the second locator process does not include displaying, via the display generation component, a visual indication of a location of the second electronic device relative to the first electronic device that includes an indication of a direction of the second electronic device relative to the first electronic device (1108a), such as user interface 1012b in FIG. 10H not including an indication of a direction of Object 2 relative to device 500. In some embodiments, during the second locator process, the first electronic device is not able to determine the distance of the second electronic device from the first electronic device and determine the relative orientation/direction of the second electronic device with respect to the first electronic device (e.g., straight ahead, ahead and to the right, to the right, etc.). In some embodiments, during the second locator process, the first electronic device is able to determine the distance of the second electronic device from the first electronic device, but is not able to determine the relative orientation/direction of the second electronic device with respect to the first electronic device. In some embodiments, the distance determination during the second locator process is less accurate/precise than the distance determination during the first locator process. In some embodiments, the second locator process is based on Bluetooth signal strength between the first electronic device and the second electronic device. Thus, in some embodiments, during the second locator process, the first electronic device displays indications of ranges of distances between the first and second devices (e.g., 10-15 feet, 20-25 feet, 15-30 feet) rather than a precise indication of the distance between the first and second devices (e.g., 12 feet, 21 feet, 16 feet), and in some embodiments, during the second locator process, the first electronic device does not display an indication of a direction (e.g., to the right, straight ahead, to the left, etc.) of the second electronic device relative to the first electronic device.

The above-described manner of not indicating the direction of the second electronic device when the finding process is not able to do so ensures that erroneous direction information is not displayed, which simplifies the interaction between the user and the electronic device and enhances the operability of the electronic device and makes the user-device interface more efficient (e.g., by avoiding incorrect movements for finding the second electronic device), which additionally reduces power usage and improves battery life of the electronic device by enabling the user to use the electronic device more quickly and efficiently.

In some embodiments, a beginning of the first locator process and a beginning of the second locator process both include displaying, via the display generation component, a user interface for finding the second electronic device that includes a visual indication of a location of the second electronic device relative to the first electronic device without indicating a direction of the second electronic device relative to the first electronic device (1110a), such as user interfaces 1012a and 1012b in FIGS. 10E and 10F indicating that the objects being located are too far from device 500, without indicating a direction of the objects being located relative to device 500. For example, at the start of the first locator process (e.g., when the second electronic device is too far from the first electronic device for its relative location to be accurately determined, or when the orientation of the first electronic device must move through a plurality of orientations to calibrate the locator process), the first electronic device does not display an indication of the relative direction of the second electronic device. In some embodiments, the first electronic device displays a user interface that indicates a distance of the second electronic device from the first electronic device and/or an indication to move/change the orientation of the first electronic device through a range of positions/orientations to calibrate/lock onto the relative location of the second electronic device. In some embodiments, the first electronic device displays the same as described above at the start of the second locator process as well, despite later stages of the second locator process having different information/user interfaces, as described above.

The above-described manner of starting both locator processes with the same/similar displayed information ensures that erroneous location information is not displayed in either process, which simplifies the interaction between the user and the electronic device and enhances the operability of the electronic device and makes the user-device interface more efficient (e.g., by avoiding incorrect movements for finding the second electronic device), which additionally reduces power usage and improves battery life of the electronic device by enabling the user to use the electronic device more quickly and efficiently.

In some embodiments, the first locator process and the second locator process both include (1112a), in accordance with a determination that the second electronic device is within a threshold distance (e.g., 0.1, 0.5, 1, 2, 3, 5, 10 feet) of the first electronic device, displaying, via the display generation component, a geometric shape, such as shown by indicators 1028a and 1028b in FIGS. 10M and 10N, respectively (e.g., that corresponds to a shape of the second electronic device) (1112b). For example, if the second electronic device is round, the geometric shape that is displayed is round. In some embodiments, if the second electronic device is rectangular, the geometric shape that is displayed is rectangular. In some embodiments, the first electronic device ceases displaying an indication of the relative location of the second electronic device with respect to the first electronic device and/or a distance from the second electronic device to the first electronic device when it displays the geometric shape.

In some embodiments, the first locator process and the second locator process both include (1112a), in accordance with a determination that the second electronic device is further than the threshold distance from the first electronic device, forgoing displaying the geometric shape (1112c), such as the circular indicators 1028a and 1028b in FIGS. 10M and 10N not being displayed in FIGS. 10K and 10L. For example, until the first electronic device is within the threshold distance of the second electronic device, the first electronic device does not display the geometric shape, but instead displays an indication of the relative location of the second electronic device with respect to the first electronic device and/or a distance from the second electronic device to the first electronic device.

The above-described manner of displaying a geometric shape when within a threshold distance of the second electronic device provides a quick and efficient manner of indicating that the second electronic device is within the threshold distance of the first electronic device, which simplifies the interaction between the user and the electronic device and enhances the operability of the electronic device and makes the user-device interface more efficient (e.g., by avoiding large movements for finding the second electronic device when it is within the threshold distance of the first electronic device), which additionally reduces power usage and improves battery life of the electronic device by enabling the user to use the electronic device more quickly and efficiently.

In some embodiments, the first locator process and the second locator process both further include (1114a), while displaying, via the display generation component, the geometric shape at a first size, detecting a change in distance between the first electronic device and the second electronic device (1114b), such as Objects 1 and 2 getting closer to device 500 in FIGS. 10M and 10N, respectively (e.g., the first electronic device has been moved, by the user, to a greater or lesser distance from the second electronic device, and/or the second electronic device has moved to a greater or lesser distance from the first electronic device).

In some embodiments, the first locator process and the second locator process both further include (1114a), in response to detecting the change in distance between the first electronic device and the second electronic device (1114c), in accordance with a determination that the distance between the first electronic device and the second electronic device has decreased, updating the geometric shape to be displayed at a second size, greater than the first size (1114d), such as circular indicators 1028a and 1028b in FIGS. 10M and 10N increasing in size (e.g., once the geometric shape is displayed by the first electronic device, as the first and second electronic devices move closer together, the first electronic device increases (or decreases) the size of the geometric shape to indicate that the second electronic device is getting closer to the first electronic device).

In some embodiments, the first locator process and the second locator process both further include (1114a), in response to detecting the change in distance between the first electronic device and the second electronic device (1114c), in accordance with a determination that the distance between the first electronic device and the second electronic device has increased, updating the geometric shape to be displayed at a third size, smaller than the first size (1114e), such as circular indicators 1028a and 1028b in FIGS. 10M and 10N decreasing in size (e.g., once the geometric shape is displayed by the first electronic device, as the first and second electronic devices move further apart, the first electronic device decreases (or increases) the size of the geometric shape to indicate that the second electronic device is getting further away from the first electronic device).

The above-described manner of changing the size of the geometric shape provides a quick and efficient manner of indicating whether the first electronic device is moving closer to or further away from the second electronic device, which simplifies the interaction between the user and the electronic device and enhances the operability of the electronic device and makes the user-device interface more efficient (e.g., by avoiding erroneous movements for finding the second electronic device), which additionally reduces power usage and improves battery life of the electronic device by enabling the user to use the electronic device more quickly and efficiently.

In some embodiments, while displaying, via the display generation component, the geometric shape at a first size (1116a) (e.g., as part of the first or second locator processes), in accordance with an indication that a distance between the first electronic device and the second electronic device has decreased (1116b) (e.g., the first electronic device has been moved, by the user, to a lesser distance from the second electronic device, and/or the second electronic device has moved to a lesser distance from the first electronic device), in accordance with a determination that the second locator process for finding the second electronic device is currently active (1116*c*) (e.g., the second electronic device is compatible with the second locator process but not the first locator process, and therefore the first electronic device is performing the second locator process for finding the second electronic device), in accordance with a determination that the decrease in distance between the first electronic device and the second electronic device is less than a threshold distance (e.g., 1 inch, 2 inches, 6 inches, 12 inches, 24 inches, 36 inches, 48 inches, etc.), display of the geometric shape is maintained at the first size (1116*d*), such as indicator 1028*b* not changing from FIG. 10N to 10P. In some embodiments, because the accuracy of the distance determination of the second locator process may not be very high, the indication that the distance between the devices has decreased may have relatively low precision. In some embodiments, the indication of the change in distance between the two devices is based on a Bluetooth signal strength between the first and second devices increasing (e.g., for the second locator process). In some embodiments, the indication of the change in distance between the two devices is based on an ultra-wideband signal between the first and second devices (e.g., for the first locator process). In some embodiments, while displaying, via the display generation component, the geometric shape at a first size (1116*a*) (e.g., as part of the first or second locator processes), in accordance with an indication that a distance between the first electronic device and the second electronic device has decreased (1116*b*) (e.g., the first electronic device has been moved, by the user, to a lesser distance from the second electronic device, and/or the second electronic device has moved to a lesser distance from the first electronic device), in accordance with a determination that the second locator process for finding the second electronic device is currently active (1116*c*) (e.g., the second electronic device is compatible with the second locator process but not the first locator process, and therefore the first electronic device is performing the second locator process for finding the second electronic device in accordance with a determination that the decrease in distance between the first electronic device and the second electronic device is greater than the threshold distance (e.g., 1 inch, 2 inches, 6 inches, 12 inches, 24 inches, 36 inches, 48 inches, etc.), the geometric shape is updated to be displayed at a second size, greater than the first size, such as indicator 1028*b* changing from FIG. 10N to 10R (e.g., because the accuracy of the distance determination of the second locator process may be relatively low or inaccurate, in some embodiments, the first electronic device updates the size of the geometric shape in steps, rather than gradually. For example, the first electronic device updates the size of the geometric shape in correspondence with changes in distance between the two devices in steps of 1 inch, 2 inches, 6 inches, 12 inches, 24 inches, 36 inches, 48 inches, etc. In some embodiments, changes in distance that fall within such distance steps do not result in the geometric shape changing size) (1116*e*).

In some embodiments, while displaying, via the display generation component, the geometric shape at a first size (1116*a*) (e.g., as part of the first or second locator processes), in accordance with an indication that a distance between the first electronic device and the second electronic device has decreased (1116*b*) (e.g., the first electronic device has been moved, by the user, to a lesser distance from the second electronic device, and/or the second electronic device has moved to a lesser distance from the first electronic device), in accordance with a determination that the first locator process for finding the second electronic device is currently active (e.g., the second electronic device is compatible with the first locator process, and therefore the first electronic device is performing the first locator process for finding the second electronic device), the geometric shape is updated to be displayed at a third size, greater than the first size (e.g., and less than the second size), independent of whether the decrease in distance between the first electronic device and the second electronic device is greater than or less than the threshold distance (1116*f*), such as indicator 1028*a* changing in both FIGS. 10O and 10Q. For example, because the accuracy of the distance determination of the first locator process may be relatively high or accurate, in some embodiments, the first electronic device updates the size of the geometric shape gradually rather than in steps as the first electronic device determines that the distance between the devices has changed, without waiting for the distance change to reach a step or threshold amount. For example, the first electronic device changes the size of the geometric shape for every 0.1, 0.2, 0.5, 1, 2, 3 inches of change in the distance between the first and second electronic devices.

The above-described manner of changing the size of the geometric shape ensures that inaccurate indications of changes in distance are not indicated in the user interface, which simplifies the interaction between the user and the electronic device and enhances the operability of the electronic device and makes the user-device interface more efficient (e.g., by avoiding erroneous movements for finding the second electronic device), which additionally reduces power usage and improves battery life of the electronic device by enabling the user to use the electronic device more quickly and efficiently.

In some embodiments, in response to detecting a change in distance between the first electronic device and the second electronic device (1118*a*) (e.g., the first electronic device has been moved, by the user, to a lesser or greater distance from the second electronic device, and/or the second electronic device has moved to a lesser or greater distance from the first electronic device), in accordance with a determination that the distance between the first electronic device and the second electronic device is less than a threshold distance (1118*b*) (e.g., 10, 20, 40, 50, 100, 200, 300 feet), in accordance with a determination that the first locator process for finding the second electronic device is currently active (e.g., the second electronic device is compatible with the first locator process, and therefore the first electronic device is performing the first locator process for finding the second electronic device), a visual indication of a location of the second electronic device relative to the first electronic device that includes an indication of a direction of the second electronic device relative to the first electronic device is displayed via the display generation component (1118*c*), such as indicator 1024 in FIG. 10G (e.g., an indication of the directional position of the second electronic device relative to the first electronic device (e.g., straight ahead, to the left, to the right, behind, etc.)). In some embodiments, an indication of the distance of the second electronic device from the first electronic device is displayed (e.g., a textual indication of the distance and/or a graphical indication of the distance, such as via the size of a displayed geometric shape, as previously described). In some embodiments, because the accuracy of the distance determination of the second locator process may not be very high, the indication that the distance between the devices has changed may have relatively low precision. In some embodiments, the indication of the change in distance between the two devices is based on a Bluetooth signal strength between the first and second devices changing (e.g., for the second locator process). In some embodiments, the indication of the change in distance between the two devices is based on an ultra-wideband signal between the first and second devices (e.g., for the first locator process).

In some embodiments, in response to detecting a change in distance between the first electronic device and the second electronic device (1118*a*) (e.g., the first electronic device has been moved, by the user, to a lesser or greater distance from the second electronic device, and/or the second electronic device has moved to a lesser or greater distance from the first electronic device), in accordance with a determination that the distance between the first electronic device and the second electronic device is less than a threshold distance (1118*b*) (e.g., 10, 20, 40, 50, 100, 200, 300 feet), in accordance with a determination that the second locator process for finding the second electronic device is currently active (e.g., the second electronic device is compatible with the second locator process but not the first locator process, and therefore the first electronic device is performing the second locator process for finding the second electronic device), a visual indication of the location of the second electronic device relative to the first electronic device that does not include an indication of a direction of the second electronic device relative to the first electronic device is displayed via the display generation component (1118*d*), such as indication 1026*b* in FIG. 10H, which does not include an indication of a direction of Object 2 relative to device 500 (e.g., an indication of the directional position of the second electronic device relative to the first electronic device (e.g., straight ahead, to the left, to the right, behind, etc.) is not displayed). In some embodiments, an indication of the distance of the second electronic device from the first electronic device is displayed (e.g., a textual indication of the distance and/or a graphical indication of the distance, such as via the size of a displayed geometric shape, as previously described). In some embodiments, in response to detecting a change in distance between the first electronic device and the second electronic device (1118*a*) (e.g., the first electronic device has been moved, by the user, to a lesser or greater distance from the second electronic device, and/or the second electronic device has moved to a lesser or greater distance from the first electronic device), in accordance with a determination that the distance between the first electronic device and the second electronic device is greater than the threshold distance (e.g., 10, 20, 40, 50, 100, 200, 300 feet), a visual indication of the location of the second electronic device relative to the first electronic device is not displayed via the display generation component (1118*e*), such as user interfaces 1012*a* and 1012*b* in FIGS. 10E and 10F when Objects 1 and 2 are further than the threshold distance from device 500. For example, for both the first and second locator processes, when the second electronic device is too far away for the first electronic device to be able to establish a signal connection with the second electronic device, the first electronic device does not display an indication of the location (e.g., distance and/or direction) of the second electronic device relative to the first electronic device. In some embodiments, the first electronic device displays an indication that the second electronic device is too far away to proceed with the first or second locator processes, and once the devices are within the threshold distance of one another, displays the visual indication of the location of the second electronic device relative to the first electronic device that includes the indication of the direction of the second electronic device relative to the first electronic device (e.g., if the first electronic device is performing the first locator process).

The above-described manner of selectively displaying the visual indication of the location of the second electronic device relative to the first electronic device ensures that inaccurate indications of relative location are not indicated in the user interface when accurate indications are unavailable or unlikely, which simplifies the interaction between the user and the electronic device and enhances the operability of the electronic device and makes the user-device interface more efficient (e.g., by avoiding erroneous movements for finding the second electronic device), which additionally reduces power usage and improves battery life of the electronic device by enabling the user to use the electronic device more quickly and efficiently.

In some embodiments, the first locator process includes (1120*a*), while displaying, via the display generation component, a first respective user interface for finding the second electronic device, wherein the first respective user interface is displayed in a first color, such as displaying user interface 1012*a* in FIG. 10Q with a black background (e.g., having a background of the first color. In some embodiments, the indication(s) of the distance and/or relative location of the second electronic device with respect to the first electronic device is (are) displayed over the background), detecting a change in state of the second electronic device (1120*b*), such as Object 1 being found in FIG. 10S (e.g., the second electronic device is one or more earbuds, and the change in state is that earbud, which was previously not in a user's ear, being placed in a user's ear. In some embodiments, the change in state is the earbud being placed in its case and/or charger. In some embodiments, the change in state is the earbud establishing a wired or wireless connection with another electronic device, such as a smartphone. In some embodiments, the first locator process includes (1120*a*), in response to detecting the change in the state of the second electronic device, updating the first respective user interface to be displayed in a second color, different from the first color (1120*c*), such as displaying user interface 1012*a* in FIG. 10S with a green background. For example, the background over which the indication(s) of the distance and/or relative location of the second electronic device with respect to the first electronic device is (are) displayed changes color from the first color to the second color. In some embodiments, display of the indication(s) of the distance and/or relative location of the second electronic device with respect to the first electronic device is maintained. In some embodiments, the first electronic device additionally or alternatively displays a separate (e.g., textual, iconic or graphic, etc.) visual indication that indicates that the state of the second electronic device has changed and/or the updated state of the second electronic device (e.g., "left earbud has been found or placed in ear").

The above-described manner of updating display of the finding user interface provides a quick and efficient manner of indicating that the state of the device being located has changed, which simplifies the interaction between the user and the electronic device and enhances the operability of the electronic device and makes the user-device interface more efficient (e.g., by avoiding unnecessary finding movements or inputs when the second electronic device may already be found, and facilitating earlier termination of the locator process), which additionally reduces power usage and improves battery life of the electronic device by enabling the user to use the electronic device more quickly and efficiently.

In some embodiments, the second locator process includes (1122a), while displaying, via the display generation component, a second respective user interface, different from the first respective user interface, for finding the second electronic device, such as user interface 1012b in FIG. 10R (e.g., a user interface specific to the second locator process and not the first locator process, such as including an indication of the distance between the first and second electronic devices, but not including an indication of the relative location of the second electronic device with respect to the first electronic device, as previously described), wherein the second respective user interface is displayed in the first color, such as displaying user interface 1012 in FIG. 10R with a black background (e.g., having a background of the first color (e.g., the same corresponding color as in the first locator process)), detecting the change in state of the second electronic device (1122b), such as Object 2 being found in FIG. 10T (e.g., the second electronic device is one or more earbuds, and the change in state is that earbud, which was previously not in a user's ear, being placed in a user's ear). In some embodiments, additional or alternative differences between the first and second respective user interfaces are as described above. In some embodiments, the indication of the distance of the second electronic device from the first electronic device is displayed over the background. In some embodiments, the change in state is the earbud being placed in its case and/or charger. In some embodiments, the change in state is the earbud establishing a wired or wireless connection with another electronic device, such as a smartphone. In some embodiments, the second locator process includes (1122a), in response to detecting the change in the state of the second electronic device, updating the second respective user interface to be displayed in the second color (1122b), such as displaying user interface 1012b in FIG. 10T with a green background. For example, the background over which the indication of the distance of the second electronic device from the first electronic device is displayed changes color from the first color to the second color (e.g., the same corresponding color as in the first locator process). In some embodiments, display of the indication of the distance of the second electronic device is maintained. In some embodiments, the first electronic device additionally or alternatively displays a separate (e.g., textual, iconic or graphic, etc.) visual indication that indicates that the state of the second electronic device has changed and/or the updated state of the second electronic device (e.g., "left earbud has been found or placed in ear").

The above-described manner of displaying the same/similar colors corresponding to status changes of the second electronic device in the first and second locator processes provides a quick and efficient manner of consistently indicating that the state of the device being located has changed, which simplifies the interaction between the user and the electronic device and enhances the operability of the electronic device and makes the user-device interface more efficient (e.g., by avoiding unnecessary finding movements or inputs when the second electronic device may already be found, and facilitating earlier termination of the locator process, whether the first electronic device is performing the first or the second locator process), which additionally reduces power usage and improves battery life of the electronic device by enabling the user to use the electronic device more quickly and efficiently.

It should be understood that the particular order in which the operations in FIGS. 11A-11F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300 and 1500) are also applicable in an analogous manner to method 1100 described above with respect to FIGS. 11A-11F. For example, the locator processes described above with reference to method 1100 optionally have one or more of the characteristics of locator processes, separation alerts, object tracking, etc., described herein with reference to other methods described herein (e.g., methods 700, 900, 1300 and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 11A-11F are, optionally, implemented by components depicted in FIGS. 1A-1B. For example, displaying operation 1102a, receiving operation 1102b, and initiating operations 1102d and 1102e are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Locating Associated Components

Users interact with electronic devices in many different manners. In some embodiments, an electronic device is able to track the location of an object or device. In some embodiments, the electronic device is able to track the location of associated devices (e.g., a set of left and right earbuds) that can be separated from one another. The embodiments described below provide ways in which an electronic device facilitates finding associated components that are at one or more physical locations, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 12A-12TT illustrate exemplary ways in which an electronic device facilitates finding associated components that are at one or more physical locations in accordance with some embodiments of the disclosure. The embodiments in these figures are used to illustrate the processes described below, including the processes described with reference to FIGS. 13A-13J.

FIG. 12A illustrates an exemplary device 500 that includes touch screen 504. In FIG. 12A, the electronic device 500 is displaying user interface 1202. User interface 1202 includes a list 1206 of devices or objects whose location can be tracked/viewed by device 500, such as list item 1210 corresponding to John's Tablet, list item 1212 corresponding to John's Phone, and list item 1214 corresponding to John's Computer. The list 1206 also includes representations of components that are associated with each other, such as list item 1208 corresponding to John's Earbuds (e.g., corresponding to a left earbud and a right earbud that are associated with each other). In the example of FIG. 12A, list items 1208-1214 include a name of the object that corresponds to the list item ("John's Earbuds", "John's Tablet", etc.), a graphical representation of that object, labels which provide textual descriptions about the last time device 500 received information about a location of that object, and information about the last known location for that object.

Additionally, user interface 1202 also includes a representation of a map 1204. The representation of the map 1204 includes representations of devices or objects whose location can be tracked/viewed by device 500, and also includes representations of components that are associated with each other, such as a representation of John's Earbuds 1216 displayed at a location on map 1204 corresponding to the last known location for John's Earbuds, a representation of John's Tablet 1218 displayed at a location on map 1204 corresponding to the last known location for John's Tablet, a representation of John's Computer 1220 displayed at a location on map 1204 corresponding to the last known location for John's Computer, and a representation of John's Phone 1222 displayed at a location on map 1204 corresponding to the last known location for John's Phone. The representation of the map 1204 also includes a location indicator 1224 that indicates a location of the electronic device 500.

In FIG. 12B, while displaying user interface 1202, the electronic device 500 receives a selection of list item 1208 corresponding to John's Earbuds (indicated by touch contact 1226). As will be discussed in detail later, in some embodiments, based on whether the components (e.g., the left earbud and the right earbud) associated with the selected list item are currently together or separated will result in different behaviors when that list item is selected. In the example of FIG. 12B, John's Earbuds include a left earbud and a right earbud that are at a same physical location (e.g., are not separated from one another). In some embodiments, the left earbud and right earbud are considered to be in the same location if the earbuds are within a threshold distance of each other (e.g., 3, 6, 12, 24, 36, 48, 96, 192, etc. inches apart) and/or if the earbuds are both located in the same object (e.g., a case).

In FIG. 12C, because the left earbud and right earbud of John's Earbuds are at a same physical location, in response to the input in FIG. 12B, user interface 1202 is updated to display a card user interface 1228 corresponding to John's Earbuds. Specifically, card user interface 1228 includes label 1234 indicating the object that is associated with card 1228 ("John's Earbuds"), label 1236 which provides information about the last known location of John's Earbuds and the last time the device 500 received location information for John's Earbuds ("Near Mission Ave, Last Seen 6 m ago"), and selectable options 1230 and 1232 corresponding to functions available for finding John's Earbuds (the left earbud and right earbud). Additionally, the representation of John's Earbuds 1216 is centered in the representation of the map 1204, and device 500 ceases to display representation of other, unselected items in map 1204. Because the left earbud and right earbud were determined to be in a same physical location when the selection input 1226 was received in FIG. 12B, the representation of John's Earbuds 1216 are displayed as a single representation in the representation of the map 1204 (as compared to displaying separate representations for the left earbud and right earbud when the earbuds are not in the same physical location, as will be described later with reference to FIGS. 12T and 12U).

In FIG. 12D, the electronic device 500 receives a selection of selectable option 1232 (indicated by touch contact 1226). In FIG. 12E, in response to receiving the selection of selectable object 1232, the left and right earbud of John's earbuds begin to emit an audio tone (indicated in card 1228 with text "A sound is playing . . . "), and card 1228 is updated to display selectable option 1234 for toggling muting of the left earbud, selectable option 1238 for toggling muting of the right earbud, and selectable option 1236 to toggle playback of the audio tone. In FIG. 12E, while the audio tone is playing at the left earbud and right earbud, the electronic device 500 receives a request to close card 1228 (indicated by touch contact 1226).

In FIG. 12F, in response to receiving the request to close card 1228, the electronic device displays a user interface 1202 that is similar to the user interface 1202 described with reference to FIG. 12A. In FIG. 12G, while displaying user interface 1202, the electronic device 500 receives a selection of list item 1208 corresponding to John's Earbuds, and updates user interface 1202 as shown in FIG. 12H. In the example of FIG. 12H, the left and right earbuds of John's Earbuds are still at a same physical location when the input selecting list item 1208 was received. Accordingly, user interface 1202 in FIG. 12H is similar to the user interface 1202 described with reference FIG. 12C.

In FIG. 12I, the electronic device 500 receives a selection of selectable option 1230. In FIG. 12J, in response to receiving the selection of selectable option 1230, device 500 initiates a finding mode for finding the left and right earbuds of John's Earbuds (e.g., finding the left and right earbuds together, because they are in the same physical location), and displays user interface 1240. In the example of FIG. 12J, user interface 1240 is associated with a far (e.g., map-based) finding mode of device 500, because the distance between device 500 and a physical location of John's Earbuds is further than a threshold distance (e.g., more than 25, 50, 100, 300, 500, 1,000, 5,000, 10,000, etc. feet). User interface 1240 includes a suggested route 1242 for navigating from the location of device 500 (indicated by indicator 1224) to the location of John's Earbuds (indicated by representation 1216 of John's Earbuds), and suggested route 1242 is displayed on a map 1204. User interface 1240 also includes card 1228 that includes information about the length of route 1242, travel time for the route, and if it is the fasted suggested route. Card 1228 also includes selectable options 1243-1246, which are selectable to switch suggested route 1242 between driving, walking, and transit routes, and includes selectable option 1248 for starting navigation to John's Earbuds.

In FIG. 12K, the electronic device 500 receives a selection of selectable option 1248 (indicated by touch contact 1226). In FIG. 12L, in response to selection of selectable option 1248, the electronic device 500 begins displaying driving directions to John's Earbuds. User interface 1240 displays the navigation route 1243 in the suggested direction of travel, and includes intermediate navigation directions 1250 based on the current location of device 500 on the route 1243. In the example of FIG. 12L, intermediate navigation directions 1250 include information informing the user to navigate to First Ave. ("Start on First Ave"), and because the user needs to navigate to "First Ave.", the street First Ave. is displayed straight ahead (e.g., in the direction of travel) in user interface 1240. In FIG. 12M, after some progression on the route to John's Earbuds, the electronic device 500 has detected that the user has moved to a new position in route 1243. In response to the device's 500 new location along the route 1243, the user interface 1240 updates the intermediate driving directions ("Proceed on Second Ave") and updates the user interface in the direction of travel (e.g., displays street "Second Ave." straight ahead)). In FIG. 12N, after some more progression on the route to John's Earbuds, the electronic device 500 has again detected that the user has moved to a new position in the route 1243. In response to the device's 500 new location along the route 1243, the user interface 1240 updates the intermediate driving direction ("Earbuds on Right"), but does not update the user interface 1240 in the direction of travel (e.g., continues to display the street "Second Ave." straight ahead), because there are no more roads between John's Earbuds and the device 500.

In some embodiments, when a user moves within a threshold distance (e.g., 200, 100, 50, 25, 15, 10, 5 feet) of John's Earbuds, the electronic device automatically transitions from the far finding mode (e.g., displaying driving directions) to a close finding mode (e.g., displaying relative directions, similar to as described with reference to method 1100) for the object being located. Various details of the close finding mode are optionally as described with reference to method 1100. For example, in FIG. 12O, after device 500 has moved within the threshold distance of John's Earbuds, device 500 transitions to the close finding mode. In response to device 500 transitioning to the close finding mode, user interface 1240 is updated to include direction indicator 1246 and distance indicator 1248. Direction indicator 1246 graphically indicates the direction to John's Earbuds relative to the orientation of device 500 (e.g., similar to as described with reference to method 1100). Distance indicator 1248 textually indicates the distance between device 500 and John's Earbuds (e.g., similar to as described with reference to method 1100). In some embodiments, as the location of device 500 and/or the object that is being located changes, direction indicator 1246 and distance indicator 1248 are updated in real time. In the example of FIG. 12O, direction indicator 1246 is indicating John's Earbuds are to the right of device 500, and distance indicator 1248 is indicating that John's Earbuds are 25 ft to the right.

In FIG. 12P, device 500 has detected that John's Earbuds are directly in front of device 500 and are now 10 feet away from device 500. In response to detecting that John's Earbuds are directly in front of device 500, electronic device 500 updates direction indicator 1246 to point straight ahead (indicating that John's Earbuds are straight ahead), and updates distance indicator 1248 to the new distance between device 500 and John's Earbuds ("10 feet ahead").

In FIG. 12Q, device 500 has now detected that John's Earbuds are directly in front of device 500 and are 1 foot way from device 500. In response, electronic device 500 continues to display the direction indicator 1246 pointing straight ahead (indicating that John's Earbuds are straight ahead) and updates distance indicator 1248 with the new distance between device 500 and John's Earbuds ("1 foot ahead").

In FIG. 12R, the electronic device 500 detects that John's earbuds have been found. In response to electronic device 500 detecting that the earbuds have been found, the electronic device 500 changes a color of user interface 1240 (represented by cross hatch fill in user interface 1240) for indicating that the earbuds have been found, and also updates user interface 1240 to include status message 1250 for indicating that the earbuds have been found ("Found"). In some embodiments, the electronic device determines that John's earbuds have been found when the earbuds change states (e.g., earbuds begins to be worn by a user, are placed in or attached to a (e.g., magnetic) case, and/or begin charging).

FIGS. 12S-12PP illustrate exemplary ways that the electronic device facilitates finding associated components that are at a different physical locations, thus requiring separate finding directions. In FIG. 12S, electronic device 500 is displaying user interface 1202. Similar to as described with reference to FIG. 12A, user interface 1202 include a list 1206 of devices or objects whose location can be tracked/viewed by device 500, such as list item 1210 corresponding to John's Tablet, list item 1212 corresponding to John's Phone, and list item 1214 corresponding to John's Computer. The list 1206 also includes representations of components that are associated with each other, such as list item 1208 corresponding to John's Earbuds (e.g., corresponding to a left earbud and a right earbud that are associated with each other).

User interface 1202 also includes a representation of a map 1204. The representation of the map 1204 includes representation of the devices or the objects whose location can be tracked/viewed by device 500, and also includes representations of components that are associated with each other, such as a representation of John's left earbud 1223 displayed at a location on map 1204 corresponding to the last known location for John's Earbuds, a representation of John's right earbud 1221 displayed at a location on map 1204 corresponding to the last known location for John's Earbuds, a representation of John's computer 1220 displayed at a location on map 1204 corresponding to the last known location for John's Earbuds, a representation of John's phone 1218 displayed at a location on map 1204 corresponding to the last known location for John's Earbuds, and a representation of John's tablet 1222 displayed at a location on map 1204 corresponding to the last known location for John's Earbuds. In the example of FIG. 12S, the earbuds associated with John's Earbuds are displayed with separate representations and at separate locations on map 1204, because the earbuds are at different physical locations (in contrast to FIG. 12A when the earbuds associated with John's Earbuds are displayed with a single representation because the earbuds were at a same physical location). Additionally, list item 1208 includes a different textual description of the location of John's Earbuds ("At different locations") as compared to list item 1208 in FIG. 12A ("Near You"), because the left and right earbuds are now at different physical locations (e.g., more than 3, 6, 12, 24, 36, 48, 96, 192 inches apart).

In FIG. 12T, while displaying user interface 1202, the electronic device 500 receives a selection of list item 1208 corresponding to John's Earbuds (e.g., via tap of contact 1226). As mentioned previously, depending on whether the locations of the left and the right earbud (e.g., the plurality of associated components corresponding to list item 1208) are at the same location or are at separate locations, device 500 will perform different actions when list item 1208 is selected. In the example of FIG. 12T, John's Earbuds include a left earbud and a right earbud that are at different physical locations. In some embodiments, the left earbud and right earbud are considered to be in different locations if the earbuds are more than a threshold distance apart (e.g., 5, 10, 20, 50, 100, 500, 1000, 2000, 5000 feet and/or if the earbuds are not located in the same object (e.g., a case).

In FIG. 12U, in response receiving the selection of list item 1208 and because the left earbud and right earbud are at different physical locations, list item 1208 is expanded to include the components associated with John's Earbuds, including a child item 1252 corresponding to John's Left Earbud, and a child item 1254 corresponding to John's right earbud—which is different than the behavior shown when the earbuds were together as described with reference to FIGS. 12G and 12H). Child items 1252 and 1254 include information about their respective locations relative to device 500. As shown in FIG. 12U, child item 1252 corresponding to John's Left Earbud includes label 1258 that provides information about the distance between the left earbud and device 500 ("2 miles"), and an estimated travel time to the earbud ("10 minutes"). Similarly, child item 1254 corresponding to John's Right Earbud includes information about the distance between the right earbud and device 500 ("25 feet"), and an estimated travel time to the earbud ("2 minutes"). Additionally, because the left earbud and the right earbud are separated (e.g., are separated by more than a threshold distance), the representation of the map 1204 includes a representation of the left earbud 1221 and a representation of the right earbud 1223, and is centered at a location between John's Left Earbud and John's Right Earbud, and also no longer displays representations of other unselected items on map 1204.

In FIG. 12V, the electronic device detects a selection of child list item 1252 corresponding to John's Left Earbud (indicated by touch contact 1226). In FIG. 12W, in response to receiving the selection of child item 1252, the electronic device 500 updates the child list item 1252 to include a selectable option 1260 for emitting audio at John's Left Earbud, a selectable option 1262 for initiating a process to display map-based directions to John's Left Earbud, and a selectable option 1264 for initiating a close finding mode for finding John's Left Earbud, as described above. Selectable option 1264 is disabled (represented by cross hatch fill), because the location of John's Left Earbud is more than a threshold distance (e.g., 5, 10, 20, 50, 100, 500, 1000, 2000, 5000 feet) from device 500.

Figure 12Y:
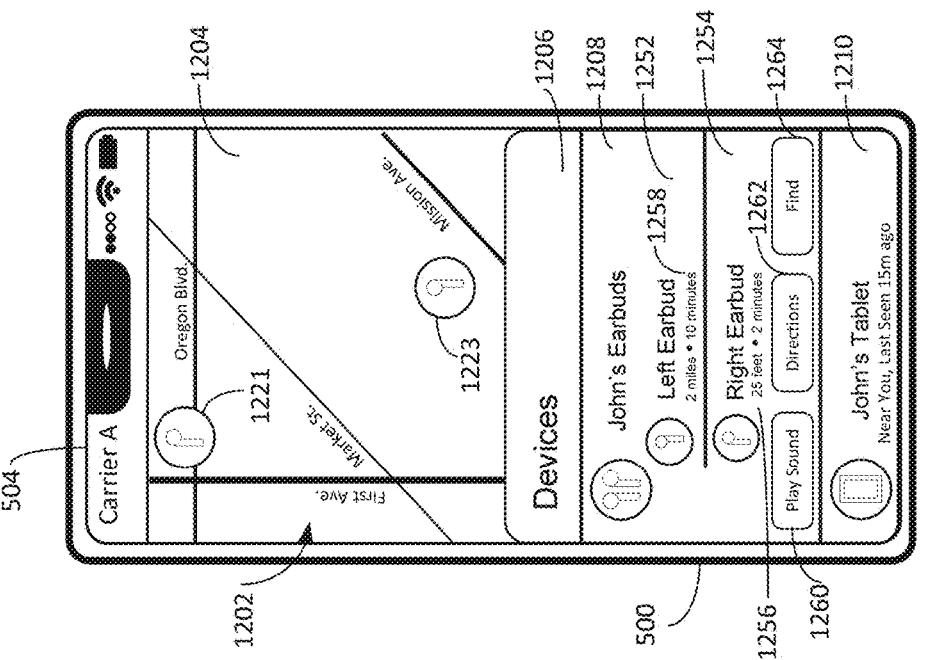
Figure 12B:
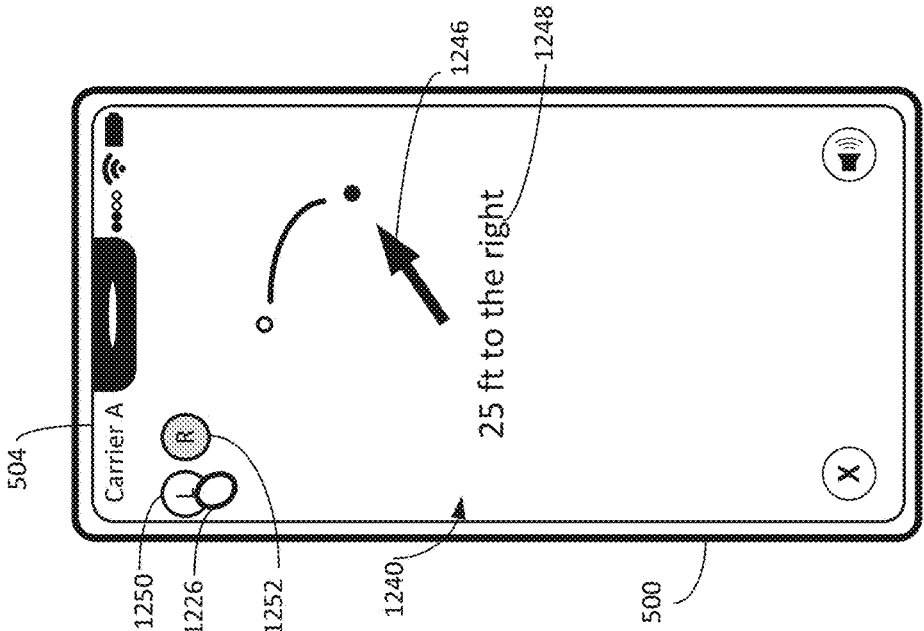
Figure 12A:
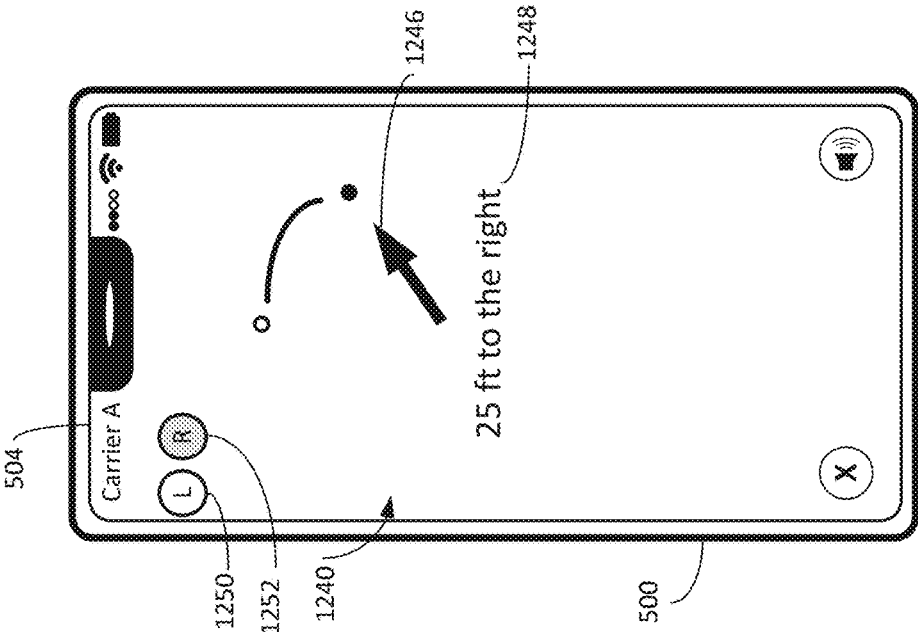
Figure 12D:
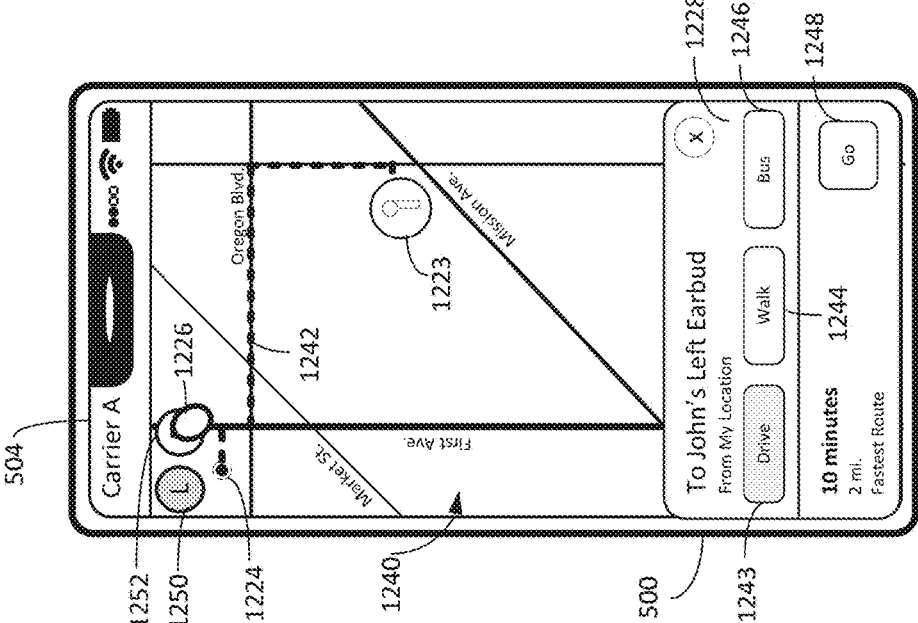
Figure 12C:
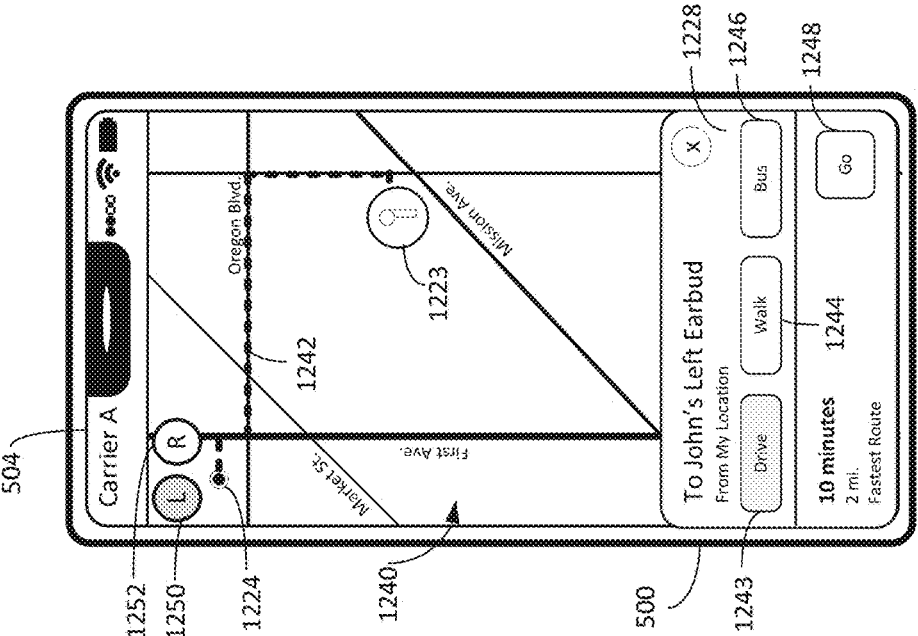
Figure 12F:
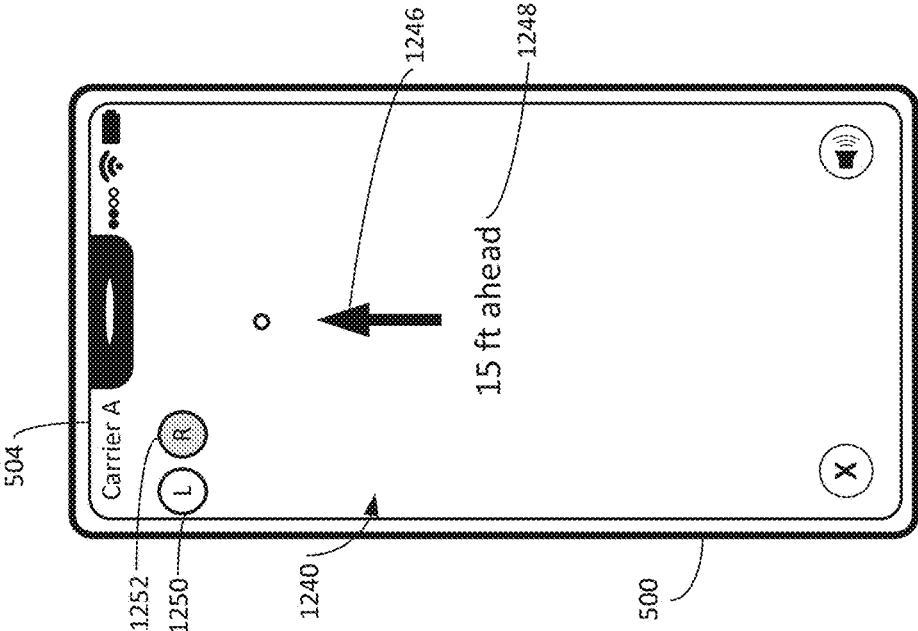
Figure 12E:
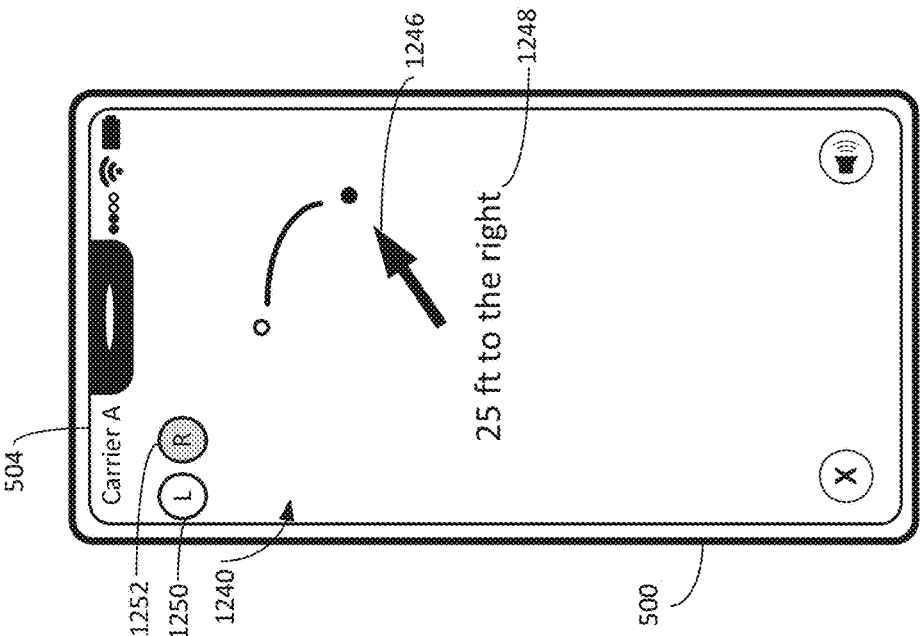
Figure 12H:
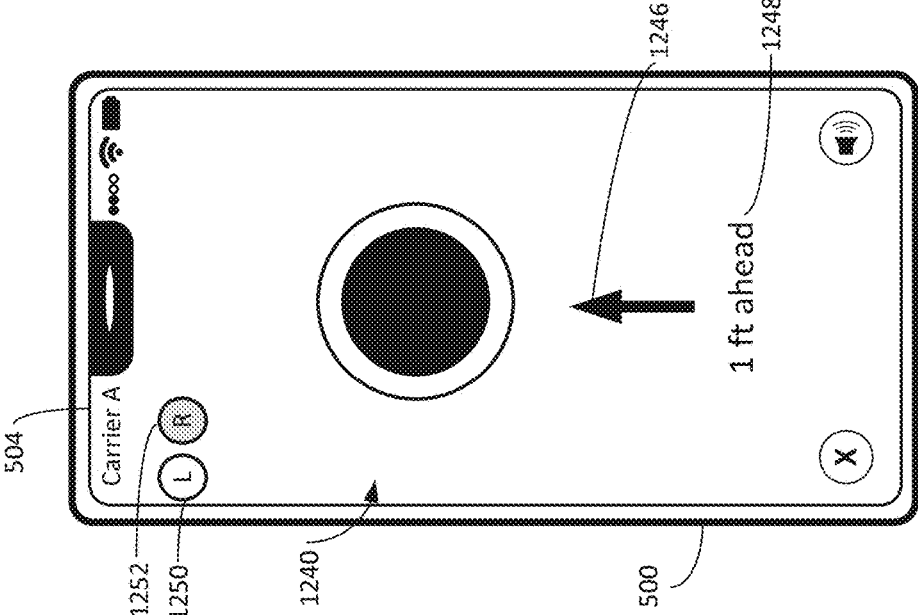
Figure 12G:
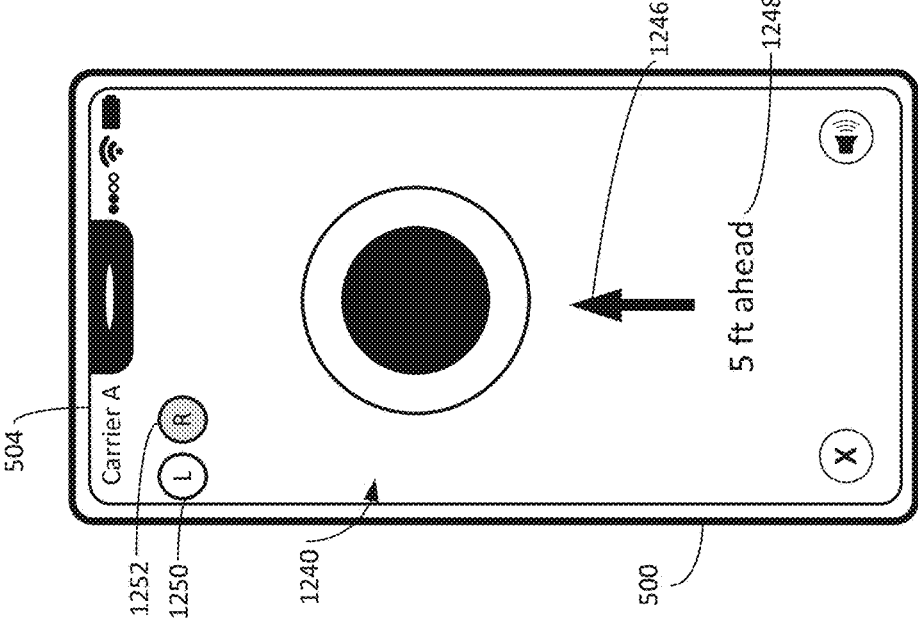
Figure 12J:
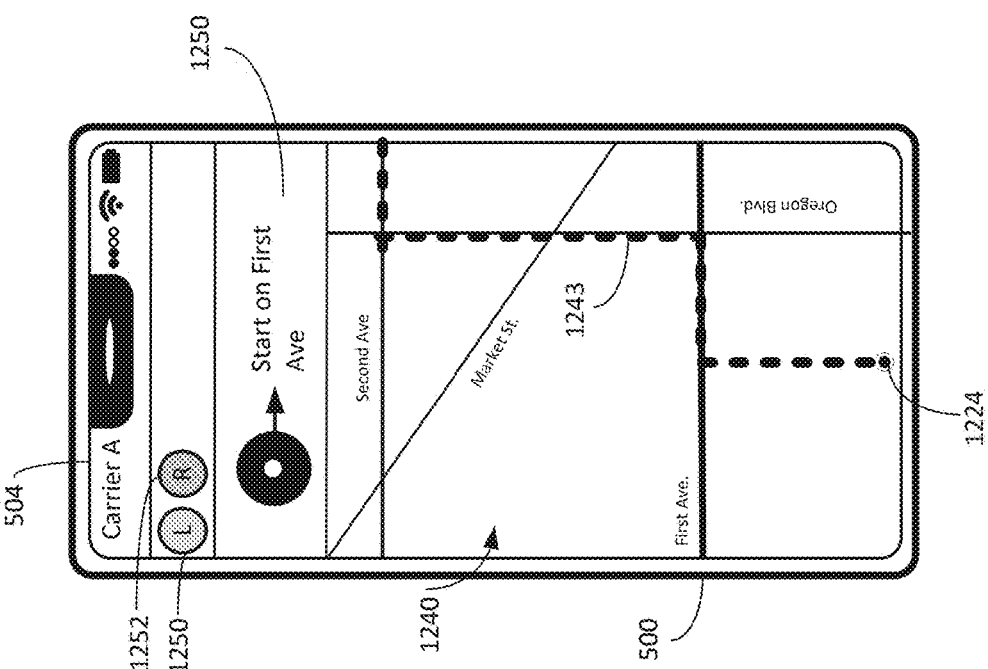
Figure 12I:
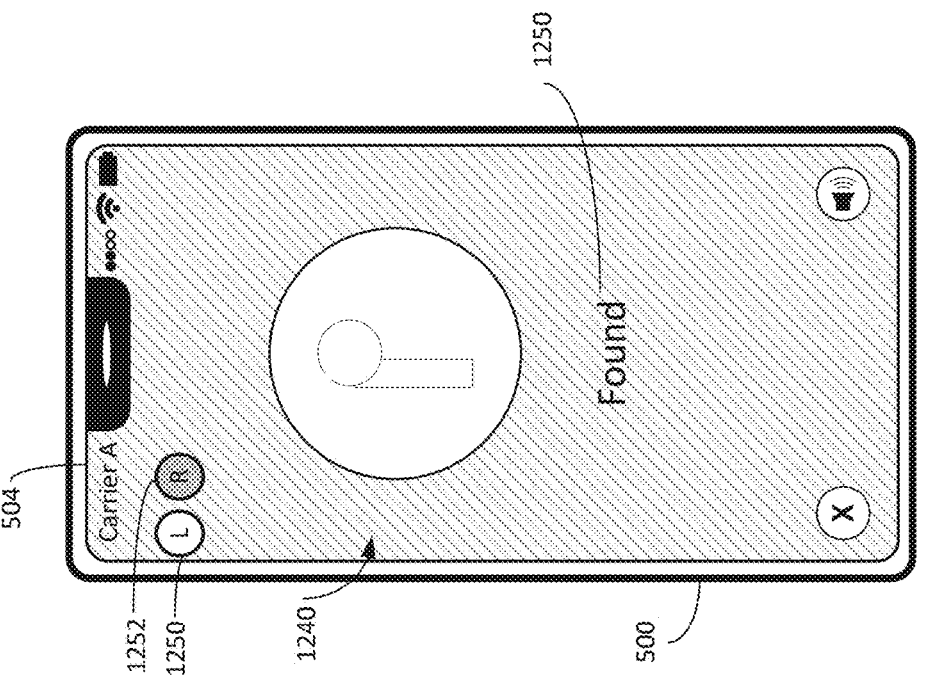
Figure 12L:
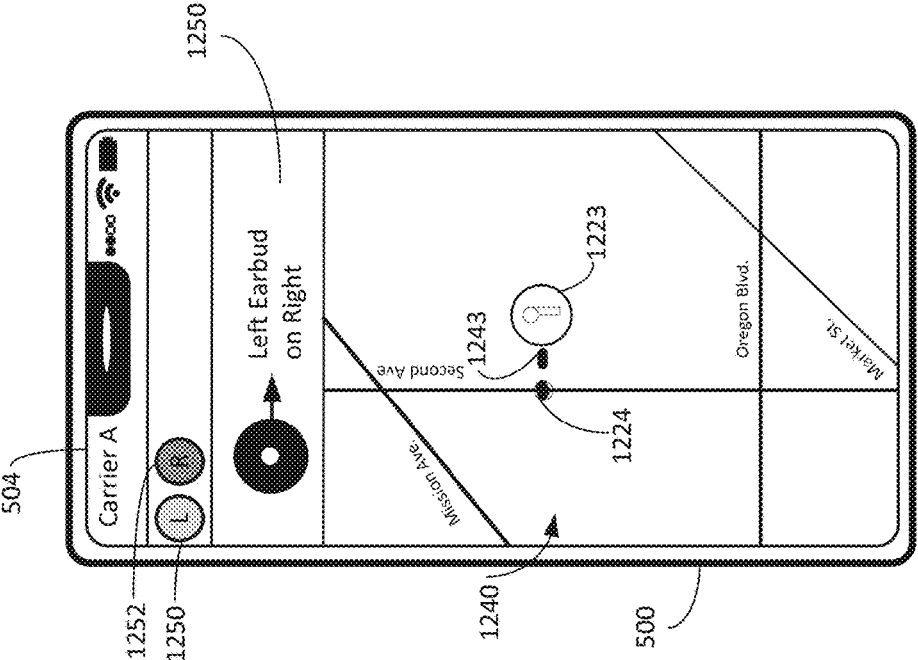
Figure 12K:
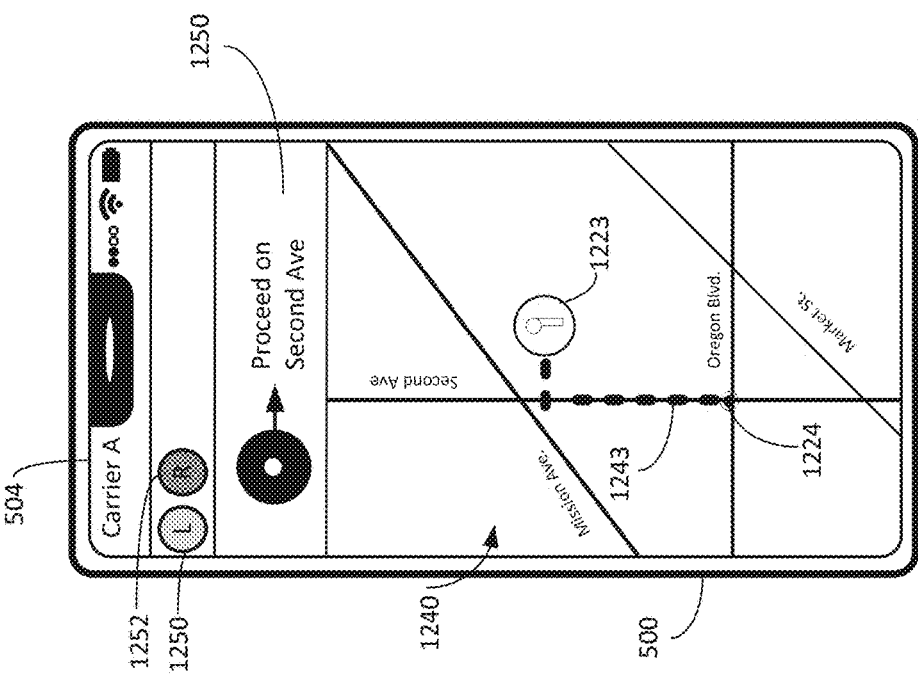
Figure 12P:
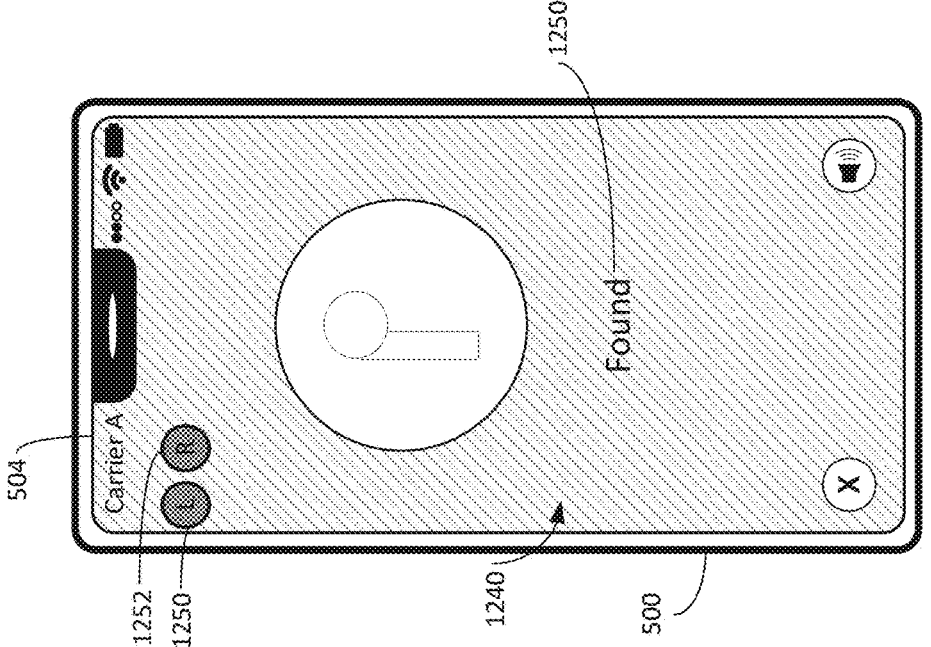
Figure 12O:
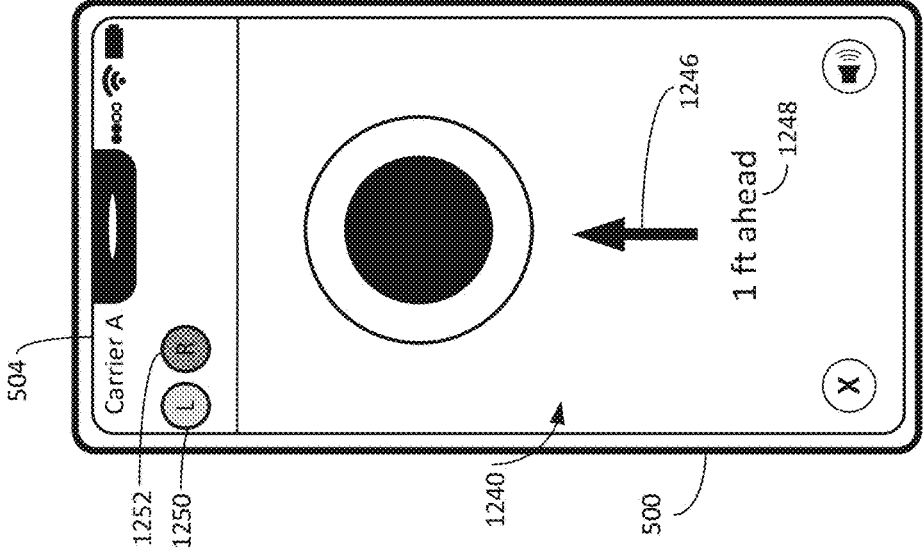
Figure 12R:
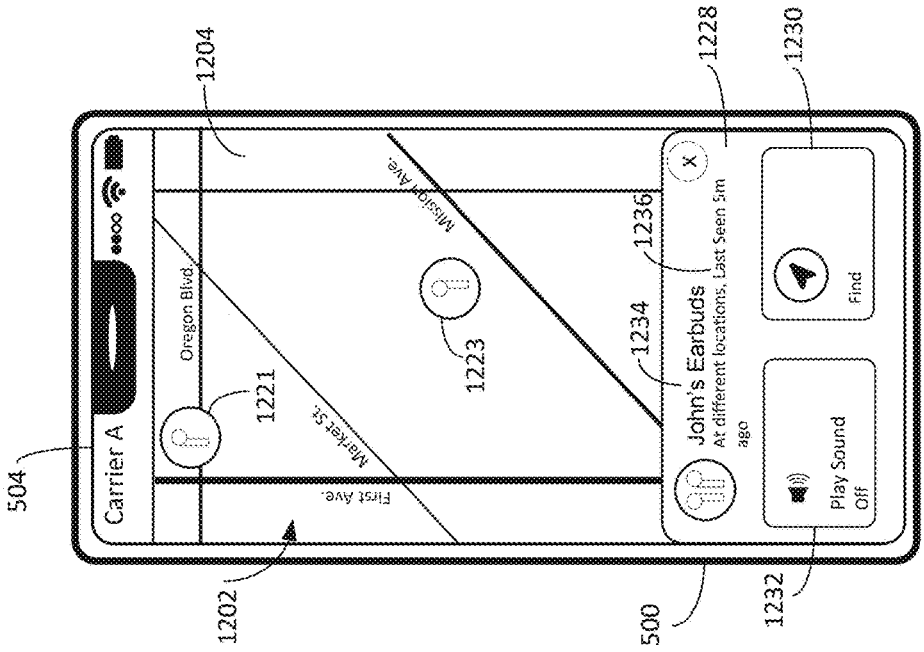
Figure 12Q:
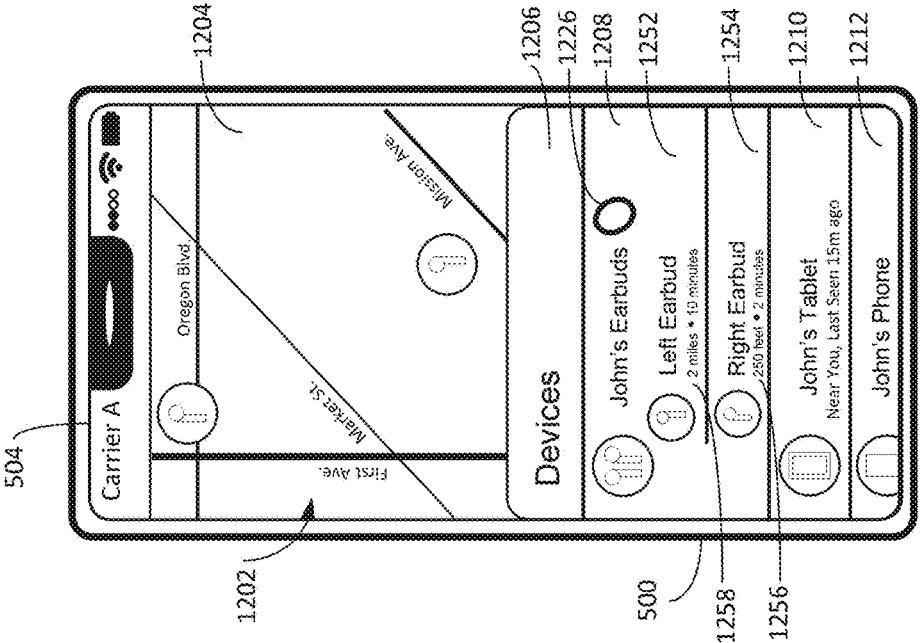
Figure 12T:
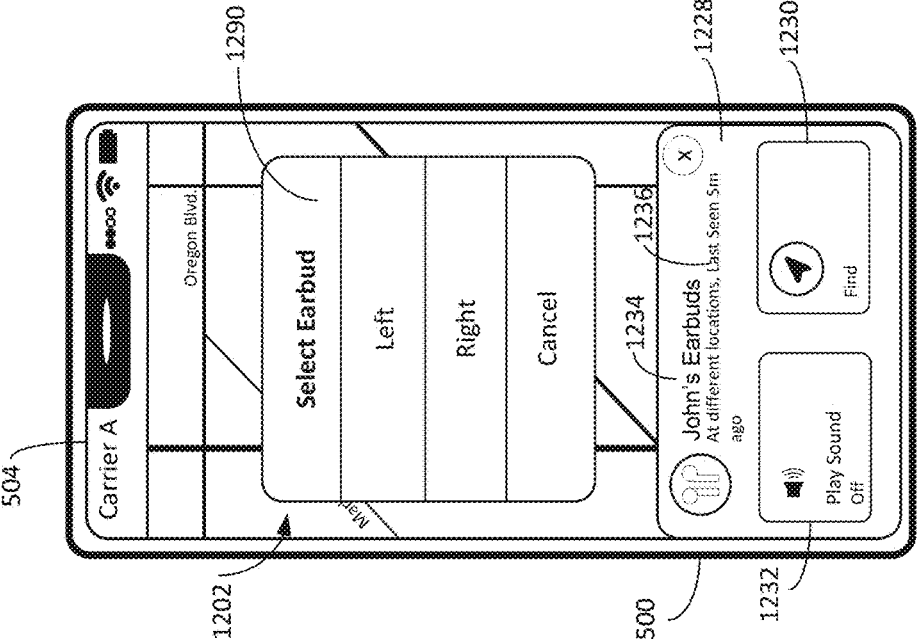
Figure 12S:
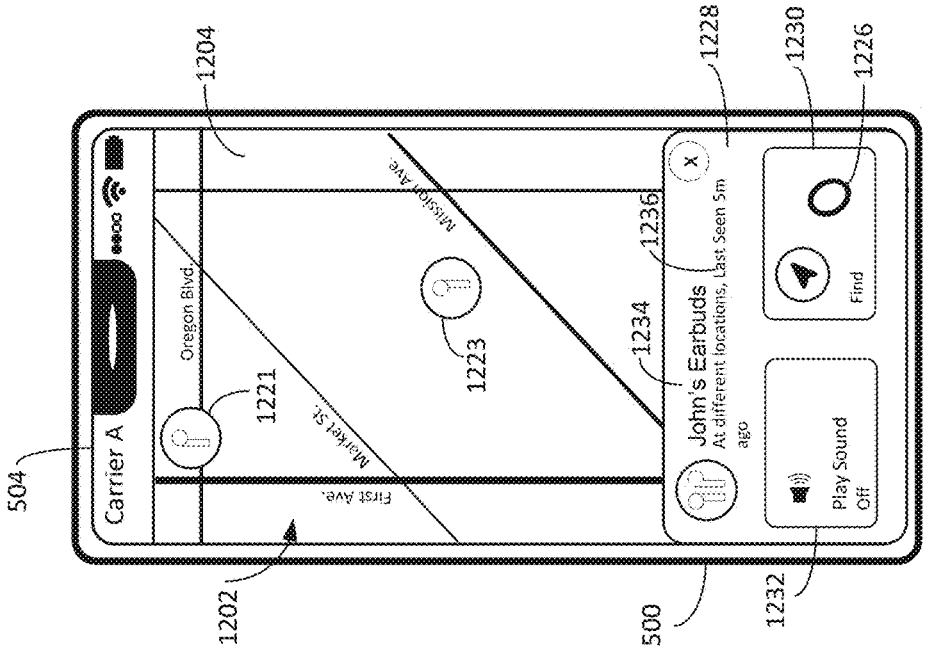
Figure 13A:
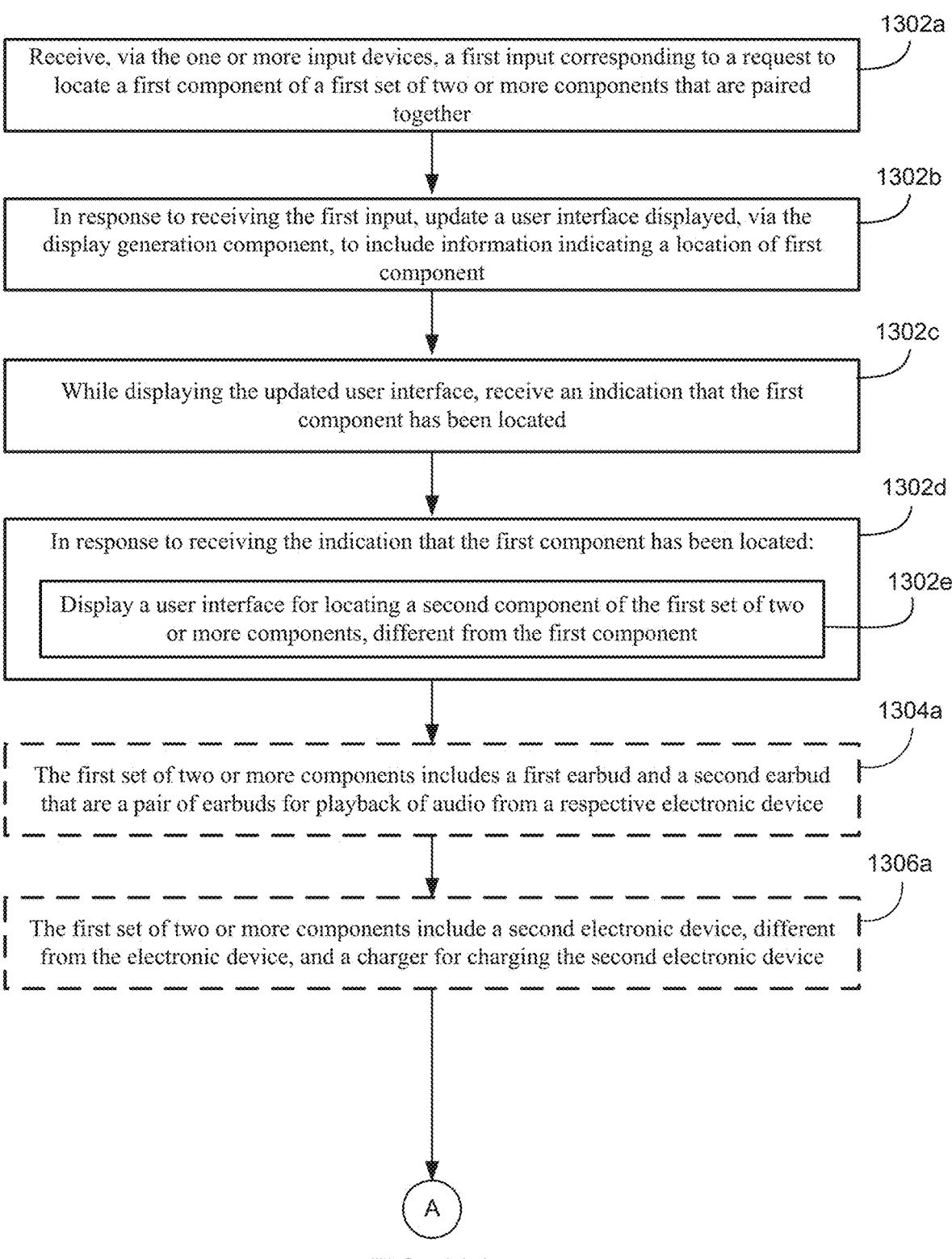
Figure 13B:
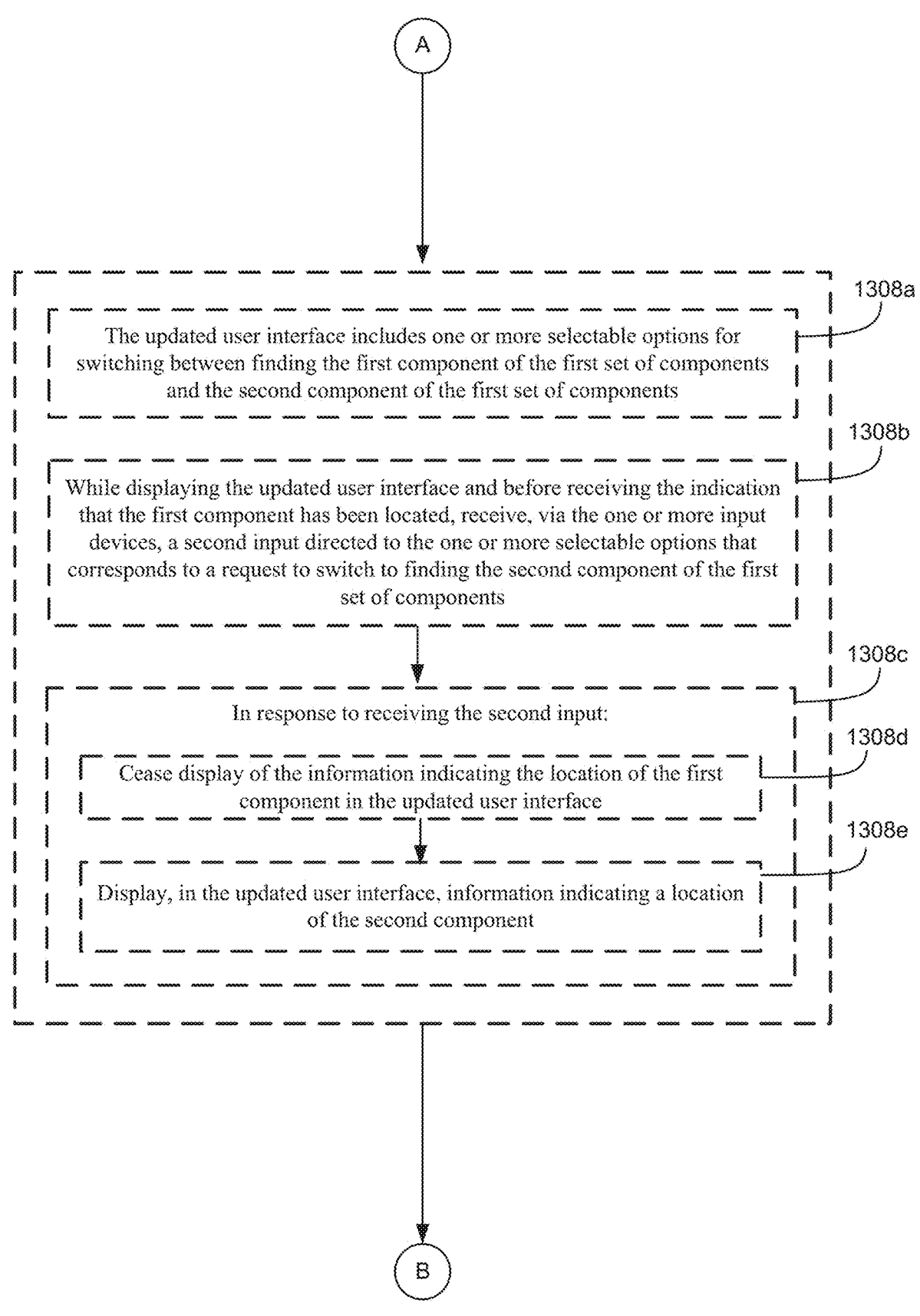
Figure 13C:
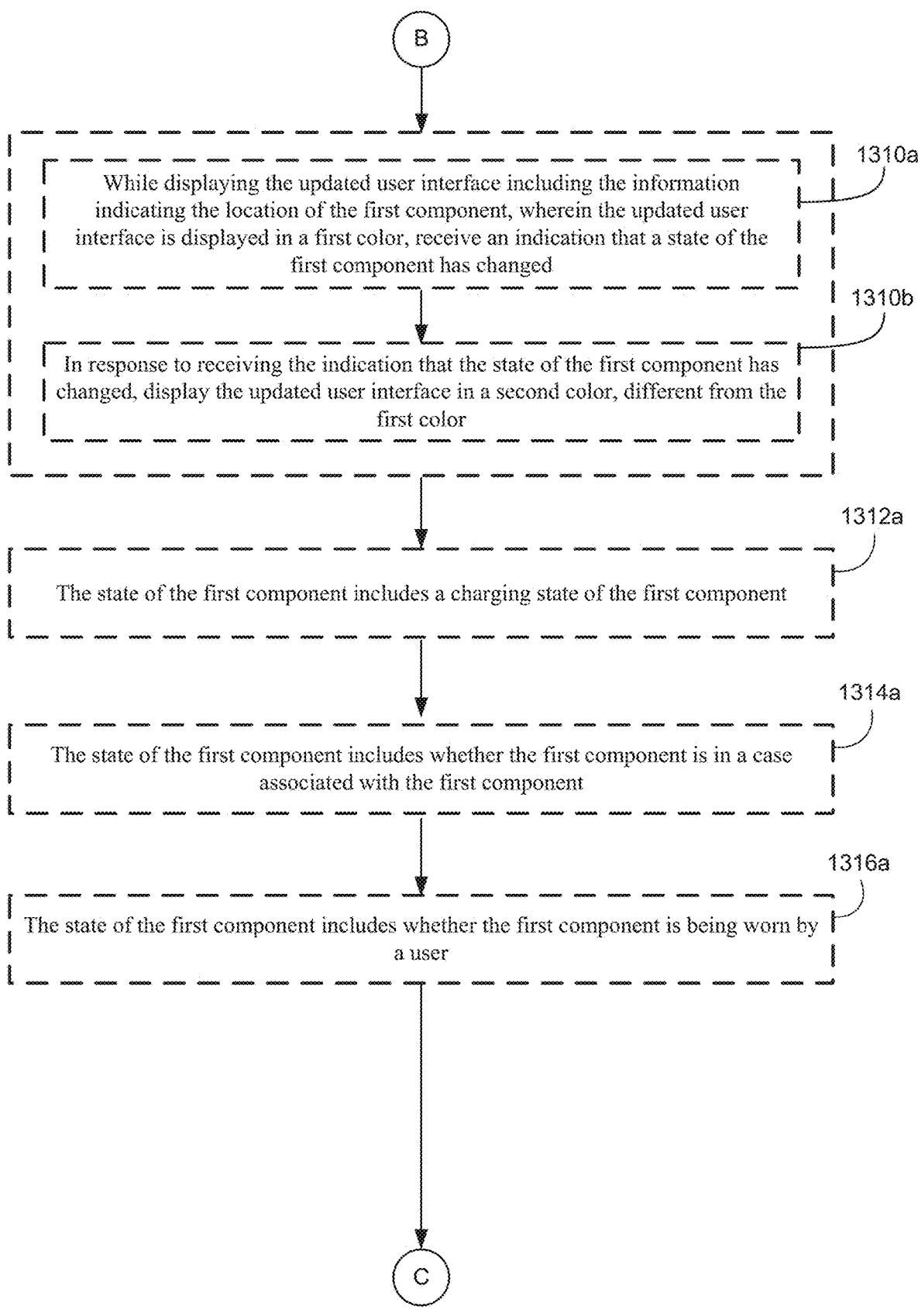
Figure 13D:
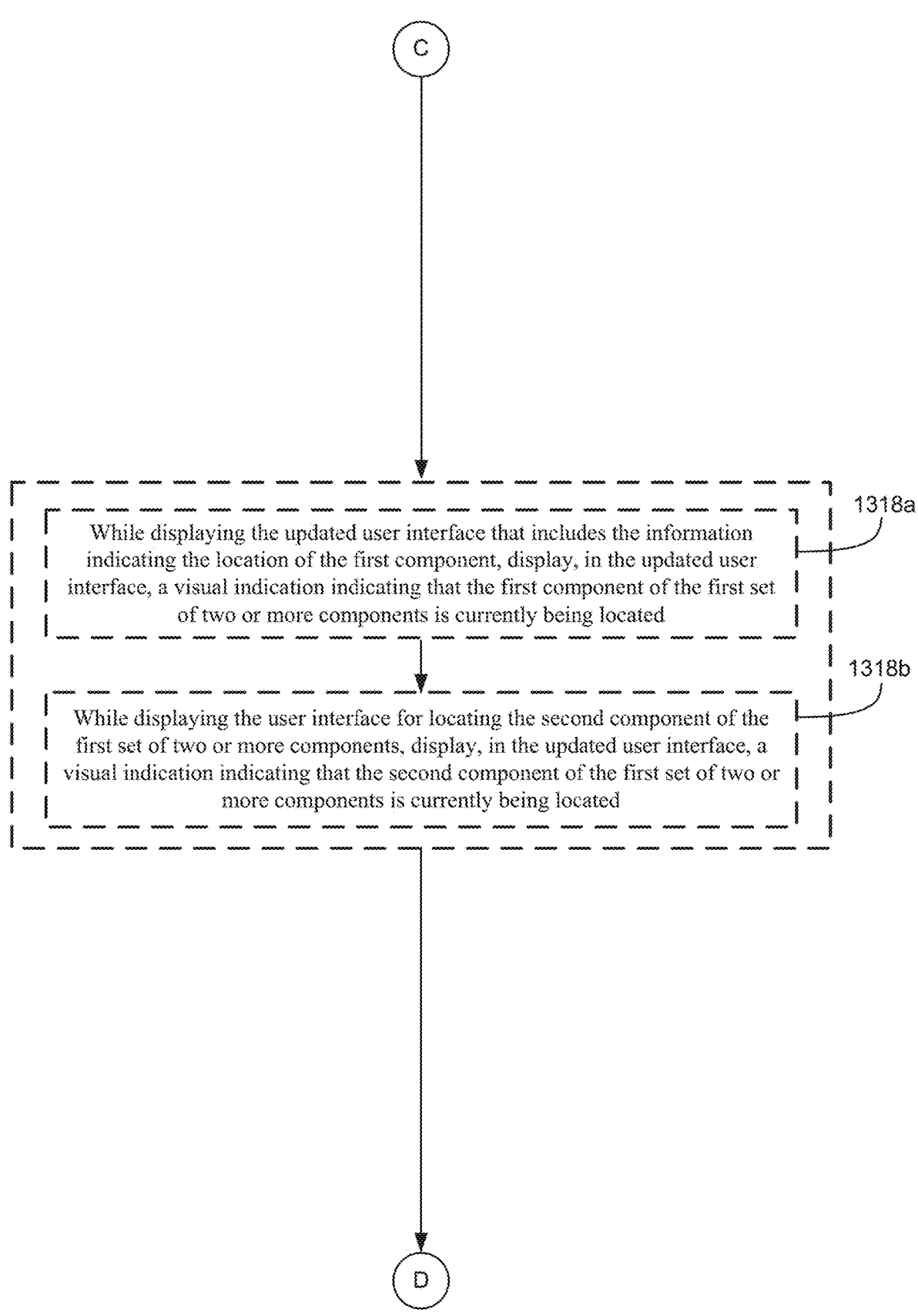
Figure 13E:
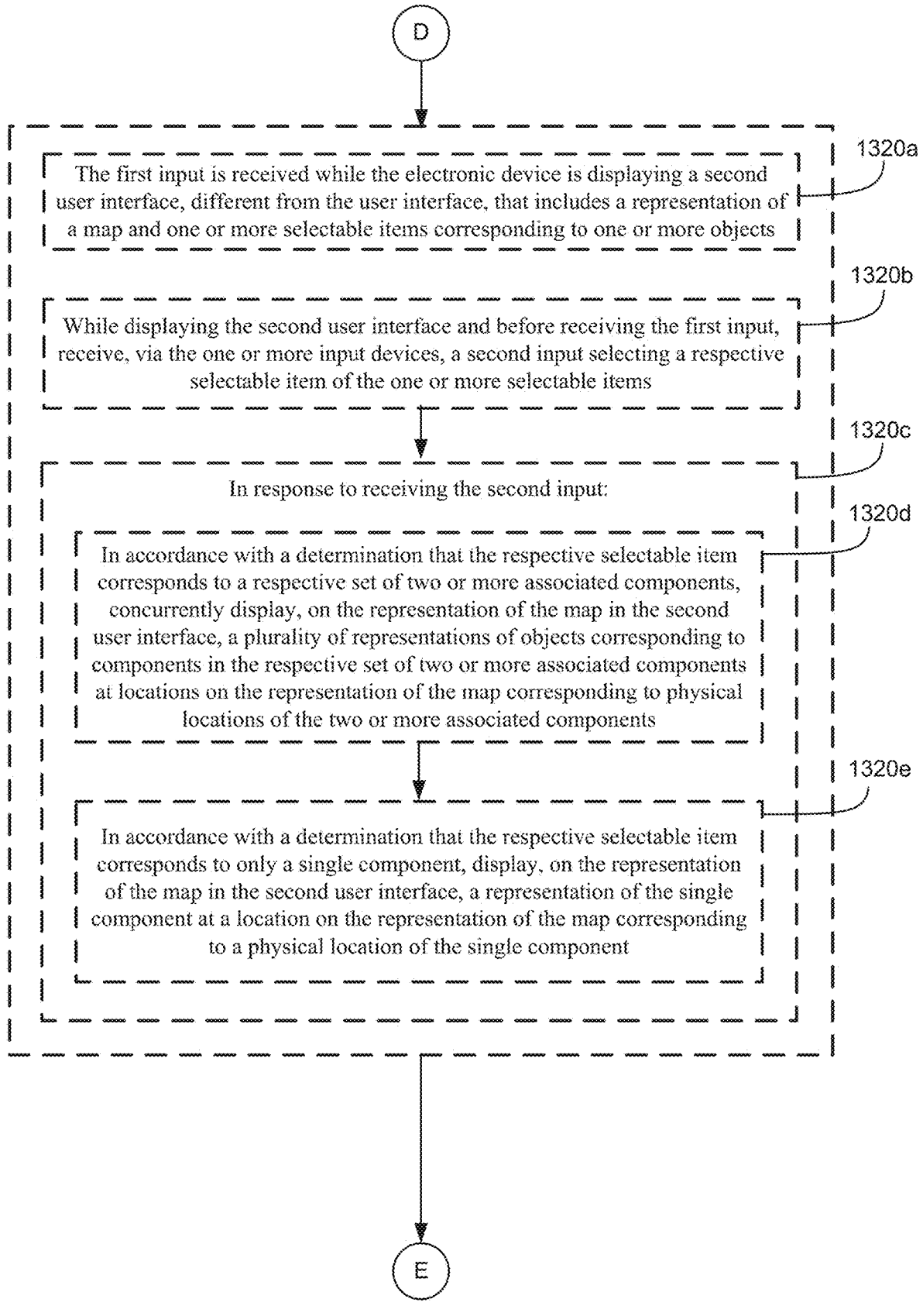
Figure 13F:
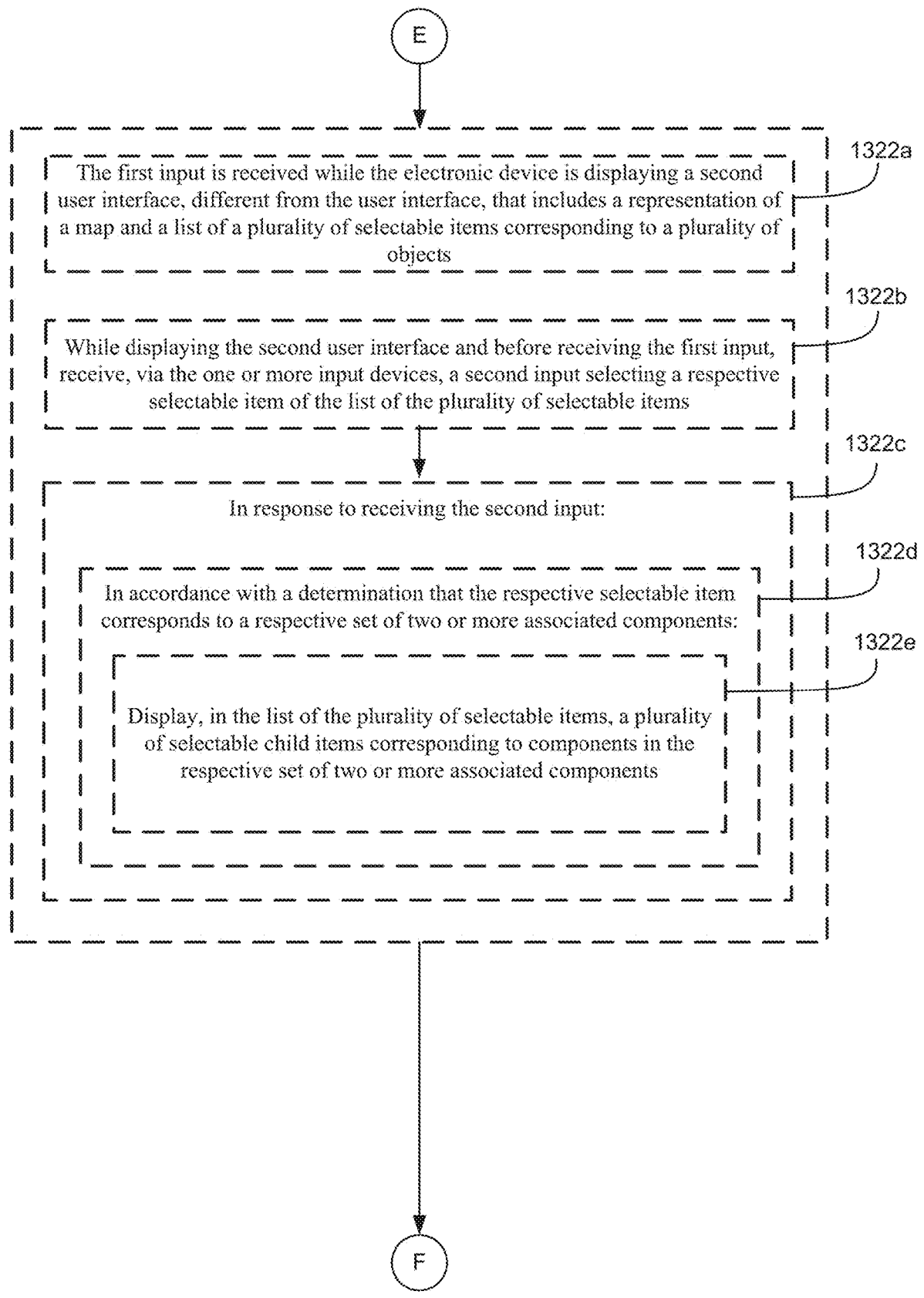
Figure 13I:
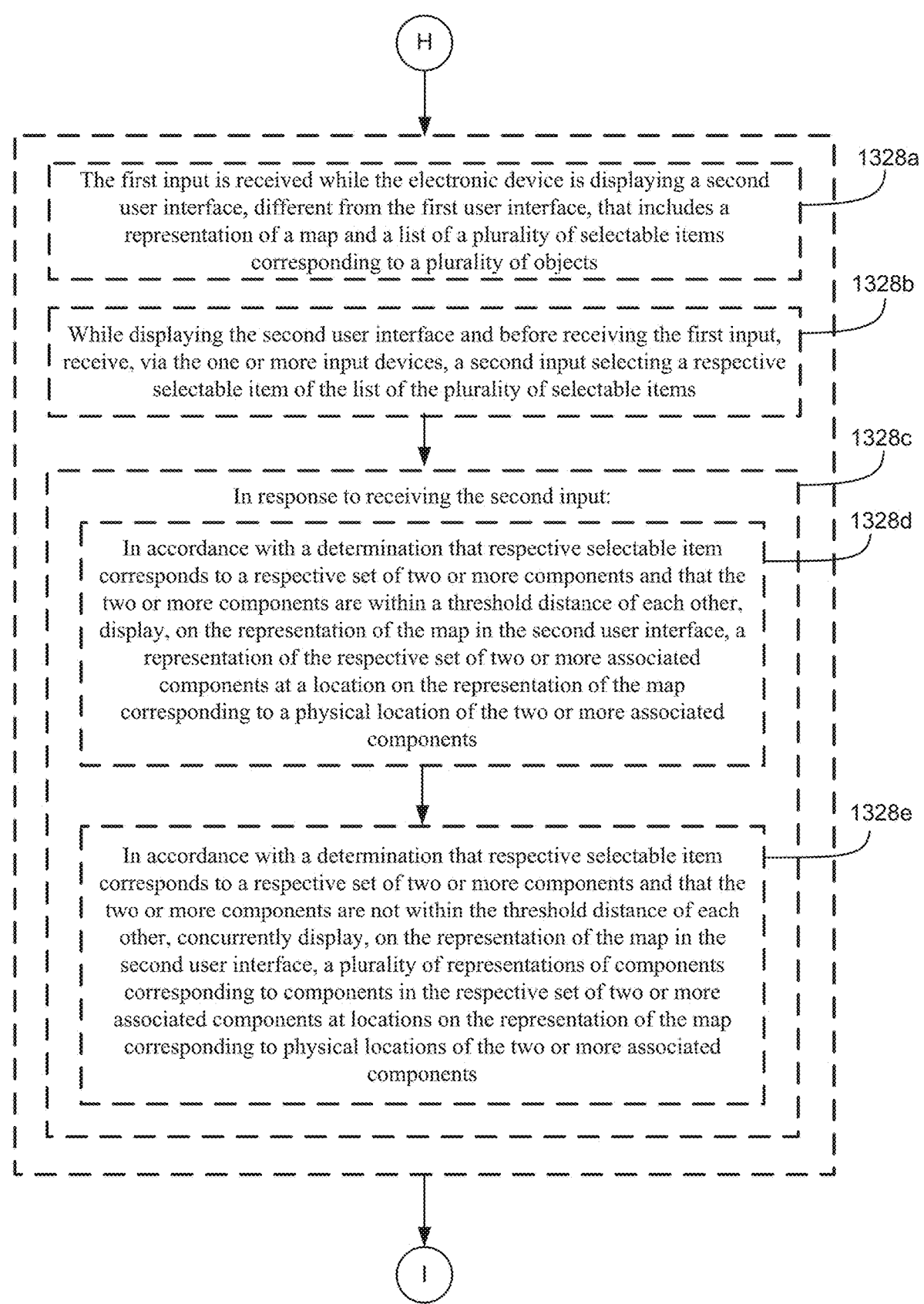

In FIG. 12X, the electronic device receives a selection of child list item 1254 corresponding to John's Right Earbud (indicated by touch contact 1226). In FIG. 12Y, in response to receiving the selection of child list item 1254, the electronic device 500 updates child item 1254 to include selectable option 1260 for emitting audio at John's Right Earbud, a selectable option 1262 for initiating a process to display map-based directions to John's Right Earbud, and selectable option 1264 for initiating a close finding mode for finding John's Right Earbud, as described above. Selectable option 1264 is enabled (as compared to being disabled in FIG. 12W), because the location of John's Right Earbud is less than a threshold distance (e.g., 5, 10, 20, 50, 100, 500, 1000, 2000, 5000 feet) from device 500.

In FIG. 12Z, the electronic device 500 detects a selection (e.g., via touch contact 1226) of selectable option 1264 corresponding to a request to enter a close finding mode for John's Right Earbud. In FIG. 12AA, in response to receiving the selection in FIG. 12Z, device 500 displays user interface 1240 corresponding to the close finding mode previously described, including as described with reference to method 1100. User interface 1240 includes direction indicator 1246, which is indicating John's Right Earbud is at a location to the right of device 500 (direction indicator 1246 pointing to the right), and includes distance indicator 1248, which is indicating that John's Right Earbud is 25 feet away ("25 feet to the right").

Additionally, because device 500 is currently in a finding mode for one component of a plurality of associated components (e.g., John's Right Earbud, which is part of a set of associated components comprising John's Right Earbud and John's Left Earbud), user interface 1240 also includes toggle button 1250 corresponding to John's Left Earbud and toggle button 1252 corresponding to John's Right Earbud. In some embodiments, user interface 1240 visually indicates which component (e.g., earbud) is currently being located by device 500. For example, in FIG. 12AA, because user interface 1240 includes finding information for John's Right Earbud, device 500 displays toggle button 1252 (the toggle button corresponding to John's Right Earbud) with a particular visual characteristic (represented by solid fill in toggle button 1252). Similarly, because user interface 1240 does not currently including finding information for John's Left Earbud, the toggle button 1250 corresponding to John's Left Earbud does not have the same visual characteristic as toggle button 1252.

In some embodiments, toggle buttons 1250 are selectable to cause finding informing for a corresponding component/object to be displayed in the user interface 1240. For example, in FIG. 12BB while device 500 is displaying finding information for John's Right Earbud, the electronic device 500 receives a selection of toggle button 1250 corresponding to John's Left Earbud (indicated by touch contact 1226). In FIG. 12CC, in response to receiving the selection of toggle button 1250, device 500 enters into a far finding mode for John's Left Earbud, because the left earbud is more than the threshold distance away from device 500, and ceases displaying finding information for John's Right Earbud. Specifically, user interface 1240 includes map-based directions to John's Left Earbud, as previously described. User interface 1240 includes a suggested route 1242 from the current location of device 500 (indicated by indicator 1224) to the location of John's Left Earbud (indicated by the representation of John's Left Earbud 1223). The user interface 1240 also includes card 1228 that includes information about the length of route 1242, travel time for the route, and if it is the fasted suggested route. Card 1228 includes selectable options 1243-1246, which are selectable to switch between driving, walking, and transit routes, and also includes selectable option 1248 for starting navigation to John's Left Earbud. Additionally, the user interface 1240 includes toggle buttons 1250 and 1252 for toggling between finding John's Left and Right Earbuds, which were described above. In some embodiments, toggle buttons 1250 and 1252 are not included in user interface 1240 when the device is in the far finding mode (e.g., displaying map-based directions).

In FIG. 12DD, the electronic device 500 receives a selection of toggle button 1252 corresponding to John's Right Earbud (indicated by touch contact 1226). In response to receiving the selection of toggle button 1252, device 500 updates the user interface 1240 to include finding information for John's Right Earbud, and because John's Right earbud is within the threshold distance of device 500, device 500 again transitions into the close finding mode, and user interface 1240 includes relative directions to John's Right Earbud, as shown in FIG. 12EE. Specifically, user interface 1240 includes direction indicator 1246 and distance indicator 1248, as were previously described. In FIG. 12FF, while displaying finding information for John's Right Earbud, the electronic device 500 detects that John's Right Earbud is now directly in front of device 500. In response to detecting the new location of John's Right Earbud, the electronic device 500 updates direction indicator 1246 and distance indicator 1248 based on the new location of John's Right Earbud. Specifically, device 500 updates direction indicator 1246 to point straight ahead (indicating that John's Earbuds are straight ahead), and updates the distance indicator 1248 with the new distance between device 500 and John's Right Earbud ("15 feet ahead").

In FIG. 12GG, while displaying the updated direction and distance information in the user interface 1240, the electronic devices detects that device 500 has again moved closer to John's Right Earbud, and that the right earbud is straight ahead. In response to detecting the new location of John's Right Earbud, the electronic device 500 continues to display direction indicator 1246 pointing straight ahead, and updates distance indicator 1248 with the new distance between device 500 and John's Right Earbud ("5 feet ahead"). In FIG. 12HH, the electronic device detects that the device 500 has again moved closer to John's Right Earbud. In response to detecting the new location of John's Right Earbud, the electronic device 500 continues to display direction indicator 1246 pointing straight ahead and updates distance indicator 1248 with the new distance between device 500 and John's Right Earbud ("1 foot ahead").

In FIG. 12II, the electronic device 500 has detected that John's Right Earbud has been found. In some embodiments, earbuds (or other types of components) are determined to be found if the earbud was placed in or attached to a (e.g., magnetic) case, begins charging, becomes attached to device 500 (e.g., in the case of a magnetic or otherwise attachable accessory of device 500) and/or begins being worn by a user. In some embodiments, when the earbud is determined to be found, device 500 updates user interface 1240 to provide a visual indication about the new state of the earbud. For example, in FIG. 12II, in response to John's Right Earbud having been found, device 500 changes a color of the user interface 1240 (indicated by the cross hatch in user interface 1240), updates the user interface 1240 to include a status message 1250 indicating that the earbud has been found, and updates a visual characteristic of the toggle button 1252 (represented by cross hatch fill) corresponding to the right earbud to indicate the earbud has been found. In some embodiments, toggle button 1252 is no longer selectable, or no longer displayed, after the right earbud has been found.

In some embodiments, when one of the earbuds (or components) in a pair (or more) of components are found, a process for finding a second earbud (or component) in the pair (or more) of components is automatically initiated. For example, in FIG. 12JJ, in response to device 500 detecting that John's Right Earbud has been located, the electronic device automatically (e.g., without user input for doing so) begins displaying finding information for John's Left Earbud—the next earbud in John's Earbuds that is currently in a "not found" state. In some embodiments, an earbud (or component) is optionally determined to be in a "not found" state if the that earbud (or component) is not being worn by a user, is not being charged, is not placed in or attached to a (e.g. magnetic) case, is not attached to device 500, and/or is more than a threshold distance (e.g., 5, 10, 20, 50, 100, 500, 1000, 2000, 5000 feet) from device 500. In FIG. 12JJ, user interface 1240 includes map-based directions to John's Left Earbud, because the location of the earbud is more than the previously-described threshold distance for initiating the far finding mode from device 500. Specifically, user interface 1240 includes intermediate navigation directions 1250 informing the user to navigate to First Ave. ("Start on First Ave"), and because the user needs to navigate to "First Ave.", the street First Ave. is displayed straight ahead (e.g., in the direction of travel) in user interface 1240. In FIG. 12KK, the electronic device 500 has detected that the user has moved to a new position in the route 1243. In response to the device's 500 new location along the route 1243, the user interface 1240 updates the intermediate driving directions ("Proceed on Second Ave"), and is reoriented in the direction of travel (e.g., displays street "Second Ave." straight ahead)). In FIG. 12LL, the electronic device 500 has again detected that the user has moved to a new position in the route 1243. In response to the device's 500 new location along the route 1243, the user interface 1240 updates the intermediate driving direction ("Left Earbud on Right"), but does not reorient the user interface 1240 in the direction of travel (e.g., continues to display the street "Second Ave." straight ahead) because there are no more roads between John's Left Earbud and the user.

As previously mentioned, when device 500 moves within the threshold distance of a component that is currently being located, the electronic device switches from far finding mode (e.g., displaying driving directions) to close finding mode (e.g., displaying relative directions) for the object being located. For example, in FIG. 12MM, after device 500 has moved within the threshold distance of John's Left Earbud, device 500 changes from displaying map-based directions to displaying relative directions. In response to device 500 switching to close finding mode, user interface 1240 is updated to include direction indicator 1246 and distance indicator 1248, which indicate that John's left earbud is at a location to the right of device 500, and that the left earbud is 25 feet away.

In FIG. 12NN, device 500 has detected that John's Left Earbud are now directly in front of device 500 and that John's Left Earbud is now 10 feet from device 500. In response, electronic device 500 updates direction indicator 1246 to point straight ahead (indicating that John's Left Earbud is now straight ahead) and updates distance indicator 1248 to indicate the new distance between device 500 and John's Left Earbud ("10 feet ahead"). In FIG. 12OO, device 500 has now detected that John's Left Earbud is now directly in front of device 500 and is now 1 foot from device 500. In response, electronic device 500 continues to display the direction indicator 1246 pointing straight ahead (indicating that John's Left Earbud is straight ahead) and updates distance indicator 1248 to indicate the new distance between device 500 and John's Left Earbud ("1 foot ahead").

In FIG. 12PP, the electronic device 500 has detected that John's Left Earbud has been found. As discussed previously, in some embodiments, earbuds (or other types of components) are determined to be found if the earbud was placed in or attached to a (e.g., magnetic) case, begins charging, becomes attached to device 500 (e.g., in the case of a magnetic or otherwise attachable accessory of device 500), and/or begins being worn by a user. In some embodiments, when the earbud is determined to be found, device 500 updates user interface 1240 to provide a visual indication about the new state of the earbud. For example, in FIG. 12PP, in response to John's Left Earbud having been found, device 500 changes a color of the user interface 1240 (indicated by the cross hatch in user interface 1240), updates the user interface 1240 to include a status message 1250 indicating that the earbud has been found ("Found"), and updates a visual characteristic of the toggle button 1250

(represented by cross hatch fill in the toggle button 1250) corresponding to the left earbud to indicate the earbud has been found. In some embodiments, toggle button 1250 is no longer selectable, or no longer displayed, after the left earbud has been found. As shown in FIG. 12PP, both toggle buttons 1250 and 1252 are displayed as inactive, because both John's Left and Right Earbuds have been found.

In some embodiments, the electronic device 500 displays disambiguation options when input is received that corresponds to more than one component in a set of associated components, such as in FIGS. 12QQ-12TT. In FIG. 12QQ, device 500 is displaying a user interface 1202 that is similar to the user interface described previously with reference to FIG. 12U. While displaying user interface 1202, the electronic device 500 detects a selection of menu item 1208 corresponding to John's Earbuds (indicated by contact 1226). In the example of FIG. 12QQ, John's Left and Right Earbuds are separated from each other, such as in FIG. 12U.

In FIG. 12RR, in response to receiving the selection of menu item 1208, the electronic device 500 updates user interface 1204 to display a card user interface 1228 corresponding to John's Earbuds (e.g., while John's Left and Right Earbuds are separated from each other). Specifically, card user interface 1228 includes label 1234 indicating the object(s) that is associated with card 1228 ("John's Earbuds"), label 1236 that provides information about the last known location of the object and the last time the device 500 received location for John's Earbuds ("At different locations, Last Seen 5 m ago"), and selectable options 1230 and 1232 corresponding to functions available for finding John's Earbuds. In the example of FIG. 12RR, label 1236 includes different textual information than label 1236 in FIG. 12H ("Near You") because the left and right earbuds are at different physical locations. Additionally, the representation of the map 1204 includes a representation of the left earbud 1221 and a representation of the right earbud 1223 at different locations on map 1204, and map 1204 is centered at a location between John's Left Earbud and John's Right Earbud.

In FIG. 12SS, while displaying user interface 1202, the electronic device receives an input selecting selectable option 1230 (indicated by contact 1226). In FIG. 12TT, in response to the input in FIG. 12SS, the electronic device 500 displays a disambiguation menu 1290 overlaid on user interface 1202, because the left and right earbud in John's Earbuds are at separate locations. In contrast, if the earbuds had been together (e.g., at a same location) when the selectable option 1230 was selected, the device would operate in a manner similar to what was described with reference to FIGS. 12I-12R. Selection input directed to items of the disambiguation menu (e.g., selection of Left or Right) optionally causes finding information for that component to be displayed by electronic device 500 in the manners described previously.

FIGS. 13A-13J are flow diagrams illustrating a method 1300 of finding associated components that are at one or more physical locations in accordance with some embodiments, such as in FIGS. 12A-12TT. The method 1300 is optionally performed at an electronic device such as device 100, device 300, or device 500 as described above with reference to FIGS. 1A-1B, 2-3, 4A-4B and 5A-5H. Some operations in method 1300 are, optionally combined and/or order of some operations is, optionally, changed.

As described below, the method 1300 provides ways to find associated components that are at one or more physical locations. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1300 is performed at an electronic device in communication with a display generation component and one or more input devices (e.g., a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.)). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the electronic device receives (1302*a*), via the one or more input devices, a first input (e.g., an input such as a touch input, mouse input, keyboard input, etc.) corresponding to a request to locate a first component of a first set of two or more components that are, for example, paired together, such as, in FIG. 12Z, touch contact 1226 selecting selectable option 1264 for locating John's Right Earbud. For example, the electronic device receives a touch input corresponding to a request to find a mouse (e.g., first component) of a set of components comprising a mouse and a computer. In some embodiments, the first component (e.g., the mouse) is wirelessly (or via wired connection) paired with other components (e.g., the computer) in the set of two or more components via a Bluetooth connection or other similar connection such that the components operate in conjunction with one another when they are in use together. In some embodiments, the electronic device has information (e.g., from prior configuration of the electronic device for use with the set of components) that the components are paired together. In some embodiments, the first component (e.g., the mouse) and other components (e.g., the computer) in the set of two or more components are located at different locations in a physical environment (e.g., a room, or a city, or a state). In some embodiments, the location of the first component (e.g., the mouse) is unknown to the user, and because the location of the first component is unknown to the user, the electronic device receives a request, from a user, to locate the first component (e.g., to initiate a finding mode to find the first component, such as described with reference to method 1100).

In some embodiments, representations of components in the set of two or more components are displayed in a user interface (e.g., overlaid on a map user interface at locations corresponding to each components location). In some embodiments, selecting a respective representation displayed in the user interface optionally causes the display of one or more second selectable options associated with one or more actions for a component corresponding to the selected representation. For example, after selecting a particular representation displayed in the user interface, a selectable option for displaying information for locating the component corresponding to the selected representation is optionally displayed. In some embodiments, the electronic device optionally detects a touch input directed to the selectable option associated with displaying information for locating the component corresponding to the selected representation. In some embodiments, some of the components in the set of two or more components provide similar functionality, while other components in the set of two or more components provide a different functionality. For example, a set of components optionally comprises a left earphone/earbud, a right earphone/earbud, and/or a charging component capable of charging the left earphone and right earphone (e.g., a charging case into which the left and right earphones are placed for storage and/or charging). The left earphone and right earphone optionally provide a similar function (e.g., playback music) in a synchronized manner (e.g., playback of left and right channels of audio, respectively) due to being paired together, while the charging component does not provide the similar function (e.g., does not playback music). In some embodiments, a single earbud can be used to play mono audio, both earbuds can be used together to play synchronized audio such as stereo audio or spatial audio. In some embodiments, either earbud can be used as a microphone for recording audio for use during a video or phone call. In some embodiments, both earbuds can be used together to cancel ambient sounds around the user (e.g., using active noise cancellation techniques).

In some embodiments, in response to receiving the first input, the electronic device updates (1302b) a user interface displayed, via the display generation component, to include information indicating a location of first component, such as the user interface 1240 including direction and distance indicators 1246 and 1248 for John's Right Earbud in FIG. 12AA. For example, a user interface currently displayed by the electronic device is updated to include information for locating the first component, such as described with reference to method 1100. In some embodiments, the information optionally includes directions for navigating to a location of the first component. For example, the directions optionally include directions for navigating from a location where the first input was received on the electronic device (e.g., starting location) to a current location of the first component (e.g., ending location). In some embodiments, when the first component is a threshold distance away from a location of the electronic device, the navigation directions are directions at a first granularity level (e.g., driving directions when the first component is more than 2, 3, 7, 10, 15 miles away from the location of the first component). In some embodiments, when the first component is less than a threshold distance away from a location of the electronic device, the navigation directions are directions at a second granularity level (e.g., walking directions when the first component is less than 2, 3, 7, 10, 15 miles away from the location of the first component). In some embodiments, the granularity of the directions displayed in the user interface changes as a user of the electronic device moves closer or further away from the location of the first component. In some embodiments, the information for locating the first component is distance and/or relative direction information, such as "to the left, to the right, straight ahead, behind" (e.g., when the component is determined to be relatively close to the device, such as within 10, 50, 100, 500, 1000 feet), rather than driving directions (e.g., which are displayed when the component is determined to be relatively far from the device, such as more than 10, 50, 100, 500, 1000 feet).

In some embodiments, while displaying the updated user interface, the electronic device receives (1302c) an indication that the first component has been located, such as the indication received to cause device 500 to display user interface 1240 for John's Right Earbud in FIG. 12II. For example, detecting that a user has found the first component (e.g., user has located the first component). In some embodiments, the electronic device receives an indication (e.g., detects) that the first component has been located when a state with respect to the first component changes. For example, if the first component was in a non-charging state when the first input (e.g., for requesting information on locating the first component) was received, and the first component has changed to a charging state at some time after the first input was received by the electronic device (e.g., because the earbud has been placed in its charging case), the electronic device optionally receives an indication (e.g., from the charger and/or the first component) that the first component has been located. Additionally, or alternatively, the electronic device optionally receives the indication that the first component has been located in response to a determination that the first component is in contact with a user (e.g., the first component is touching the user and/or the first component is being worn by the user, such as the earbud being placed in the user's ear). Additionally, or alternatively, the electronic device optionally receives the indication that the first component has been located when the first component becomes in contact (e.g., insert in, placed on top of, or in contact with) a second component of the set of two or more components. In some embodiments, the electronica device optionally receives the indication (e.g., from the electronic device) that the first component has been located in response to a user selecting a "found" selectable option displayed in the user interface while displaying information for locating the first component.

In some embodiments, in response to receiving the indication that the first component has been located (1302d) (e.g., detecting that a user has located the first component), the electronic device displays (1302e) a user interface for locating a second component of the first set of two or more components, different from the first component, such as updating the user interface to include finding information for John's Left Earbud in FIG. 12JJ. For example, automatically (e.g., without user input for doing so, other than the device determining that the first component has been located) updating the user interface to include finding information for a second component after the first component has been located, such as described with reference to method 1100. In some embodiments, when the electronic device receives an indication that the first component has been located, the electronic device ceases display of the information for locating the first component in the user interface. In some embodiments, if the electronic device receives an indication that the second component is already located (e.g., not missing), the electronic device does not display information for locating the second component. Thus, in some embodiments, the electronic device automatically sequentially initiates finding processes for components that are paired together as those components are indicated as being located. In some embodiments, the information associated with locating the second component optionally includes directions for navigating to a location of the second component. For example, the directions optionally include directions for navigating from a location of the electronic device where the first input was received (e.g., a starting location) to a current location of the second component (e.g., an ending location).

In some embodiments, when the second component is a threshold distance away from a location of the electronic device, the navigation directions are directions at a first granularity level (e.g., driving directions if the second component is more than 2, 3, 7, 10, 15 miles away from the location of the first component). In some embodiments, when the second component is less than a threshold distance away from a location of the electronic device, the navigation directions are directions at a second granularity level (e.g., walking directions if the second component is less than 2, 3, 7, 10, 15 miles away from the location of the second component). In some embodiments, the granularity of the directions displayed in the user interface changes as a user of the electronic device moves closer or further away from the location of the second component. In some embodiments, the information for locating the second component is distance and/or relative direction information, such as "to the left, to the right, straight ahead, behind" (e.g., when the component is determined to be relatively close to the device, such as within 10, 50, 100, 500, 1000 feet), rather than driving directions (e.g., which are displayed when the component is determined to be relatively far from the device, such as more than 10, 50, 100, 500, 1000 feet). In some embodiments, if a third component is paired with the first and second components, upon determining that the second component has been located, the electronic device automatically updates the user interface to include finding information for the third component. In some embodiments, if the device is displaying finding information for a component that is not paired with (e.g., associated with) other components and/or if the component is paired with other components that are already designated as having been located, in response determining that the component has been located, the electronic device does not automatically display finding information for another component (e.g., and instead terminates the finding process).

The above-described manner of updating a user interface to include information associated with locating a first component, and updating the user interface to include information associated with locating a second component when the first component has been located, provides an efficient way for locating components that are associated with each other in a set of two or more components and also reduces inputs as compared to requiring a user to separately locate different devices/components, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first set of two or more components includes a first earbud and a second earbud that are a pair of earbuds for playback of audio from a respective electronic device (1304*a*), such as John's Left Earbud and John's Right Earbud as described with reference to FIG. 12U (e.g., when the first earbud and the second earbud are within a threshold distance from the respective electronic device). For example, the first set of components includes audio playback devices such as a left earbud (e.g., first earbud) and a right earbud (e.g., a second earbud). In some embodiments, the first earbud and second earbud communicate (e.g., with the respective electronic device) independently of each other (e.g., perform one or more functions independent of other components, such as being able to play audio of a given channel of audio independently of whether the other component is currently playing audio). In some embodiments, components in the first set transmit (e.g., directly or indirectly) information regarding their status to the electronic device. For example, the left earbud (e.g., the first earbud) optionally independently communicates a physical location and/or a status of charge of the left earbud directly or indirectly to the electronic device. Similarly, the right earbud (e.g., the second earbud) optionally independently communicates a physical location and/or status of charge of the right earbud directly or indirectly to the electronic device. In some embodiments, the first component corresponds to the first earbud and the second component corresponds to the second earbud. In some embodiments, the two earbuds operate together when both are placed in a user's ears to play synchronized multi-channel audio.

The above-described manner of the inclusion of earbuds in the first set of two or more components provides an efficient way for locating components in the first set, including earbuds that are wirelessly paired together, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first set of two or more components include a second electronic device (e.g., a computer, tablet, phone, an earbud, or other type of electronic device), different from the electronic device, and a charger for charging the second electronic device (1306*a*), such as if the described John's Computer in FIGS. 12A-12TT corresponded to both a computer and a charger for that computer. For example, the earbud is placed in a charging case for charging the earbud). In some embodiments, the charger is wirelessly paired with the second electronic device to provide an indication of a charge status of the second electronic device. For example, the components of the set of two or more components at least include an electronic device and a charger. In some embodiments, the electronic device corresponds to a computer, tablet, phone, earbud, or other type of electronic device, and the charger of the electronic device is wireless paired with the second electronic device to provide an indication about a status of the second electronic device (e.g., to the electronic device). In some embodiments, the indication optionally indicates a continuous charge level of the second electronic device or optionally indicates a charge level when a battery of the second electronic device is below a threshold charge level (e.g., 1%, 2%, 3%, 5%, 10%, 20%). In some embodiments, the charger of the second electronic device also functions as a case for the second electronic device. In some such embodiments, the case optionally attaches to, supports, or otherwise connects the charger to the second electronic device. In some embodiments, when the charger also functions as a case, the charger/case is able to detect if a component (e.g., the second electronic device) currently in contact with and/or inserted into the case has been previously associated (e.g., paired) together with the charger. In some embodiments, the second electronic corresponds to the first component and the charger for the second electronic device corresponds to the second component.

The above-described manner of the inclusion of an electronic device and a charger for the electronic device in the first set of two or more components provides an efficient way for locating components in the first set including an electronic device and a charger of the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the updated user interface includes one or more selectable options for switching between finding the first component of the first set of components and the second component of the first set of components (1308*a*), such as the toggle buttons 1250 and 1252 in FIG. 12AA (e.g., selectable buttons that correspond to respective components in the set of two or more components and are selectable to cause finding information to be displayed in the updated user interface for the component corresponding to the selected button, for example to toggle between finding a left earbud and a right earbud). In some embodiments, while displaying the updated user interface and before receiving the indication that the first component has been located, the electronic device receives (1308*b*), via the one or more input devices, a second input directed to the one or more selectable options that corresponds to a request to switch to finding the second component of the first set of components, such as touch contact 1226 selecting toggle button 1250 in FIG. 12BB (e.g., while the updated user interface is displaying information for locating the first component and while the first component has not yet been located, the electronic device receives a request from a user corresponding to a request to start finding the second component).

In some embodiments, in response to receiving the second input (1308*c*), the electronic device ceases (1308*d*) display of the information indicating the location of the first component in the updated user interface, such as the information for the right earbud no longer being displayed in FIG. 12CC. In some embodiments, in response to receiving the second input (1308*c*), the electronic device displays (1308*e*), in the updated user interface, information indicating a location of the second component, such as, in FIG. 12CC, the user interface 1240 includes finding information for John's left earbud. For example, if a request to start locating a second component is received while information for finding the first component is being displayed in the updated user interface (e.g., an indication of a location of the first component in the updated user interface) and before receiving an indication that the first component has been located, the updated user interface ceases displaying information for locating the first component and begins to display information for locating the second component (e.g., information indicating a location of the second component). In some embodiments, the information displayed in the updated user interface for locating the second component is based on the location of the second component in a physical environment. For example, if the location of the second component is more than a threshold distance from a location of the electronic device (e.g., that received the input to switch to finding the second component), the information indicating a location of the second component optionally includes displaying the second component at a location in a map corresponding to the location of the second component in a physical environment. Similarly, if the location of the second component is less than a threshold distance from a location of the electronic device (e.g., that received the input to switch to finding the second component), the information indicating a location of the second component optionally includes an indication of a distance to the second component from the electronic device and/or relative directions to second component such as "to the left, to the right, straight ahead, behind" (e.g., when the component is determined to be relatively close to the device, such as within 10, 50, 100, 500, 1000 feet), rather than driving directions or a map (e.g., which are displayed when the component is determined to be relatively far from the device, such as more than 10, 50, 100, 500, 1000 feet).

The above-described manner of displaying finding information for a second component when a request to switch from finding the first component to finding the second component is received provides an efficient way of switching between finding information for different components, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the updated user interface including the information indicating the location of the first component, wherein the updated user interface is displayed in a first color (e.g., such as the color of user interface 1240 in FIG. 12HH) (e.g., while the first component has not been located, the updated user interface is displayed in a first color, which indicates that the first component is currently being located. For example, the first color is black, blue, red, etc.). In some embodiments, the first color is the background color over which the information indicating the location of the first component is displayed), the electronic device receives (1310*a*) an indication that a state of the first component has changed (e.g., the first component is no longer being located (e.g., moved from a "being located" state to a new state (e.g., found state), or the first component is placed in a charger, or the first component is placed in a user's ear (if the first component is an earbud))). In some embodiments, in response to receiving the indication that the state of the first component has changed, the electronic device displays (1310*b*) the updated user interface in a second color, different from the first color, such as the user interface 1240 changing a background color from FIG. 12HH to FIG. 12II (represented by a cross hatch fill in user interface 1240).

For example, when the first component that is currently being located has changed from a "being located" state, the updated user interface changes colors (e.g., to green) to provide an indication of the new state of the first component. In some embodiments, the background of the updated user interface changes to the second color while still displaying the information indicating the location of the first component. In some embodiments, when the first component changes to the new state (e.g., a "located" state), the updated user interface includes an indication (e.g., notification) associated with how the first component changed to the new state (e.g., displays graphical information such a representation of the first component being placed in a user's ear, being placed in a (e.g., charging) case, etc. and/or textual information such as "first component has been placed in a user's ear", "first component has started charging", "first component has been placed in a case", etc.). In some embodiments, the state that the first component changes to (e.g., "placed in a user's ear", "now charging", "placed in a case", etc.) determines the color of the updated user interface (e.g., the color of the background of the updated user interface), with different colors corresponding to different updated status of the first component. In some embodiments, the background changes to correspond to a "being located" (e.g., not found) state if a user provides an input indicating that the component has not been found or when the updated user interface begins displaying information for locating a second component that is not currently located (e.g., in a "not found/located" state). In some embodiments, in response to the state change (or, alternatively, for particular state changes), the electronic device switches to the user interface for finding the second component. In some embodiments, when the second component is located the color of the user interfaces changes in a manner similar to/the same as the manner described when the first component changes states.

The above-described manner of changing a display color of the updated user interface from a first color to a second color when the component has changed states provides an efficient way of indicating a new state of the first component, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the state of the first component includes a charging state of the first component (1312*a*), such as displaying the user interface 1240 in FIG. 12II when John's right earbud started charging. For example, the electronic device receives the indication of a change in state when the first component enters a charging state. In some embodiments, when the first components changes to a charging state from a "not found" state (e.g., being located state). In some embodiments, the first component enters a charging state when the first component begins charging from a charger that has been previously associated (e.g., paired) with the first component. In some embodiments, if the first component begins to be charged with a charger that has not been previously associated (e.g., paired) with the first component, the first component does not enter (e.g., change to) a charge state. In some embodiments, if the first component begins charging (e.g., changes to a charging state), a display color of the updated user interface changes from a first display color to a second display color, where the second color corresponds to the charging state. In some embodiments, the first component and/or the charger that is charging the first component directly and/or indirectly communicates with the electronic device to allow the electronic to receive an indication that the first component has changed to a charging state. In some embodiments, when the first component enters the charging state, the first component is indicated as found/located. In some embodiments, the second component functions in a manner similar to/the same as the first component.

The above-described manner of changing a display color of the updated user interface from a first color to a second color when the component has moved to a charging state provides an efficient way of indicating a new state of the first component, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the state of the first component includes whether the first component is in a case associated with the first component (1314*a*), such as displaying the user interface 1240 in FIG. 12II if John's Right earbud is placed into a case. For example, the electronic receives the indication that the first component has changed states when the first component is placed in (or moves within a threshold distance) of a case associated with the first component. In some embodiments, the determination that the first component is in a case associated with the first component is additionally or alternatively based on magnetic, electric, NFC and/or mechanical coupling between the first component and the case. In some embodiments, when it is detected that the first components is placed in a case associated with the first component, the first component is identified as having been found. In some embodiments, the first component and/or the case that the first component is placed in communicates directly and/or indirectly with the electronic device to indicate that the first component has been placed in the case. In some embodiments, if the first component is placed in a case that is not paired with the first component (e.g., was not previously paired together), the electronic device does not receive an indication that the first component has been placed in a case (e.g., the first component remains in the same state (e.g., "lost/missing" state)). In some embodiments, if the first component is placed into an associated case (e.g., a case that is paired with the first component), the color of the updated user interface changes from a first color to a second color corresponding to "case insertion state". In some embodiments, the background changes to correspond to a "not located" state if a user provides an input indicating that the component has not been found or the updated user interface begins displaying information for locating a second component that is in a not located state. In some embodiments, the second component functions in a manner similar to/the same as the first component. In some embodiments, the case associated with the first component is configured to charge the first component (e.g., causes the first component to enter a charging state if the first component is inserted into the case).

The above-described manner of changing a display color of the updated user interface from a first color to a second color when the component has been placed into an associated case provides an efficient way of indicating that the first component has been found and is now in a case, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the state of the first component includes whether the first component is being worn by a user (1316*a*), such as displaying the user interface 1240 in FIG. 12II if John's Right Earbud starts being worn by a user (e.g., of the electronic device). For example, the electronic device receives the indication the first component has changed states when the first component begins to be worn by a user (e.g., in contact with the body of a user (e.g., in ear, in hand, on wrist, on head, etc.)). In some embodiments, the first component detects that it is being worn by a user based on sensor measurements from the first component device, such as a proximity sensor that indicates proximity of the component to a portion of a user's body, or a biometric sensor such as a pulse or face or eye sensor that detects the presence of a biometric feature of the user. In some embodiments, when the first component begins to be worn by a user, the first component communicates directly and/or indirectly with the electronic device to indicate that the first component is being worn by a user. In some embodiments, when the electronic device receives the indication that the first component is being worn by a user, the color of the updated user interface changes from a first color to a second color to correspond to a state in which the user is wearing the first component. In some embodiments, the background changes to correspond to a "not located" state if a user provides an input indicating that the component has not been found or the updated user interface begins displaying information for locating a second component that is in a "not located" state. In some embodiments, one or more proximity sensors of the first component determines if the first component is being worn by a user (e.g., if an object is within a threshold distance of the one or more proximity sensors of the first component). In some embodiments the second component in a manner similar to/the same as the first component.

The above-described manner of changing a display color of the updated user interface from a first color to a second color when the component is being worn by a user provides an efficient way of indicating that the first component has been found and is being worn by a user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the updated user interface that includes the information indicating the location of the first component, the electronic device displays (1318a), in the updated user interface, a visual indication indicating that the first component of the first set of two or more components is currently being located, such as toggle button 1252 having a different visual characteristic than toggle button 1250 in FIG. 12HH (e.g., while the updated user interface is including information for located the first component, a visual indication is displayed that indicates the first component is currently being located). In some embodiments, while displaying the user interface for locating the second component of the first set of two or more components, the electronic device displays (1318b), in the updated user interface, a visual indication indicating that the second component of the first set of two or more components is currently being located such as toggle button 1252 having a different visual characteristic than toggle button 1250 in FIG. 12CC (e.g., while the updated user interface is including information for located the second component, a visual indication is displayed, in the updated user interface, that indicates that the second component is currently being located). In some embodiments, the updated user interface optionally includes selectable options corresponding to the components in the set of two or more components, which are selectable to display information for locating a respective component (e.g., the respective component corresponding to the selected selectable option). In some such embodiments, when the updated user interface includes information for locating the first component (e.g., is indicating a location of the first component), the selectable option corresponding to the first component is optionally shown with a first visual characteristic and the selectable options that do not correspond to the first selectable option are shown in a different visual characteristic.

The above-described manner of visually indicating which component of the set of two or more components is currently being located in the updated user interface provides an efficient way of indicating which component is currently being located, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first input is received while the electronic device is displaying a second user interface, different from the user interface, that includes a representation of a map and one or more selectable items corresponding to one or more objects (e.g., when the input corresponding to the request to locate a first component is received, the electronic device is displaying a user interface that includes a representation of a map and one or more selectable items that correspond to objects that can be located or found using the finding processes described herein). In some embodiments, the one or more selectable items are items in a list. In some such embodiments, when a respective selectable item is selected in the list, a graphical (or textual representation) of the component corresponding to the selected item is displayed at a location on the representation of the map corresponding to a physical location of the component.

In some embodiments, while displaying the second user interface and before receiving the first input, the electronic device receives (1320a), via the one or more input devices, a second input selecting a respective selectable item of the one or more selectable items, such as touch contact 1226 selecting list item 1208 in FIG. 12T (e.g., before the input corresponding to the request to display information for locating the first component is received, receiving a selection of one of the selectable items). In some embodiments, in response to receiving the second input (1320c), in accordance with a determination that the respective selectable item corresponds to a respective set of two or more associated components (e.g., if the selected item corresponds to a set of two or more associated components, such as associated left and right earbuds), the electronic device concurrently displays (1320d), on the representation of the map in the second user interface, a plurality of representations of objects corresponding to components in the respective set of two or more associated components at locations on the representation of the map corresponding to physical locations of the two or more associated components, such as the representation of John's Right Earbud 1221 and the representation of John's Left Earbud 1223 in FIG. 12U.

For example, if the selected item of the plurality of selectable items displayed in the second user corresponds to a respective set of two or more associated components, then the second user interface displays, on the representation of the map, a plurality of representations of objects corresponding to the components in the respective of two or more associated components. For example, if a selectable item is selected that corresponds to a respective set that includes (e.g., a pair of) earbuds, representations of objects, including the earbuds, in the respective set are displayed concurrently with the representation of the map—including displaying a representation of a first item in the pair of earbuds and a representation of a second item in the pair of earbuds in the representation of the map. In some such examples, the representations of objects corresponding the earbuds are displayed at locations on the map corresponding to the locations of the earbuds in a physical environment. In some embodiments, the representations of objects displayed on the map are selectable to initiate a request for locating a particular component. In some embodiments, the locations of the earbuds (e.g., components) are at a same location in a physical environment (e.g., within a threshold distance from the same physical location). In some such embodiments, the representations of objects are displayed at a location on the representation of the map corresponding to same location of the earbuds in the physical environment. In some embodiments, the locations of the earbuds (e.g., components) are at different locations in a physical environment. In some such embodiments, the representations of objects are displayed at different locations on the representation of the map corresponding to the different locations of the earbuds (e.g., components) in the physical environment.

In some embodiments, in accordance with a determination that the respective selectable item corresponds to only a single component, the electronic device displays (1302e), on the representation of the map in the second user interface, a representation of the single component at a location on the representation of the map corresponding to a physical location of the single component, such as if the list item 1210 corresponded to only a tablet (and no other associated components), a single representation of John's Tablet would be displayed on the map 1204 in response to selecting that list item. For example, if the selected item of the plurality of selectable items corresponds to a single component (e.g., an electronic device that does not correspond to a respective set of two or more associated components), the second user interface concurrently displays a representation of the single component on the representation of the map. In some embodiments, the representation of the single component is displayed at a location on the representation of the map that corresponds to a physical location of the single component.

The above-described manner of displaying a plurality of representations of components on the representation of the map when a selected selectable item corresponds to a set of two or more components and displaying a single representation of a component on the representation of the map when a selected selectable item corresponds to a single component provides an efficient way of indicating a physical location of single components and multiple components, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first input is received while the electronic device is displaying a second user interface, different from the user interface, that includes a representation of a map and a list of a plurality of selectable items corresponding to a plurality of objects (1322a), such as user interface 1202 in FIG. 12T (e.g., when the input corresponding to the request to locate a first component is received, the electronic device is displaying a user interface that includes a representation of a map and one or more selectable items that correspond to objects that can be located or found using the finding processes described herein). In some embodiments, the one or more selectable items are items in a list. In some such embodiments, when a respective selectable item is selected in the list, a graphical (or textual representation) of the component corresponding to the selected item is displayed at a location on the representation of the map corresponding to a physical location of the component.

In some embodiments, while displaying the second user interface and before receiving the first input, the electronic device receives (1322b), via the one or more input devices, a second input selecting a respective selectable item of the list of the plurality of selectable items, such as touch contact 1226 selecting one of list items 1208-1214 in FIG. 12T (e.g., before the input corresponding to the request to display information for locating the first component is received, receiving a selection of one of the selectable items). In some embodiments, in response to receiving the second input (1322c), in accordance with a determination that the respective selectable item corresponds to a respective set of two or more associated component (1322d) (e.g., the components in the respective set are part of a pair of input and/or output devices, such as left and right earbuds that can be located independently of each other), (e.g., while maintaining display of the respective selectable item in the second user interface,) the electronic device displays (1322e), in the list of the plurality of selectable items, a plurality of selectable child items (e.g., sub-items of the respective selectable item) corresponding to components in the respective set of two or more associated components, such as touch contact 1226 selecting list item 1226 in FIG. 12T and in response, in FIG. 12U, displaying child items 1252 and 1254.

For example, when a selectable item that corresponds to a respective set of two or more associated components is selected, the components in the respective set are displayed as child items of the selected item (e.g., sub items) in the list. In some embodiments, when the respective selectable item corresponds to a single component, information for locating the item is optionally displayed as child items or is displayed in a different user interface (e.g., a new user interface that causes the display of the list of the plurality of selectable items to cease displaying in the second user interface). In some embodiments, the selectable item corresponding to a respective set of two or more components includes information such as a charge level for the respective set, information about the physical location of the respective set, a name of the respective set, a graphical representation of the respective set, and/or the last time the electronic device directly and/or indirectly received an indication of the physical location of the respective set. In some embodiments, in response to a selection of the selectable item corresponding to the respective set, child items are displayed proximate to (e.g., within a threshold distance of) the respective selectable item. In some embodiments, the child items are selectable to initiate a process to locate the component that corresponds to that particular child item and include information such as information about a location of the corresponding component with respect to a user (e.g., of the electronic device), a graphical representation of the corresponding component, and/or a name of the corresponding component. In some embodiments, child items of a respective set optionally include information similar to the information included in a selectable item corresponding to the respective set (e.g., a charge level for a corresponding component, information about the physical location of a corresponding component, a name of the corresponding component, a graphical representation of the corresponding component, and/or the last time the electronic device directly and/or indirectly received an indication of the physical location of the corresponding component). In some embodiments, the child items of a respective set are not displayed until the selectable item corresponding to the respective set is selected by a user.

The above-described manner of displaying child items corresponding to components in a respective set of two or more associated components when an item corresponding a set of two or more component is selected provides an efficient way of displaying information about the components in the set of two or more components, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first input is received while the electronic device is displaying a second user interface, different from the user interface, that includes a representation of a map and a list of a plurality of selectable items corresponding to a plurality of objects (1324a) (e.g., when the input corresponding to the request to locate a first component is received, the electronic device is displaying a user interface that includes a representation of a map and one or more selectable items that correspond to objects that can be located or found using the finding processes described herein). In some embodiments, the one or more selectable items are items in a list. In some such embodiments, when a respective selectable item is selected in the list, a graphical (or textual representation) of the component corresponding to the selected item is displayed at a location on the representation of the map corresponding to a physical location of the component. In some embodiments, while displaying the second user interface and before receiving the first input, the electronic device receives (1324*b*), via the one or more input devices, a second input selecting a respective selectable item of the list of the plurality of selectable items (e.g., before the input corresponding to the request to display information for locating the first component is received, receiving a selection of one of the selectable items).

In some embodiments, in response to receiving the second input (1324*c*), in accordance with a determination that the respective selectable item corresponds to a respective set of two or more associated components (e.g., the components in the respective set are part of a pair of input and/or output devices, such as left and right earbuds that can be located independently of each other), in accordance with a determination that the two or more components are within a threshold distance (e.g., 1, 3, 6, 12, 24, 48, 96, 192 inches) of each other, (e.g., ceasing display of the plurality of selectable items in the second user interface, and while maintaining display of the map in the second user interface,) the electronic device displays (1324*e*), via the display generation component, one or more options associated with locating components in the respective set of two or more associated components, such as such as touch contact 1226 selecting list item 1226 in FIG. 12B and in response, in FIG. 12C, displaying card 1228 because John's Left and Right Earbuds are together. For example, if the selected item corresponds to a respective set of two or more associated components and those components are at physical locations that are within a threshold distance from each other, the second user interface displays options for locating and finding the (e.g., set of) components. In some embodiments, the options include selectable options for initiating a process to display directions to a respective component or the set of components and/or to initiate a process to play a sound at a respective component or the set of components. In some embodiments, selecting the respective selectable option causes a disambiguation user interface (e.g., dialog box overlaid the second user interface) that includes selectable objects corresponding to components in the respective set, which when selected, causes directions to that selected respective component to be displayed in the second user interface and/or a sound to be played at that respective component. In some embodiments, the components are determined to be within a threshold distance of each other when the components are able to connect to each other via Bluetooth or other wireless communication protocol (e.g., are located 30 or less feet away from each other), and are determined to be farther than the threshold distance of each other when the components are not able to connect to each other via Bluetooth or other wireless communication protocol.

In some embodiments, in accordance with a determination that the two or more components are not within the threshold distance of each other, (e.g., while maintaining display of the respective item,) the electronic device displays (1324*f*) a plurality of selectable child items corresponding to components in the respective set of two or more associated components such as touch contact 1226 selecting list item 1226 in FIG. 12T and in response, in FIG. 12U, displaying child items 1252 and 1254 because John's Left and Right Earbuds are not together. For example, if the selected item corresponds to a respective set of two or more associated components and those components are at physical locations that are more than a threshold distance from each other, the second user interface displays the components of the respective set as child items (e.g., sub items of the respective selectable item). In some embodiments, the selectable child items are displayed within a threshold distance of the list item in which it relates (e.g., the respective selected item). In some embodiments, the child items are selectable to initiate a process to locate the component that corresponds to that particular selected child item and includes information such as information about a location of the corresponding component with respect to a user (e.g., of the electronic device or the electronic device itself), a graphical representation of the corresponding component, and/or a name of the corresponding component.

The above-described manner of displaying finding information when the components of a respective set are together and displaying child items when the components of the respective set are not together provides an efficient way of indicating information about locations of the components in the respective set, without a user needing to view the locations of the components in a map, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the plurality of selectable child items include a first item corresponding to a first component in the respective set and a second item corresponding to a second component in the respective set, different from the first component, the first item includes information about a location of the first component relative to the electronic device, and the second item includes second information about the location of the second component relative to the electronic device, different from the location of the first component relative to the electronic device (1326*a*), such as labels 1256 and 1258 in FIG. 12U. For example, the child item corresponding to the first component indicates how far (e.g., in feet, yards, miles, etc.) and/or the direction the first component is from the electronic device. Similarly, the child item corresponding to the second component indicates how far (e.g., in feet, yards, miles, etc.) and/or the direction the second component is from the electronic device.

The above-described manner of displaying information about a location of a corresponding component relative to the electronic device in a respective child item provides an efficient way of indicating a current relative location of the first component and with respect to the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first input is received while the electronic device is displaying a second user interface, different from the first user interface, that includes a representation of a map and a list of a plurality of selectable items corresponding to a plurality of objects (1328*a*) (e.g., when the input corresponding to the request to locate a first component is received, the electronic device is displaying a user interface that includes a representation of a map and one or more selectable items that correspond to objects that can be located or found using the finding processes described herein). In some embodiments, the one or more selectable items are items in a list. In some such embodiments, when a respective selectable item is selected in the list, a graphical (or textual representation) of the component corresponding to the selected item is displayed at a location on the representation of the map corresponding to a physical location of the component. In some embodiments, while displaying the second user interface and before receiving the first input, the electronic device receives (1328*b*), via the one or more input devices, a second input selecting a respective selectable item of the list of the plurality of selectable items (e.g., before the input corresponding to the request to display information for locating the first component is received, receiving a selection of one of the selectable items).

In some embodiments, in response to receiving the second input (1328*c*), in accordance with a determination that respective selectable item corresponds to a respective set of two or more components (e.g., the components in the respective set are communicatively coupled (e.g., paired together)) and that the two or more components are within a threshold distance of each other, the electronic device displays (1328*d*), on the representation of the map in the second user interface, a representation of the respective set of two or more associated components at a location on the representation of the map corresponding to a physical location of the two or more associated components, such as in FIGS. 12B and 12C, because John's Left and Right Earbuds are together the selection of list item 1208 in FIG. 12B causes the display of a single representation of John's Earbuds in FIG. 12C. For example, if the two or more components in the respect set are within a threshold distance of each other, a single representation corresponding to the respective set is displayed on the representation of the map. In some embodiments the components determined to be together, if the physical location of the components are less than 10 feet, 5 feet, 3 feet, or 1 foot, etc. apart. In some embodiments, the two or more components are within a threshold distance of each other if components are able to be paired together via a Bluetooth connection. In some embodiments, the representation of the respective set includes a graphical representation of the respective set, a name of the respective set, etc. In some embodiments, the representation of the respective set is selectable to display information about the respective set and/or one or more selectable objects that are selectable to initiate a process to locate one or more of (or the set of) the components in the respective set or play a sound at one or more of (or the set of) the components.

In some embodiments, in accordance with a determination that respective selectable item corresponds to a respective set of two or more components and that the two or more components are not within the threshold distance of each other, the electronic device concurrently displays (1328*e*), on the representation of the map in the second user interface, a plurality of representations of components corresponding to components in the respective set of two or more associated components at locations on the representation of the map corresponding to physical locations of the two or more associated components, such as touch contact 1226 selecting list item 1226 in FIG. 12T and in response, in FIG. 12U, displaying child items 1252 and 1254 because John's Left and Right Earbuds are not together. For example, if the two or more components in the respect set are not within a threshold distance of each other, a plurality of representations corresponding to components in the respective set are displayed (e.g., at different locations) on the representation of the map. In some embodiments, the components are determined to not be within a threshold distance of each other if the physical locations of the components are more than 10 feet, 5 feet, 3 feet, or 1 foot, etc. apart. In some embodiments, the two or more components are determined to not be within a threshold distance of each other if the components are unable to be paired together via a Bluetooth connection. In some embodiments, the representation of the respective includes a graphical representation of the respective set, a name of the respective set, etc. In some embodiments, the plurality of representations are selectable to display information about the component it corresponds to and/or one or more selectable objects that are selectable to initiate a process to locate one or more of the components in the respective set or play a sound at one or more of the components.

The above-described manner of displaying a plurality of representations corresponding to components in a respective set if the component are separated and displaying a single representation if the components corresponding to the respective set are together provides an efficient way of indicating the location of the components in the respective set, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device displays (1323*a*) the user interface for locating the second component of the first set of two or more components in response to receiving the indication that the first component has been located is in accordance with a determination that the second component is not already located (e.g., if the second component is not in a charging state, is not being worn by a user, is not inside of a case, or is not otherwise indicated as being found). In some embodiments, in response to receiving the indication that the first component has been located (1330*b*), in accordance with a determination that the second component in the first set of two or more components is already located, the electronic device forgoes (1330*c*) displaying the user interface for locating the second component of the set of two or more components, such as if the left earbud is already located when the right earbud was found in FIG. 12II, device 500 would not display finding information for John's Left earbud. For example, if the second component is indicated as being located (e.g., if the second component is in a charging state, inside of a case associated with the second component, is being worn by a user), the user interface for locating the second component is not displayed by the electronic device. In some embodiments, the second component is indicated as already being located if a user has manually indicated that the second component has been located. In some embodiments, if the second component has already been indicated as located, the electronic device displays a user interface for locating a third component of the set of two or more components. In some embodiments, if no components in the set of components remains not located, the electronic device optionally ceases displaying the user interface for locating one or more components of the set of components.

The above-described manner of displaying a user interface for locating the second component when the second component is not already located and not displaying the user interface for locating the second component when the second component is already located provides an efficient way of displaying information for locating the second component when the second component is not already found, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIGS. 13A-13J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1500) are also applicable in an analogous manner to method 1300 described above with respect to FIGS. 13A-13J. For example, the map and finding user interfaces described above with reference to method 1300 optionally have one or more of the characteristics of device or object tracking, finding user interfaces, map user interfaces, separation alerts, etc., described herein with reference to other methods described herein (e.g., methods 700, 900, 1100 and 1500). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 13A-13J are, optionally, implemented by components depicted in FIGS. 1A-1B. For example, displaying operation 1302e, receiving operations 1302a and 1302c, and updating operation 1302b are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 14A-14I illustrate exemplary ways in which an electronic device facilitates display of location information of associated components that are at one or more physical locations in accordance with some embodiments of the disclosure. The embodiments in these figures are used to illustrate the processes described below, including the processes described with reference to FIGS. 15A-15E.

Figure 14B:
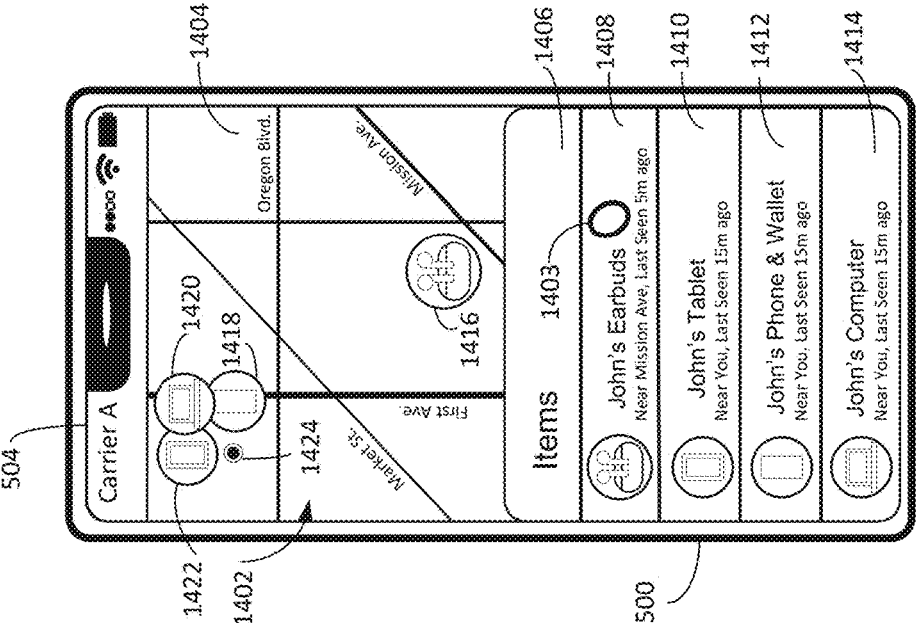
FIGS. 14A-14I illustrate exemplary ways in which an electronic device facilitates display of location information of associated components that are at one or more physical locations in accordance with some embodiments of the disclosure.
Figure 14A:
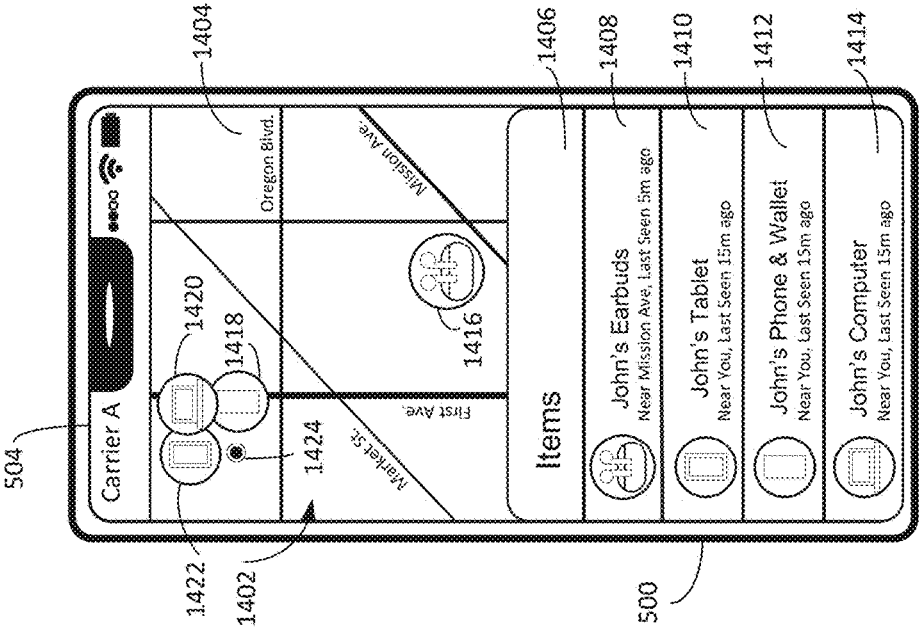

FIG. 14A illustrates an exemplary device 500 that includes touch screen 504. In FIG. 14A, the electronic device 500 is displaying user interface 1402. User interface 1402 includes a list 1406 of devices or objects whose location can be tracked/viewed by device 500, such as list item 1410 corresponding to John's Tablet, list item 1414 corresponding to John's Computer. The list 1406 also includes representations of components that are associated with each other, such as list item 1408 corresponding to John's Earbuds (e.g., corresponding to a left earbud, a right earbud and a charging case for the earbuds that are associated with each other), and list item 1412 corresponding to John's Phone & Wallet (e.g., corresponding to a smartphone and associated wallet accessory that is physically attached to the phone, such as via a magnetic attachment mechanism). In the example of FIG. 14A, list items 1408-1414 include a name of the object that corresponds to the list item ("John's Earbuds", "John's Tablet", etc.), a graphical representation of that object, labels which provide textual descriptions about the last time device 500 received information about a location of that object, and information about the last known location for that object.

Additionally, user interface 1402 also includes a representation of a map 1404. The representation of the map 1404 includes representations of devices or objects whose location can be tracked/viewed by device 500, and also includes representations of components that are associated with each other, such as a representation of John's Earbuds 1416 displayed at a location on map 1404 corresponding to the last known location for John's Earbuds, a representation of John's Tablet 1422 displayed at a location on map 1404 corresponding to the last known location for John's Tablet, a representation of John's Computer 1420 displayed at a location on map 1404 corresponding to the last known location for John's Computer, and a representation of John's Phone & Wallet 1418 displayed at a location on map 1404 corresponding to the last known location for John's Phone & Wallet. The representation of the map 1404 also includes a location indicator 1424 that indicates a location of the electronic device 500.

In FIG. 14B, while displaying user interface 1402, the electronic device 500 receives a selection of list item 1408 corresponding to John's Earbuds (indicated by touch contact 1403). As will be discussed in detail later, in some embodiments, based on whether the components (e.g., the left earbud, the right earbud and/or the charging case) associated with the selected list item are currently together or separated will result in different responses by device 500 when that list item is selected. In the example of FIG. 14B, John's Earbuds include a left earbud, a right earbud and a charging case that are at a same physical location (e.g., are not separated from one another). In some embodiments, the left earbud, right earbud and charging case are considered to be in the same location if the earbuds and charging case are within a threshold distance of each other (e.g., 0.1, 0.3, 0.5, 1, 3, 5, 10 or 20 yards) and/or if the earbuds are both located in the same object (e.g., the charging case).

Figure 14D:
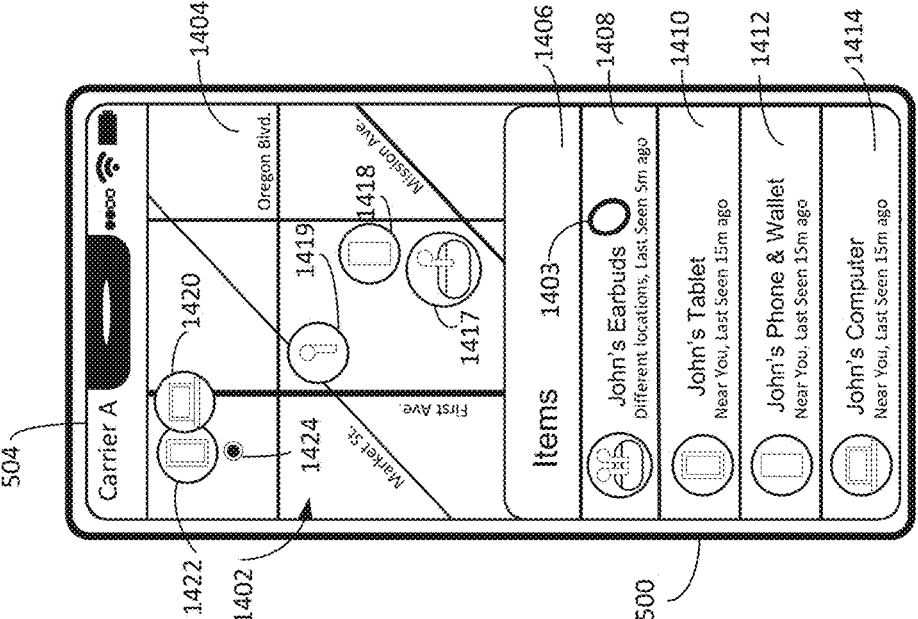
Figure 14C:
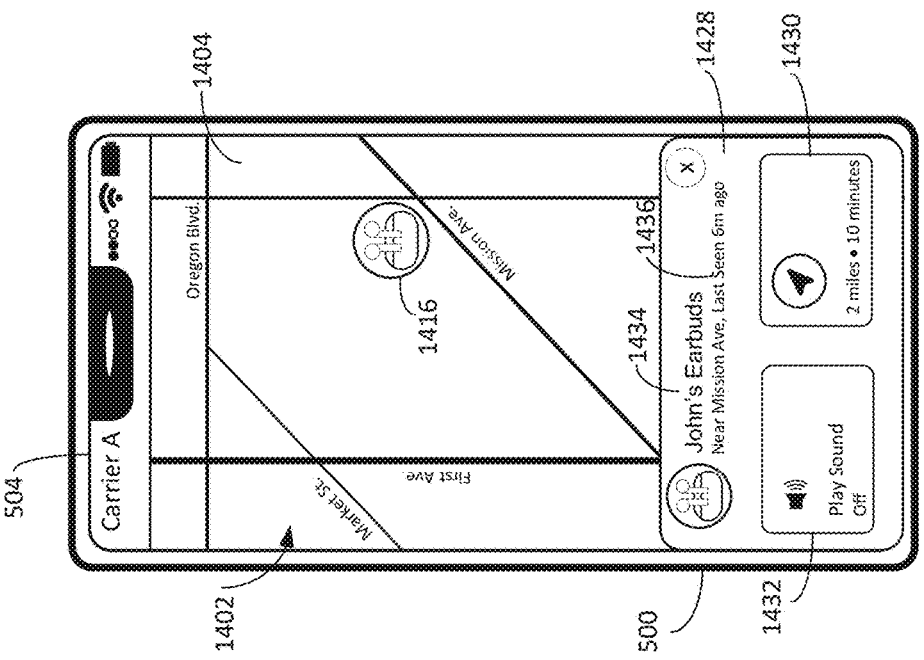

In FIG. 14C, because the left earbud, right earbud and charging case of John's Earbuds are at a same physical location, in response to the input in FIG. 14B, user interface 1402 is updated to display a card user interface 1428 corresponding to John's Earbuds. Specifically, card user interface 1428 includes label 1434 indicating the object that is associated with card user interface 1428 ("John's Earbuds"), label 1436 that provides information about the last known location of John's Earbuds and the last time the device 500 received location information for John's Earbuds ("Near Mission Ave, Last Seen 6 m ago"), and selectable options 1430 and 1432 corresponding to functions available for finding John's Earbuds, as described in more detail with reference to methods 900, 1100 and/or 1300. Additionally, the representation of John's Earbuds 1416 is focused (e.g., centered) in the representation of the map 1404, and device 500 ceases to display representation of other, unselected items in map 1404. Because the left earbud, right earbud and charging case were determined to be in a same physical location when the selection input 1403 was received in FIG. 14B, the representation of John's Earbuds 1416 is displayed as a single combined representation in the representation of the map 1404 (as compared to displaying separate representations for the left earbud, right earbud and/or charging case when the earbuds are not in the same physical location, as will be described later with reference to FIGS. 14D-14I).

In FIG. 14D, device 500 is displaying user interface 1402 as described previously with reference to FIG. 14A; however, in FIG. 14D, the left earbud of John's Earbuds is separated from the right earbud and charging case of John's Earbuds. As a result, device 500 is displaying a separate representation 1419 of the left earbud on the representation of the map 1404 at a location corresponding to the location of the left earbud, and a separate representation 1417 of the right earbud and charging case on the representation of the map 1404 at a location corresponding to the location of the right earbud and charging case.

In FIG. 14D, device 500 detects selection of list item 1408 corresponding to John's Earbuds, such as via a tap of contact 1403. In response, because the left earbud is separated from the right earbud and charging case, and because the right earbud and charging case are not separated from each other (e.g., the right earbud is placed within the charging case), in FIG. 14E device 500 updates list 1406 to include separate list items 1452 and 1454 corresponding to the left earbud and the right earbud/charging case, respectively. For example, list item 1452 includes label "Left Earbud" indicating that the list item corresponds to the left earbud, and list item 1454 includes label "Right Earbud, Case" indicating that the list item corresponds to the right earbud and the charging case. Further, list item 1452 includes distance and time information 1458 for the left earbud analogous to as described with reference to list items 1408-1414, and list item 1454 includes distance and time information 1456 for the right earbud and charging case analogous to as described with reference to list items 1408-1414. In FIG. 14E, because John's Phone & Wallet corresponds to a collection of components different from John's Earbuds, device 500 maintains the separate list item 1412 for the collection of John's Phone & Wallet—and corresponding representation 1418 on map 1404—in user interface 1402 even if John's Phone & Wallet is/are in proximity to one or more components of John's Earbuds.

Figure 14F:
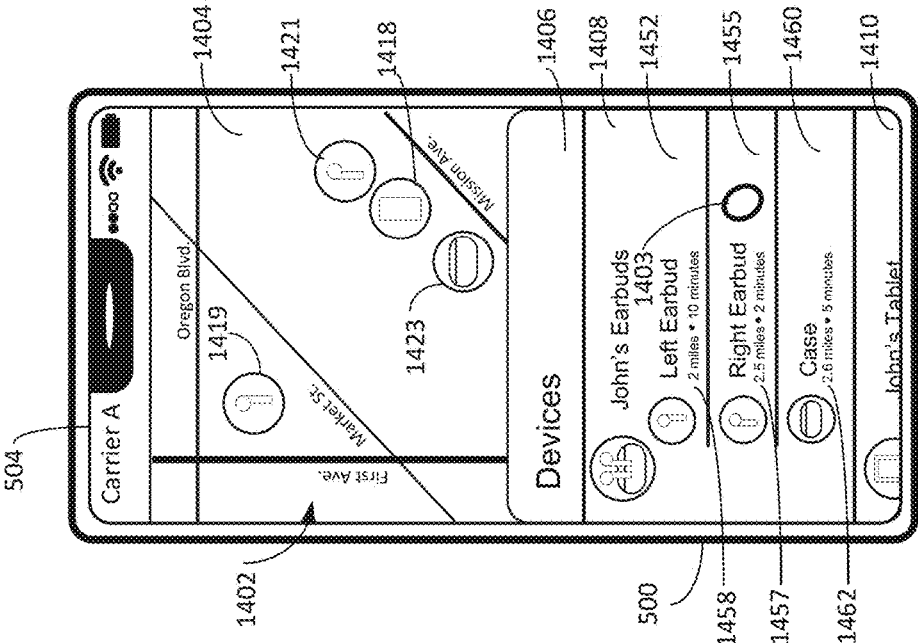
Figure 14E:
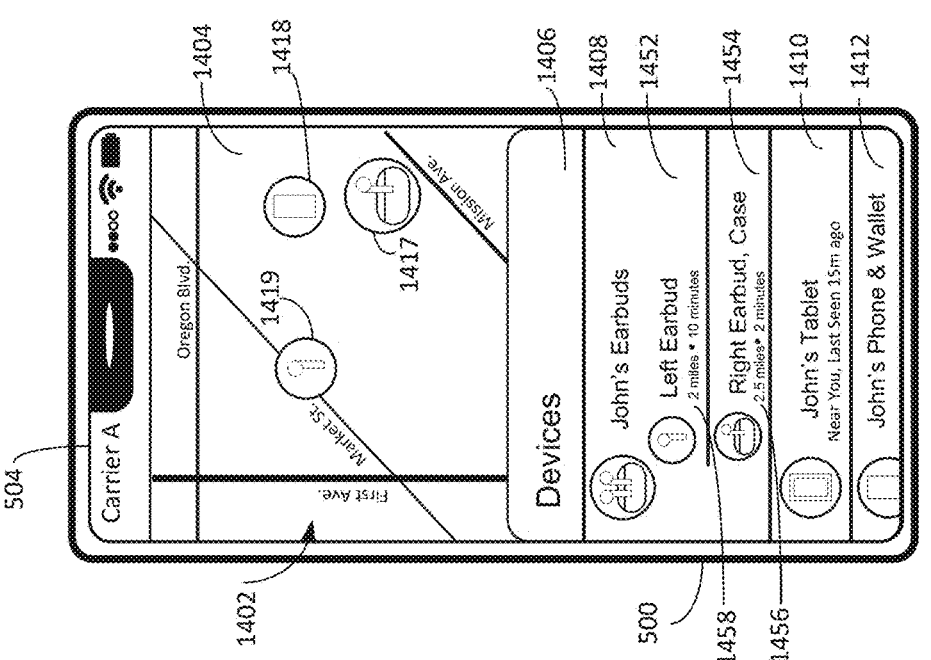

FIG. 14F illustrates an alternative to FIG. 14E in response to the input detected in FIG. 14D if the left earbud, the right earbud, and the charging case of John's Earbuds are all separated from each other. As shown in FIG. 14F, in response to the input in FIG. 14D, device 500 has updated list 1406 in user interface 402 to additionally include list item 1455 corresponding to the right earbud, and list item 1460 corresponding to the charging case (in addition to list item 1452 corresponding to the left earbud, as previously described). For example, list item 1455 includes label "Right Earbud" indicating that the list item corresponds to the right earbud, and list item 1460 includes label "Case" indicating that the list item corresponds to the charging case. Further, list item 1455 includes distance and time information 1457 for the right earbud analogous to as described with reference to list items 1408-1414, and list item 1460 includes distance and time information 1462 for the charging case analogous to as described with reference to list items 1408-1414. Device 500 is also displaying separate representations of the left earbud 1419, the right earbud 1421, and the charging case 1423 at locations on map 1404 corresponding to the locations of those components. Similar to as described above, in FIG. 14F, because John's Phone & Wallet corresponds to a collection of components different from John's Earbuds, device 500 maintains the separate list item 1412 for the collection of John's Phone & Wallet—and corresponding representation 1418 on map 1404—in user interface 1402 even if John's Phone & Wallet is/are in proximity to one or more components of John's Earbuds.

In FIG. 14E or FIG. 14F, in response to selection of a list item corresponding to a particular component or collection of components of John's earbuds, device 500 optionally displays a card user interface (e.g., similar to card user interface 1428) for the selected component or collection of components, as will now be described. For example, in FIG. 14F, device 500 detects selection of list item 1455, such as via a tap of contact 1403.

Figure 14H:
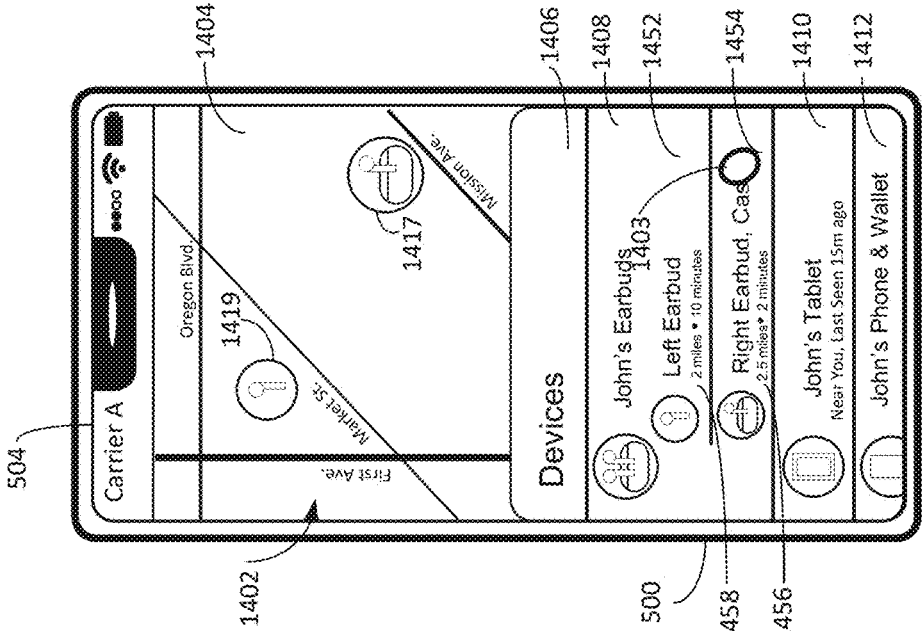
Figure 14G:
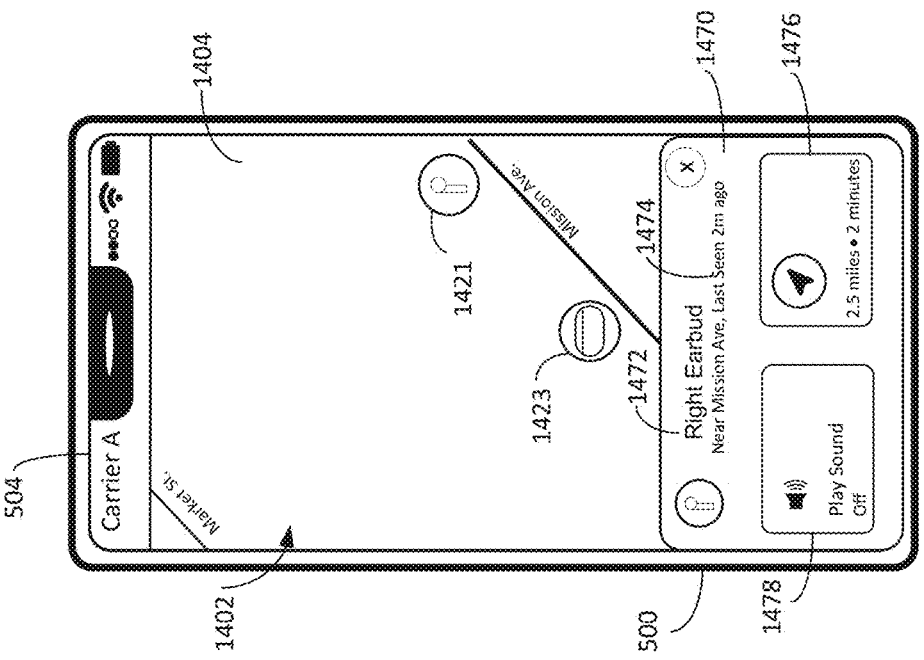

In response, in FIG. 14G, device 500 displays card user interface 1470 corresponding to the right earbud. Card user interface 1470 optionally includes item label 1472, location and time information 1474, selectable option 1476 and selectable option 1478 that are analogous to corresponding elements described with reference to card user interface 1428 in FIG. 14C, but instead directed to the right earbud in particular rather than the collection of the right and left earbuds and the charging case. In addition to displaying card user interface 1470, device 500 updates display of map 1404 to no longer include representations of items that are not part of the left earbud/right earbud/charging case collection of items. For example, despite representation 1418 (corresponding to John's Phone & Wallet) being displayed at a location on map 1404 in FIG. 14F that remains displayed in FIG. 14G, device 500 no longer displays representation 1418 in FIG. 14G. In contrast, device 500 in FIG. 14G continues to display representation 1423 corresponding to the charging case on map 1404 (e.g., at a location on map 1404 corresponding to the location of the charging case) despite card user interface 1470 being associated with the right earbud (e.g., and not associated with the charging case), because the charging case is part of the collection of components that is associated with the right earbud (e.g., the left earbud, the right earbud, and the charging case).

FIG. 14H illustrates an alternative to FIG. 14F. In FIG. 14H, user interface 1402 includes list 1406 as described with reference to FIG. 14E. In FIG. 14H, device 500 detects selection of list item 1454 corresponding to the right earbud and the charging case, such as via a tap of contact 1403. In response, in FIG. 14I, device 500 displays card user interface 1480 corresponding to the right earbud and charging case combination. Card user interface 1480 optionally includes item label 1482, location and time information 1484, selectable option 1486 and selectable option 1488 that are analogous to corresponding elements described with reference to card user interface 1428 in FIG. 14C and card user interface 1470 in FIG. 14G, but instead directed to the right earbud and charging case combination in particular. In addition to displaying card user interface 1480, device 500 updates display of map 1404 to no longer include representations of items that are not part of the left earbud/right earbud/charging case collection of items and optionally focuses (e.g., centers) display of map 1404 on representation 1417 of the right earbud/charging case combination, thus causing representation 1419 of the left earbud to no longer be in view on map 1404. Further, because the combination of components associated with card user interface 1480 includes the charging case, selectable option 1488 is optionally selectable to cause device 500 to initiate a process to play sound from the charging case (optionally rather than the right earbud) to aid a user in finding the right earbud and the charging case. In some embodiments, the charging case has a larger battery and/or speaker than the right earbud, thus making its speaker a preferred speaker for generating audio that is more likely to be heard by the user when searching for the right earbud and/or charging case.

FIGS. 15A-15E are flow diagrams illustrating a method 1500 of facilitating display of location information of associated components that are at one or more physical locations in accordance with some embodiments, such as in FIGS. 14A-141. The method 1500 is optionally performed at an electronic device such as device 100, device 300, or device 500 as described above with reference to FIGS. 1A-1B, 2-3, 4A-4B and 5A-5H. Some operations in method 1500 are, optionally combined and/or order of some operations is, optionally, changed.

As described below, the method 1500 provides ways to display location information of associated components that are at one or more physical locations. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1500 is performed at an electronic device in communication with a display generation component and one or more input devices. In some embodiments, the electronic device has one or more of the characteristics of the electronic devices of methods 700, 900, 1100 and/or 1300. In some embodiments, the display generation component and one or more of the characteristics of the display generation components of methods 700, 900, 1100 and/or 1300. In some embodiments, the one or more input devices have one or more of the characteristics of the input devices of methods 700, 900, 1100 and/or 1300.

In some embodiments, the electronic device receives (1502a), via the one or more input devices, a first input (e.g., an input such as a touch input, mouse input and/or keyboard input) corresponding to a request to locate one or more components of a first set of two or more components that are paired together, such as an input to display user interface 1402 in FIG. 14A. For example, receiving an input to display and/or launch an item locating application (e.g., selection of an icon for the item locating application on a home screen user interface such as described with reference to FIG. 4A) that displays information associated with the locations of one or more items to which the electronic device has access, including the first set of two or more components that are paired together. In some embodiments, the first set of two or more components has one or more of the characteristics of the sets of two or more (paired) components described with reference to methods 900 and/or 1300.

In some embodiments, in response to receiving the first input, the electronic device displays (1502b), via the display generation component in an item locating user interface (e.g., a user interface of an item locating application installed on the electronic device), a combined representation of the first set of components, such as list item 1408 in user interface 1402 in FIG. 14A. For example, the item locating user interface optionally includes representations of one or more different items, to which the locations of which the electronic device has access (e.g., via wired or wireless communication directly with the one or more different items, or indirect wired or wireless communication with the one or more different items via one or more other electronic devices, some of which are optionally in direct wired or wireless communication with the one or more different items). In some embodiments, the item locating user interface includes a representation of a map, and the representation of the map includes representations of the one or more different items (e.g., including the first set of components) at locations on the representation of the map corresponding to the locations of the one or more different items. In some embodiments, the item locating user interface includes a list of one or more different items (e.g., including the first set of components), and the list includes representations of the one or more different items displayed along with indications of the locations of the one or more different items (e.g., indications of addresses, indications of distances from the electronic device, and/or indications of cities or countries in which the items are located). The item locating user interface optionally includes a single representation of the first set of components, without including separate representations for individual components of the first set of components. In some embodiments, the combined representation of the first set of components includes a photorealistic or otherwise image of the collection of the first set of components (e.g., an image of two earbuds inside a case in a scenario in which the components of the first set of components are a left earbud, a right earbud, and the case). In some embodiments, if the first input were an input corresponding to a request to locate one or more components that are not paired together, the item locating user interface would optionally include separate representations (e.g., on a map and/or in a list) of the one or more components, rather than a combined representation as described above. Such separate representations would optionally be selectable to display additional information associated with locating the respective component corresponding to the selected representation, similar to as described below.

In some embodiments, while displaying the combined representation of the first set of components, the electronic device receives (1502c), via the one or more input devices, a second input corresponding to selection of the combined representation of the first set of components, such as selection of list item 1408 in FIG. 14B (e.g., an input such as a touch input, mouse input, and/or keyboard input).

In some embodiments, in response to receiving the second input, the electronic device displays (1502d), via the display generation component, additional information associated with locating the one or more components of the first set of components, such as shown in FIG. 14C, 14E or 14F. In some embodiments, the additional information includes information for locating one or more components of the first set of components, as will be described in more detail below. In some embodiments, the additional information includes one or more selectable options that are selectable to initiate a process to locate one or more components of the first set of components, as will be described in more detail below. Displaying a combined representation for a set of components in an item locating user interface reduces unnecessary consumption of user interface area and facilitates efficient locating interactions with the set of components.

In some embodiments, displaying the additional information associated with locating the one or more components of the first set of components includes (1504a) in accordance with a determination that the first set of components are in proximity to one another, such as the left and right earbuds and the charging case in FIG. 14B being in proximity to one another (e.g., the components that make up the first set of components are all within a threshold distance of one another, such as 0.1, 0.3, 0.5, 1, 3, 5, 10 or 20 yards and/or otherwise have characteristics relative to one another that would not trigger a separation alert with respect to one another as described with reference to method 900), displaying (1504b), via the display generation component, a second user interface associated with the first set of components, such as user interface 1428 in FIG. 14C (e.g., a user interface dedicated to the first set of components), wherein the second user interface includes one or more selectable options for performing one or more finding operations for the combined first set of components, such as option 1430 and 1432 in FIG. 14C (e.g., such as options 1232 and 1230 described with reference to FIG. 12C). For example, the second user interface is optionally a user interface displayed in an item locating application that includes information about the current location of the first set of components (e.g., an address or city), an indication of when the location of the first set of components was last updated, and/or one or more selectable options for initiating processes to locate the first set of one or more components, such as described with reference to user interface 1228 in FIG. 12C. Displaying a user interface for the combined set of components when the components are in proximity to one another facilitates efficient locating interactions with the set of components.

In some embodiments, displaying the additional information associated with locating the one or more components of the first set of components includes (1506a) in accordance with a determination that at least one component of the first set of components is not in proximity to at least one other component of the first set of components (1506b), such as the left earbud not being in proximity to the right earbud/charging case in FIG. 14D (e.g., the components that make up the first set of components are not all within a threshold distance of one another, such as 0.1, 0.3, 0.5, 1, 3, 5, 10 or 20 yards and/or otherwise have characteristics relative to one another that would trigger a separation alert with respect to one another as described with reference to method 900. For example, the at least one component is more than the threshold distance from other(s) of the set of components), displaying, in the item locating user interface a first representation of first one or more components in the first set of components (1506c), such as list item 1452 in FIG. 14E (e.g., the at least one component that is more than the threshold distance from other(s) of the set of components), and a second representation of second one or more components in the first set of components (1506d), such as list item 1454 in FIG. 14E (e.g., the other(s) of the set of components that are within the threshold distance of one another), wherein the first one or more components are not in proximity to the second one or more components. For example, the electronic device optionally displays separate representations for components (or groups of components) of the set of components that are not in proximity to at least one other component in the set of components. In some embodiments, the components included in a given group of one or more components (corresponding to a single representation that is displayed) are those components in the set of components that are in proximity to one another. For example, the electronic device transitions from displaying representation 1208 in FIG. 12T to representations 1252 and 1254 in FIG. 12U. Displaying different representations for different similarly-situated individual or groups of components facilitates efficient locating interactions with those similarly-situated individual or groups of components.

In some embodiments, while displaying, in the item locating user interface, the first representation and the second representation, the electronic device receives (1508a), via the one or more input devices, a third input corresponding to selection of a respective representation of a respective component, such as the selection from contact 1403 in FIG. 14F or FIG. 14H (e.g., an input such as a touch input, mouse input, and/or keyboard input). In some embodiments, in response to receiving the third input (1508b), in accordance with a determination that the third input corresponds to selection of the first representation of the first one or more components, the electronic device displays (1508c), via the display generation component, a second user interface associated with the first one or more components, such as user interface 1470 in FIG. 14G (e.g., a user interface dedicated to the first one or more components), wherein the second user interface includes one or more selectable options for performing one or more finding operations for the first one or more components, such as options 1476 and 1478 in FIG. 14G (e.g., such as options 1232 and 1230 described with reference to FIG. 12C, but for the first one or more components) but does not include a selectable option for performing a finding operation for the second one or more components, such as user interface 1470 in FIG. 14G not including options for finding the left earbud or the charging case (e.g., does not include an analogous option 1232 or 1230 for the second one or more components). For example, the second user interface is optionally a user interface displayed in an item locating application that includes information about the current location of the first one or more components (e.g., an address or city), an indication of when the location of the first one or more components was last updated, and/or one or more selectable options for initiating processes to locate the first one or more components, similar to as described with reference to user interface 1228 in FIG. 12C. However, the second user interface optionally does not include information about the current location of the second one or more components (e.g., an address or city), an indication of when the location of the second one or more components was last updated, and/or one or more selectable options for initiating processes to locate the second one or more components.

Figure 14I:
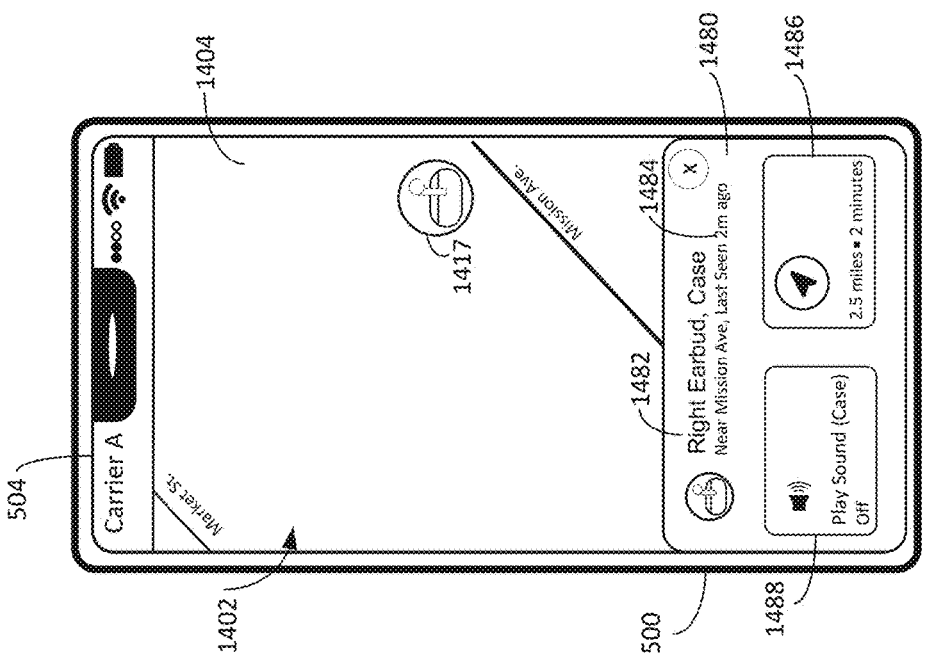
Figure 15B:
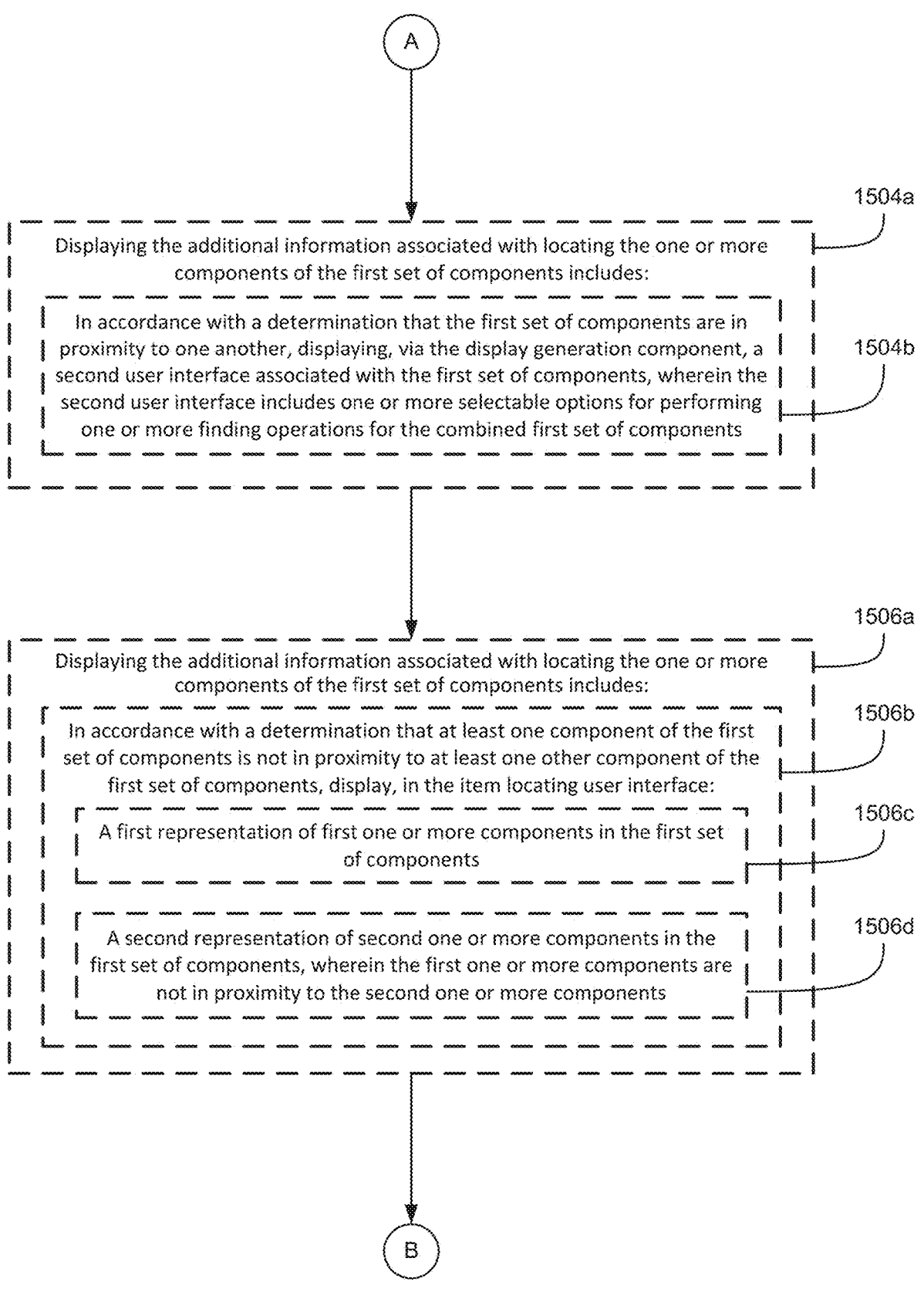
Figure 15D:
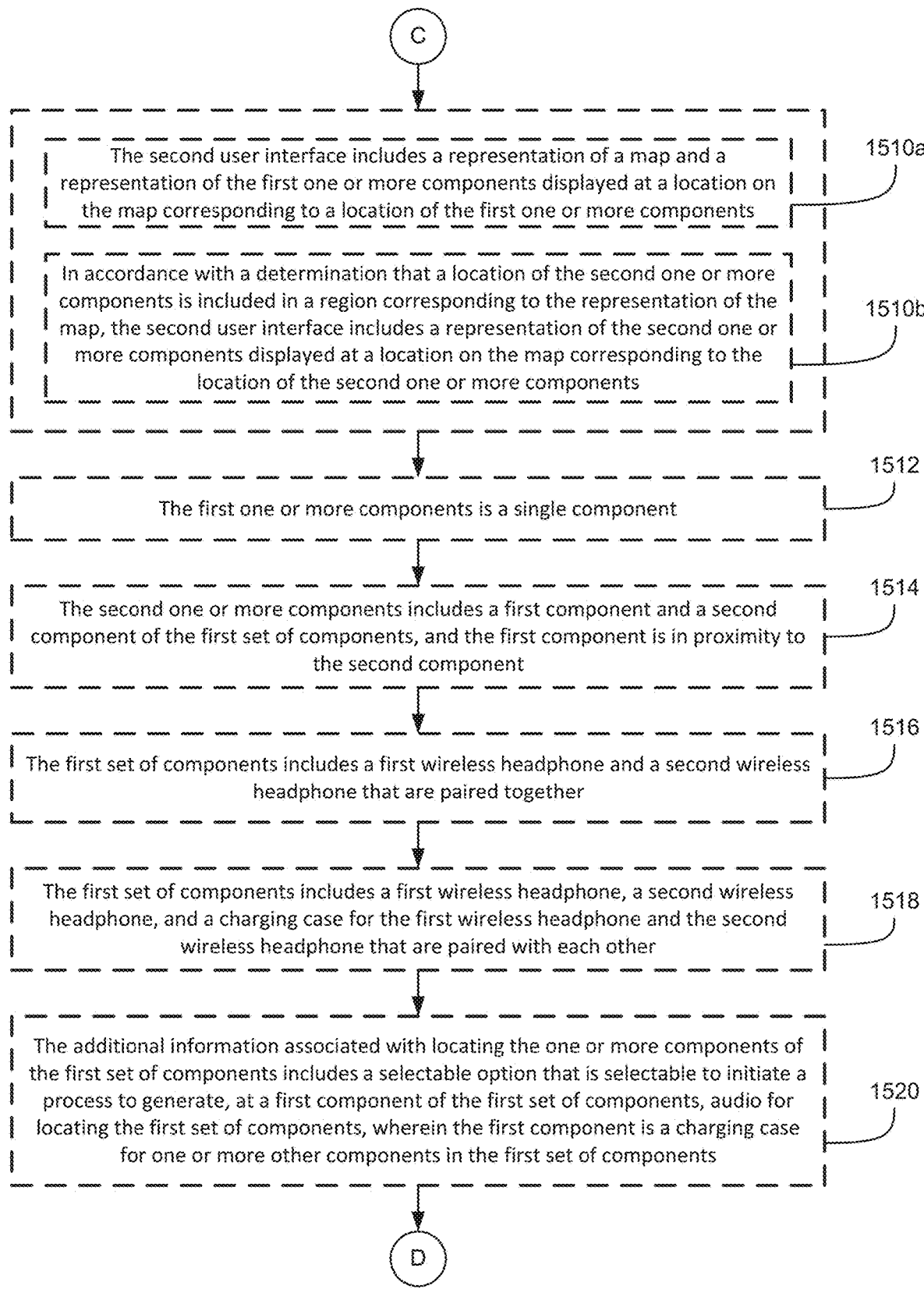
Figure 15E:
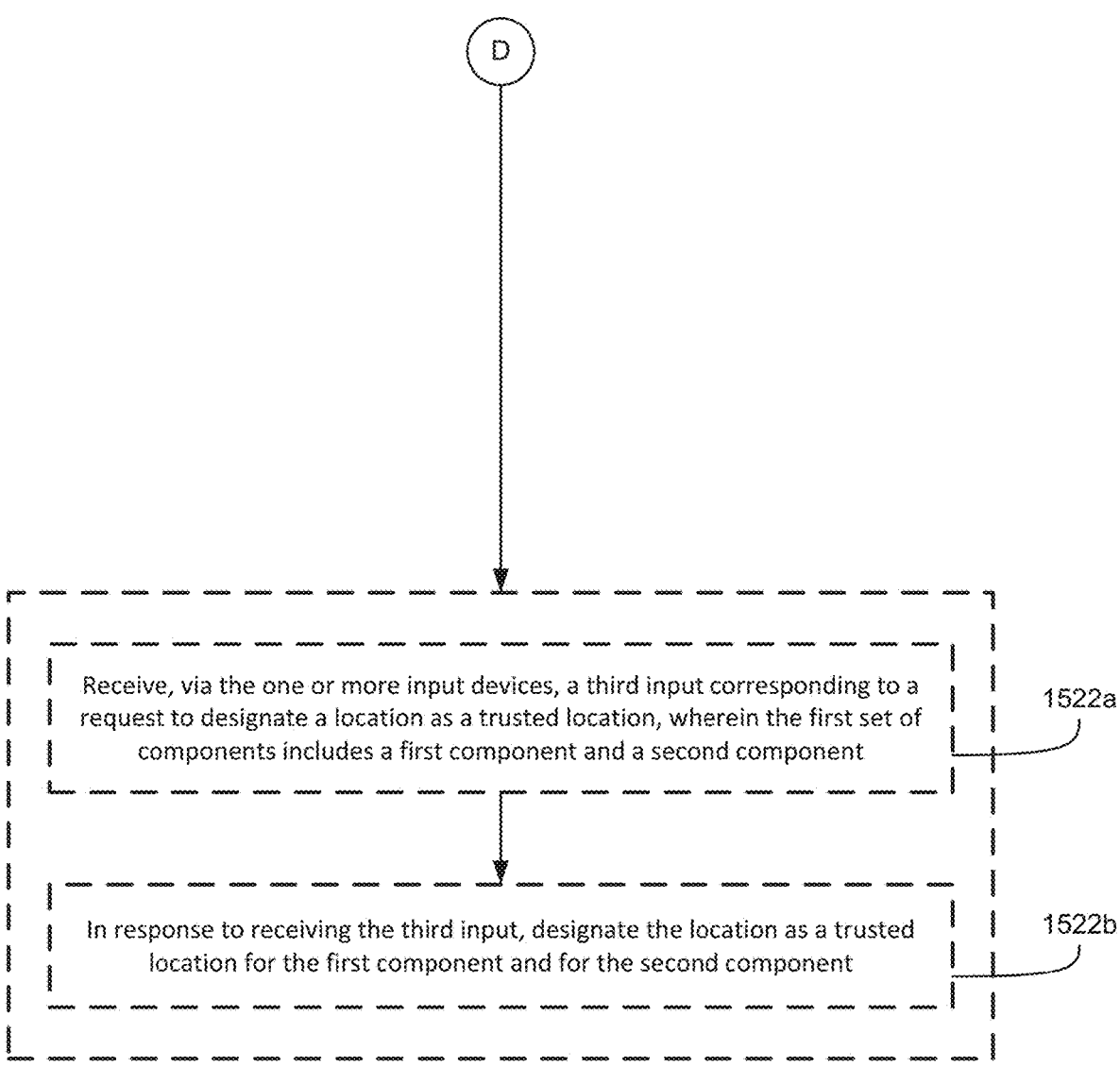

In some embodiments, in accordance with a determination that the third input corresponds to selection of the second representation of the second one or more components, such as the selection from contact 1403 in FIG. 14H, the electronic device displays (1508d), via the display generation component, a third user interface associated with the second one or more components, such as user interface 1480 in FIG. 14I (e.g., a user interface dedicated to the second one or more components), wherein the third user interface includes one or more selectable options for performing one or more finding operations for the second one or more components, such as options 1486 and 1488 in FIG. 14I (e.g., such as options 1232 and 1230 described with reference to FIG. 12C, but for the second one or more components) but does not include a selectable option for performing a finding operation for the first one or more components, such as user interface 1480 in FIG. 14I not including options for finding the left earbud (e.g., does not include an analogous option 1232 or 1230 for the first one or more components). For example, the third user interface is optionally a user interface displayed in an item locating application that includes information about the current location of the second one or more components (e.g., an address or city), an indication of when the location of the second one or more components was last updated, and/or one or more selectable options for initiating processes to locate the second one or more components, similar to as described with reference to user interface 1228 in FIG. 12C. However, the third user interface optionally does not include information about the current location of the first one or more components (e.g., an address or city), an indication of when the location of the first one or more components was last updated, and/or one or more selectable options for initiating processes to locate the first one or more components. Displaying different item locating user interface for different similarly-situated individual or groups of components avoids erroneous finding interactions with incorrect items or groups of items and facilitates efficient finding operations for similarly-situated individual or groups of components.

In some embodiments, the second user interface includes a representation of a map (e.g., a map that encompasses a region that includes the location of the first one or more components) and a representation of the first one or more components displayed at a location on the map corresponding to a location of the first one or more components (1510*a*), such as map 1404 in FIG. 14G including representation 1421 of the right earbud (e.g., an icon, image or graphic of the collection of first one or more components displayed at a location on the map corresponding to the determined location of the first one or more components, such as displayed at an intersection of two roads if that is the determined location for the first one or more components). In some embodiments, in accordance with a determination that a location of the second one or more components is included in a region corresponding to the representation of the map (e.g., if the physical region of the map includes the determined location of the second one or more components), the second user interface includes a representation of the second one or more components displayed at a location on the map corresponding to the location of the second one or more components (1510*b*), such as representation 1423 of the charging case shown on map 1404 in FIG. 14G (e.g., an icon, image or graphic of the collection of second one or more components displayed at a location on the map corresponding to the determined location of the second one or more components, such as displayed at an intersection of two roads if that is the determined location for the second one or more components). Thus, in some embodiments, even though the second user interface is not associated with the second one or more components, if the location of the second one or more components happens to fall within the displayed area of the map, the electronic device displays a representation of the second one or more components in the displayed area of the map. The electronic device optionally similarly displays a representation of the first one or more components in the displayed area of the map in the third user interface if the location of the first one or more components falls within the displayed area of the map in the third user interface. Displaying a representation of the second one or more components in the second user interface reduces the number of inputs needed to display information about the location of the second one or more components when the second one or more components are relatively close to the first one or more components.

In some embodiments, the first one or more components is a single component (1512), such as left earbud corresponding to list item 1452 in FIG. 14E (e.g., a left earbud of a pair of left and right earbuds). For example, a single component of the first set of components is separated from others of the first set of components, and the electronic device displays a representation of that single component. Selection of the representation of that single component optionally causes the electronic device to display a user interface associated with that single component, as previously described. Displaying a representation of a single component of the set of components facilitates efficient locating interactions with the single component and indicates, without further input, that the single component is separated from the others of the set of components.

In some embodiments, the second one or more components includes a first component and a second component of the first set of components, and the first component is in proximity to the second component (1514), such as the right earbud and the charging case corresponding to list item 1454 in FIG. 14E (e.g., a left earbud and a right earbud of a paired collection of left and right earbuds and a corresponding charging case for the left and right earbuds). For example, a collection of components of the first set of components is separated from others of the first set of components, and the electronic device displays a representation of that collection of components. Selection of the representation of that collection of components optionally causes the electronic device to display a user interface associated with that collection of components, as previously described. In some embodiments, the second one or more components are one earbud and the charging case of the paired collection of left and right earbuds and the charging case. In some embodiments, different collections of components (e.g., having one or more of the characteristics of the first set of components described herein) are optionally displayed in ways similar to as described herein with respect to the first set of components. If such a second set of components were at the same location (e.g., as described herein) as the first set of components (e.g., the first and second set of components are in proximity to one another as described herein), the electronic device would optionally not combine representations of one or more components of the second set of components with representations of one or more components of the first set of components. Rather, the electronic device would optionally display representations of one or more components of the second set of components in one or more of the manners as described herein with reference to the first set of components, and separately from representations of the first set of components. Further, in some embodiments, components (e.g., earbuds and/or charging cases) that are not associated with one another (e.g., because they are not paired together and/or are associated with different sets of components/earbuds, instead) will not be displayed with combined representations (e.g., as described herein), even if they are in proximity to one another (e.g., as described herein). Thus, in some embodiments, components from different sets of components that are not associated with each other are optionally not combined by the electronic device into combined representations, even if one or more or all of the other requirements for being displayed in a combined representation are satisfied. Displaying a representation of a collection of components of the set of components facilitates efficient locating interactions with the collection of components and indicates, without further input, that the collection of components is separated from the others of the set of components.

In some embodiments, the first set of components includes a first wireless headphone (e.g., left earbud) and a second wireless headphone (e.g., right earbud) that are paired together (1516), such as the left and right earbuds described with reference to FIGS. 14A-14I (e.g., such as described with reference to methods 900, 1100 and/or 1300). Performing the various locating-related operations and/or displaying the various locating-related user interfaces described herein for paired wireless headphones facilitates efficient locating interactions for such headphones, which are optionally more likely to be separated from one another due to their wireless connection with each other (e.g., as opposed to wired connection).

In some embodiments, the first set of components includes a first wireless headphone (e.g., left earbud), a second wireless headphone (e.g., right earbud), and a charging case for the first wireless headphone and the second wireless headphone that are paired with each other (1518), such as the left and right earbuds and the charging case described with reference to FIGS. 14A-14I (e.g., such as described with reference to methods 900, 1100 and/or 1300). For example, the charging case is configured to store the first and second wireless headphones, and while both or either are stored in the charging case, the charging case charges the battery of the headphone(s) that are stored in it. In some embodiments, the first wireless headphone, the second wireless headphone and the charging case are paired with each other. Performing the various locating-related operations and/or displaying the various locating-related user interfaces described herein for paired wireless headphones and corresponding charging case facilitates efficient locating interactions for such headphones and charging case, which are optionally more likely to be separated from one another due to their wireless connection with each other (e.g., as opposed to wired connection).

In some embodiments, the additional information associated with locating the one or more components of the first set of components includes a selectable option that is selectable to initiate a process to generate, at a first component of the first set of components, audio for locating the first set of components, such as option 1488 in FIG. 14I, wherein the first component is a charging case for one or more other components in the first set of components (1520). For example, the charging case is a charging case for left and/or right wireless earbuds as described above. In some embodiments, the additional information includes a selectable option, similar to option 1232 in FIG. 12C, that is selectable to cause the charging case to emit audio that is audible to the user (e.g., if the user is close enough to the charging case to hear the emitted audio) to help the user in finding the charging case. In some embodiments, the additional information includes such an option if the charging case is co-located with one or more of its corresponding earbuds (e.g., the earbuds are placed in the charging case), rather than causing audio to be emitted from the one or more co-located earbuds. In some embodiments, the charging case is determined to be co-located with one or more of its corresponding earbuds if the earbuds are placed in the charging case (and optionally not co-located if the earbuds are not placed in the charging case). In some embodiments, the charging case is determined to be co-located with one or more of its corresponding earbuds if the earbuds are within a threshold distance (e.g., 0.01, 0.1, 0.5, 1, 3, 5, 10, 20, 50 or 100 yards) of the charging case, whether or not the earbuds are placed in the charging case (and optionally not co-located if the earbuds are further than the threshold distance from the charging case). In some embodiments, the charging case has a larger battery and/or speaker than its corresponding earbuds, and therefore is able to generate louder and/or longer audio than its corresponding earbuds.

Displaying an option to generate audio at the charging case facilitates finding of the charging case, and in the case of co-located earbuds, increases the chances of successfully locating the earbuds due to the ability of the charging case to generate a stronger audio output.

In some embodiments, the electronic device receives (1522*a*), via the one or more input devices, a third input corresponding to a request to designate a (current) location (of the first set of components) as a trusted location (e.g., similar to as described with reference to method 900), wherein the first set of components includes a first component and a second component (e.g., the left earbud, the right earbud and/or the charging case described with reference to FIGS. 14A-14I). For example, the third input optionally corresponds to selection of option 812*b* in FIG. 8K (or selection of other similar options in FIGS. 8L-8T), but for the first set of components. The electronic device optionally displays such an option for the first set of components in one or of the ways described with reference to FIGS. 8A-8T and/or method 900.

In some embodiments, in response to receiving the third input, the electronic device designates (1522*b*) the (current) location (of the first set of components) as a trusted location for the first component and for the second component, such as for the left earbud, the right earbud and/or the charging case described with reference to FIGS. 14A-14I (e.g., similar to as described with reference to method 900). Thus, in some embodiments, a (single) input for setting a trusted location for the first set of components optionally sets that trusted location for (each of) the components included in the first set of components. As such, after the third input is received, if the electronic device becomes separated from the collection of components in the first set of components, or any single component or group of components in the first set of components, and the single component or group of components in the first set of components is located at the trusted location, the electronic device will optionally not generate a separation alert (e.g., as described with reference to method 900) for the single component or group of components in the first set of components. In some embodiments, the third input is an input directed to a single component of the first set of components. In some embodiments, the third input is an input directed to a subgroup of components of the first set of components. In some embodiments, the third input is an input directed to the first set of components. Designating a location as a trusted location for multiple components in the set of components reduces the number of inputs needed to set trusted locations for paired components.

As described above, one aspect of the present technology is the gathering and use of data available from specific and legitimate sources to improve the ability for users to track and locate items or devices that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to identify the location of remote locator objects and/or identify the location of the user. Accordingly, use of such personal information data enables users to identify, find, and otherwise interact with remote locator objects. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide personal data and/or device or object location data. In yet another example, users can select to limit the length of time personal data and/or device or object location data is maintained or entirely block the development of a baseline location profile. In addition to providing "opt in" and "opt out" options, the present disclosure contemplates providing notifications relating to the access or use of personal information. For instance, a user may be notified upon downloading an application that their personal information data and/or location data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location data and notifications can be delivered to users based on aggregated non-personal information data or a bare minimum amount of personal information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with one or more wireless antenna, an output component, and one or more input devices:

detecting a change in a location of a remote locator object relative to a location associated with a user, wherein the location associated with the user corresponds to a location of the electronic device; and in response to detecting the change in location of the remote locator object relative to the location associated with the user:

in accordance with a determination that the location associated with the user and the location of the remote locator object have been moving for at least a first threshold amount of time while remaining within a first threshold distance from each other, and that first separation criteria are met, generating, via the output component, a separation alert, that indicates that the remote locator object has been separated from the location associated with the user, at the electronic device without regard to whether second separation criteria have been met, wherein the second separation criteria are different from the first separation criteria; and in accordance with a determination that the location associated with the user and the location of the remote locator object have moved less than a second threshold distance for at least a second threshold amount of time, and that the second separation criteria are met, generating, via the output component, a separation alert, that indicates that the remote locator object has been separated from the location associated with the user, at the electronic device without regard to whether the first separation criteria have been met.

2. The method of claim 1, wherein whether the first separation criteria have been met is based at least in part on a signal strength of the remote locator object as detected by the electronic device, and whether the second separation criteria have been met is independent of the signal strength of the remote locator object as detected by the electronic device.

3. The method of claim 1, wherein whether the second separation criteria have been met is based at least in part on whether the remote locator object or the electronic device have exited a geofenced region, and whether the first separation criteria have been met is independent of the geofenced region.

4. The method of claim 1, further comprising:

after generating the separation alert associated with the remote locator object, detecting, via the one or more input devices, input directed to the separation alert; and in response to detecting the input directed to the separation alert:

in accordance with a determination that the input corresponds to a request to designate a current location of the remote locator object as a trusted location, initiating a process to designate the current location of the remote locator object as a trusted location.

5. The method of claim 1, further comprising:

before generating the separation alert and before the electronic device is configured to generate separation alerts based on separation of the remote locator object from the electronic device:

detecting that the first separation criteria or the second separation criteria have been met; and in response to detecting that the first separation criteria or the second separation criteria have been met:

in accordance with a determination that one or more criteria are satisfied, including a criterion that is satisfied based on a number of times the first separation criteria or the second separation criteria have been met, generating, via the output component, an indication that the electronic device can be configured to generate separation alerts based on separation of the remote locator object from the electronic device.

6. The method of claim 1, further comprising:

while displaying, via the output component, a user interface that includes a representation of a map:

in accordance with a determination that a first component and a second component that are associated with each other are currently connected with each other, indicating, in the user interface, the first and second components with a first set of one or more indications having a first visual appearance; and in accordance with a determination that the first component and the second component that are associated with each other are not currently connected with each other, indicating, in the user interface, the first and second components with a second set of one or more indications having a second visual appearance, different from the first visual appearance.

7. The method of claim 6, further comprising:

in accordance with the determination that the first component and the second component that are associated with each other are not currently connected with each other:

while displaying, via the output component, a first indication corresponding to the first and second components, detecting, via the one or more input devices, an input directed to the first indication; and in response to detecting the input directed to the first indication, displaying, via the output component, a second indication corresponding to the first component, and a third indication corresponding to the second component.

8. The method of claim 6, further comprising:

in accordance with the determination that the first component and the second component that are associated with each other are not currently connected with each other:

displaying, on the representation of the map:

a first indication corresponding to the first component at a location on the representation of the map corresponding to a location of the first component, and a second indication corresponding to the second component at a location on the representation of the map corresponding to a location of the second component.

9. The method of claim 6, further comprising:

while displaying, via the output component, a finding user interface, providing an option to switch between finding the first component and finding the second component.

10. The method of claim 1, wherein the separation alert includes a representation of a map and a visual indication of the remote locator object displayed at a location on the representation of the map that corresponds to the location of the remote locator object.

11. The method of claim 1, wherein the separation alert includes a selectable option that is selectable to display a user interface associated with the remote locator object, wherein the user interface associated with the remote locator object includes additional information for locating the remote locator object.

12. The method of claim 11, wherein the user interface associated with the remote locator object includes a visual indication that indicates a location at which the remote locator object was separated from the location of the user, and the visual indication is selectable to initiate a process to designate the location at which the remote locator object was separated from the location of the user as a trusted location for the remote locator object.

13. The method of claim 1, wherein:

in accordance with a determination that one or more criteria are satisfied, the separation alert includes a selectable option that is selectable to initiate a process to designate the location of the remote locator object as a trusted location for the remote locator object.

14. The method of claim 13, wherein the process to designate the location of the remote locator object as a trusted location for the remote locator object includes:

in accordance with a determination that the remote locator object has been separated from the location of the user at the location of the remote locator object without a respective set of one or more other remote locator objects being separated from the location of the user at the location of the remote locator object, designating the location of the remote locator object as a trusted location for the remote locator object without designating the location of the remote locator object as a trusted location for other remote locator objects in the respective set of one or more other remote locator objects.

15. The method of claim 13, wherein the process to designate the location of the remote locator object as a trusted location for the remote locator object includes:

in accordance with a determination that the remote locator object and a second remote locator object have been separated from the location of the user at the location of the remote locator object:

designating the location of the remote locator object as a trusted location for the remote locator object; and designating the location of the remote locator object as a trusted location for the second remote locator object.

16. The method of claim 13, wherein designating the location of the remote locator object as a trusted location for the remote locator object does not designate the location of the remote locator object as a trusted location for one or more other remote locator objects that are not separated from the location of the user.

17. The method of claim 13, wherein:

the one or more criteria include a criterion that is satisfied when the separation alert was generated in accordance with the determination that the second separation criteria are met, and is not satisfied when the separation alert was generated in accordance with the determination that the first separation criteria are met, and in accordance with a determination that the one or more criteria are not satisfied, the separation alert does not include the selectable option that is selectable to initiate the process to designate the location of the remote locator object as a trusted location for the remote locator object.

18. The method of claim 1, wherein the separation alert includes a selectable option that is selectable to initiate a process to disable separation alerts for the remote locator object.

19. The method of claim 1, wherein displaying the separation alert includes:

in accordance with a determination that one or more criteria are satisfied, wherein whether the one or more criteria are satisfied is based on a number of times the remote locator object has been separated from the location of the user, displaying the separation alert concurrently with one or more options for adjusting separation alert settings for the remote locator object, and in accordance with a determination that the one or more criteria are not satisfied, displaying the separation alert without displaying the one or more options for adjusting the separation alert settings for the remote locator object.

20. The method of claim 1, further comprising:

displaying, via the output component, a user interface for designating one or more locations as trusted locations for the remote locator object, wherein:

in accordance with a determination that a respective location has been designated as a trusted location for another remote locator object associated with the electronic device but not the remote locator object, the user interface includes a selectable option that is selectable to designate the respective location as a trusted location for the remote locator object, and in accordance with a determination that the respective location has not been designated as a trusted location for another remote locator object associated with the electronic device, the user interface does not include the selectable option that is selectable to designate the respective location as a trusted location for the remote locator object.

21. The method of claim 20, wherein displaying the user interface for designating the one or more locations as trusted locations for the remote locator object includes:

in accordance with the determination that the respective location has been designated as a trusted location for another remote locator object associated with the electronic device but not the remote locator object, displaying, in the user interface, a visual indication of an identity of a second remote locator object for which the respective location has been designated as a trusted location.

22. The method of claim 20, wherein displaying the user interface for designating the one or more locations as trusted locations for the remote locator object includes:

in accordance with the determination that the respective location has been designated as a trusted location for another remote locator object associated with the electronic device but not the remote locator object, displaying, in the user interface, a visual indication of a number of other remote locator objects associated with the electronic device for which the respective location has been designated as a trusted location.

23. The method of claim 1, wherein the first separation criteria and the second separation criteria include a criterion that is satisfied when, prior to generating the separation alert, the location associated with the user and the location of the remote locator object exited a trusted location together, and is not satisfied when, prior to generating the separation alert, the location associated with the user and the location of the remote locator object did not exit a trusted location together.

24. The method of claim 1, wherein the first separation criteria and the second separation criteria include a criterion that is satisfied when at least one trusted location has been designated for the remote locator object, and is not satisfied when at least one trusted location has not been designated for the remote locator object.

25. An electronic device, comprising:

one or more processors;

memory; and one or more programs, wherein the one or more programs are stored in the memory and configured to be executed by the one or more processors, the one or more programs including instructions for:

detecting a change in a location of a remote locator object relative to a location associated with a user, wherein the location associated with the user corresponds to a location of the electronic device; and in response to detecting the change in location of the remote locator object relative to the location associated with the user:

in accordance with a determination that the location associated with the user and the location of the remote locator object have been moving for at least a first threshold amount of time while remaining within a first threshold distance from each other, and that first separation criteria are met, generating, via an output component, a separation alert, that indicates that the remote locator object has been separated from the location associated with the user, at the electronic device without regard to whether second separation criteria have been met, wherein the second separation criteria are different from the first separation criteria; and in accordance with a determination that the location associated with the user and the location of the remote locator object have moved less than a second threshold distance for at least a second threshold amount of time, and that the second separation criteria are met, generating, via the output component, a separation alert, that indicates that the remote locator object has been separated from the location associated with the user, at the electronic device without regard to whether the first separation criteria have been met.

26. The electronic device of claim 25, wherein the one or more programs further include instructions for:

after generating the separation alert associated with the remote locator object, detecting, via the one or more input devices, input directed to the separation alert; and in response to detecting the input directed to the separation alert:

in accordance with a determination that the input corresponds to a request to designate a current location of the remote locator object as a trusted location, initiating a process to designate the current location of the remote locator object as a trusted location.

27. The electronic device of claim 25, wherein the one or more programs further include instructions for:

before generating the separation alert and before the electronic device is configured to generate separation alerts based on separation of the remote locator object from the electronic device:

detecting that the first separation criteria or the second separation criteria have been met; and in response to detecting that the first separation criteria or the second separation criteria have been met:

in accordance with a determination that one or more criteria are satisfied, including a criterion that is satisfied based on a number of times the first separation criteria or the second separation criteria have been met, generating, via the output component, an indication that the electronic device can be configured to generate separation alerts based on separation of the remote locator object from the electronic device.

28. The electronic device of claim 25, wherein the one or more programs further include instructions for:

while displaying, via the output component, a user interface that includes a representation of a map:

in accordance with a determination that a first component and a second component that are associated with each other are currently connected with each other, indicating, in the user interface, the first and second components with a first set of one or more indications having a first visual appearance; and in accordance with a determination that the first component and the second component that are associated with each other are not currently connected with each other, indicating, in the user interface, the first and second components with a second set of one or more indications having a second visual appearance, different from the first visual appearance.

29. The electronic device of claim 28, wherein the one or more programs further include instructions for:

in accordance with the determination that the first component and the second component that are associated with each other are not currently connected with each other:

while displaying, via the output component, a first indication corresponding to the first and second components, detecting, via one or more input devices, an input directed to the first indication; and in response to detecting the input directed to the first indication, displaying, via the output component, a second indication corresponding to the first component, and a third indication corresponding to the second component.

30. The electronic device of claim 28, wherein the one or more programs further include instructions for:

in accordance with the determination that the first component and the second component that are associated with each other are not currently connected with each other:

displaying, on the representation of the map:

a first indication corresponding to the first component at a location on the representation of the map corresponding to a location of the first component, and a second indication corresponding to the second component at a location on the representation of the map corresponding to a location of the second component.

31. The electronic device of claim 25, wherein:

in accordance with a determination that one or more criteria are satisfied, the separation alert includes a selectable option that is selectable to initiate a process to designate the location of the remote locator object as a trusted location for the remote locator object.

32. The electronic device of claim 31, wherein the process to designate the location of the remote locator object as a trusted location for the remote locator object includes:

in accordance with a determination that the remote locator object has been separated from the location of the user at the location of the remote locator object without a respective set of one or more other remote locator objects being separated from the location of the user at the location of the remote locator object, designating the location of the remote locator object as a trusted location for the remote locator object without designating the location of the remote locator object as a trusted location for other remote locator objects in the respective set of one or more other remote locator objects.

33. The electronic device of claim 31, wherein the process to designate the location of the remote locator object as a trusted location for the remote locator object includes:

in accordance with a determination that the remote locator object and a second remote locator object have been separated from the location of the user at the location of the remote locator object:

designating the location of the remote locator object as a trusted location for the remote locator object; and designating the location of the remote locator object as a trusted location for the second remote locator object.

34. The electronic device of claim 31, wherein:

the one or more criteria include a criterion that is satisfied when the separation alert was generated in accordance with the determination that the second separation criteria are met, and is not satisfied when the separation alert was generated in accordance with the determination that the first separation criteria are met, and in accordance with a determination that the one or more criteria are not satisfied, the separation alert does not include the selectable option that is selectable to initiate the process to designate the location of the remote locator object as a trusted location for the remote locator object.

35. The electronic device of claim 25, wherein displaying the separation alert includes:

in accordance with a determination that one or more criteria are satisfied, wherein whether the one or more criteria are satisfied is based on a number of times the remote locator object has been separated from the location of the user, displaying the separation alert concurrently with one or more options for adjusting separation alert settings for the remote locator object, and in accordance with a determination that the one or more criteria are not satisfied, displaying the separation alert without displaying the one or more options for adjusting the separation alert settings for the remote locator object.

36. The electronic device of claim 25, wherein the one or more programs further include instructions for:

displaying, via the output component, a user interface for designating one or more locations as trusted locations for the remote locator object, wherein:

in accordance with a determination that a respective location has been designated as a trusted location for another remote locator object associated with the electronic device but not the remote locator object, the user interface includes a selectable option that is selectable to designate the respective location as a trusted location for the remote locator object, and in accordance with a determination that the respective location has not been designated as a trusted location for another remote locator object associated with the electronic device, the user interface does not include the selectable option that is selectable to designate the respective location as a trusted location for the remote locator object.

37. The electronic device of claim 36, wherein displaying the user interface for designating the one or more locations as trusted locations for the remote locator object includes:

in accordance with the determination that the respective location has been designated as a trusted location for another remote locator object associated with the electronic device but not the remote locator object, displaying, in the user interface, a visual indication of an identity of a second remote locator object for which the respective location has been designated as a trusted location.

38. The electronic device of claim 36, wherein displaying the user interface for designating the one or more locations as trusted locations for the remote locator object includes:

in accordance with the determination that the respective location has been designated as a trusted location for another remote locator object associated with the electronic device but not the remote locator object, displaying, in the user interface, a visual indication of a number of other remote locator objects associated with the electronic device for which the respective location has been designated as a trusted location.

39. A non-transitory computer readable storage medium storing one or more programs, the one or more programs comprising instructions, which when executed by one or more processors of an electronic device, cause the electronic device to perform a method comprising:

detecting a change in a location of a remote locator object relative to a location associated with a user, wherein the location associated with the user corresponds to a location of the electronic device; and in response to detecting the change in location of the remote locator object relative to the location associated with the user:

in accordance with a determination that the location associated with the user and the location of the remote locator object have been moving for at least a first threshold amount of time while remaining within a first threshold distance from each other, and that first separation criteria are met, generating, via an output component, a separation alert, that indicates that the remote locator object has been separated from the location associated with the user, at the electronic device without regard to whether second separation criteria have been met, wherein the second separation criteria are different from the first separation criteria; and in accordance with a determination that the location associated with the user and the location of the remote locator object have moved less than a second threshold distance for at least a second threshold amount of time, and that the second separation criteria are met, generating, via the output component, a separation alert, that indicates that the remote locator object has been separated from the location associated with the user, at the electronic device without regard to whether the first separation criteria have been met.

40. The non-transitory computer readable storage medium of claim 39, further storing instructions which, when executed by the one or more processors, further cause the electronic device to perform:

after generating the separation alert associated with the remote locator object, detecting, via one or more input devices, input directed to the separation alert; and in response to detecting the input directed to the separation alert:

in accordance with a determination that the input corresponds to a request to designate a current location of the remote locator object as a trusted location, initiating a process to designate the current location of the remote locator object as a trusted location.

41. The non-transitory computer readable storage medium of claim 39, further storing instructions which, when executed by the one or more processors, further cause the electronic device to perform:

before generating the separation alert and before the electronic device is configured to generate separation alerts based on separation of the remote locator object from the electronic device:

detecting that the first separation criteria or the second separation criteria have been met; and in response to detecting that the first separation criteria or the second separation criteria have been met:

in accordance with a determination that one or more criteria are satisfied, including a criterion that is satisfied based on a number of times the first separation criteria or the second separation criteria have been met, generating, via the output component, an indication that the electronic device can be configured to generate separation alerts based on separation of the remote locator object from the electronic device.

42. The non-transitory computer readable storage medium of claim 39, further storing instructions which, when executed by the one or more processors, further cause the electronic device to perform:

while displaying, via the output component, a user interface that includes a representation of a map:

in accordance with a determination that a first component and a second component that are associated with each other are currently connected with each other, indicating, in the user interface, the first and second components with a first set of one or more indications having a first visual appearance; and in accordance with a determination that the first component and the second component that are associated with each other are not currently connected with each other, indicating, in the user interface, the first and second components with a second set of one or more indications having a second visual appearance, different from the first visual appearance.

43. The non-transitory computer readable storage medium of claim 42, further storing instructions which, when executed by the one or more processors, further cause the electronic device to perform:

in accordance with the determination that the first component and the second component that are associated with each other are not currently connected with each other:

while displaying, via the output component, a first indication corresponding to the first and second components, detecting, via one or more input devices, an input directed to the first indication; and in response to detecting the input directed to the first indication, displaying, via the output component, a second indication corresponding to the first component, and a third indication corresponding to the second component.

44. The non-transitory computer readable storage medium of claim 42, further storing instructions which, when executed by the one or more processors, further cause the electronic device to perform:

in accordance with the determination that the first component and the second component that are associated with each other are not currently connected with each other:

displaying, on the representation of the map:

a first indication corresponding to the first component at a location on the representation of the map corresponding to a location of the first component, and a second indication corresponding to the second component at a location on the representation of the map corresponding to a location of the second component.

45. The non-transitory computer readable storage medium of claim 39, wherein:

in accordance with a determination that one or more criteria are satisfied, the separation alert includes a selectable option that is selectable to initiate a process to designate the location of the remote locator object as a trusted location for the remote locator object.

46. The non-transitory computer readable storage medium of claim 45, wherein the process to designate the location of the remote locator object as a trusted location for the remote locator object includes:

in accordance with a determination that the remote locator object has been separated from the location of the user at the location of the remote locator object without a respective set of one or more other remote locator objects being separated from the location of the user at the location of the remote locator object, designating the location of the remote locator object as a trusted location for the remote locator object without designating the location of the remote locator object as a trusted location for other remote locator objects in the respective set of one or more other remote locator objects.

47. The non-transitory computer readable storage medium of claim 45, wherein the process to designate the location of the remote locator object as a trusted location for the remote locator object includes:

in accordance with a determination that the remote locator object and a second remote locator object have been separated from the location of the user at the location of the remote locator object:

designating the location of the remote locator object as a trusted location for the remote locator object; and designating the location of the remote locator object as a trusted location for the second remote locator object.

48. The non-transitory computer readable storage medium of claim 45, wherein:

the one or more criteria include a criterion that is satisfied when the separation alert was generated in accordance with the determination that the second separation criteria are met, and is not satisfied when the separation alert was generated in accordance with the determination that the first separation criteria are met, and in accordance with a determination that the one or more criteria are not satisfied, the separation alert does not include the selectable option that is selectable to initiate the process to designate the location of the remote locator object as a trusted location for the remote locator object.

49. The non-transitory computer readable storage medium of claim 39, wherein displaying the separation alert includes:

in accordance with a determination that one or more criteria are satisfied, wherein whether the one or more criteria are satisfied is based on a number of times the remote locator object has been separated from the location of the user, displaying the separation alert concurrently with one or more options for adjusting separation alert settings for the remote locator object, and in accordance with a determination that the one or more criteria are not satisfied, displaying the separation alert without displaying the one or more options for adjusting the separation alert settings for the remote locator object.

50. The non-transitory computer readable storage medium of claim 39, further storing instructions which, when executed by the one or more processors, further cause the electronic device to perform:

displaying, via the output component, a user interface for designating one or more locations as trusted locations for the remote locator object, wherein:

in accordance with a determination that a respective location has been designated as a trusted location for another remote locator object associated with the electronic device but not the remote locator object, the user interface includes a selectable option that is selectable to designate the respective location as a trusted location for the remote locator object, and in accordance with a determination that the respective location has not been designated as a trusted location for another remote locator object associated with the electronic device, the user interface does not include the selectable option that is selectable to designate the respective location as a trusted location for the remote locator object.

51. The non-transitory computer readable storage medium of claim 50, wherein displaying the user interface for designating the one or more locations as trusted locations for the remote locator object includes:

in accordance with the determination that the respective location has been designated as a trusted location for another remote locator object associated with the electronic device but not the remote locator object, displaying, in the user interface, a visual indication of an identity of a second remote locator object for which the respective location has been designated as a trusted location.

52. The non-transitory computer readable storage medium of claim 50, wherein displaying the user interface for designating the one or more locations as trusted locations for the remote locator object includes:

in accordance with the determination that the respective location has been designated as a trusted location for another remote locator object associated with the electronic device but not the remote locator object, displaying, in the user interface, a visual indication of a number of other remote locator objects associated with the electronic device for which the respective location has been designated as a trusted location.

\* \* \* \* \*